(12) United States Patent
Schrock et al.

(10) Patent No.: US 9,441,059 B2
(45) Date of Patent: Sep. 13, 2016

(54) METATHESIS CATALYSTS AND METHODS THEREOF

(71) Applicant: Massachusetts Institute of Technology, Cambridge, MA (US)

(72) Inventors: Richard Royce Schrock, Winchester, MA (US); Jian Yuan, Albany, CA (US); Jonathan Clayton Axtell, Harpursville, NY (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/311,111

(22) Filed: Jun. 20, 2014

(65) Prior Publication Data

US 2014/0378637 A1    Dec. 25, 2014

Related U.S. Application Data

(60) Provisional application No. 61/837,589, filed on Jun. 20, 2013.

(51) Int. Cl.
*C08F 132/08* (2006.01)

(52) U.S. Cl.
CPC .................................. *C08F 132/08* (2013.01)

(58) Field of Classification Search
CPC .................................................. C08F 132/08
See application file for complete search history.

(56) References Cited

U.S. PATENT DOCUMENTS

| | | | |
|---|---|---|---|
| 6,121,473 A | 9/2000 | Schrock et al. | |
| 7,932,397 B2 | 4/2011 | Hock et al. | |
| 8,222,469 B2 | 7/2012 | Schrock et al. | |
| 8,350,073 B2 | 1/2013 | Hock et al. | |
| 8,362,311 B2 | 1/2013 | Schrock et al. | |
| 8,546,500 B2 | 10/2013 | Hoveyda et al. | |
| 8,598,400 B2 | 12/2013 | Hoveyda et al. | |
| 8,829,219 B2 | 9/2014 | Hock et al. | |
| 9,073,801 B2 | 7/2015 | Hoveyda et al. | |
| 9,079,173 B2 | 7/2015 | Schrock et al. | |
| 9,085,595 B2 | 7/2015 | Schrock et al. | |
| 9,206,211 B2 | 12/2015 | Schrock et al. | |
| 2011/0015430 A1 | 1/2011 | Schrock et al. | |

(Continued)

FOREIGN PATENT DOCUMENTS

| | | |
|---|---|---|
| WO | WO-2009/094201 A2 | 7/2009 |
| WO | WO-2011/008258 A2 | 1/2011 |

(Continued)

OTHER PUBLICATIONS

Addison, A.W. et al., Synthesis, structure, and spectroscopic properties of copper(II) compounds containing nitrogen—sulphur donor ligands; the crystal and molecular structure of aqua[1,7-bis(N-methylbenzimidazol-2'-yl)-2,6-dithiaheptane]copper(II) perchlorate, J. Chem. Soc., Dalton Trans., 1349-1356 (1984).

(Continued)

*Primary Examiner* — Robert Harlan
(74) *Attorney, Agent, or Firm* — Stoel Rives LLP

(57) ABSTRACT

The present application provides, among other things, compounds and methods for metathesis reactions. In some embodiments, a provided compound has the structure of formula I, II or III. In some embodiments, $R^1$ of formula I, II or III comprises an electron-withdrawing group. In some embodiments, the present invention provides methods for preparing provided compounds.

29 Claims, 3 Drawing Sheets

(56) References Cited

U.S. PATENT DOCUMENTS

| | | | |
|---|---|---|---|
| 2011/0065915 | A1 | 3/2011 | Malcolmson et al. |
| 2011/0077421 | A1 | 3/2011 | Schrock et al. |
| 2011/0237815 | A1 | 9/2011 | Hock et al. |
| 2011/0245477 | A1 | 10/2011 | Hoveyda et al. |
| 2012/0302710 | A1 | 11/2012 | Hoveyda et al. |
| 2012/0323000 | A1* | 12/2012 | Hoveyda et al. ............ 540/452 |
| 2013/0116434 | A1 | 5/2013 | Schrock et al. |
| 2013/0274482 | A1 | 10/2013 | Schrock et al. |
| 2013/0281706 | A1 | 10/2013 | Hock et al. |
| 2014/0309388 | A1 | 10/2014 | Schrock et al. |
| 2014/0316088 | A1 | 10/2014 | Schrock et al. |
| 2014/0330018 | A1 | 11/2014 | Czirok et al. |
| 2014/0378634 | A1 | 12/2014 | Kol et al. |
| 2015/0065723 | A1 | 3/2015 | Hock et al. |
| 2015/0240008 | A1 | 8/2015 | Schrock et al. |
| 2015/0246348 | A1 | 9/2015 | Hoveyda et al. |

FOREIGN PATENT DOCUMENTS

| | | |
|---|---|---|
| WO | WO-2011/040963 A1 | 4/2011 |
| WO | WO-2011/097642 A1 | 8/2011 |
| WO | WO-2012/167171 A2 | 12/2012 |
| WO | WO-2013/070725 A1 | 5/2013 |
| WO | WO-2014/169014 A1 | 10/2014 |
| WO | WO-2014/172534 A1 | 10/2014 |
| WO | WO-2015/127192 A1 | 8/2015 |

OTHER PUBLICATIONS

Bailey, B.C. et al., Evaluation of Molybdenum and Tungsten Metathesis Catalysts for Homogeneous Tandem Alkane Metathesis, Organometallics, 28:355-360 (2009).

Bencze, N. et al., Chemical transformations of cis-W(CO)4(C5H5N)2 in the ring-opening metathesis polymerization of norbornene, Can. J. Chem., 82:499-503 (2004).

Binger, P. et al., Vinylcarbene Complexes of Titanocene, Angew. Chem. Int. Ed. Engl., 28(5):610-611 (1989).

Churchill et al., X-Ray Crystallographic Studies on Octahedral Oxo Alkylidene Complexes of Tungsten VI: (W=O)(=CHCMe3)(PMe3)2 Cl2 and W(=O)(=CHCMe3)(PEt3)2Cl2, Journal of Organometallic Chemistry, 204:C17-C20 (1981).

Dabrowski, M. et al., (2-Meth-oxy-1, 3-phenyl-ene)diboronic acid, Acta Crystallogr Sect E Struct Rep Online, 64(Pt 2):0414-0415 (2008).

De La Mata, F.J. and Grubbs, R.H., Synthesis and Reactions of Tungsten Oxo Vinylalkylidene Complexes: Reactions of $WCl_2(O)(PX_3)$ (X=OMe, R) Precursors with 3,3-Diphenylcyclopropene, Organometallics, 15(2):577-584 (1996).

Flook et al., Z-selective olefin metathesis processes catalyzed by a molybdenum hexaisopropylterphenoxide monopyrrolide complex, J. Am. Chem. Soc., 131(23):7962-3 (2009).

Flook, M. M., et al. Z-Selective and Syndioselective Ring-Opening Metathesis Polymerization (ROMP) Inititated by Monoaryloxidepyrrolide (MAP) Catalysts. Macromolecule.43, 7515-7522 (2010).

Flook, M. M., et al., Synthesis of cis, syndiotactic ROMP Polymers Containing Alternating Enantiomers, J. Am. Chem. Soc.133:1784-6 (2011).

Flook, M.M. et al., Five-Coordinate Rearrangements of Metallacyclobutane Intermediates during Ring-Opening Metathesis Polymerization of 2,3-Dicarboalkoxynorbornenes by Molybdenum and Tungsten Monoalkoxide Pyrrolide Initiators Organometallics, 31(17):6231-6243 (2012).

Fox, H. H. et al., Simple, high yield syntheses of molybdenum(VI) bis(imido) complexes of the type Mo(NR)2Cl2(1,2-dimethoxyethane), Inorg. Chem., 31(11):2287-2289 (1992).

Goldman, AS et al, Catalytic alkane metathesis by tandem alkane dehydrogenation-olefin metathesis, Science, 312(5771):257-261 (2006).

Grubbs, R.H., Olefin-metathesis catalysts for the preparation of molecules and materials (Nobel Lecture), Angew Chem. Int. Ed. Engl., 45(23):3760-5 (2006).

Hirsekorn, K.F. et al., Thermodynamics, kinetics, and mechanism of (silox)3M(olefin) to (silox)3M(alkylidene) rearrangements (silox=tBu3SiO; M=Nb, Ta), J. Am. Chem. Soc., 127(13):4809-30 (2005).

Hock, A.S. et al., Dipyrrolyl Precursors to Blsalkaxoide Molybdenum Olefin Metathesis Catalysts, J. Am. Chem. Soc., 128:16373-16375 (2008).

Ibrahem et al., Highly Z- and enantioselective ring-opening/cross-metathesis reactions catalyzed by stereogenic-at-Mo adamantylimido complexes, J. Am. Chem Soc., 131(11):3844-5 (2009).

International Search Report for PCT/US12/63898, 3 pages (Jan. 28, 2013).

International Search Report for PCT/US2014/033450, 4 pages (Aug. 28, 2014).

Ivin, K.J. et al., The $^{13}C$ NMR spectra of poly(1-pentenylene) and poly(1,3-cyclopentylenevinylene), Die Makromolekulare Chemie, 178(5):1545-1560 (1977).

Javier De La Mata, F., Synthesis and characterization of tungsten oxo alkylidene complexes via the reaction of WCl2(O)[PX3]3 (PX3=P (OMe)3, PMe2Ph, PMePh2) with 4,8-dioxaspiro[2,5]oct-1-ene (ketalcyclopropene), Journal of Organometallic Chemistry, 525:183-189 (1996).

Jiang et al., Fundamental studies of tungsten alkylidene imido monoalkoxidepyrrolide complexes. J Am Chem Soc.131(22):7770-80 (2009).

Jiang et al., Highly Z-selective metathesis homocoupling of terminal olefins, J Am Chem Soc. 131(46):16630-1 (2009).

Jiang, A. J. et al., Cationic Molybdenum Imido Alkylidene Complexes, Organometallics, 27, 4428-4438 (2008).

Johnson, L.K. et al., Synthesis of tungsten vinyl alkylidene complexes via the reactions of WCl2(NAr)(PX3)3 (X=R, OMe) precursors with 3,3-disubstituted cyclopropenes, J. Am. Chem. Soc., 115(18):8130-8145 (1993).

Marinescu et al., Inversion of configuration at the metal in diastereomeric imido alkylidene monoaryloxide monopyrrolide complexes of molybdenum. J Am Chem Soc.131 (1):58-9 (2009).

Marinescu et al., Syntheses of Variations of Stereogenic-at-Metal Imido Alkylidene Complexes of Molybdenum, Organometallics, 31: 6336-6343 (2012).

Marinescu, S. C., et al., Room-Temperature Z-Selective Homocoupling of α-Olefins by Tungsten Catalysts. Organometallics. 30, 1780-1782 (2011).

Marinescu, S. C., et al., Syntheses and Structures of Molybdenum Imido Alkylidene Pyrrolide and Indolide Complexes. Organometallics. 27, 6570-6578 (2008).

Marinescu, S.C. et al., Simple Molybdenum(IV) Olefin Complexes of the Type Mo(NR)(X)(Y)(olefin), Organometallics, 29(24):6816-6828 (2010).

McConville, D.H. et al., Synthesis of chiral molybdenum ROMP initiators and all-cis highly tactic poly(2,3-(R)2norbornadiene) (R=CF3 or CO2Me), J. Am. Chem. Soc., 115(10): 4413-4414 (1993).

Meek, S. J., et al., Catalytic Z-selective olefin cross-metathesis for natural product synthesis, Nature 471:461-466 (2011).

Müller, P., Practical suggestions for better crystal structures, Crystallography Reviews, 15(1):57-83 (2009).

Nguyen, S.T. et al., Ring-opening metathesis polymerization (ROMP) of norbornene by a Group VIII carbene complex in protic media J. Am. Chem. Soc., 114(10):3974-3975 (1992).

O'Donoghue et al., Preparation of Well-Defined, Metathetically Active Oxo Alkylidene Complexes of Tungsten, Organometallics, 15:1334-1336 (1996).

Peryshkov, D. et al., Synthesis of Tungsten Oxo Alkylidene Complexes, Organometallics, 7278-7286 (2012).

Peryshkov, D. V., et al., Z-Selective Olefin Metathesis Reaction Promoted by Tungsten Oxo Alkylidene Comlexes. J. Am. Chem. Soc. 133, 20754-20757 (2011).

Rappe, A.K. et al., Olefin metathesis. A mechanistic study of high-valent group 6 catalysts, JACS, 104:448-456 (1982).

(56) References Cited

OTHER PUBLICATIONS

Schrock, R.R. et al. Synthesis of stereoregular ROMP polymers using molybdenum and tungsten imido alkylidene initiators, Dalton Trans., 40(29):7484-95 (2011).
Schrock, R.R. et al., Catalytic homologation of vinyltributylstannane to allyltributylstannane by Mo(IV) complexes in the presence of ethylene, J. Am. Chem. Soc., 126(7):1948-9 (2004).
Schrock, R.R. et al., Olefin Metathesis Reactions Initiated by d2 Molybdenum; or Tungsten Complexes, Organometallics, 24:5211-5213 (2005).
Schrock, R.R. et al., Recent advances in olefin metathesis by molybdenum and tungsten imido alkylidene complexes, Journal of Molecular Catalysis A: Chemical 213:21-30 (2004).
Schrock, R.R., Multiple metal-carbon bonds for catalytic metathesis reactions (Nobel Lecture), Angew Chem. Int. Ed. Engl., 45(23):3748-59 (2006).
Schrock, Recent advances in high oxidation state Mo and W imido alkylidene chemistry, Chem. Rev., 109(8):3211-26 (2009).
Sheldrick, G.M, Phase annealing in *SHELX*-90: direct methods for larger structures, Acta Crystallographica, A46:467-473 (1990).
Sheldrick, GM et al., A short history of SHELX, Acta Crystallographica A., 64(Pt 1):112-22 (2008).
Siaj, M. et al., Preparation and olefin-metathesis activity of cyclopentylidene-oxo initiator sites on a molybdenum carbide surface, Journal of Organometallic Chemistry, 691:5497-5504 (2006).
Singh, R., Cyclopropene Polymerization and Enyne Metathesis Catalyzed by High Oxidation State Molybdenum Alkylidenes, PhD Thesis, Massachusetts Institute of Technology (2008), downloaded from DSpace@MIT, <http://dspace.mit.edu/handle/1721.1/43771#files-area> [last accessed Mar. 25, 2015].
Townsend, E.M. et al., Z-selective metathesis homocoupling of 1,3-dienes by molybdenum and tungsten monoaryloxide pyrrolide (MAP) complexes, J. Am. Chem. Soc., 134(28):11334-7 (2012).
Tsang, W.C.P. et al., Investigations of Reactions between Chiral Molybdenum Imido Alkylidene Complexes and Ethylene:? Observation of Unsolvated Base-Free Methylene Complexes, Metalacyclobutane and Metalacyclopentane Complexes, and Molybdenum(IV) Olefin Complexes, Organometallics, 23(9):1997-2007 (2004).
Vorozhtsov, N. et al., Zhurnal Obshchei Khimii, 37:1225-1227 (1967).
Wang, C. et al., Efficient and selective formation of macrocyclic disubstituted Z alkenes by ring-closing metathesis (RCM) reactions catalyzed by Mo- or W-based monoaryloxide pyrrolide (MAP) complexes: applications to total syntheses of epilachnene, yuzu lactone, ambrettolide, epothilone C, and nakadomarin A, Chemistry, 19(8):2726-40 (2013).
Wang, C. et al., Molybdenum-based complexes with two aryloxides and a pentafluoroimido ligand: catalysts for efficient Z-selective synthesis of a macrocyclic trisubstituted alkene by ring-closing metathesis, Angew Chem. Int. Ed. Engl., 52(7):1939-43 (2013).
Written Opinion for PCT/US12/63898, 4 pages (Jan. 28, 2013).
Written Opinion for PCT/US2014/033450, 5 pages (Aug. 28, 2014).
Yu, M., et al., Enol Ethers as Substrates for Efficient Z- and Enantioselective Ring-Opening/Cross-Metathesis Reactions Promoted by Stereogenic-at-Mo Complexes: Utility in Chemical Synthesis and Mechanistic Attributes. J. Am. Chem. Soc.134, 2788-2799 (2012).
Yuan, J. et al., Pentafluorophenylimido Alkylidene Complexes of Molybdenum and Tungsten, Organometallics, 31: 4650-4653 (2012).
Yuan, J. et al., Synthesis and ROMP Chemistry of Decafluoroterphenoxide Molybdenum Imido Alkylidene and Ethylene Complexes, Organometallics, 32:2983-2992 (2013).
Arndt, S. et al., Synthesis and Reactions of Tunsten Alkylidene Complexes That Contain the 2,6-Dichlorophenylimido Ligand, Organometallics, 26:1279-1290 (2007).
Axtell, J. et al., Synthesis of Tungsten Imido Alkylidene Complexes that Contain an Electron-Withdrawing Imido Ligand, Organometallics, 33:5342-5348 (2014).

Bazan, G. et al., Living Ring-Opening Metathesis Polymerization of 2,3-Difunctionalized Norbornadienes by Mo(CH-*t*-Bu)(N-2,6-C6H3-*i*-Pr2) (O-t-Bu)2, Journal of the American Chemical Society, 112(23):8378-8387 (1990).
Bielawski, C. and Grubbs, R., Living ring-opening metathesis polymerization, Progress in Polymer Science, 32:1-29 (2007).
Buchmeiser, Michael R., Homogeneous Methathesis Polymerization by Well-Defined Group VI and Group VIII Transition-Metal Alkylidenes: Fundamentals and Applications in the Preparation of Advanced Materials, Chemical Review, 100:1565-1604 (2000).
Cain, M. et al., Synthesis of a TREN in which the aryl substituents are part of a 45 atom macrocycle, Journal of the American Chemical Society, 135(41):15338-15341 (2013).
Dreisch, K. et al., Synthesis and Structure of Dimethoxyethane-Dichlorodioxo-Tungsten(VI)—A Highly Soluble Derivative of Tungsten Dioxodichloride, Polyhedron, 10(20/21):2417-2421 (1991).
Feldman, J. and Schrock, R., Recent Advances in the Chemistry of "d0" Alkylidene and Metallacyclobutane Complexes, Progress in Inorganic Chemistry, 39:1-74 (1991).
Flook, M., Z-Selective Olefin Metathesis Processes and Cis/Syndioselective ROMP with High Oxidation State Molybdenum Alkylidenes, Massachusetts Institute of Technology, Cambridge, MA, 2012 (215 pages).
Forrest, W. et al., Stereospecific ring-opening metathesis polymerization of norbornadienes employing tungsten oxo alkylidene initiators, Journal of American Chemical Society, 136(31):10910-10913 (2014).
Forrest, W. et al., Tungsten Oxo Alkylidene Complexes as Initiators for the Stereoregular Polymerization of 2,3-Dicarbomethoxynorbornadiene, Organometallics, 33:2313-2325 (2014).
Franke, S. et al., Uranium(III) complexes with bulky aryloxide ligands featuring metal-arene interactions and their reactivity toward nitrous oxide, Inorganic Chemistry, 52(18):10552-10558 (2013).
Hoveyda, Amir H., Evolution of catalytic stereoselective olefin metathesis: from ancillary transformation to purveyor of stereochemical identity, Journal of Organic Chemistry, 79(11):4763-4792 (2014).
Huang, Z. et al., Efficient Heterogeneous Dual Catalyst Systems for Alkane Metathesis, Advanced Synthesis & Catalysis, 352:125-135 (2010).
Jamieson, Jennifer Yvonne, Ligand Variation in Molybdenum Asymmetric Ring-Closing Metathesis Catalysts, Massachusetts Institute of Technology, Cambridge, MA, 133 pages (2002).
Jeong, H. et al., Syntheses of Tungsten tert-Butylimido and Adamantylimido Alkylidene Complexes Employing Pyridinium Chloride as the Acid, Organometallics, 31(18):6522-6525 (108 pages) (2012).
Kiesewetter, E. et al., Synthesis of Z-(Pinacolato)allylboron and Z-(Pinacolato)alkenylboron Compounds through Stereoselective Catalytic Cross-Materials, Journal of the American Chemical Society, 135:6026-6029 (2013).
Kreickmann, T. et al., Imido Alkylidene Bispyrrolyl Complexes of Tungsten, Organametallics, 26:5702-5711 (2007).
Lopez, L. and Schrock, R., Formation of dimers that contain unbridged W(IV)/W(IV) double bonds, Journal of American Chemical Society, 126(31):9526-9527 (2004).
Malcolmson et al., Highly efficient molybdenum-based catalysts for enantioselective alkene metathesis. Nature. 456(7224):933-7 (2008).
Mann, T. et al., Catalytic Z-Selective Cross-Metathesis with Secondary Silyl- and Benzyl-Protected Allylic Ethers: Mechanistic Aspects and Applications to Natural Product Synthesis, Angewandte Chemie International Edition, 52:8395-8400 (2013).
Nielson, Alastair J., *bis-t*-Butylimido Complexes of Tungsten(VI), Polyhedron, 6(8):1657-1667 (1987).
Peryshkov et al., B(C6F5)3 Activation of Oxo Tungsten Complexes that are Relevant to Olefin Metathesis, Organometallics, 32:5256-5259 (2013).
Reithofer, M. Monoaryloxide Pyrrolide (MAP) Imido Alkylidene Complexes of Molybdenum and Tungsten That Contain 2,6-Bis

(56) References Cited

OTHER PUBLICATIONS (2,5-R2-pyrrolyl)phenoxide (R=i-Pr, Ph) Ligands and an Unsubstituted Metallacyclobutane on Its Way to Losing Ethylene, Organometallics, 32(9):2489-2492 (2013).

Rufanov, K. et al., Sulfinylamine metathesis at oxo metal species—convenient entry into imido metal chemistry, Dalton Transactions, 40(9):1990-7 (2011).

Rufanov, K. et al., Synthesis and structure of a series of new haloaryl imido complexes of molybdenum, Polyhedron, 20:379-385 (2001).

Schrock et al., Further studies of imido alkylidene complexes of tungsten, well-characterized olefin metathesis catalysts with controllable activity. Organometallics, vol. 9, No. 8, pp. 2262-2275 (1990).

Schrock, R. et al., Exploring Factors That Determine Cis/Trans Structure and Tacticity in Polymers Prepared by Ring-Opening Metathesis Polymerization with Initiators of the Type *syn-* and *anti*-Mo(NAr)(CHCMe2Ph)(OR)2. Observation of a Temperature-Dependent Cis/Trans Ratio, Macromolecules, 28:5933-5940 (1995).

Schrock, R. et al., Molybdenum and tungsten imido alkylidene complexes as efficient olefinmetathesis catalysts. Angew. Chem. Int. Ed. 42, 4592-4633 (2003).

Schrock, R. et al., Synthesis of Molybdenum Imido Alkylidene Complexes and Some Reactions Involving Acyclic Olefins. J. Am. Chem. Soc. 112, 3875-3886 (1990).

Schrock, R. R., et al., Recent Advances in the Syntheses and Applications of Molybdebnum and Tungsten Alkylidene and Alkylidyne Catalysts for the Metathesis of Alkenes and Alkynes. Adv. Syn. Catal. 349, 55 (2007).

Schrock, R., High Oxidation State Multiple Metal-Carbon Bonds, Chemical Reviews, 102(1):145-179 (2002).

Schrock, Richard R., Alkylidene Complexes of the Earlier Transition Metals, Department of Chemistry, Massachusetts Institute of Technology, In *Reactions of Coordinated Ligands;* Braterman, P. R., Ed.; Plenum: New York, pp. 221-283 (1986).

Schrock, Richard R., Synthesis of stereoregular polymers through ring-opening metathesis polymerization, Accounts of Chemical Research, 47(8):2457-2466 (2014).

Smith, D. et al., Bioactive and Therapeutic ROMP Polymers, Polymer Reviews, 47:419-459 (2007).

Stewart, C. et al., Reactions of CO2 and related heteroallenes with CF3-substituted aromatic silylamines of tin, Polyhedron, 32:14-23 (2012).

Storozhenko, P. et al., Synthesis of N- and C-Trimethylsilyl-Substituted Anililes, Russian Journal of General Chemistry, 78(5):892-897 (2008).

Vougioukalakis, C. and Grubbs, R., Ruthenium-Based Heterocyclic Carbene-Coordinated Olefin Metathesis Catalysts, Chemical Review, 110(3):1746-1787 (2010).

Yu, M. et al., Synthesis of macrocyclic natural products by catalyst-controlled steroselective ring-closing metathesis, Nature, 479:88-93 (2011).

Yuan, J. et al., Preparation of Tungsten-Based Olefin Metathesis Catalysts Supported on Alumina, Advanced Synthesis & Catalysis, 353:1985-1992 (2011).

\* cited by examiner

METATHESIS CATALYSTS AND METHODS THEREOF

CROSS-REFERENCE TO RELATED APPLICATIONS

The present invention claims priority to U.S. Provisional Application Ser. No. 61/837,589, filed Jun. 20, 2013, the entirety of which is incorporated herein by reference.

STATEMENT REGARDING FEDERALLY SPONSORED RESEARCH OR DEVELOPMENT

This invention was made with government support under Grant Nos. CHE-0650456 and CHE-1111133 awarded by the National Science Foundation. The government has certain rights in the invention.

FIELD OF THE INVENTION

The present invention generally relates to metathesis reactions.

BACKGROUND

Catalytic metathesis has transformed chemical synthesis and offers exceptionally efficient pathways for the synthesis of many commercially important chemicals including biologically active molecules, oleochemicals, renewables, fine chemicals, and polymeric materials. There remains an unmet need for improved methods and catalysts for metathesis reactions, for example, in terms of better catalyst stability and/or activity, efficiency and stereoselectivity.

SUMMARY

The present invention, among other things, provides new compounds for promoting metathesis reactions. In some embodiments, the present invention provides a compound of formula I:

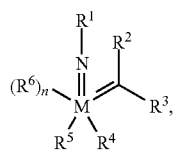

wherein:

M is molybdenum or tungsten;

$R^1$ is an optionally substituted group selected from $C_{1-20}$ aliphatic, $C_{1-20}$ heteroaliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or $R^1$ is optionally substituted

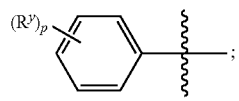

each of $R^2$ and $R^3$ is independently R, —OR, —SR, —N(R)$_2$, —OC(O)R, —SOR, —SO$_2$R, —SO$_2$N(R)$_2$, —C(O)N(R)$_2$, —NRC(O)R, or —NRSO$_2$R;

each of $R^4$ and $R^5$ is independently halogen, R, —N(R)$_2$, —NRC(O)R, —NRC(O)OR, —NRC(O)N(R)$_2$, —NRSO$_2$R, —NRSO$_2$N(R)$_2$, —NROR, —OR, —OSi(R)$_3$, —OAr$^a$, or an optionally substituted group selected from a 5-6 membered monocyclic heteroaryl ring having at least one nitrogen and 0-3 additional heteroatoms independently selected from nitrogen, oxygen, or sulfur, a 3-7 membered saturated or partially unsaturated heterocyclic ring having at least one nitrogen and 0-2 additional heteroatoms independently selected from nitrogen, oxygen, or sulfur, a 7-10 membered bicyclic saturated or partially unsaturated heterocyclic ring having at least one nitrogen and 0-4 additional heteroatoms independently selected from nitrogen, oxygen, or sulfur, or an 8-10 membered bicyclic heteroaryl ring having at least one nitrogen and 0-4 additional heteroatoms independently selected from nitrogen, oxygen, or sulfur;

Ar$^a$ is

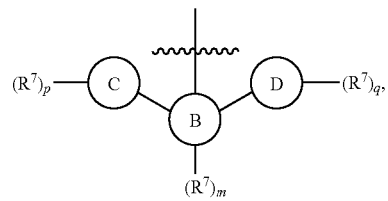

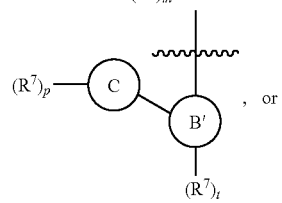

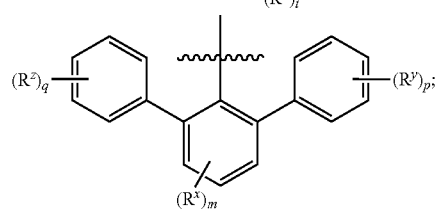

m is 0-3;

Ring B is an optionally substituted group selected from phenyl or a 5-6 membered monocyclic heteroaryl ring having 1-4 heteroatoms independently selected from nitrogen, oxygen, or sulfur;

p is 1-5;

q is 0-5;

t is 0-4;

each of Ring B', Ring C and Ring D is independently an optionally substituted group selected from phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-14 membered bicyclic or tricyclic heteroaryl ring having 1-5 heteroatoms independently selected from nitrogen, oxygen, or sulfur;

each $R^7$ is independently halogen, R, —CN, —NO$_2$, —OR, —SR, —S(O)R, —S(O)$_2$R, —OSi(R)$_3$, —N(R)$_2$, —NRC(O)R, —NRC(O)OR, —NRC(O)N(R)$_2$, —NRSO$_2$R, —NRSO$_2$N(R)$_2$, or —NROR;

each of $R^x$, $R^y$ and $R^z$ is independently an electron-withdrawing group;

each R is independently hydrogen or an optionally substituted group selected from $C_{1-20}$ aliphatic, $C_{1-20}$ heteroaliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:

two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen, or sulfur;

n is 0-2; and each $R^6$ is independently a neutral ligand.

In some embodiments, $R^1$ is optionally substituted

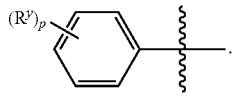

In some embodiments, the present invention provides a compound having the structure of I-a:

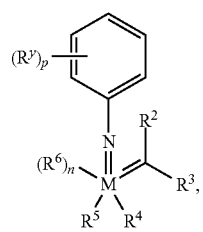

I-a wherein each variable is independently as defined above and described herein.

In some embodiments, the present invention provides a compound of formula II:

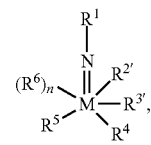

II wherein:

$R^{2'}$ and $R^{3'}$ are taken together with M to form an optionally substituted 3-8 membered saturated or partially unsaturated ring having, in addition to M, 0-4 heteroatoms independently selected from nitrogen, oxygen, or sulfur; and each of $R^1$, $R^4$, $R^5$, $R^6$, and n is independently as defined above and described herein.

In some embodiments, a compound of formula II has the structure of formula II-a:

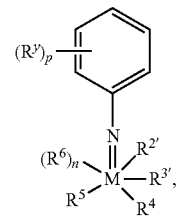

II-a wherein each variable is independently as defined above and described herein.

In some embodiments, $R^{2'}$ and $R^{3'}$ are taken together with M to form an optionally substituted 3-membered ring. In some embodiments, the present invention provides a compound having the structure of formula II-b:

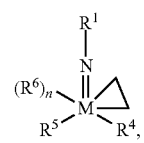

II-b wherein each variable is independently as defined above and described herein. In some embodiments, the present invention provides a compound having the structure of formula II-c:

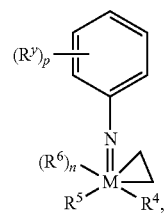

II-c wherein each variable is independently as defined above and described herein.

In some embodiments, the present invention provides a compound having the structure of formula III:

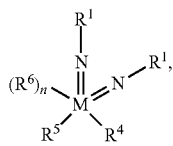

each variable is independently as defined above and described herein. In some embodiments, the present invention provides a compound having the structure of formula III-a:

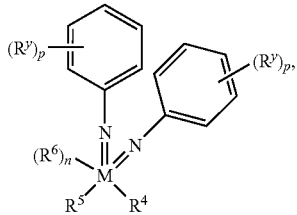

wherein each variable is independently as defined above and described herein.

In some embodiments, R⁴ is

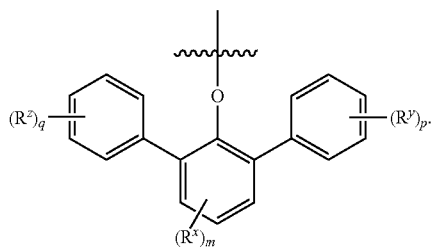

In some embodiments, the present invention provides a compound having the structure of formula I-b:

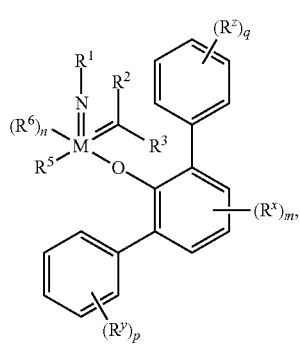

wherein each variable is independently as defined above and described herein.

In some embodiments, each of R⁴ and R⁵ is independently

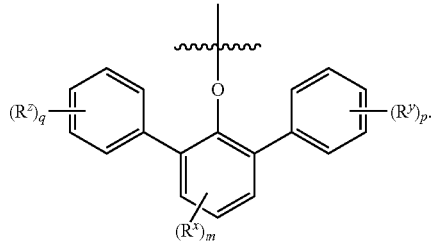

In some embodiments, a provide compound has the structure of formula I-c:

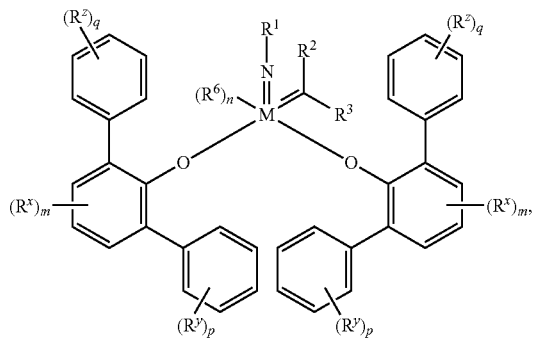

wherein each variable is independently as defined above and described herein.

Among other things, the present invention recognizes that a provided compound is particularly difficult to prepare. In some embodiments, a person of ordinary skill in the art, when using previously described methods in the art, cannot prepare a provided compound in suitable purity or yield. In some embodiments, the present invention provides methods for preparing provided compounds. In some embodiments, the present invention provides methods for preparing a compound of formula I. In some embodiments, the present invention provides methods for preparing a compound of formula II. In some embodiments, the present invention provides methods for preparing a compound of formula III.

(2), C(1)-C(2) 1.604(4), C(2)-C(3) 1.603(4); N(1)-W(1)-O(2) 173.79(7), W(1)-O(1)-C(17) 142.79(13), W(1)-O(2)-C(21) 163.19(14).

Figure 4:
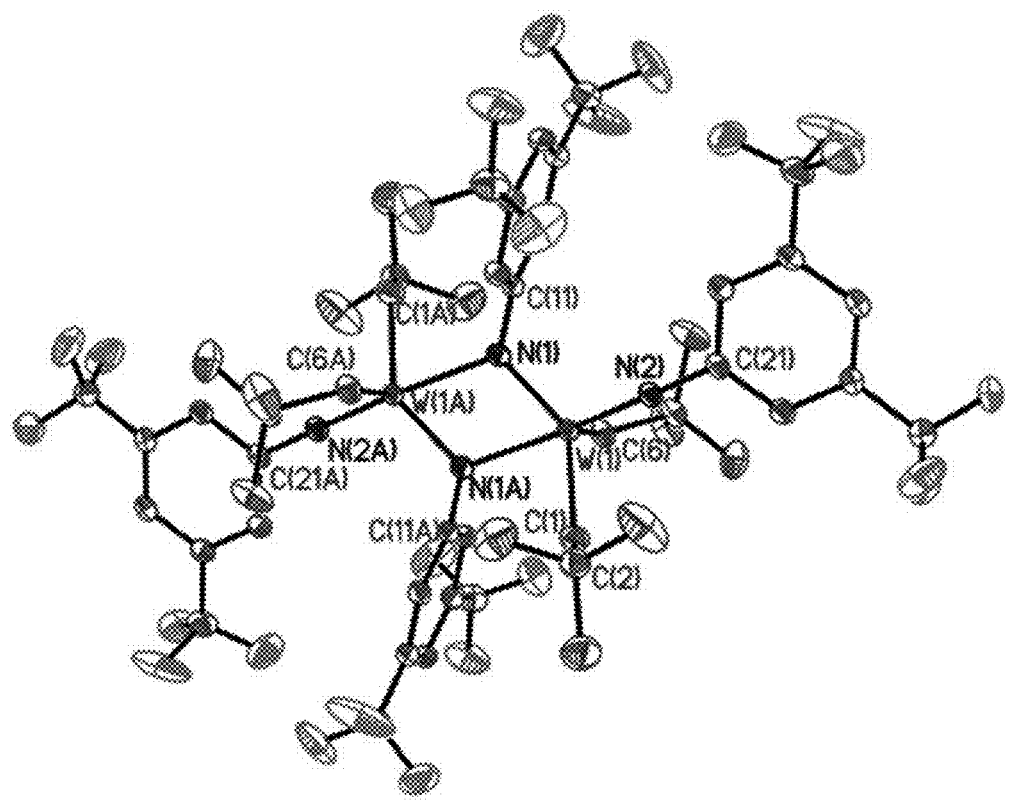

FIG. 4. Thermal ellipsoid drawing of the structure of [W(NAr$^{(CF3)2}$)$_2$(CH$_2$CMe$_3$)$_2$]$_2$ (10d). Selected bond distances (Å) and angles (°): W1-N1=1.888(2), W1-N2=1.756(7), W1-C1=2.135(2), W1-C6 2.126(2), W1-N1A 2.262(2); W1-N1-C11=127.0(7), W1-N2-C21=179.2(7), W1-C1-C2=128.7(9), W1-C6-C7=129.1(9), W1-N1-W1A=104.3(0).

Figure 5:
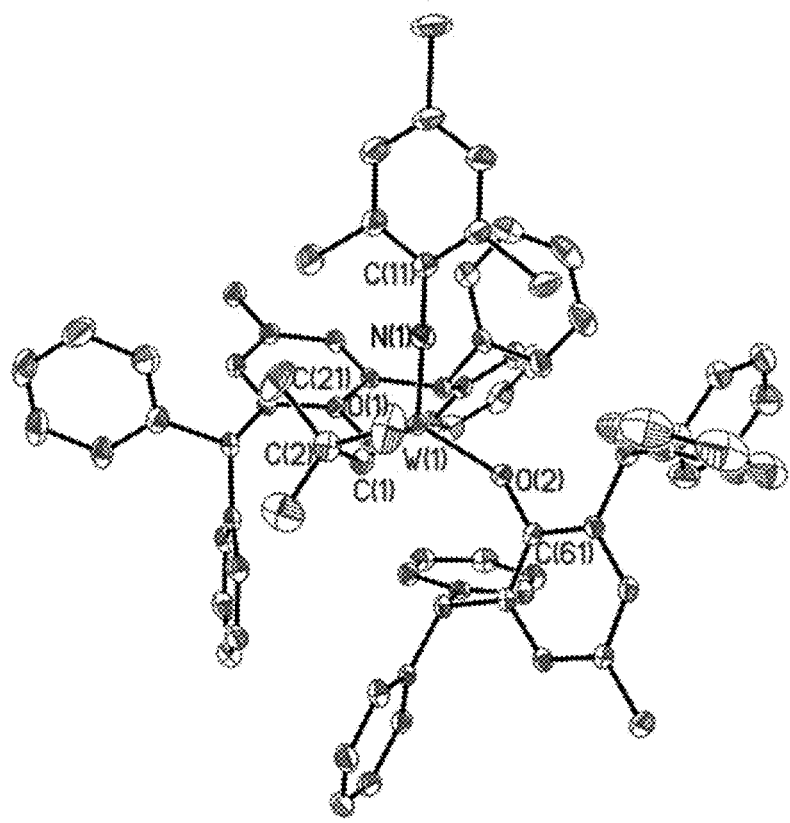

FIG. 5. Thermal ellipsoid drawing of the structure of 12a. Selected bond distances (Å) and angles (°): W1-N1=1.741(2), W1-C1=1.897(3), W1-O1=1.906(0), W1-O2=1.907(2); W1-N1-C11=175.4(2), W1-C1-C2=144.8(4), W1-O1-C21=138.1(1), W1-O2-C61=140.8(9).

Figure 6:
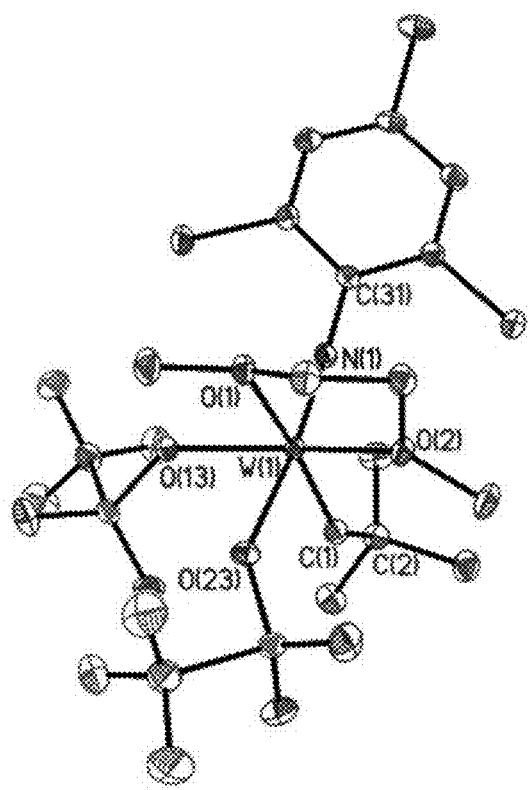

FIG. 6. Thermal ellipsoid drawing (50%) of W(NAr$^{Cl3}$)(CHCMe$_3$)(OTf)$_2$(dme) (11a). Hydrogen atoms have been omitted for clarity. Select bond distances (Å) and angles (°): W1-N1=1.736(0), W1-C1=1.198(3), W1-1=2.312(2), W1-O2=2.103(1), W1-O13=2.056(1), W1-O23=2.171(0); W1-N1-C31=170.7(2), W1-C1-C2=141.3(9), N1-W1-C1=100.4(0).

DETAILED DESCRIPTION OF CERTAIN EMBODIMENTS

1. General Description of Certain Embodiments of the Invention

Olefin metathesis is of continuing importance to the synthesis of organic molecules including polymers. The present invention, among other things, provides new compounds for promoting metathesis reactions. In some embodiments, the present invention provides a compound having the structure of formula I:

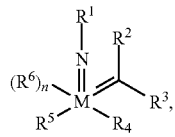

wherein each variable is independently as defined above and described herein.

In some embodiments, $R^1$ is

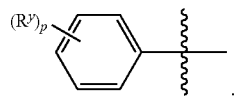

In some embodiments, the present invention provides a compound having the structure of I-a:

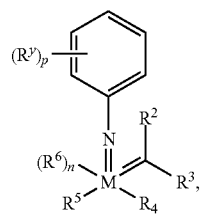

wherein each variable is independently as defined above and described herein.

In some embodiments, the present invention provides a compound of formula II:

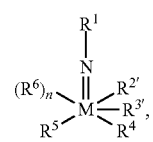

wherein:
$R^{2'}$ and $R^{3'}$ are taken together with M to form an optionally substituted 3-8 membered saturated or partially unsaturated ring having, in addition to M, 0-4 heteroatoms independently selected from nitrogen, oxygen, or sulfur; and
each of $R^1$, $R^4$, $R^5$, $R^6$, and n is independently as defined above and described herein.

In some embodiments, a compound of formula II has the structure of formula II-a:

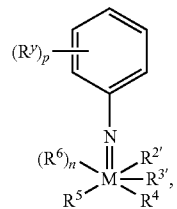

wherein each variable is independently as defined above and described herein.

In some embodiments, $R^{2'}$ and $R^{3'}$ are taken together with M to form an optionally substituted 3-membered ring. In some embodiments, the present invention provides a compound having the structure of formula II-b:

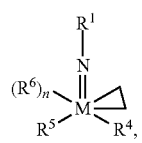

wherein each variable is independently as defined above and described herein. In some embodiments, the present invention provides a compound having the structure of formula II-c:

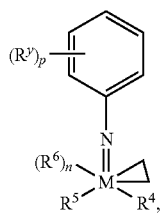

wherein each variable is independently as defined above and described herein.

In some embodiments, the present invention provides a compound having the structure of formula III:

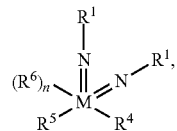

wherein each variable is independently as defined above and described herein. In some embodiments, the present invention provides a compound having the structure of formula III-a:

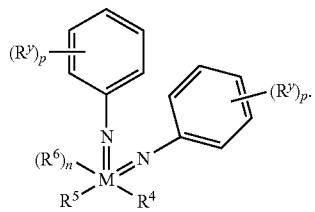

III-a wherein each variable is independently as defined above and described herein.

In some embodiments, $R^4$ is

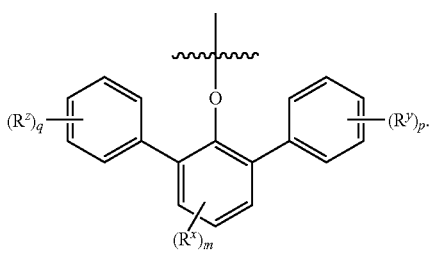

In some embodiments, the present invention provides a compound having the structure of formula I-b:

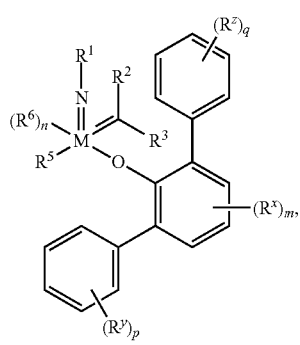

I-b wherein each variable is independently as defined above and described herein.

In some embodiments, each of $R^4$ and $R^5$ is independently

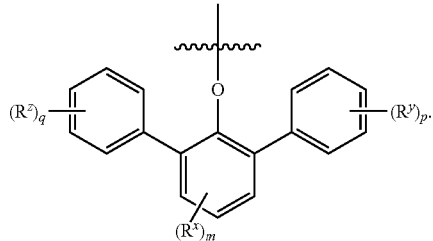

In some embodiments, a provide compound has the structure of formula I-c:

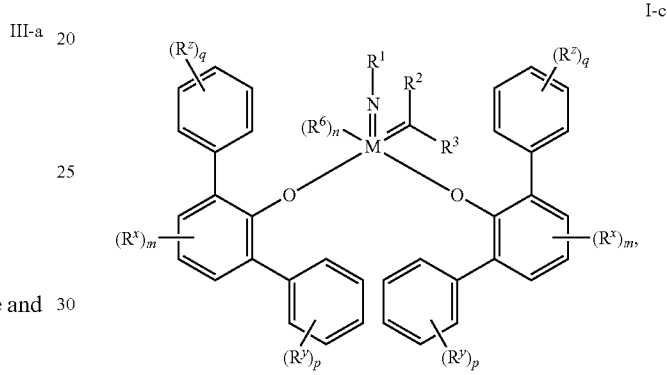

I-c wherein each variable is independently as defined above and described herein.

Among other things, the present invention recognizes that a provided compound is particularly difficult to prepare. In some embodiments, a person of ordinary skill in the art, when using previously described methods in the art, cannot prepare a provided compound in suitable purity or yield. In some embodiments, the present invention provides methods for preparing provided compounds. In some embodiments, the present invention provides methods for preparing a compound of formula I. In some embodiments, the present invention provides methods for preparing a compound of formula II. In some embodiments, the present invention provides methods for preparing a compound of formula III.

In some embodiments, the present invention provides a method for preparing a compound of formula III, wherein $R^1$ is optionally substituted

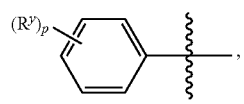

comprising providing a compound having the structure of $R^1NSO$. In some embodiments, the present invention provides a method for preparing a compound of formula III-a, comprising providing a compound having the structure of $R^1NSO$. In some embodiments, the present invention provides a method for preparing a compound of formula III, wherein $R^1$ is optionally substituted

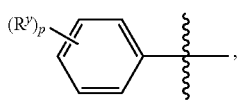

comprising providing a compound having the structure of $R^1NHTMS$. In some embodiments, a provided method comprises providing a compound having the structure of $R^1NHTMS$ and $WCl_6$.

2. Definitions

Compounds of the present invention include those described generally herein, and are further illustrated by the classes, subclasses, and species disclosed herein. As used herein, the following definitions shall apply unless otherwise indicated. For purposes of this invention, the chemical elements are identified in accordance with the Periodic Table of the Elements, CAS version, Handbook of Chemistry and Physics, 75$^{th}$ Ed. Additionally, general principles of organic chemistry are described in "Organic Chemistry", Thomas Sorrell, University Science Books, Sausalito: 1999, and "March's Advanced Organic Chemistry", 5$^{th}$ Ed., Ed.: Smith, M. B. and March, J., John Wiley & Sons, New York: 2001, the entire contents of which are hereby incorporated by reference.

The term "aliphatic" or "aliphatic group", as used herein, means a straight-chain (i.e., unbranched) or branched, substituted or unsubstituted hydrocarbon chain that is completely saturated or that contains one or more units of unsaturation, or a monocyclic hydrocarbon, bicyclic hydrocarbon, or tricyclic hydrocarbon that is completely saturated or that contains one or more units of unsaturation, but which is not aromatic (also referred to herein as "carbocycle," "cycloaliphatic" or "cycloalkyl"), that has a single point of attachment to the rest of the molecule. Unless otherwise specified, aliphatic groups contain 1-30 aliphatic carbon atoms. In some embodiments, aliphatic groups contain 1-20 aliphatic carbon atoms. In other embodiments, aliphatic groups contain 1-10 aliphatic carbon atoms. In still other embodiments, aliphatic groups contain 1-5 aliphatic carbon atoms, and in yet other embodiments, aliphatic groups contain 1, 2, 3, or 4 aliphatic carbon atoms. Suitable aliphatic groups include, but are not limited to, linear or branched, substituted or unsubstituted alkyl, alkenyl, alkynyl groups and hybrids thereof such as (cycloalkyl)alkyl, (cycloalkenyl)alkyl or (cycloalkyl)alkenyl.

The term "cycloaliphatic," as used herein, refers to saturated or partially unsaturated cyclic aliphatic monocyclic, bicyclic, or polycyclic ring systems, as described herein, having from 3 to 14 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic," may also include aliphatic rings that are fused to one or more aromatic or nonaromatic rings, such as decahydronaphthyl or tetrahydronaphthyl, where the radical or point of attachment is on the aliphatic ring. In some embodiments, a carbocyclic group is bicyclic. In some embodiments, a carbocyclic group is tricyclic. In some embodiments, a carbocyclic group is polycyclic. In some embodiments, "cycloaliphatic" (or "carbocycle" or "cycloalkyl") refers to a monocyclic $C_3$-$C_6$ hydrocarbon, or a $C_8$-$C_{10}$ bicyclic hydrocarbon that is completely saturated or that contains one or more units of unsaturation, but which is not aromatic, that has a single point of attachment to the rest of the molecule, or a $C_9$-$C_{16}$ tricyclic hydrocarbon that is completely saturated or that contains one or more units of unsaturation, but which is not aromatic, that has a single point of attachment to the rest of the molecule.

As used herein, the term "alkyl" is given its ordinary meaning in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 1-20 carbon atoms in its backbone (e.g., $C_1$-$C_{20}$ for straight chain, $C_2$-$C_{20}$ for branched chain), and alternatively, about 1-10. In some embodiments, a cycloalkyl ring has from about 3-10 carbon atoms in their ring structure where such rings are monocyclic or bicyclic, and alternatively about 5, 6 or 7 carbons in the ring structure. In some embodiments, an alkyl group may be a lower alkyl group, wherein a lower alkyl group comprises 1-4 carbon atoms (e.g., $C_1$-$C_4$ for straight chain lower alkyls).

As used herein, the term "alkenyl" refers to an alkyl group, as defined herein, having one or more double bonds.

As used herein, the term "alkynyl" refers to an alkyl group, as defined herein, having one or more triple bonds.

The term "heteroalkyl" is given its ordinary meaning in the art and refers to alkyl groups as described herein in which one or more carbon atoms is replaced with a heteroatom (e.g., oxygen, nitrogen, sulfur, and the like). Examples of heteroalkyl groups include, but are not limited to, alkoxy, poly(ethylene glycol)-, alkyl-substituted amino, tetrahydrofuranyl, piperidinyl, morpholinyl, etc.

The term "aryl" used alone or as part of a larger moiety as in "aralkyl," "aralkoxy," or "aryloxyalkyl," refers to monocyclic or bicyclic ring systems having a total of five to fourteen ring members, wherein at least one ring in the system is aromatic and wherein each ring in the system contains 3 to 7 ring members. The term "aryl" may be used interchangeably with the term "aryl ring." In certain embodiments of the present invention, "aryl" refers to an aromatic ring system which includes, but not limited to, phenyl, biphenyl, naphthyl, binaphthyl, anthracyl and the like, which may bear one or more substituents. Also included within the scope of the term "aryl," as it is used herein, is a group in which an aromatic ring is fused to one or more non-aromatic rings, such as indanyl, phthalimidyl, naphthimidyl, phenanthridinyl, or tetrahydronaphthyl, and the like.

The terms "heteroaryl" and "heteroar-," used alone or as part of a larger moiety, e.g., "heteroaralkyl," or "heteroaralkoxy," refer to groups having 5 to 10 ring atoms (i.e., monocyclic or bicyclic), in some embodiments 5, 6, 9, or 10 ring atoms. In some embodiments, such rings have 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, and pteridinyl. In some embodiments, a heteroaryl is a heterobiaryl group, such as bipyridyl and the like. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Non-limiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaryl" may be used interchangeably with the terms "heteroaryl ring," "heteroaryl group," or "heteroaromatic," any of which terms include rings that are optionally substituted. The term "heteroaralkyl" refers to an alkyl group substituted by a heteroaryl, wherein the alkyl and heteroaryl portions independently are optionally substituted.

As used herein, the terms "heterocycle," "heterocyclyl," "heterocyclic radical," and "heterocyclic ring" are used interchangeably and refer to a stable 5- to 7-membered monocyclic or 7-10-membered bicyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl).

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle," "heterocyclyl," "heterocyclyl ring," "heterocyclic group," "heterocyclic moiety," and "heterocyclic radical," are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

The term "heteroatom" means one or more of oxygen, sulfur, nitrogen, phosphorus, or silicon (including, any oxidized form of nitrogen, sulfur, phosphorus, or silicon; the quaternized form of any basic nitrogen or; a substitutable nitrogen of a heterocyclic ring, for example N (as in 3,4-dihydro-2H-pyrrolyl), NH (as in pyrrolidinyl) or NR$^+$ (as in N-substituted pyrrolidinyl)).

The term "unsaturated," as used herein, means that a moiety has one or more units of unsaturation.

The term "halogen" means F, Cl, Br, or I.

As described herein, compounds of the invention may contain "optionally substituted" moieties. In general, the term "substituted," whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable," as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; $-(CH_2)_{0-4}R^°$; $-(CH_2)_{0-4}OR^°$; $-O(CH_2)_{0-4}R^°$, $-O-(CH_2)_{0-4}C(O)OR^°$; $-(CH_2)_{0-4}CH(OR^°)_2$; $-(CH_2)_{0-4}Ph$, which may be substituted with $R^°$; $-(CH_2)_{0-4}O(CH_2)_{0-1}Ph$ which may be substituted with $R^°$; $-CH=CHPh$, which may be substituted with $R^°$; $-(CH_2)_{0-4}O(CH_2)_{0-1}$-pyridyl which may be substituted with $R^°$; $-NO_2$; $-CN$; $-N_3$; $-(CH_2)_{0-4}N(R^°)_2$; $-(CH_2)_{0-4}N(R^°)C(O)R^°$; $-N(R^°)C(S)R^°$; $-(CH_2)_{0-4}N(R^°)C(O)NR^°_2$; $-N(R^°)C(S)NR^°_2$; $-(CH_2)_{0-4}N(R^°)C(O)OR^°$; $-N(R^°)N(R^°)C(O)R^°$; $-N(R^°)N(R^°)C(O)NR^°_2$; $-N(R^°)N(R^°)C(O)OR^°$; $-(CH_2)_{0-4}C(O)R^°$; $-C(S)R^°$; $-(CH_2)_{0-4}C(O)OR^°$; $-(CH_2)_{0-4}C(O)SR^°$; $-(CH_2)_{0-4}C(O)OSiR^°_3$; $-(CH_2)_{0-4}OC(O)R^°$; $-OC(O)(CH_2)_{0-4}SR-$, $SC(S)SR^°$; $-(CH_2)_{0-4}SC(O)R^°$; $-(CH_2)_{0-4}C(O)NR^°_2$; $-C(S)NR^°_2$; $-C(S)SR^°$; $-SC(S)SR^°$, $-(CH_2)_{0-4}OC(O)NR^°_2$; $-C(O)N(OR^°)R^°$; $-C(O)C(O)R^°$; $-C(O)CH_2C(O)R^°$; $-C(NOR^°)R^°$; $-(CH_2)_{0-4}SSR^°$; $-(CH_2)_{0-4}S(O)_2R^°$; $-(CH_2)_{0-4}S(O)_2OR^°$; $-(CH_2)_{0-4}OS(O)_2R^°$; $-S(O)_2NR^°_2$; $-(CH_2)_{0-4}S(O)R^°$; $-N(R^°)S(O)_2NR^°_2$; $-N(R^°)S(O)_2R$; $-N(OR^°)R^°$; $-C(NH)NR^°_2$; $-P(O)_2R$; $-P(O)R^°_2$; $-OP(O)R^°_2$; $-OP(O)(OR^°)_2$; $-SiR^°_3$; $-OSiR^°_3$; $-(C_{1-4}$ straight or branched alkylene)$O-N(R^°)_2$; or $-(C_{1-4}$ straight or branched alkylene)$C(O)O-N(R^°)_2$, wherein each $R^°$ may be substituted as defined below and is independently hydrogen, $C_{1-6}$ aliphatic, $-CH_2Ph$, $-O(CH_2)_{0-1}Ph$, $-CH_2$-(5-6 membered heteroaryl ring), or a 5-6-membered saturated, partially unsaturated, or aryl ring having 0-4 heteroatoms independently selected from nitrogen, oxygen, or sulfur, or, notwithstanding the definition above, two independent occurrences of $R^°$, taken together with their intervening atom(s), form a 3-12-membered saturated, partially unsaturated, or aryl mono- or bicyclic ring having 0-4 heteroatoms independently selected from nitrogen, oxygen, or sulfur, which may be substituted as defined below.

Suitable monovalent substituents on $R^°$ (or the ring formed by taking two independent occurrences of $R^°$ together with their intervening atoms), are independently halogen, $-(CH_2)_{0-2}R^•$, -(haloR$^•$), $-(CH_2)_{0-2}OH$, $-(CH_2)_{0-2}OR^•$, $-(CH_2)_{0-2}CH(OR^•)_2$; $-O(haloR^•)$, $-CN$, $-N_3$, $-(CH_2)_{0-2}C(O)R^•$, $-(CH_2)_{0-2}C(O)OH$, $-(CH_2)_{0-2}C(O)OR^•$, $-(CH_2)_{0-2}SR^•$, $-(CH_2)_{0-2}SH$, $-(CH_2)_{0-2}NH_2$, $-(CH_2)_{0-2}NHR^•$, $-(CH_2)_{0-2}NR^•_2$, $-NO_2$, $-SiR^•_3$, $-OSiR^•_3$, $-C(O)SR^•$, $-(C_{1-4}$ straight or branched alkylene)$C(O)OR^•$, or $-SSR^•$ wherein each $R^•$ is unsubstituted or where preceded by "halo" is substituted only with one or more halogens, and is independently selected from $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur. Suitable divalent substituents on a saturated carbon atom of $R°$ include =O and =S.

Suitable divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R•, -(haloR•), —OH, —OR•, —O(haloR•), —CN, —C(O)OH, —C(O)OR•, —NH$_2$, —NHR•, —NR•$_2$, or —NO$_2$, wherein each R• is unsubstituted or where preceded by "halo" is substituted only with one or more halogens, and is independently $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^†$, —NR$^†_2$, —C(O)R$^†$, —C(O)OR$^†$, —C(O)C(O)R$^†$, —C(O)CH$_2$C(O)R$^†$, —S(O)$_2$R$^†$, —S(O)$_2$NR$^†_2$, —C(S)NR$^†_2$, —C(NH)NR$^†_2$, or —N(R$^†$)S(O)$_2$R$^†$; wherein each R$^†$ is independently hydrogen, $C_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R$^†$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R$^†$ are independently halogen, —R•, -(haloR•), —OH, —OR•, —O(haloR•), —CN, —C(O)OH, —C(O)OR•, —NH$_2$, —NHR•, —NR•$_2$, or —NO$_2$, wherein each R• is unsubstituted or where preceded by "halo" is substituted only with one or more halogens, and is independently $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur.

As used herein, the term "stereogenic metal atom" is given its ordinary meaning, and refers to a metal atom coordinated by at least two ligands (e.g., at least four ligands), wherein the ligands are arranged about the metal atom such that the overall structure (e.g., metal complex) lacks a plane of symmetry with respect to the metal atom. In some cases, the stereogenic metal atom may be coordinated by at least three ligands, at least four ligands, at least five ligands, at least six ligands, or more. In certain embodiments, the stereogenic metal atom may be coordinated by four ligands. Metal complexes comprising a stereogenic metal center may provide sufficient space specificity at a reaction site of the metal complex, such that a molecular substrate having a plane of symmetry may be reacted at the reaction site to form a product that is free of a plane of symmetry. That is, the stereogenic metal center of the metal complex may impart sufficient shape specificity to induce stereogenicity effectively, producing a chiral product. Such metal complexes may exhibit improved catalytic activity and stereoselectivity, relative to previous systems, and may reduce undesired side reactions (e.g., dimerization or oligomerization of the metal complex).

The term "chiral" is given its ordinary meaning in the art and refers to a molecule that is not superimposable with its mirror image, wherein the resulting nonsuperimposable mirror images are known as "enantiomers" and are labeled as either an (R) enantiomer or an (S) enantiomer. Typically, chiral molecules lack a plane of symmetry.

The term "achiral" is given its ordinary meaning in the art and refers to a molecule that is superimposable with its mirror image. Typically, achiral molecules possess a plane of symmetry.

As used herein, a ligand may be either monodentate or polydentate. In some embodiments, a ligand is monodentate. In some embodiments, a ligand is bidentate. In some embodiments, a ligand is tridentate. In some embodiments, two or more monodentate ligands are taken together to form a polydentate ligand. A ligand may have hapticity of more than one. In some cases, a ligand has a hapticity of 1 to 10. In some embodiments, a ligand has a hapticity of 1. In some embodiments, a ligand has a hapticity of 2. In some embodiments, a ligand has a hapticity of 3. In some embodiments, a ligand has a hapticity of 4. In some embodiments, a ligand has a hapticity of 5. In some embodiments, a ligand has a hapticity of 6. For a ligand having hapticity greater than one, as sometimes done in the art, a single bond may be drawn between the ligand and the metal. In some cases, a ligand is alkylidene. In some cases, a ligand is a nitrogen-containing ligand. In some cases, a ligand is an oxygen-containing ligand. In some cases, a ligand is a phosphorus-containing ligand. In some embodiments, a ligand comprises an unsaturated bond, and the unsaturated bond is coordinated to a metal. In some embodiments, a ligand comprises a carbon-carbon double bond, and the double bond is coordinated to a metal. In some embodiments, a ligand is an olefin. When an olefin double bond is coordinated to a metal, the chemical bonding between the olefin and the metal can either be depicted as a 3-membered ring wherein the ring members comprises the metal and both carbon atoms of the double bond, or as a single bond between the metal and the double bond.

As used herein, a "nitrogen-containing ligand" may be any species comprising a nitrogen atom. In some cases, the nitrogen atom may bind to the metal atom. In some cases, the nitrogen-containing ligand may bind the metal center via a different atom. In some cases, the nitrogen atom may be a ring atom of a heteroaryl or heteroalkyl group. In some cases, the nitrogen atom may be a substituted amine group. It should be understood that, in catalyst precursors described herein, the nitrogen-containing ligand may have sufficiently ionic character to coordinate a metal center, such as a Mo or W metal center. Examples of nitrogen-containing ligands include, but are not limited to, pyrrolyl, pyrazolyl, pyridinyl, pyrazinyl, pyrimidinyl, imidazolyl, triazolyl, tetrazolyl, oxazolyl, isoxazolyl, thiazolyl, isothiazolyl, indolyl, indazolyl, carbazolyl, morpholinyl, piperidinyl, oxazinyl, substituted derivatives thereof, and the like. For example, the nitrogen-containing ligand may be pyrrolide or 2,5-dimethylpyrrolide. The nitrogen-containing ligand may be selected to interact with an oxygen-containing ligand such that the oxygen-containing ligand can readily replace the nitrogen-containing ligand in a precatalyst to generate a catalyst. In cases where the catalyst composition may be generated in situ in order to carry out a chemical reaction, the first, nitrogen-containing ligand may be selected such that, upon replacement by an oxygen-containing ligand, the nitrogen-containing ligands or protonated versions thereof do not interfere with the chemical reaction. In some embodiments, the nitrogen-containing ligand may be chiral and the precatalyst may be provided as a racemic mixture or a purified stereoisomer.

In some embodiments, a nitrogen-containing ligand may also describe a ligand precursor comprising at least one hydrogen atom directly bonded to a nitrogen atom, wherein deprotonation of the at least one hydrogen atom results in a negatively charged nitrogen atom, which may coordinate to a metal atom. Exemplary such precursors include but are not limited to amines, amides, and pyrrole and its derivatives thereof. A nitrogen-containing ligand may be a heteroaryl or heteroalkyl group comprising at least one nitrogen ring atom. In some cases, the nitrogen atom may be positioned on a substituent of an alkyl, heteroalkyl, aryl, or heteroaryl group. For example, a nitrogen-containing ligand may be an amine- or amide-substituted aryl group, wherein the amine or amide group is deprotonated upon coordination to the metal center.

As used herein, the term "oxygen-containing ligand" may be used to refer to ligands comprising at least one oxygen atom. In some cases, the oxygen atom binds to the metal atom thereby forming an ether-linkage. In other cases, the oxygen-containing ligand may bind the metal center via a different atom. The term "oxygen-containing ligand" may also describe ligand precursors comprising at least one hydroxyl group (e.g., a hydroxyl-containing ligand), wherein deprotonation of the hydroxyl group results in a negatively charged oxygen atom, which may coordinate to a metal atom. The oxygen-containing ligand may be a heteroaryl or heteroalkyl group comprising at least one oxygen ring atom. In some cases, the oxygen atom may be positioned on a substituent of an alkyl, heteroalkyl, aryl, or heteroaryl group. For example, the oxygen-containing ligand may be a hydroxy-substituted aryl group, wherein the hydroxyl group is deprotonated upon coordination to the metal center.

In some embodiments, an oxygen-containing ligand may also describe a ligand precursor comprising at least one hydroxyl group (e.g., a hydroxyl-containing ligand), wherein deprotonation of the hydroxyl group results in a negatively charged oxygen atom, which may coordinate to a metal atom. An oxygen-containing ligand may be a heteroaryl or heteroalkyl group comprising at least one oxygen ring atom. In some cases, the oxygen atom may be positioned on a substituent of an alkyl, heteroalkyl, aryl, or heteroaryl group. For example, an oxygen-containing ligand may be a hydroxy-substituted aryl group, wherein the hydroxyl group is deprotonated upon coordination to the metal center. In some embodiments, an oxygen-containing ligand is a neutral ligand.

As used herein, the term "phosphorus-containing ligand" may be used to refer to ligands comprising at least one phosphorus atom. In some cases, the phosphorus atom binds to the metal. In other cases, the phosphorus-containing ligand may bind to the metal center via a different atom (i.e., an atom other than the phosphorous). The phosphorus-containing ligand may have phosphorus atom of various oxidation states. In some cases the phosphorus-containing ligand is phosphine. In some cases the phosphorus-containing ligand is phosphite. In some cases the phosphorus-containing ligand is phosphate. The phosphorus-containing ligand may be either monodentate or polydentate. In some cases, two or more phosphorus atoms bind to the metal. In some cases, one or more phosphorus atoms together with one or more non-phosphorus atoms bind to the metal. In some embodiments, a phosphorus-containing ligand is a neutral ligand.

The phrase "protecting group," as used herein, refers to temporary substituents which protect a potentially reactive functional group from undesired chemical transformations. Examples of such protecting groups include esters of carboxylic acids, silyl ethers of alcohols, and acetals and ketals of aldehydes and ketones, respectively. A "Si protecting group" is a protecting group comprising a Si atom, such as Si-trialkyl (e.g., trimethylsilyl, tributylsilyl, t-butyldimethylsilyl), Si-triaryl, Si-alkyl-diphenyl (e.g., t-butyldiphenylsilyl), or Si-aryl-dialkyl (e.g., Si-phenyldialkyl). Generally, a Si protecting group is attached to an oxygen atom. The field of protecting group chemistry has been reviewed (Greene, T. W.; Wuts, P. G. M. Protective Groups in Organic Synthesis, 2nd ed.; Wiley: New York, 1991). Such protecting groups (and associated protected moieties) are described in detail below.

Protected hydroxyl groups are well known in the art and include those described in detail in *Protecting Groups in Organic Synthesis*, T. W. Greene and P. G. M. Wuts, $3^{rd}$ edition, John Wiley & Sons, 1999, the entirety of which is incorporated herein by reference. Examples of suitably protected hydroxyl groups further include, but are not limited to, esters, carbonates, sulfonates allyl ethers, ethers, silyl ethers, alkyl ethers, arylalkyl ethers, and alkoxyalkyl ethers. Examples of suitable esters include formates, acetates, proprionates, pentanoates, crotonates, and benzoates. Specific examples of suitable esters include formate, benzoyl formate, chloroacetate, trifluoroacetate, methoxyacetate, triphenylmethoxyacetate, p-chlorophenoxyacetate, 3-phenylpropionate, 4-oxopentanoate, 4,4-(ethylenedithio) pentanoate, pivaloate (trimethylacetate), crotonate, 4-methoxy-crotonate, benzoate, p-benzylbenzoate, 2,4,6-trimethylbenzoate. Examples of suitable carbonates include 9-fluorenylmethyl, ethyl, 2,2,2-trichloroethyl, 2-(trimethylsilyl)ethyl, 2-(phenylsulfonyl)ethyl, vinyl, allyl, and p-nitrobenzyl carbonate. Examples of suitable silyl ethers include trimethylsilyl, triethylsilyl, t-butyldimethylsilyl, t-butyldiphenylsilyl, triisopropylsilyl ether, and other trialkylsilyl ethers. Examples of suitable alkyl ethers include methyl, benzyl, p-methoxybenzyl, 3,4-dimethoxybenzyl, trityl, t-butyl, and allyl ether, or derivatives thereof. Alkoxyalkyl ethers include acetals such as methoxymethyl, methylthiomethyl, (2-methoxyethoxy)methyl, benzyloxymethyl, beta-(trimethylsilyl)ethoxymethyl, and tetrahydropyran-2-yl ether. Examples of suitable arylalkyl ethers include benzyl, p-methoxybenzyl (MPM), 3,4-dimethoxybenzyl, 0-nitrobenzyl, p-nitrobenzyl, p-halobenzyl, 2,6-dichlorobenzyl, p-cyanobenzyl, 2- and 4-picolyl ethers.

Protected amines are well known in the art and include those described in detail in Greene (1999). Suitable mono-protected amines further include, but are not limited to, aralkylamines, carbamates, allyl amines, amides, and the like. Examples of suitable mono-protected amino moieties include t-butyloxycarbonylamino (—NHBOC), ethyloxycarbonylamino, methyloxycarbonylamino, trichloroethyloxycarbonylamino, allyloxycarbonylamino (—NHAlloc), benzyloxocarbonylamino (—NHCBZ), allylamino, benzylamino (—NHBn), fluorenylmethylcarbonyl (—NHFmoc), formamido, acetamido, chloroacetamido, dichloroacetamido, trichloroacetamido, phenylacetamido, trifluoroacetamido, benzamido, t-butyldiphenylsilyl, and the like. Suitable di-protected amines include amines that are substituted with two substituents independently selected from those described above as mono-protected amines, and further include cyclic imides, such as phthalimide, maleimide, succinimide, and the like. Suitable di-protected amines also include pyrroles and the like, 2,2,5,5-tetramethyl-[1,2,5] azadisilolidine and the like, and azide.

Protected aldehydes are well known in the art and include those described in detail in Greene (1999). Suitable protected aldehydes further include, but are not limited to, acyclic acetals, cyclic acetals, hydrazones, imines, and the like. Examples of such groups include dimethyl acetal, diethyl acetal, diisopropyl acetal, dibenzyl acetal, bis(2-nitrobenzyl) acetal, 1,3-dioxanes, 1,3-dioxolanes, semicarbazones, and derivatives thereof.

Protected carboxylic acids are well known in the art and include those described in detail in Greene (1999). Suitable protected carboxylic acids further include, but are not limited to, optionally substituted $C_{1-6}$ aliphatic esters, optionally substituted aryl esters, silyl esters, activated esters, amides, hydrazides, and the like. Examples of such ester groups include methyl, ethyl, propyl, isopropyl, butyl, isobutyl, benzyl, and phenyl ester, wherein each group is optionally substituted. Additional suitable protected carboxylic acids include oxazolines and ortho esters.

Protected thiols are well known in the art and include those described in detail in Greene (1999). Suitable protected thiols further include, but are not limited to, disulfides, thioethers, silyl thioethers, thioesters, thiocarbonates, and thiocarbamates, and the like. Examples of such groups include, but are not limited to, alkyl thioethers, benzyl and substituted benzyl thioethers, triphenylmethyl thioethers, and trichloroethoxycarbonyl thioester, to name but a few.

Unless otherwise stated, structures depicted herein are also meant to include all isomeric (e.g., enantiomeric, diastereomeric, and geometric (or conformational)) forms of the structure; for example, the R and S configurations for each asymmetric center, (Z) and (E) double bond isomers, and (Z) and (E) conformational isomers. Therefore, single stereochemical isomers as well as enantiomeric, diastereomeric, and geometric (or conformational) mixtures of the present compounds are within the scope of the invention.

Unless otherwise stated, all tautomeric forms of the compounds of the invention are within the scope of the invention.

Additionally, unless otherwise stated, structures depicted herein are also meant to include compounds that differ only in the presence of one or more isotopically enriched atoms. For example, compounds having the present structures except for the replacement of hydrogen by deuterium or tritium, or the replacement of a carbon by a $^{11}C$- or $^{13}C$- or $^{14}C$-enriched carbon are within the scope of this invention. Such compounds are useful, for example, as analytical tools or probes in biological assays.

As used herein, the term "electron-withdrawing group" is given its ordinary meaning in the art and refers to an atom or group that draws electron density from a neighboring atom or group, usually by resonance and/or inductive effects. In some embodiments, an electron-withdrawing group withdraws electron density from an aromatic ring system by resonance and/or inductive effects. In some embodiments, an electron-withdrawing group withdraws electron density from an aromatic ring system by resonance and inductive effects. In some embodiments, an electron-withdrawing group lowers the electron density of an aromatic ring system such as phenyl. Exemplary electron-withdrawing groups are extensively described in the art, including but not limited to halogen, carbonyl moieties (e.g., aldehyde and ketone groups), —COOH and its derivatives (e.g., ester and amide moieties), protonated amines, quaternary ammonium groups, —CN, —NO$_2$, —S(O)—, and —S(O)$_2$—. In some embodiments, an electron-withdrawing group is halogen. In some embodiments, an electron-withdrawing group is —F. In some embodiments, an electron-withdrawing group is —Cl. In some embodiments, an electron-withdrawing group is —Br. In some embodiments, an electron-withdrawing group is —I. In some embodiments, hydrogen is used as reference and regarded as having no effect.

As used herein and in the claims, the singular forms "a", "an", and "the" include the plural reference unless the context clearly indicates otherwise. Thus, for example, a reference to "a compound" includes a plurality of such compounds.

3. Description of Certain Embodiments of the Invention

In some embodiments, the present invention provides compounds and methods for metathesis reactions. As used herein, the term "metathesis reaction" is given its ordinary meaning in the art and refers to a chemical reaction in which two reacting species exchange partners in the presence of a transition-metal catalyst. In some cases, a byproduct of a metathesis reaction may be ethylene. A metathesis reaction may involve reaction between species comprising, for example, olefins and/or alkynes. Examples of different kinds of metathesis reactions include cross metathesis, ring-closing metathesis, ring-opening metathesis, acyclic diene metathesis, alkyne metathesis, enyne metathesis, ring-opening metathesis polymerization (ROMP), and the like. A metathesis reaction may occur between two substrates which are not joined by a bond (e.g., intermolecular metathesis reaction) or between two portions of a single substrate (e.g., intramolecular metathesis reaction).

In some embodiments, M is molybdenum. In some embodiments, M is tungsten.

As defined generally above, $R^1$ is an optionally substituted group selected from $C_{1-20}$ aliphatic, $C_{1-20}$ heteroaliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or $R^1$ is optionally substituted

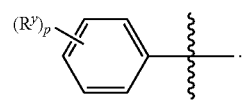

In some embodiments, R¹ is an optionally substituted group selected from $C_{1-20}$ aliphatic, $C_{1-20}$ heteroaliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur. In some embodiments, R is optionally substituted

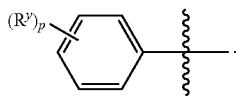

In some embodiments, R¹ is optionally substituted $C_{1-20}$ aliphatic. In some embodiments, R¹ is optionally substituted $C_{1-20}$ cycloaliphatic. In some embodiments, R¹ is optionally substituted $C_{1-12}$ aliphatic. In some embodiments, R¹ is optionally substituted $C_{1-12}$ cycloaliphatic. In some embodiments, R¹ is optionally substituted $C_{1-12}$ cycloalkyl. In some embodiments, R¹ is optionally substituted adamantyl. In some embodiments, R¹ is adamantyl. In some embodiments, R¹ is optionally substituted $C_{1-6}$ aliphatic. In some embodiments, R¹ is optionally substituted $C_{1-6}$ alkyl. In some embodiments, R¹ is optionally substituted hexyl, pentyl, butyl, propyl, ethyl or methyl. In some embodiments, R¹ is optionally substituted hexyl. In some embodiments, R¹ is optionally substituted pentyl. In some embodiments, R¹ is optionally substituted butyl. In some embodiments, R¹ is optionally substituted propyl. In some embodiments, R¹ is optionally substituted ethyl. In some embodiments, R¹ is optionally substituted methyl. In some embodiments, R¹ is hexyl. In some embodiments, R¹ is pentyl. In some embodiments, R¹ is butyl. In some embodiments, R¹ is propyl. In some embodiments, R¹ is ethyl. In some embodiments, R¹ is methyl. In some embodiments, R¹ is isopropyl.

In certain embodiments, R¹ is optionally substituted phenyl. In some embodiments, R¹ is substituted phenyl. In some embodiments, R¹ is mono-, di-, tri-, tetra- or penta-substituted phenyl. In some embodiments, R¹ is mono-substituted phenyl. In certain embodiments, R¹ is 2,6-disubstituted phenyl. In some embodiments, R¹ is tri-substituted phenyl. In some embodiments, R¹ is tetra-substituted phenyl. In some embodiments, R¹ is penta-substituted phenyl. In some embodiments, a substituent is a halogen. In some embodiments, a substituent is —F, and R¹ is phenyl substituted with one or more —F. In some embodiments, R¹ is pentafluorophenyl. In some embodiments, a substituent is optionally substituted $C_{1-4}$ aliphatic. In some embodiments, R¹ is phenyl disubstituted with halogen or $C_{1-4}$ aliphatic. Such R¹ groups include but are not limited to 2,6-dichlorophenyl, 2,6-dibromophenyl, 2,6-dimethylphenyl, 2,6-di-tert-butylphenyl, and 2,6-diisopropylphenyl. In some embodiments, R¹ is not 2,6-dichlorophenyl. In some embodiments, R¹ is not —$C_6F_5$. In some embodiments, R¹ is not 2,6-dichlorophenyl or —$C_6F_5$. In some embodiments, R¹ is substituted phenyl, wherein at least one substituent is an electron-withdrawing group. In some embodiments, R¹ is substituted with at least one $R^y$ group. In some embodiments, a substituent is a small group such as halogen. In some embodiments, each substituent at the 2'- and 6'-positions, if any, is a small group such as halogen.

In some embodiments, R¹ is R, wherein R is not hydrogen.

In some embodiments, R¹ is optionally substituted

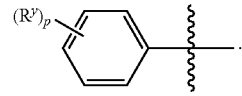

In some embodiments, R¹ is

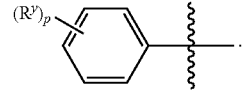

In some embodiments, a provided compound has the structure of formula I-a:

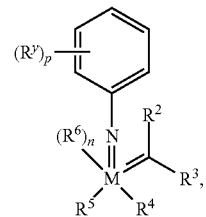

wherein each variable is independently as defined above and described herein.

In some embodiments, R¹ is

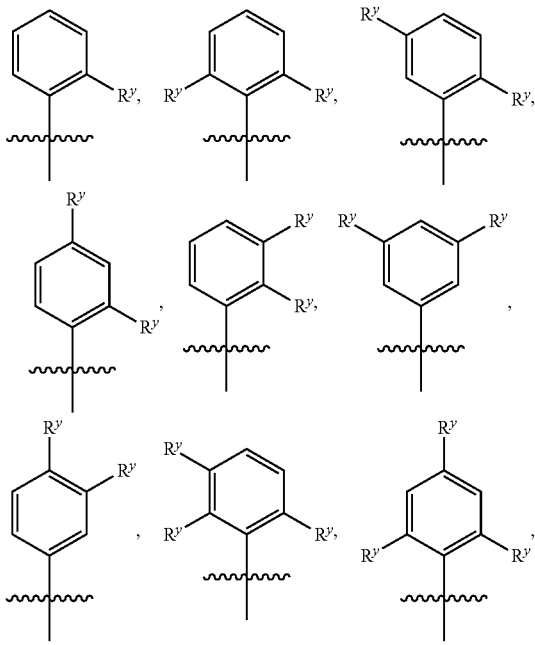

-continued

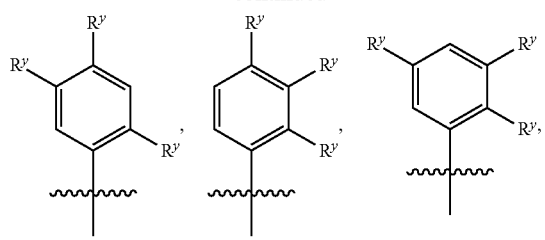

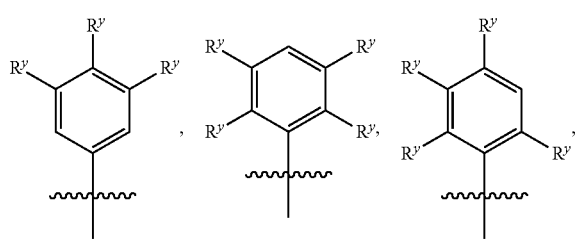

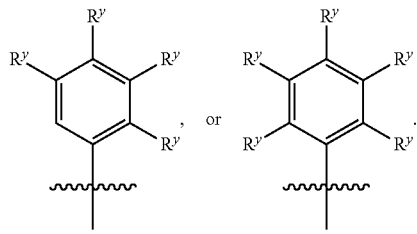

In some embodiments, at least one $R^y$ is halogen or —$CF_3$. In some embodiments, at least one $R^y$ is —F. In some embodiments, at least one $R^y$ is —$CF_3$. In some embodiments, each $R^y$ is —F. In some embodiments, $R^1$ is other than

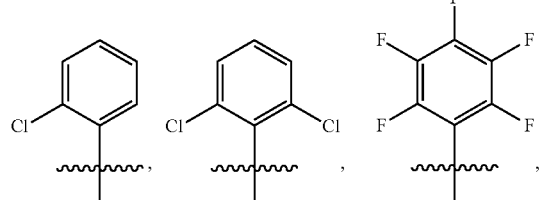

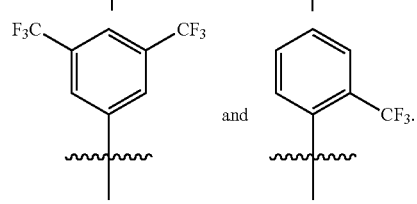

In some embodiments, $R^1$ is other than

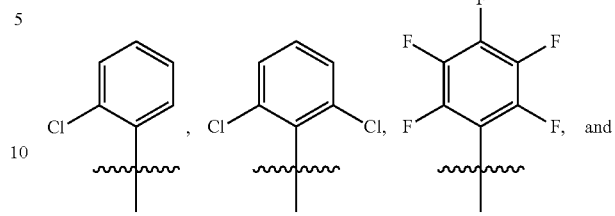

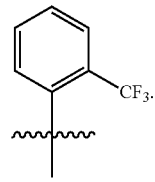

In some embodiments, $R^1$ is other than

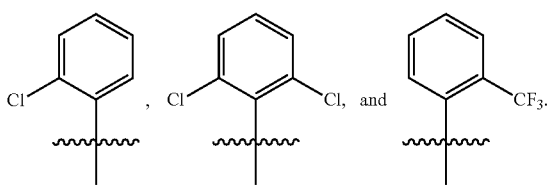

In some embodiments, $R^1$ is other than

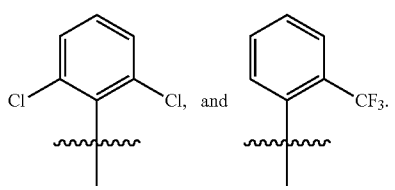 [SMILES: *c1c(Cl)cccc1Cl ; *c1ccccc1C(F)(F)F]

In some embodiments, $R^1$ is other than

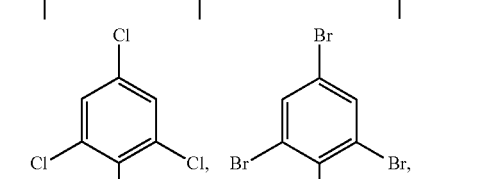
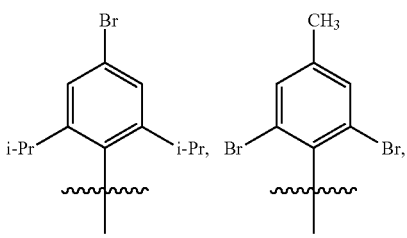

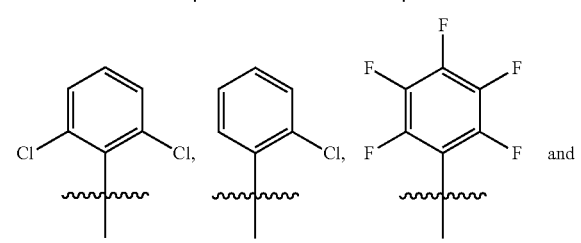

-continued
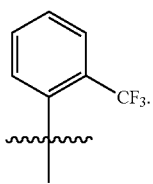
In some embodiments, $R^1$ is other than
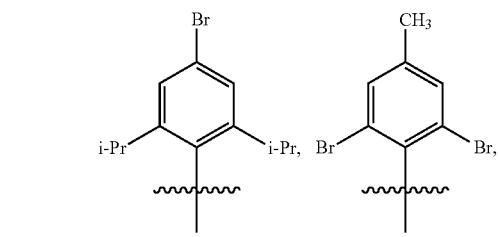
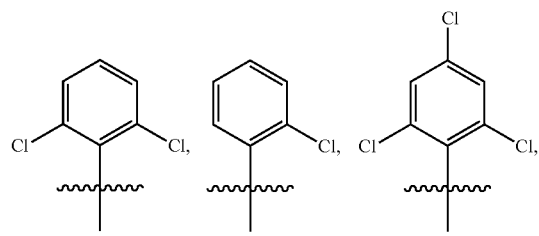
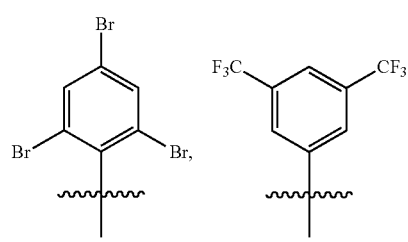
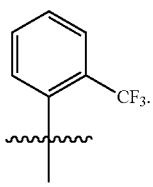
and
In some embodiments, $R^1$ is other than
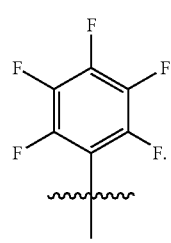
In some embodiments, $R^1$ is selected from:
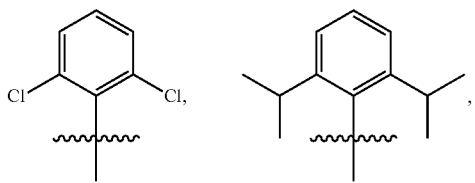
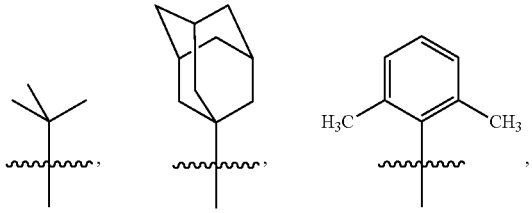
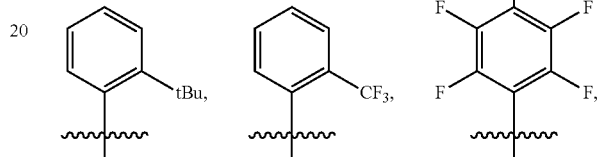
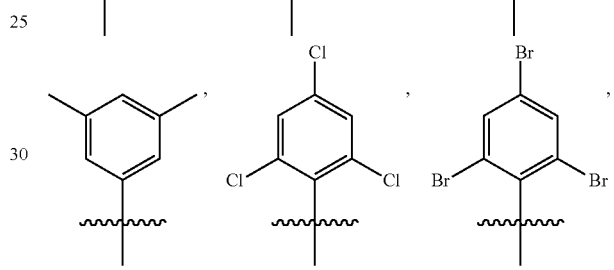
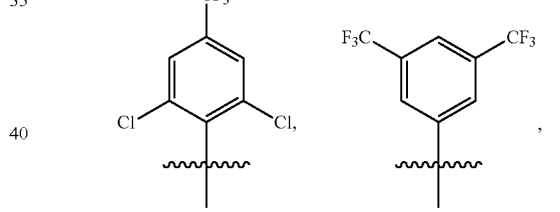
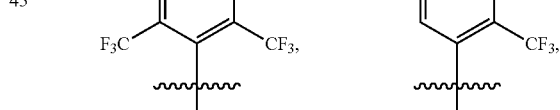
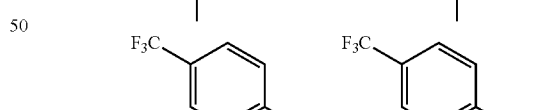
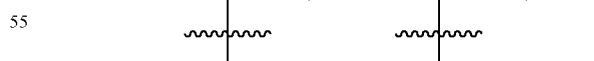
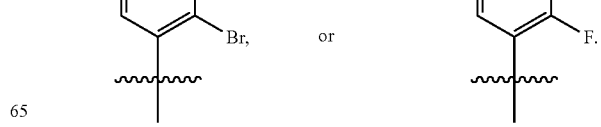 or 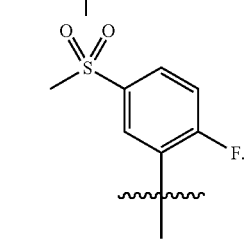

In some embodiments, R¹ is
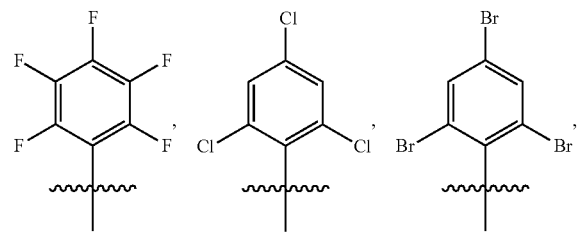
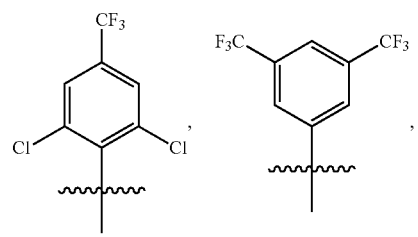
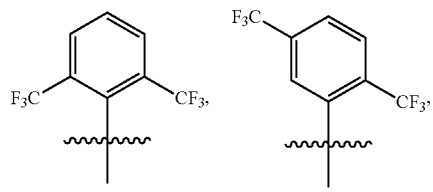
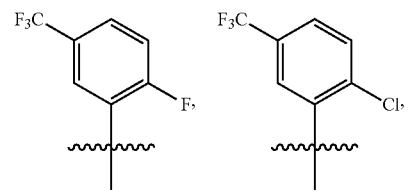
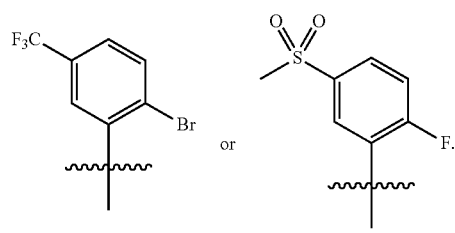
In some embodiments, R¹ is
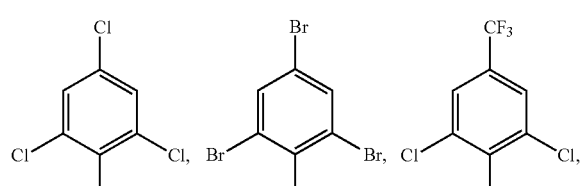
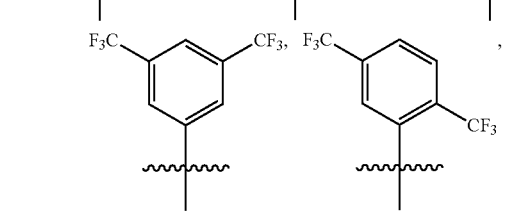
In some embodiments, R¹ is
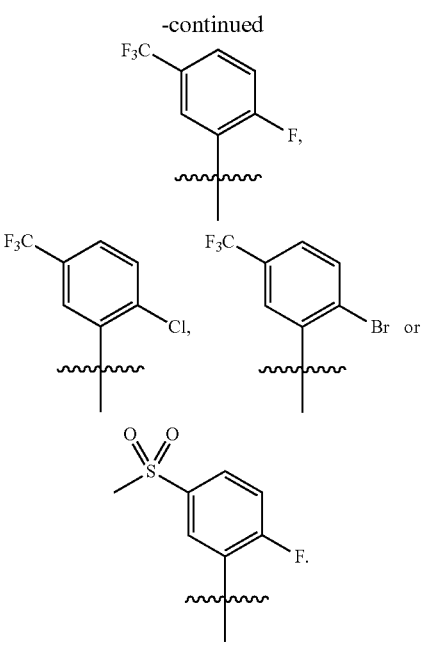
In some embodiments, R¹ is
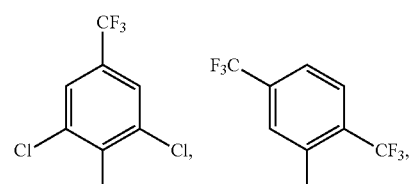
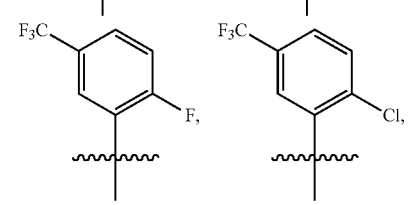
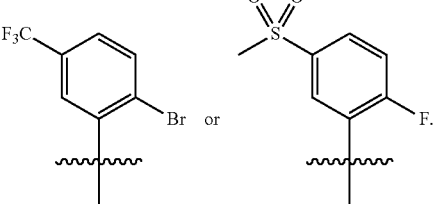
In some embodiments, R¹ is
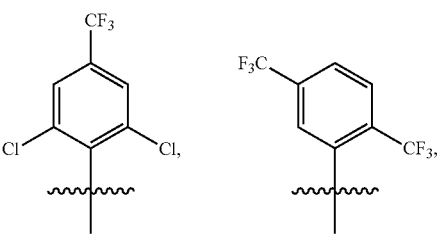

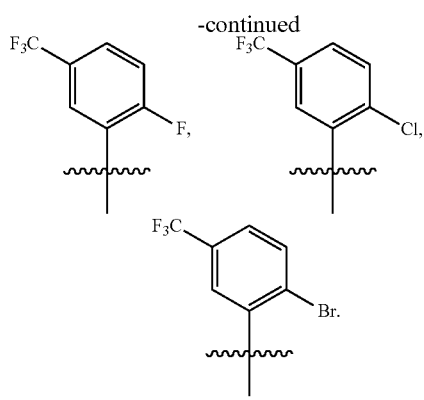
In some embodiments, R¹ is
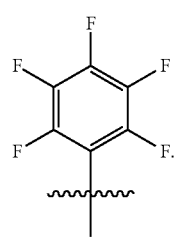
In some embodiments, R¹ is
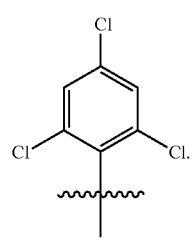 [SMILES: *c1c(Cl)cc(Cl)cc1Cl]
In some embodiments, R¹ is
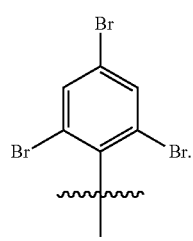
In some embodiments, R¹ is
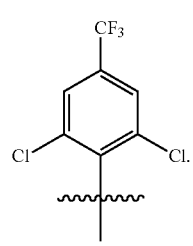
In some embodiments, R¹ is
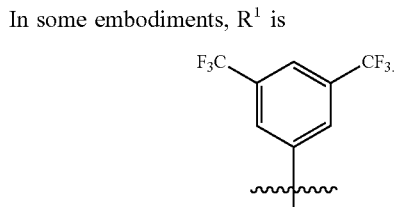
In some embodiments, R¹ is
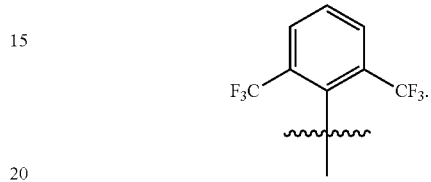
In some embodiments, R¹ is
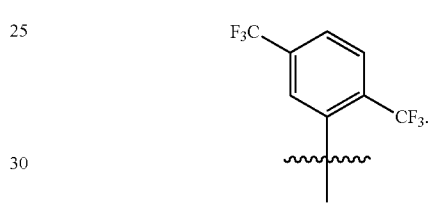
In some embodiments, R¹ is
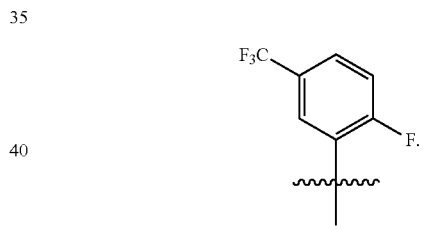
In some embodiments, R¹ is
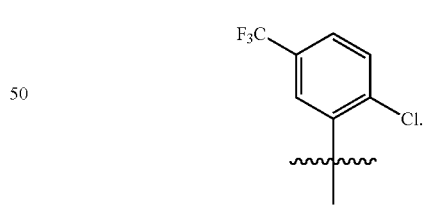
In some embodiments, R¹ is
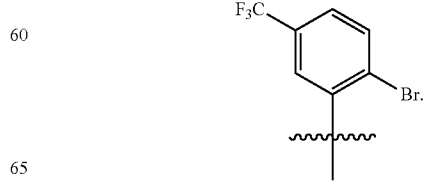

In some embodiments, $R^1$ is

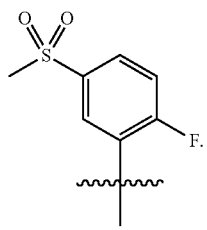 [SMILES: *c1cc(S(C)(=O)=O)ccc1F]

As defined generally above, each of $R^2$ and $R^3$ is independently R, —OR, —SR, —N(R)$_2$, —OC(O)R, —SOR, —SO$_2$R, —SO$_2$N(R)$_2$, —C(O)N(R)$_2$, —NRC(O)R, or —NRSO$_2$R, wherein each R is independently as defined above and described herein.

In some embodiments, both of $R^2$ and $R^3$ are hydrogen. In some embodiments, one of $R^2$ and $R^3$ is hydrogen and the other is an optionally substituted group selected from $C_{1-20}$ aliphatic, $C_{1-20}$ heteroaliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur, —OR, —SR, —N(R)$_2$, —OC(O)R, —SOR, —SO$_2$R, —SO$_2$N(R)$_2$, —C(O)N(R)$_2$, —NRC(O)R, or —NRSO$_2$R. In some embodiments, one of $R^2$ and $R^3$ is hydrogen and the other is an optionally substituted group selected from $C_{1-20}$ aliphatic, $C_{1-20}$ heteroaliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur. In some embodiments, one of $R^2$ and $R^3$ is hydrogen and the other is an optionally substituted group selected from $C_{1-6}$ aliphatic, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur.

In certain embodiments, $R^2$ or $R^3$ is optionally substituted $C_{1-6}$ aliphatic. In some embodiments, $R^2$ or $R^3$ is optionally substituted $C_{1-6}$ alkyl. In certain embodiments, $R^2$ or $R^3$ is $C_{1-6}$ alkyl substituted with phenyl and one or two additional substituents. In certain embodiments, $R^2$ or $R^3$ is a lower alkyl group optionally substituted with one or two methyl groups and phenyl. In certain embodiments, $R^2$ or $R^3$ is —C(Me)$_2$Ph. In certain embodiments, $R^2$ or $R^3$ is —C(Me)$_3$. In certain embodiments, $R^2$ or $R^3$ is —CH=C(Me)Ph. In certain embodiments, $R^2$ or $R^3$ is —$^{13}$CH=C(Me)Ph. In certain embodiments, $R^2$ or $R^3$ is —CH=$^{13}$C(Me)Ph.

In some embodiments, each of $R^2$ and $R^3$ is independently R, wherein R is as defined above and described herein. In some embodiments, each of $R^2$ and $R^3$ is independently R, wherein at least one of $R^2$ and $R^3$ is not hydrogen.

In certain embodiments, $R^2$ is hydrogen and $R^3$ is R, —OR, —SR, —N(R)$_2$, —OC(O)R, —SOR, —SO$_2$R, —SO$_2$N(R)$_2$, —C(O)N(R)$_2$, —NRC(O)R, or —NRSO$_2$R, wherein each R is independently as defined above and described herein. In certain embodiments, $R^2$ is hydrogen and $R^3$ is R, wherein R is as defined above and described herein. In certain embodiments, $R^2$ is hydrogen and $R^3$ is optionally substituted $C_{1-20}$ aliphatic. In some embodiments, $R^2$ is hydrogen and $R^3$ is optionally substituted $C_{1-20}$ alkyl. In certain embodiments, $R^2$ is hydrogen and $R^3$ is $C_{1-6}$ alkyl substituted with phenyl and one or two additional substituents. In certain embodiments, $R^2$ is hydrogen and $R^3$ is a lower alkyl group optionally substituted with one or two methyl groups and phenyl. In certain embodiments, $R^2$ is hydrogen and $R^3$ is —C(Me)$_2$Ph. In certain embodiments, $R^2$ is hydrogen and $R^3$ is —C(Me)$_3$. In certain embodiments, $R^2$ is hydrogen and $R^3$ is —CH=C(Me)Ph. In certain embodiments, $R^2$ is hydrogen and $R^3$ is —$^{13}$CH=C(Me)Ph. In certain embodiments, $R^2$ is hydrogen and $R^3$ is —CH=$^{13}$C(Me)Ph.

In certain embodiments, $R^3$ is hydrogen and $R^2$ is R, —OR, —SR, —N(R)$_2$, —OC(O)R, —SOR, —SO$_2$R, —SO$_2$N(R)$_2$, —C(O)N(R)$_2$, —NRC(O)R, or —NRSO$_2$R, wherein each R is independently as defined above and described herein. In certain embodiments, $R^3$ is hydrogen and $R^2$ is R, wherein R is as defined above and described herein. In certain embodiments, $R^3$ is hydrogen and $R^2$ is optionally substituted $C_{1-20}$ aliphatic. In some embodiments, $R^3$ is hydrogen and $R^2$ is optionally substituted $C_{1-20}$ alkyl. In certain embodiments, $R^3$ is hydrogen and $R^2$ is $C_{1-6}$ alkyl substituted with phenyl and one or two additional substituents. In certain embodiments, $R^3$ is hydrogen and $R^2$ is a lower alkyl group optionally substituted with one or two methyl groups and phenyl. In certain embodiments, $R^3$ is hydrogen and $R^2$ is —C(Me)$_2$Ph. In certain embodiments, $R^3$ is hydrogen and $R^2$ is —C(Me)$_3$. In certain embodiments, $R^3$ is hydrogen and $R^2$ is —CH=C(Me)Ph. In certain embodiments, $R^3$ is hydrogen and $R^2$ is —$^{13}$CH=C(Me)Ph. In certain embodiments, $R^3$ is hydrogen and $R^2$ is —CH=$^{13}$C(Me)Ph.

As defined above and described herein, $R^{2'}$ and $R^{3'}$ are taken together M to form an optionally substituted 3-8 membered saturated or partially unsaturated ring having, in addition to M, 0-4 heteroatoms independently selected from nitrogen, oxygen, or sulfur. In some embodiments, $R^{2'}$ and $R^{3'}$ are taken together with M to form an optionally substituted 3-8 membered saturated or partially unsaturated ring, wherein each ring atom is either M or carbon.

In some embodiments, $R^{2'}$ and $R^{3'}$ are taken together with M to form an optionally substituted 3-8 membered saturated ring having, in addition to M, 0-4 heteroatoms independently selected from nitrogen, oxygen, or sulfur. In some embodiments, $R^{2'}$ and $R^{3'}$ are taken together with M to form an optionally substituted 3-8 membered saturated ring having, in addition to M, 0-2 heteroatoms independently selected from nitrogen, oxygen, or sulfur. In some embodiments, $R^{2'}$ and $R^{3'}$ are taken together with M to form an optionally substituted 3-8 membered saturated ring, wherein each ring atom is either M or carbon. In some embodiments, $R^{2'}$ and $R^{3'}$ are taken together with M to form an optionally substituted 3-5 membered saturated ring having, in addition to M, 0-4 heteroatoms independently selected from nitrogen, oxygen, or sulfur. In some embodiments, $R^{2'}$ and $R^{3'}$ are taken together with M to form an optionally substituted 3-5 membered saturated ring having, in addition to M, 0-2 heteroatoms independently selected from nitrogen, oxygen, or sulfur. In some embodiments, $R^{2'}$ and $R^{3'}$ are taken together with M to form an optionally substituted 3-5 membered saturated ring, wherein each ring atom is either M or carbon.

In some embodiments, $R^{2'}$ and $R^{3'}$ are taken together with M to form an optionally substituted 3-membered saturated ring. In certain embodiments, $R^{2'}$ and $R^{3'}$ are taken together with M to form a substituted 3-membered saturated ring. In certain embodiments, $R^{2'}$ and $R^{3'}$ are taken together with M to form a 3-membered saturated ring unsubstituted at the ring carbon atoms. In certain embodiments, $R^{2'}$ and $R^{3'}$ are taken together with M to form a metallacyclopropane ring optionally substituted at the ring carbon atoms. In certain embodiments, $R^{2'}$ and $R^{3'}$ are taken together with M to form metallacyclopropane, wherein the ring carbon atoms of the metallacyclobutane are not substituted. In some embodiments, a compound of formula II wherein $R^{2'}$ and $R^{3'}$ are taken together with M to form a metallacyclopropane ring can be considered as a compound comprising an olefin ligand. For example, a

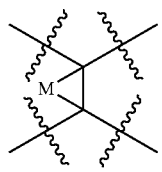

moiety can also be drawn as

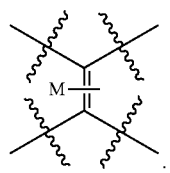

In certain embodiments, $R^{2'}$ and $R^{3'}$ are taken together with the intervening metal atom to form an optionally substituted 4-membered saturated ring. In certain embodiments, $R^{2'}$ and $R^{3'}$ are taken together with the intervening metal atom to form a substituted 4-membered saturated ring. In certain embodiments, $R^{2'}$ and $R^{3'}$ are taken together with the intervening metal atom to form a 4-membered saturated ring unsubstituted at the ring carbon atoms. In certain embodiments, $R^{2'}$ and $R^{3'}$ are taken together with the intervening metal atom to form a metallacyclobutane ring optionally substituted at the ring carbon atoms. In certain embodiments, $R^{2'}$ and $R^{3'}$ are taken together with the intervening metal atom to form metallacyclobutane, wherein the ring carbon atoms of the metallacyclobutane are not substituted.

In certain embodiments, $R^{2'}$ and $R^{3'}$ are taken together with the intervening metal atom to form an optionally substituted 5-membered saturated ring. In certain embodiments, $R^{2'}$ and $R^{3'}$ are taken together with the intervening metal atom to form a substituted 5-membered saturated ring. In certain embodiments, $R^{2'}$ and $R^{3'}$ are taken together with the intervening metal atom to form a 5-membered saturated ring unsubstituted at the ring carbon atoms. In certain embodiments, $R^{2'}$ and $R^{3'}$ are taken together with the intervening metal atom to form a metallacyclopentane ring optionally substituted at the ring carbon atoms. In certain embodiments, $R^{2'}$ and $R^{3'}$ are taken together with the intervening metal atom to form metallacyclopentane, wherein the ring carbon atoms of the metallacyclopentane are not substituted.

In some embodiments, $R^{2'}$ and $R^{3'}$ are taken together with the intervening metal atom to form an optionally substituted 3-8 membered partially unsaturated ring having, in addition to the intervening metal atom, 0-4 heteroatoms independently selected from nitrogen, oxygen, or sulfur. In some embodiments, $R^{2'}$ and $R^{3'}$ are taken together with the intervening metal atom to form an optionally substituted 3-8 membered partially unsaturated ring having, in addition to the intervening metal atom, 0-2 heteroatoms independently selected from nitrogen, oxygen, or sulfur. In some embodiments, $R^{2'}$ and $R^{3'}$ are taken together with the intervening metal atom to form an optionally substituted 5-6 membered partially unsaturated ring having, in addition to the intervening metal atom, 0-4 heteroatoms independently selected from nitrogen, oxygen, or sulfur. In some embodiments, $R^{2'}$ and $R^{3'}$ are taken together with the intervening metal atom to form an optionally substituted 5-6 membered partially unsaturated ring having, in addition to the intervening metal atom, 0-2 heteroatoms independently selected from nitrogen, oxygen, or sulfur. In some embodiments, $R^{2'}$ and $R^{3'}$ are taken together with the intervening metal atom to form an optionally substituted 3-4 membered partially unsaturated ring having, in addition to the intervening metal atom, 0-4 heteroatoms independently selected from nitrogen, oxygen, or sulfur. In some embodiments, $R^{2'}$ and $R^{3'}$ are taken together with the intervening metal atom to form an optionally substituted 3-4 membered partially unsaturated ring having, in addition to the intervening metal atom, 0-2 heteroatoms independently selected from nitrogen, oxygen, or sulfur.

As generally defined above, $R^4$ is halogen, R, —N(R)$_2$, —NRC(O)R, —NRC(O)OR, —NRC(O)N(R)$_2$, —NRSO$_2$R, —NRSO$_2$N(R)$_2$, —NROR, —OR, —OSi(R)$_3$, —OAr$^a$, or an optionally substituted group selected from a 5-6 membered monocyclic heteroaryl ring having at least one nitrogen and 0-3 additional heteroatoms independently selected from nitrogen, oxygen, or sulfur, a 3-7 membered saturated or partially unsaturated heterocyclic ring having at least one nitrogen and 0-2 additional heteroatoms independently selected from nitrogen, oxygen, or sulfur, a 7-10 membered bicyclic saturated or partially unsaturated heterocyclic ring having at least one nitrogen and 0-4 additional heteroatoms independently selected from nitrogen, oxygen, or sulfur, or an 8-10 membered bicyclic heteroaryl ring having at least one nitrogen and 0-4 additional heteroatoms independently selected from nitrogen, oxygen, or sulfur.

In some embodiments, $R^4$ is halogen. In some embodiments, $R^4$ is —F. In some embodiments, $R^4$ is —Cl. In some embodiments, $R^4$ is —Br. In some embodiments, $R^4$ is —I.

In some embodiments, R⁴ is R. In some embodiments, R⁴ is optionally substituted $C_{1-20}$ aliphatic. In some embodiments, R⁴ is optionally substituted $C_{1-6}$ aliphatic. In some embodiments, R⁴ is —CH₂CMe₂Ph. In some embodiments, R⁴ is —CH₂CMe₃. In some embodiments, R⁴ is triflate.

In some embodiments, R⁴ is —N(R)₂. In some embodiments, R⁴ is —N(R)₂, wherein two R groups are taken together with the nitrogen atom to form an optionally substituted 3-10 membered, monocyclic or bicyclic, saturated, partially unsaturated, or aryl ring having, in addition to the nitrogen atom, 0-4 heteroatoms independently selected from nitrogen, oxygen, or sulfur. In some embodiments, —N(R)₂ is optionally substituted pyrrolyl. In some embodiments, —N(R)₂ is

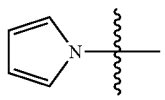

In some embodiments, —N(R)₂ is

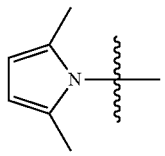

In some embodiments, R⁴ is —OR. In some embodiments, R⁴ is —OR, wherein R is not hydrogen. In some embodiments, R⁴ is —OR, wherein R is optionally substituted phenyl. In some embodiments, R⁴ is hexafluoro-tert-butoxide (—OCMe(CF₃)₂, $OR_{F6}$). In some embodiments, R⁴ is perfluoro-tert-butoxide (—OC(CF₃)₃, $OR_{F9}$). In some embodiments, R⁴ is 1,1,1,3,3,3-hexafluoroisopropoxide (O-iPr$^{F6}$). In some embodiments, R⁴ is —OC(C₆F₅)₃. In some embodiments, R⁴ is 2,2',6,6'-tetraisopropylterphen-2-oxide (TIPTO). In some embodiments, R⁴ is pentafluorophenoxide (—OC₆F₅). In some embodiments, R⁴ is 2,6-diisopropylphenoxide. In some embodiments, R⁴ is 4-dimethylamino-2,6-diphenylphenoxide. In some embodiments, R⁴ is 2,6-dimethoxylphenoxide. In some embodiments, R⁴ is 9-oxytriptycene (OTript). In some embodiments, R⁴ is O-2,6-(CHPh₂)₂-4-MeC₆H₂ (ODBMP).

In some embodiments, R⁴ is —OSi(R)₃. In some embodiments, R⁴ is —OSi(R)₃, wherein at least one R is not hydrogen. In some embodiments, R⁴ is —OSi(R)₃, wherein each R is not hydrogen.

In some embodiments, R⁴ is —OAr$^a$. In some embodiments, R⁴ is —OAr$^a$, wherein Ar$^a$ is

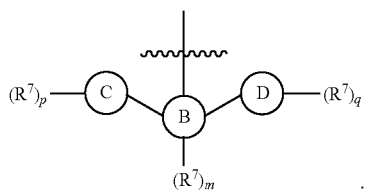

In some embodiments, R⁴ is —OAr$^a$, wherein Ar$^a$ is

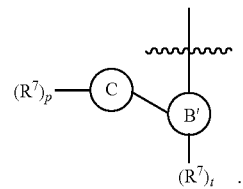

In some embodiments, R⁴ is —OAr$^a$, wherein Ar$^a$ is

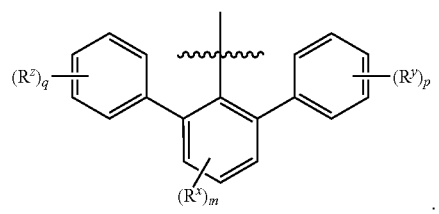

In some embodiments, R⁴ is

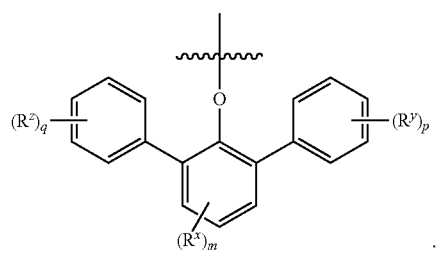

In some embodiments, R⁴ is DFTO. In some embodiments, R⁴ is 2,6-bis(2',4',6'-triisopropylphenyl)phen-2-oxide (HIPTO). In some embodiments, R⁴ is 2,6-bis(2',4',6'-trimethylphenyl)phenoxide (HMTO).

In some embodiments, R⁴ is an optionally substituted group selected from a 5-6 membered monocyclic heteroaryl ring having at least one nitrogen and 0-3 additional heteroatoms independently selected from nitrogen, oxygen, or sulfur, a 3-7 membered saturated or partially unsaturated heterocyclic ring having at least one nitrogen and 0-2 additional heteroatoms independently selected from nitrogen, oxygen, or sulfur, a 7-10 membered bicyclic saturated or partially unsaturated heterocyclic ring having at least one nitrogen and 0-4 additional heteroatoms independently selected from nitrogen, oxygen, or sulfur, or an 8-10 membered bicyclic heteroaryl ring having at least one nitrogen and 0-4 additional heteroatoms independently selected from nitrogen, oxygen, or sulfur. In some embodiments, R⁴ is optionally substituted 5-6 membered monocyclic heteroaryl ring having at least one nitrogen and 0-3 additional heteroatoms independently selected from nitrogen, oxygen, or sulfur. In some embodiments, R⁴ is optionally substituted 5-membered monocyclic heteroaryl ring having at least one nitrogen and 0-3 additional heteroatoms independently selected from nitrogen, oxygen, or sulfur. In some embodiments, R⁴ is bonded to M through the nitrogen atom.

As generally defined above, R⁵ is halogen, R, —N(R)₂, —NRC(O)R, —NRC(O)OR, —NRC(O)N(R)₂, —NRSO₂R, —NRSO₂N(R)₂, —NROR, —OR, —OSi(R)₃, —OAr$^a$, or an optionally substituted group selected from a 5-6 membered monocyclic heteroaryl ring having at least one nitrogen and 0-3 additional heteroatoms independently selected from nitrogen, oxygen, or sulfur, a 3-7 membered saturated or partially unsaturated heterocyclic ring having at least one nitrogen and 0-2 additional heteroatoms independently selected from nitrogen, oxygen, or sulfur, a 7-10 membered bicyclic saturated or partially unsaturated heterocyclic ring having at least one nitrogen and 0-4 additional heteroatoms independently selected from nitrogen, oxygen, or sulfur, or an 8-10 membered bicyclic heteroaryl ring having at least one nitrogen and 0-4 additional heteroatoms independently selected from nitrogen, oxygen, or sulfur.

In some embodiments, $R^5$ is halogen. In some embodiments, $R^5$ is —F. In some embodiments, $R^5$ is —Cl. In some embodiments, $R^5$ is —Br. In some embodiments, $R^5$ is —I.

In some embodiments, $R^5$ is R. In some embodiments, $R^5$ is optionally substituted $C_{1-20}$ aliphatic. In some embodiments, $R^5$ is optionally substituted $C_{1-6}$ aliphatic. In some embodiments, $R^5$ is —CH$_2$CMe$_2$Ph. In some embodiments, $R^5$ is —CH$_2$CMe$_3$.

In some embodiments, $R^5$ is —N(R)$_2$. In some embodiments, $R^5$ is —N(R)$_2$, wherein two R groups are taken together with the nitrogen atom to form an optionally substituted 3-10 membered, monocyclic or bicyclic, saturated, partially unsaturated, or aryl ring having, in addition to the nitrogen atom, 0-4 heteroatoms independently selected from nitrogen, oxygen, or sulfur. In some embodiments, —N(R)$_2$ is optionally substituted pyrrolyl. In some embodiments, —N(R)$_2$ is

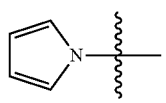

In some embodiments, —N(R)$_2$ is

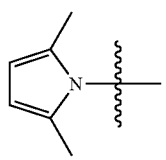

In some embodiments, $R^5$ is —OR. In some embodiments, $R^5$ is —OR, wherein R is not hydrogen. In some embodiments, $R^5$ is —OR, wherein R is optionally substituted phenyl. In some embodiments, $R^5$ is hexafluoro-tert-butoxide (—OCMe(CF$_3$)$_2$, OR$_{F6}$). In some embodiments, $R^5$ is perfluoro-tert-butoxide (—OC(CF$_3$)$_3$, (OR$_{F9}$). In some embodiments, $R^5$ is 1,1,1,3,3,3-hexafluoroisopropoxide (O-iPr$^{F6}$). In some embodiments, $R^5$ is —OC(C$_6$F$_5$)$_3$. In some embodiments, $R^5$ is 2,2',6,6'-tetraisopropylterphen-2-oxide (TIPTO). In some embodiments, $R^5$ is pentafluorophenoxide (—OC$_6$F$_5$). In some embodiments, $R^5$ is 2,6-diisopropylphenoxide. In some embodiments, $R^5$ is 4-dimethylamino-2,6-diphenylphenoxide. In some embodiments, $R^5$ is 2,6-dimethoxylphenoxide. In some embodiments, $R^5$ is 9-oxytriptycene (OTript). In some embodiments, $R^4$ is O-2,6-(CHPh$_2$)$_2$-4-MeC$_6$H$_2$ (ODBMP).

In some embodiments, $R^5$ is —OSi(R)$_3$. In some embodiments, $R^5$ is —OSi(R)$_3$, wherein at least one R is not hydrogen. In some embodiments, $R^5$ is —OSi(R)$_3$, wherein each R is not hydrogen.

In some embodiments, $R^5$ is —OAr$^a$. In some embodiments, $R^5$ is —OAr$^a$, wherein Ar$^a$ is

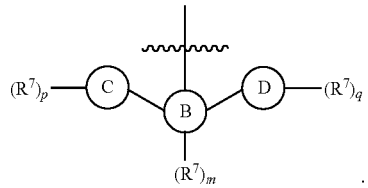

In some embodiments, $R^5$ is —OAr$^a$, wherein Ar$^a$ is

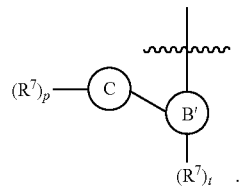

In some embodiments, $R^5$ is —OAr$^a$, wherein Ar$^a$ is

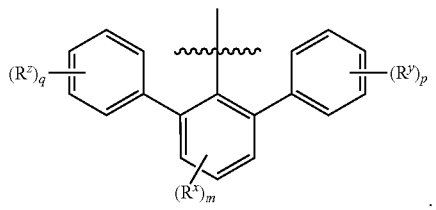

In some embodiments, $R^5$ is

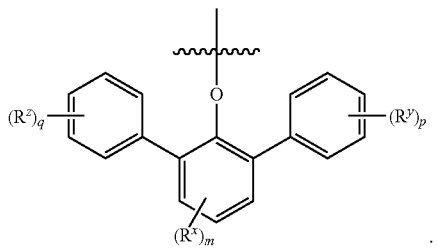

In some embodiments, $R^5$ is DFTO. In some embodiments, $R^5$ is 2,6-bis(2',4',6'-triisopropylphenyl)phen-2-oxide (HIPTO). In some embodiments, $R^5$ is 2,6-bis(2',4',6'-trimethylphenyl)phenoxide (HMTO).

In some embodiments, $R^5$ is an optionally substituted group selected from a 5-6 membered monocyclic heteroaryl ring having at least one nitrogen and 0-3 additional heteroatoms independently selected from nitrogen, oxygen, or sulfur, a 3-7 membered saturated or partially unsaturated heterocyclic ring having at least one nitrogen and 0-2 additional heteroatoms independently selected from nitrogen, oxygen, or sulfur, a 7-10 membered bicyclic saturated or partially unsaturated heterocyclic ring having at least one nitrogen and 0-4 additional heteroatoms independently selected from nitrogen, oxygen, or sulfur, or an 8-10 membered bicyclic heteroaryl ring having at least one nitrogen and 0-4 additional heteroatoms independently selected from nitrogen, oxygen, or sulfur. In some embodiments, $R^5$ is optionally substituted 5-6 membered monocyclic heteroaryl ring having at least one nitrogen and 0-3 additional heteroatoms independently selected from nitrogen, oxygen, or sulfur. In some embodiments, $R^5$ is optionally substituted 5-membered monocyclic heteroaryl ring having at least one nitrogen and 0-3 additional heteroatoms independently selected from nitrogen, oxygen, or sulfur. In some embodiments, $R^5$ is bonded to M through the nitrogen atom.

In some embodiments, $R^4$ and $R^5$ are the same. In some embodiments, $R^4$ and $R^5$ are different. In some embodiments, each of $R^4$ and $R^5$ is independently halogen. In some embodiments, each of $R^4$ and $R^5$ is —Cl. In some embodiments, each of $R^4$ and $R^5$ is —OTf. In some embodiments, each of $R^4$ and $R^5$ is an oxygen-containing ligand. In some embodiments, each of $R^4$ and $R^5$ is independently —OR, —OSi(R)$_3$, —OAr$^a$. In some embodiments, $R^4$ and $R^5$ are the same and are —OR, —OSi(R)$_3$, —OAr$^a$, wherein R is not hydrogen. In some embodiments, $R^4$ and $R^5$ are the same and are —OAr$^a$. In some embodiments, each of $R^4$ and $R^5$ is independently optionally substituted alkyl. In some embodiments, $R^4$ and $R^5$ are the same and are optionally substituted alkyl. In some embodiments, $R^4$ and $R^5$ are —CH$_2$C(Me)$_3$. In some embodiments, $R^4$ and $R^5$ are —CH$_2$CMe$_2$Ph.

As generally defined above, Ar$^a$ is

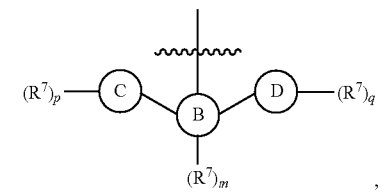

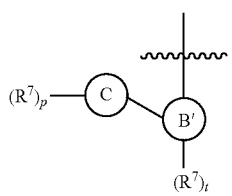, or

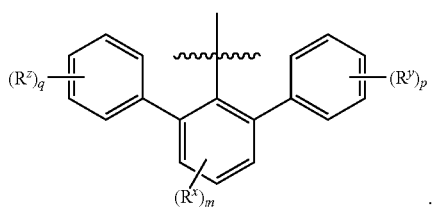

In some embodiments, Ar$^a$ is

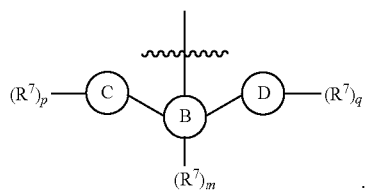

In some embodiments, Ar$^a$ is of the formula:

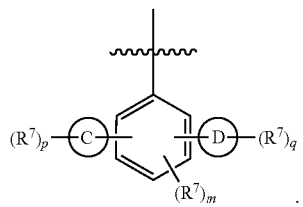

In some embodiments, Ar$^a$ is of the formula:

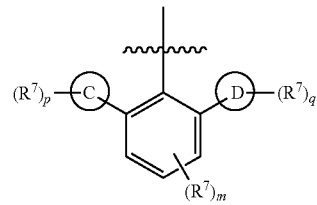

In some embodiments, Ar$^a$ is of the formula:

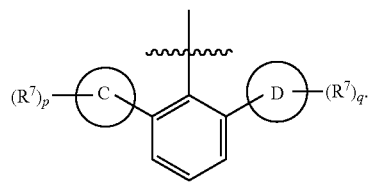

In some embodiments, Ar$^a$ is of the formula:

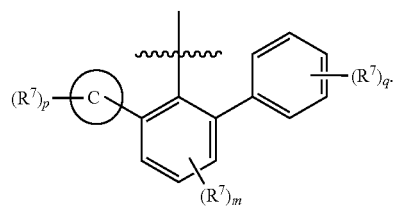

In some embodiments, Ar$^a$ is of the formula:

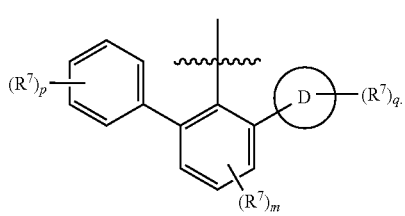

In some embodiments, Ar$^a$ is of the formula:

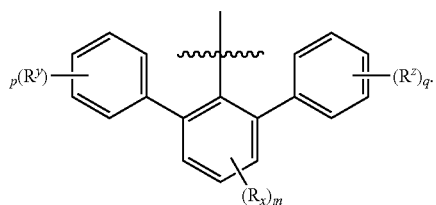

In some embodiments, Ar$^a$ is of the formula:

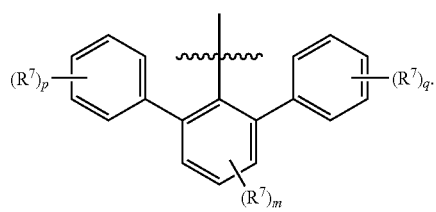

In some embodiments, Ar$^a$ is of the formula:

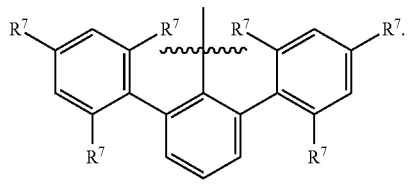

In certain embodiments, each R$^7$ is independently selected from optionally substituted C$_{1-20}$ aliphatic. In certain embodiments, each R$^7$ is independently selected from optionally substituted C$_{1-10}$ aliphatic. In certain embodiments, each R$^7$ is independently optionally substituted alkyl. Exemplary R$^7$ groups include methyl, ethyl, propyl, and butyl.

As generally defined above, Ar$^a$ is

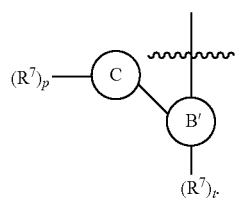

In some embodiments, Ar$^a$ is an optionally substituted group selected from:

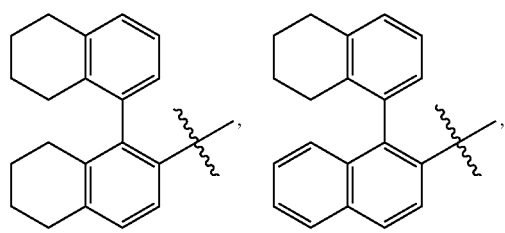

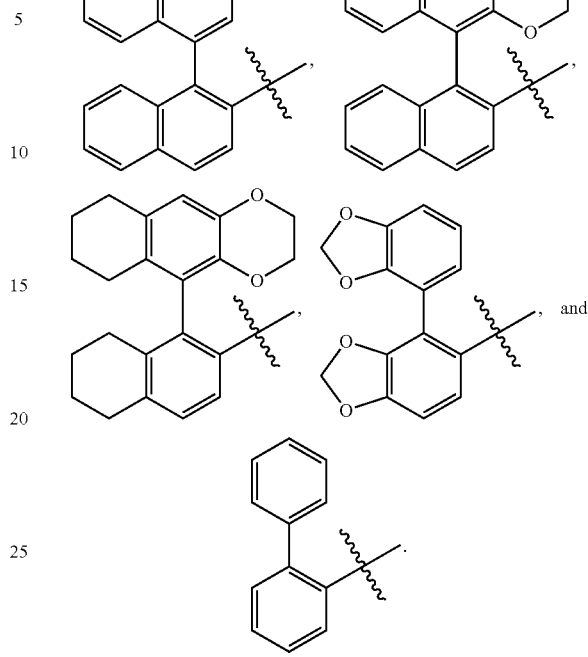

In some embodiments, Ar$^a$ is an optionally substituted group selected from:

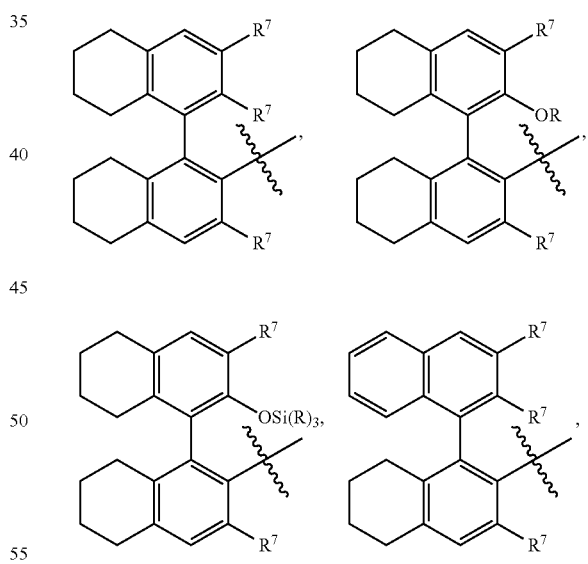

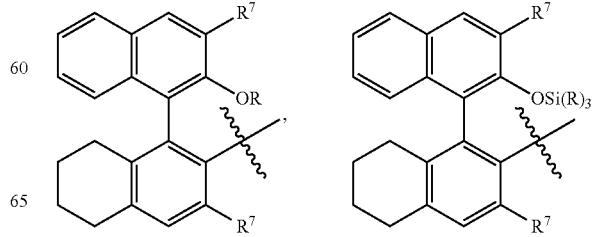

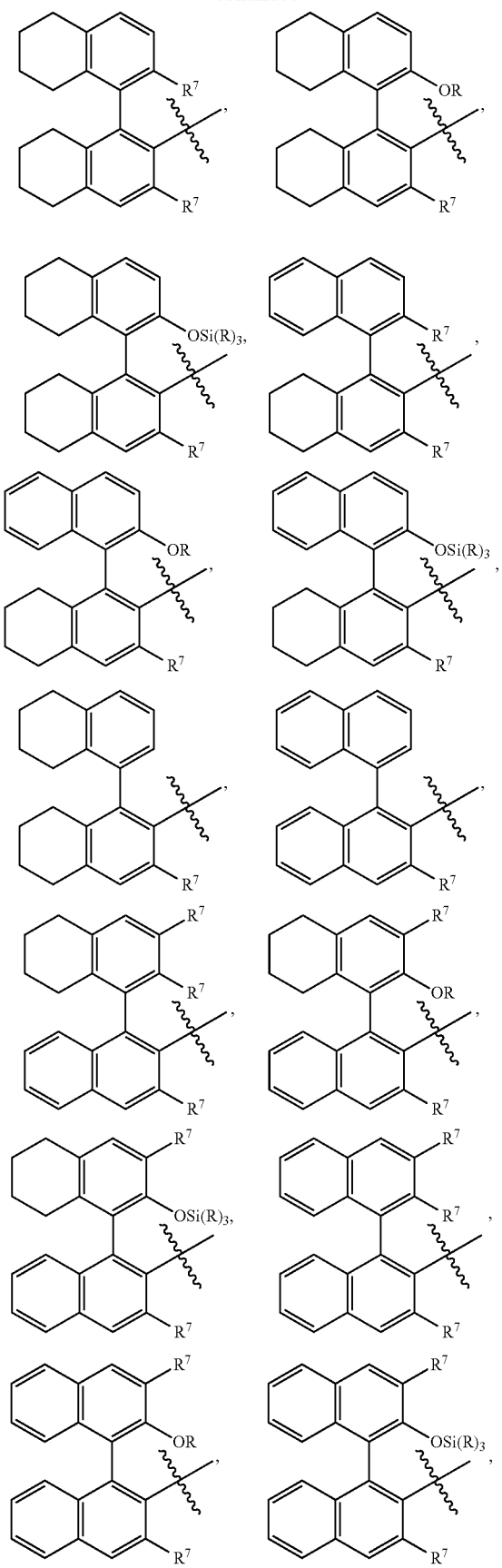
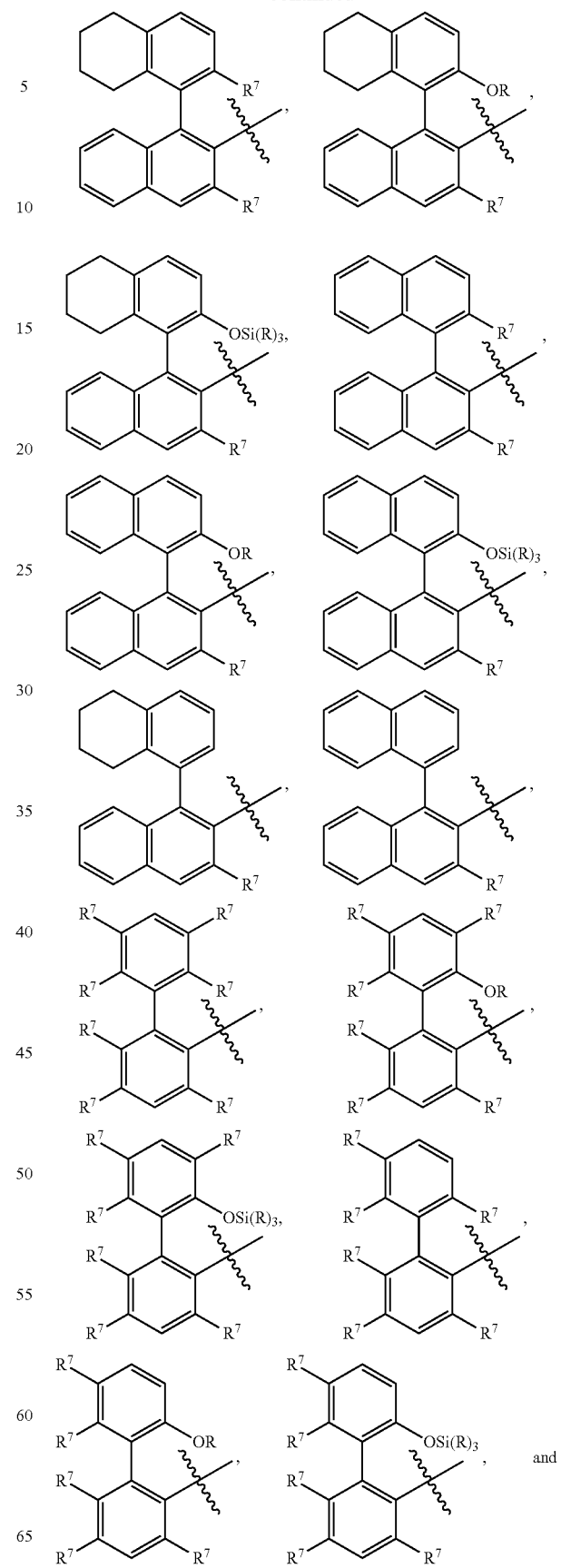

-continued
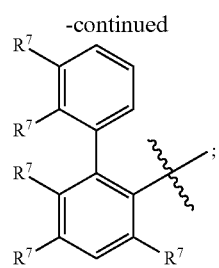
wherein each of R⁷ and R is independently as defined above and described herein. In some embodiments, one or more R⁷ is —F.
In some embodiments, Ar$^a$ is an optionally substituted group selected from:
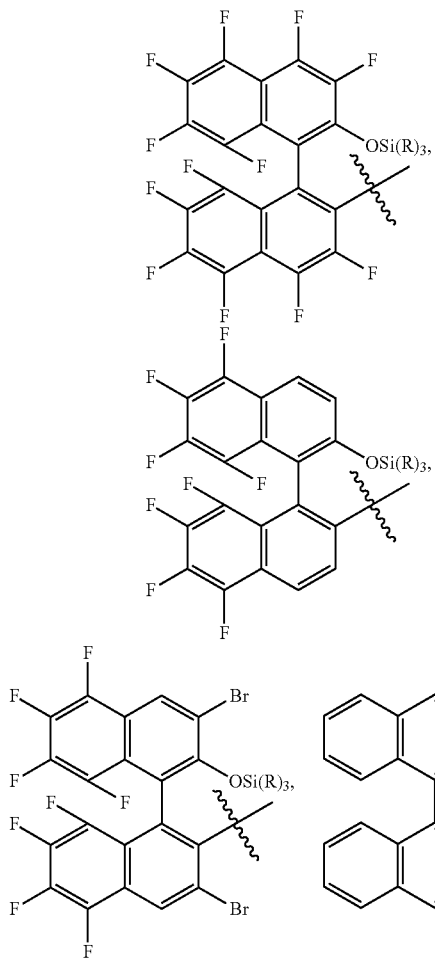
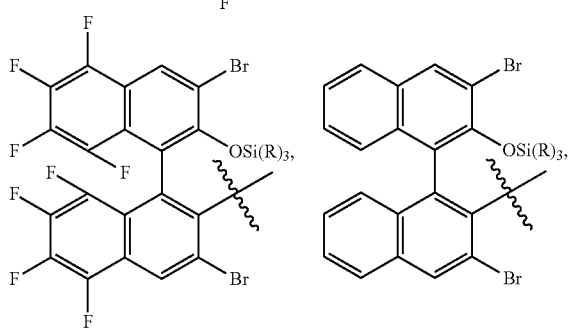
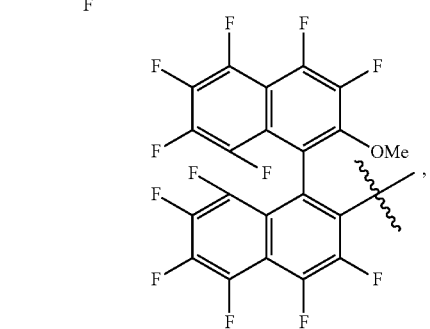
-continued
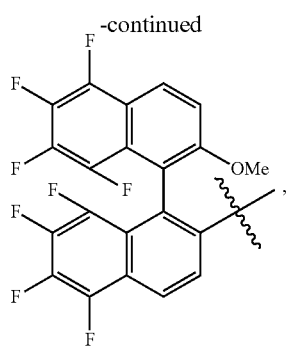
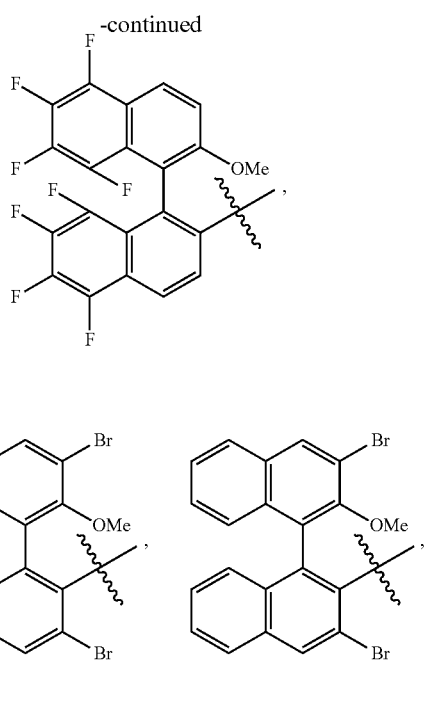
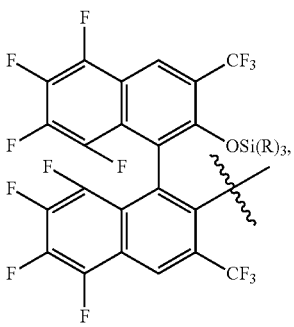
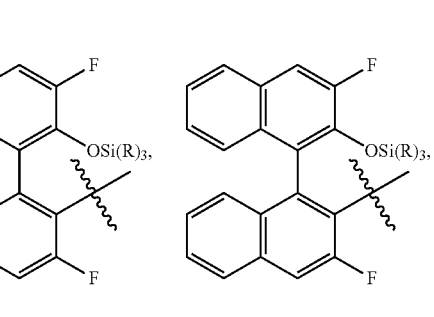
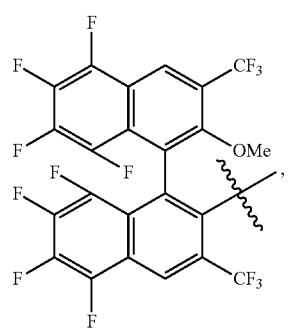

-continued
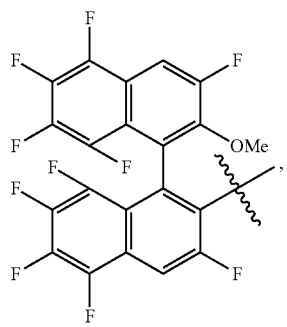
and
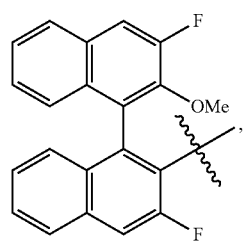
wherein each R is independently as defined above and described herein.
In some embodiments, Ar$^a$ is
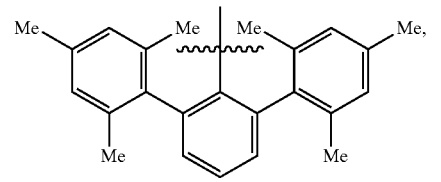
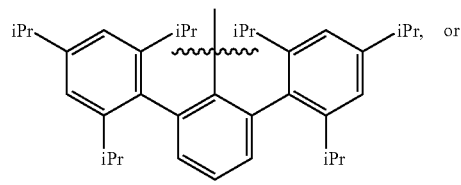
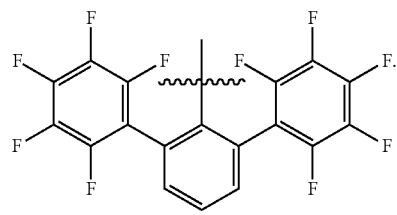
In some embodiments, Ar$^a$ is optionally substituted
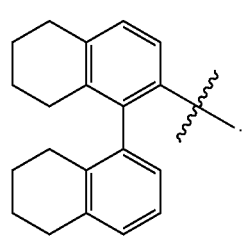 [SMILES: *c1ccc2c(c1-c1cccc3c1CCCC3)CCCC2]
In some embodiments, Ar$^a$ is
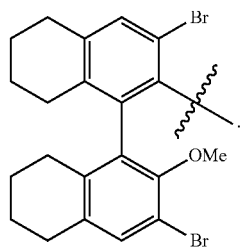 [SMILES: *c1c(Br)cc2c(c1-c1c3c(cc(Br)c1OC)CCCC3)CCCC2]
In some embodiments, Ar$^a$ is
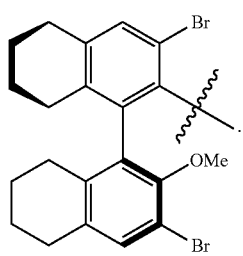
In some embodiments, Ar$^a$ is
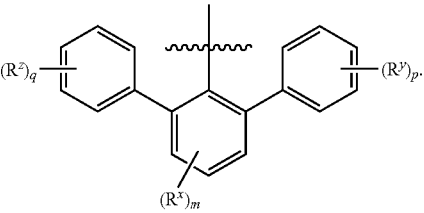
In some embodiments, Ar$^a$ is
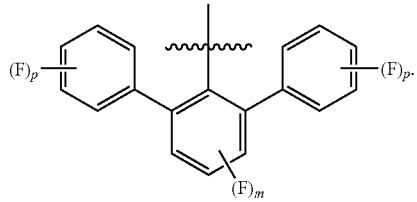
In some embodiments, Ar$^a$ is
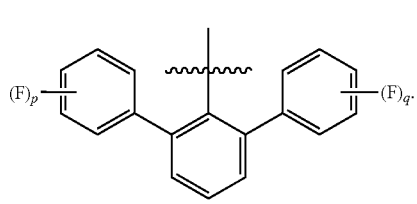

In some embodiments, Ar$^a$ is
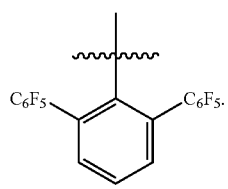
In some embodiments, —OAr$^a$ is an optionally substituted group selected from:
[Structures shown]
, and
In some embodiments, —OAr$^a$ is an optionally substituted group selected from:
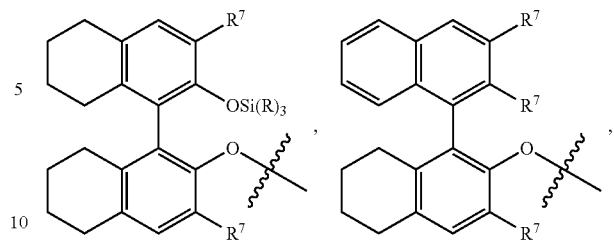
-continued
[Structures shown]

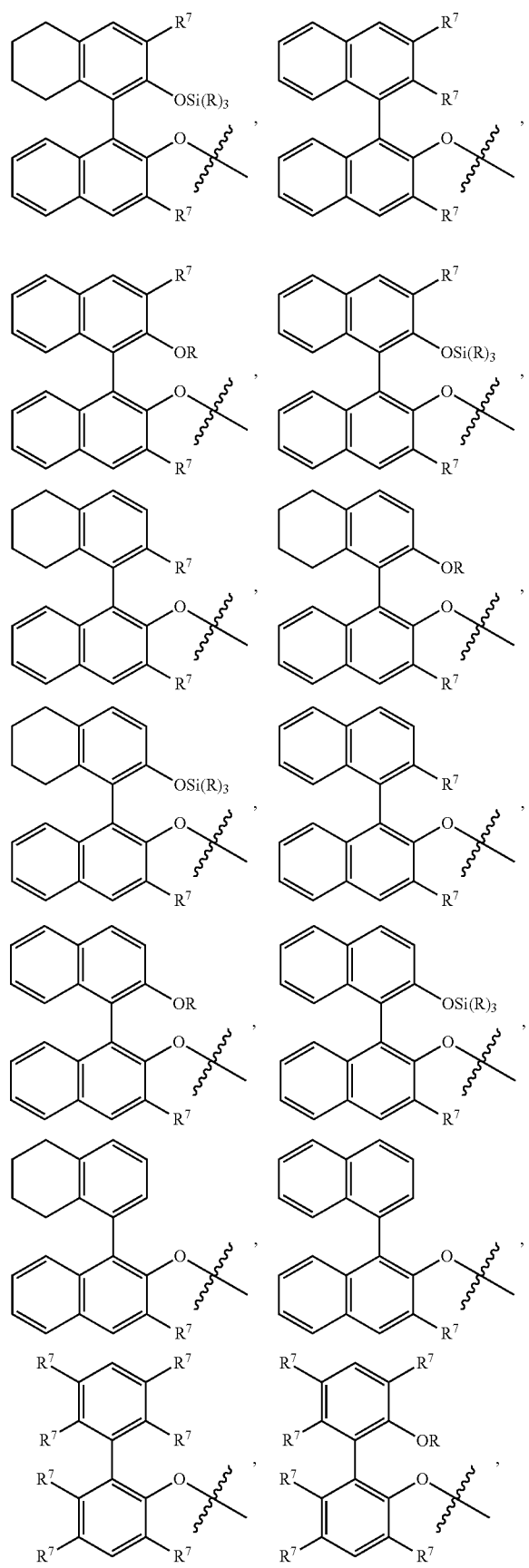
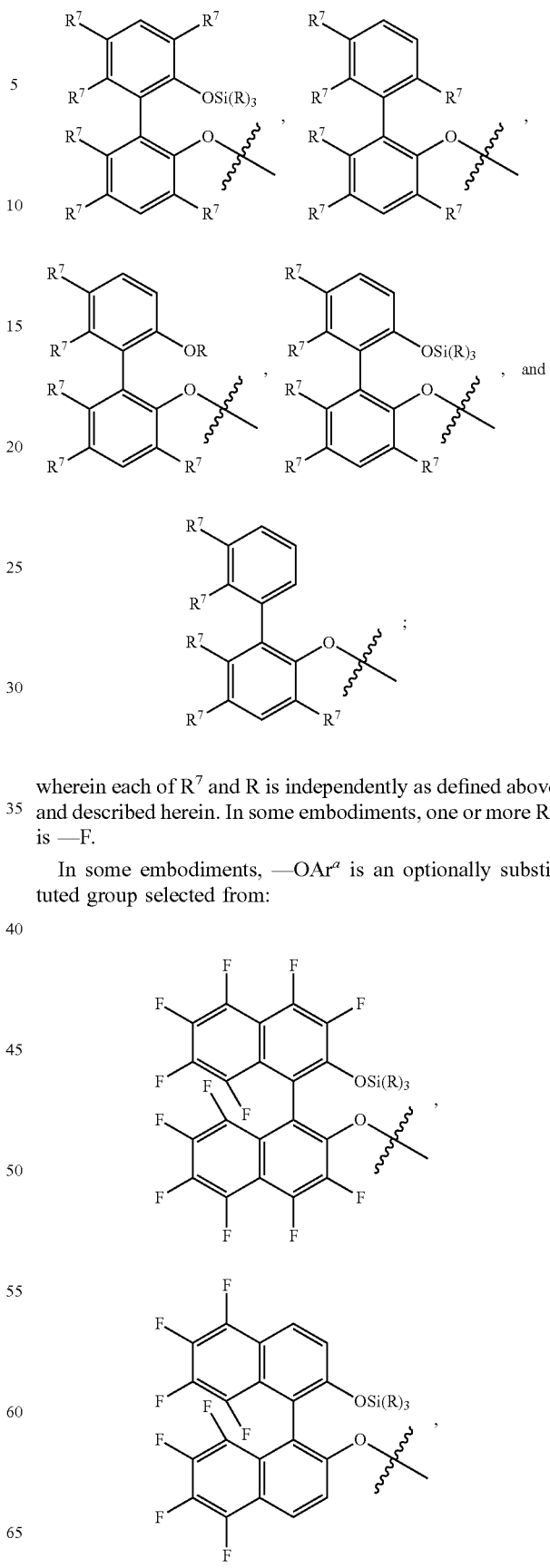
wherein each of R[7] and R is independently as defined above and described herein. In some embodiments, one or more R[7] is —F.
In some embodiments, —OAr[a] is an optionally substituted group selected from:
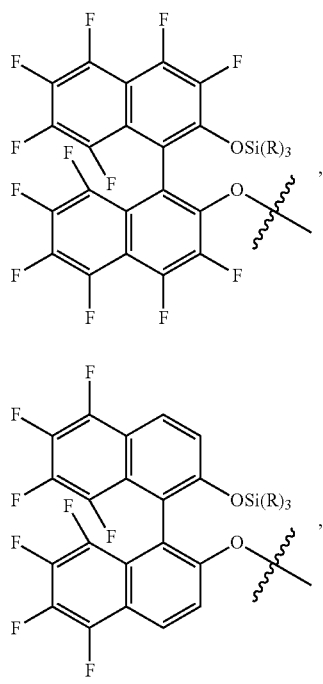

53
-continued
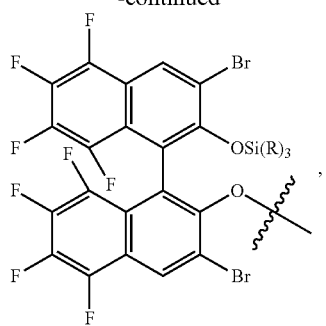
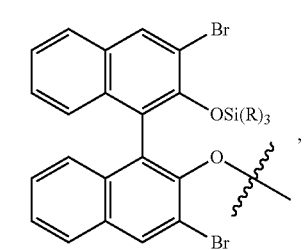
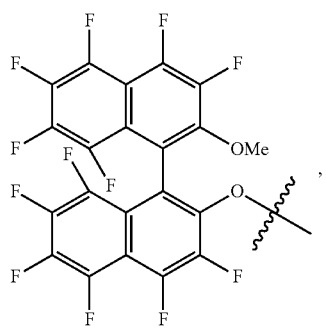
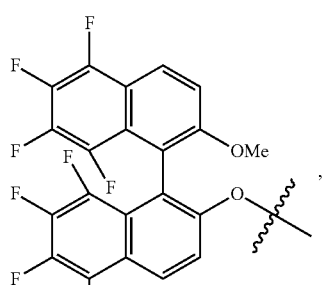
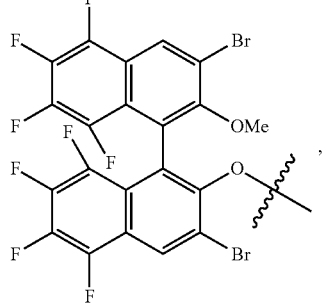
54
-continued
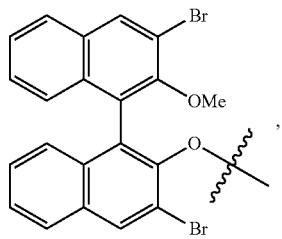
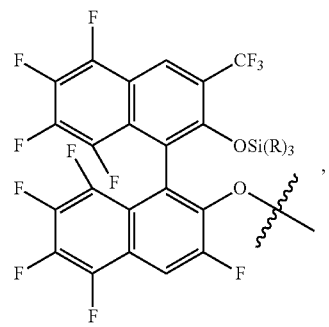
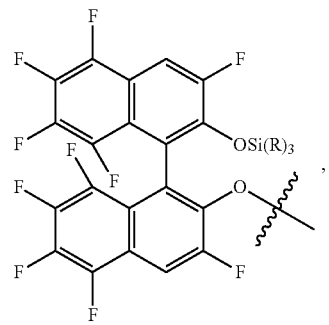
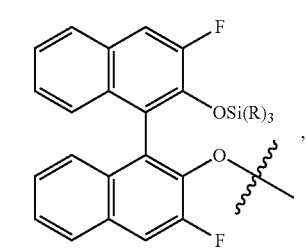
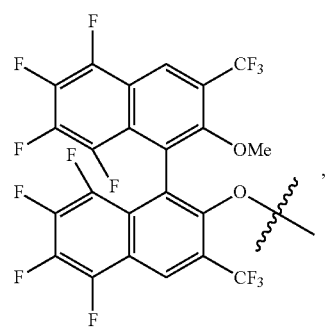

-continued

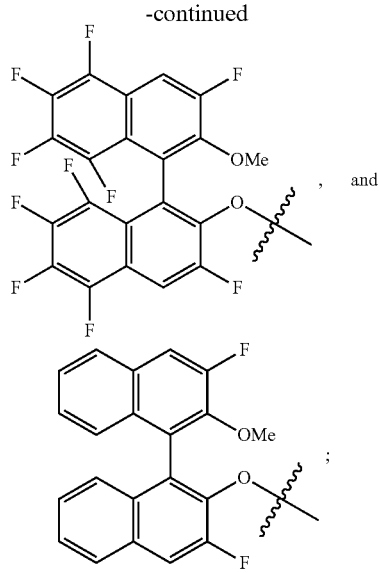
, and

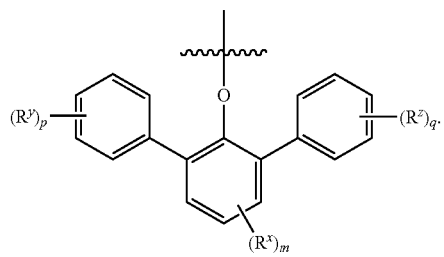
;

wherein each R is independently as defined above and described herein.

In some embodiments, —OAr$^a$ is

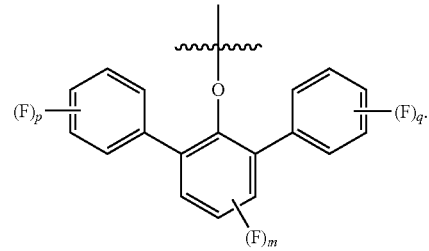

In some embodiments, —OAr$^a$ is

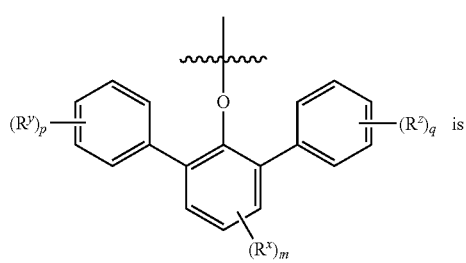

In some embodiments,

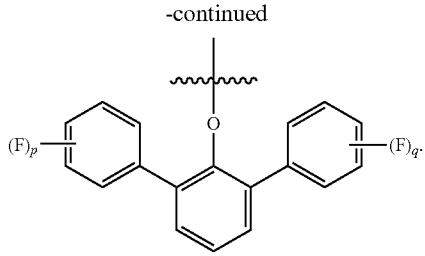

-continued

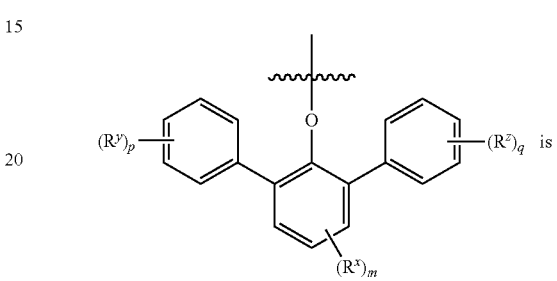

In some embodiments,

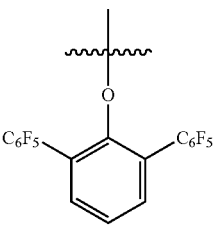 is

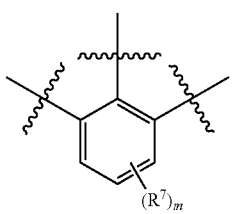

(2,6-(C$_6$F$_5$)$_2$C$_6$H$_3$O—, decafluoroterphenoxide, DFTO). In some embodiments, —OAr$^a$ is DFTO.

As generally defined above, m is 0-3. In some embodiments, m is 0. In some embodiments, m is 1-3. In some embodiments, m is 1. In some embodiments, m is 2. In some embodiments, m is 3.

As generally defined above, Ring B is an optionally substituted group selected from phenyl or a 5-6 membered monocyclic heteroaryl ring having 1-4 heteroatoms independently selected from nitrogen, oxygen, or sulfur. In some embodiments, Ring B is of the following structure:

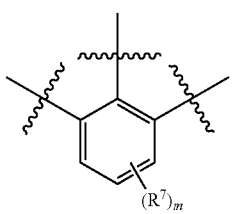

wherein R$^x$ and m are as defined above and described herein. In some embodiments, Ring B is optionally substituted phenyl. In some embodiments, m=0. In some embodiments, Ring B is

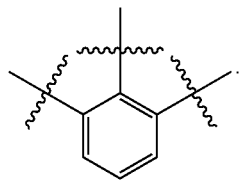 [SMILES: *c1cccc(*)c1*]

In some embodiments, Ring B is an optionally substituted 5-6 membered monocyclic heteroaryl ring having 1-4 heteroatoms independently selected from nitrogen, oxygen, or sulfur. In some embodiments, Ring B is an optionally substituted 5-membered monocyclic heteroaryl ring having 1-4 heteroatoms independently selected from nitrogen, oxygen, or sulfur, and m is 0-2. In some embodiments, Ring B is an optionally substituted 6-membered monocyclic heteroaryl ring having 1-4 heteroatoms independently selected from nitrogen, oxygen, or sulfur, and m is 0-3.

In some embodiments, Ring B is a 5-6 membered monocyclic heteroaryl ring having 1-4 heteroatoms independently selected from nitrogen, oxygen, or sulfur. In some embodiments, Ring B is a 5-6 membered monocyclic heteroaryl ring having 1-2 heteroatoms independently selected from nitrogen, oxygen, or sulfur.

In some embodiments, Ring B is a 5-membered monocyclic heteroaryl ring having 1-4 heteroatoms independently selected from nitrogen, oxygen, or sulfur. In some embodiments, Ring B is a 5-membered monocyclic heteroaryl ring having 1-2 heteroatoms independently selected from nitrogen, oxygen, or sulfur.

In some embodiments, Ring B is a 6-membered monocyclic heteroaryl ring having 1-4 heteroatoms independently selected from nitrogen, oxygen, or sulfur. In some embodiments, Ring B is a 6-membered monocyclic heteroaryl ring having 1-2 heteroatoms independently selected from nitrogen, oxygen, or sulfur.

Exemplary optionally substituted Ring B heteroaryl groups include thienylene, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, and the like.

As generally defined above, p is 1-5. In some embodiments, p is 2-5. In some embodiments, p is 3-5. In some embodiments, p is 4-5. In some embodiments, the value of p correlates with how electron-withdrawing a

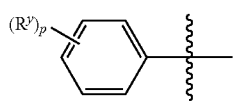

group, or a

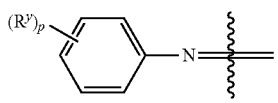

group is. In some embodiments, when each $R^y$ is the same, the larger p is, the more electron-withdrawing a

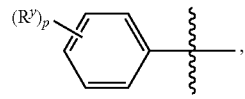

or a

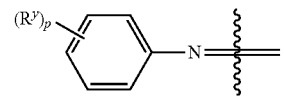

group is.

In some embodiments, p is 1. In some embodiments, p is 2. In some embodiments, p is 3. In some embodiments, p is 4. In some embodiments, p is 5.

As generally defined above, q is 0-5. In some embodiments, q is 0. In some embodiments, q is 1-5. In some embodiments, q is 1. In some embodiments, q is 2. In some embodiments, q is 3. In some embodiments, q is 4. In some embodiments, q is 5.

In some embodiments, each of p and q is independently 1-5. In some embodiments, p is 1 and q is 1. In some embodiments, p is 2 and q is 2. In some embodiments, p is 2 and q is 2, and each of Ring C and Ring D independently has two substituents. In some embodiments, each of Ring C and Ring D has two substituents, and each substituent is at the o-position relative to the ring atom bonded to Ring B. In some embodiments, p is 3 and q is 3. In some embodiments, p is 4 and q is 4. In some embodiments, p is 5 and q is 5.

In some embodiments, p=q. In some embodiments, p is different from q.

As generally defined above, t is 0-4. In some embodiments, t is 0. In some embodiments, t is 1-4. In some embodiments, t is 1. In some embodiments, t is 2. In some embodiments, t is 3. In some embodiments, t is 4. In some embodiments, t is 0-2. In some embodiments, t is 0-3.

As generally defined above, each of Ring B', Ring C and Ring D is independently an optionally substituted group selected from phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-14 membered bicyclic or tricyclic heteroaryl ring having 1-5 heteroatoms independently selected from nitrogen, oxygen, or sulfur.

In some embodiments, Ring B' is optionally substituted phenyl.

In some embodiments, Ring B' is an optionally substituted group selected from:

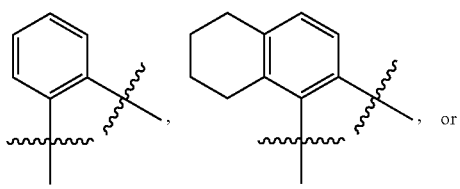

-continued

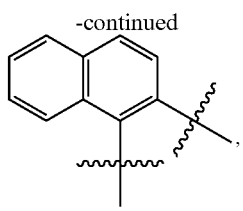

wherein each ⁞ independently represents the point of attachment to Ring C or oxygen, and Ring B' is optionally substituted with 0-4 $R^7$.

In some embodiments, Ring B' is of the following formula:

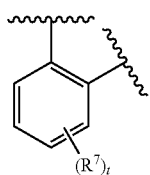

wherein each of $R^x$ and t is independently as defined above and described herein In some embodiments, Ring B' is an optionally substituted 3-7 membered saturated carbocyclic ring. In some embodiments, Ring B' is an optionally substituted 5-6 membered saturated carbocyclic ring. In some embodiments, Ring B' is an optionally substituted 3-7 membered partially unsaturated carbocyclic ring. In some embodiments, Ring B' is an optionally substituted 5-6 membered partially unsaturated carbocyclic ring.

In some embodiments, Ring B' is an optionally substituted 8-10 membered bicyclic saturated carbocyclic ring. In some embodiments, Ring B' is an optionally substituted 8-10 membered bicyclic partially unsaturated carbocyclic ring. In some embodiments, Ring B' is an optionally substituted 8-10 membered bicyclic aryl ring.

In some embodiments, Ring B' is an optionally substituted 5-6 membered monocyclic heteroaryl ring having 1-4 heteroatoms independently selected from nitrogen, oxygen, or sulfur. In some embodiments, Ring B' is an optionally substituted 5-6 membered monocyclic heteroaryl ring having 1-2 heteroatoms independently selected from nitrogen, oxygen, or sulfur.

In some embodiments, Ring B' is an optionally substituted 5 membered monocyclic heteroaryl ring having 1-4 heteroatoms independently selected from nitrogen, oxygen, or sulfur. In some embodiments, Ring B' is an optionally substituted 5 membered monocyclic heteroaryl ring having 1-2 heteroatoms independently selected from nitrogen, oxygen, or sulfur.

In some embodiments, Ring B' is an optionally substituted 6 membered monocyclic heteroaryl ring having 1-4 heteroatoms independently selected from nitrogen, oxygen, or sulfur. In some embodiments, Ring B' is an optionally substituted 6 membered monocyclic heteroaryl ring having 1-2 heteroatoms independently selected from nitrogen, oxygen, or sulfur.

In some embodiments, Ring B' is an optionally substituted 3-7 membered saturated heterocyclic ring having 1-3 heteroatoms independently selected from nitrogen, oxygen, or sulfur. In some embodiments, Ring B' is an optionally substituted 5-6 membered saturated heterocyclic ring having 1-2 heteroatoms independently selected from nitrogen, oxygen, or sulfur.

In some embodiments, Ring B' is an optionally substituted 3-7 membered partially unsaturated heterocyclic ring having 1-3 heteroatoms independently selected from nitrogen, oxygen, or sulfur. In some embodiments, Ring B' is an optionally substituted 5-6 membered partially unsaturated heterocyclic ring having 1-2 heteroatoms independently selected from nitrogen, oxygen, or sulfur.

In some embodiments, Ring B' is an optionally substituted 7-10 membered bicyclic saturated heterocyclic ring having 1-5 heteroatoms independently selected from nitrogen, oxygen, or sulfur. In some embodiments, Ring B' is an optionally substituted 8-10 membered bicyclic saturated heterocyclic ring having 1-2 heteroatoms independently selected from nitrogen, oxygen, or sulfur.

In some embodiments, Ring B' is an optionally substituted 7-10 membered bicyclic partially unsaturated heterocyclic ring having 1-5 heteroatoms independently selected from nitrogen, oxygen, or sulfur. In some embodiments, Ring B' is an optionally substituted 8-10 membered bicyclic partially unsaturated heterocyclic ring having 1-2 heteroatoms independently selected from nitrogen, oxygen, or sulfur.

In some embodiments, Ring B' is an optionally substituted 8-14 membered bicyclic or tricyclic heteroaryl ring having 1-5 heteroatoms independently selected from nitrogen, oxygen, or sulfur. In some embodiments, Ring B' is an optionally substituted 8-10 membered bicyclic heteroaryl ring having 1-5 heteroatoms independently selected from nitrogen, oxygen, or sulfur. In some embodiments, Ring B' is an optionally substituted 8 membered bicyclic heteroaryl ring having 1-3 heteroatoms independently selected from nitrogen, oxygen, or sulfur. In some embodiments, Ring B' is an optionally substituted 9 membered bicyclic heteroaryl ring having 1-3 heteroatoms independently selected from nitrogen, oxygen, or sulfur. In some embodiments, Ring B' is an optionally substituted 10 membered bicyclic heteroaryl ring having 1-3 heteroatoms independently selected from nitrogen, oxygen, or sulfur. In some embodiments, Ring B' is a 10-14 membered tricyclic heteroaryl ring having 1-5 heteroatoms independently selected from nitrogen, oxygen, or sulfur.

In some embodiments, Ring C is of the following structure:

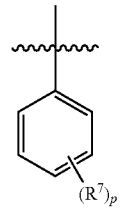

wherein $R^7$ and p is independently as defined above and described herein.

In some embodiments, Ring D is of the following structure:

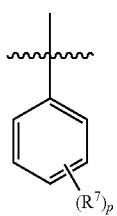

wherein $R^y$ and p is independently as defined above and described herein.

In certain embodiments, Ring C is of the following formula:

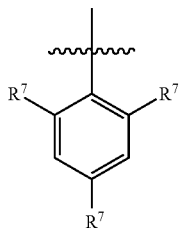

wherein $R^7$ is as defined above and described herein.

In certain embodiments, Ring D is of the following formula:

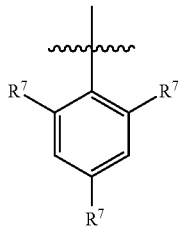

wherein $R^z$ is as defined above and described herein.

In certain embodiments, Ring C or Ring D is of the following structure:

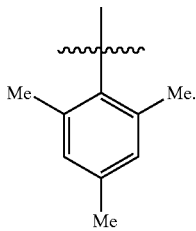 [SMILES: *c1c(C)cc(C)cc1C]

In certain embodiments, Ring C or Ring D is of the following structure:

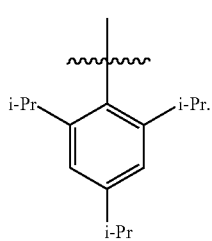 [SMILES: *c1c(C(C)C)cc(C(C)C)cc1C(C)C]

In some embodiments, Ring C is an optionally substituted a 3-7 membered saturated carbocyclic ring. In some embodiments, Ring C is an optionally substituted a 5-6 membered saturated carbocyclic ring. In some embodiments, Ring C is an optionally substituted a 3-7 membered partially unsaturated carbocyclic ring. In some embodiments, Ring C is an optionally substituted a 5-6 membered partially unsaturated carbocyclic ring.

In some embodiments, Ring D is an optionally substituted a 3-7 membered saturated carbocyclic ring. In some embodiments, Ring D is an optionally substituted a 5-6 membered saturated carbocyclic ring. In some embodiments, Ring D is an optionally substituted a 3-7 membered partially unsaturated carbocyclic ring. In some embodiments, Ring D is an optionally substituted a 5-6 membered partially unsaturated carbocyclic ring.

In some embodiments, Ring C is an optionally substituted 8-10 membered bicyclic saturated carbocyclic ring. In some embodiments, Ring C is an optionally substituted 8-10 membered bicyclic partially unsaturated carbocyclic ring. In some embodiments, Ring C is an optionally substituted 10 membered bicyclic aryl ring.

In some embodiments, Ring D is an optionally substituted 8-10 membered bicyclic saturated carbocyclic ring. In some embodiments, Ring D is an optionally substituted 8-10 membered bicyclic partially unsaturated carbocyclic ring. In some embodiments, Ring D is an optionally substituted 10 membered bicyclic aryl ring.

In some embodiments, Ring C is an optionally substituted 5-6 membered monocyclic heteroaryl ring having 1-4 heteroatoms independently selected from nitrogen, oxygen, or sulfur. In some embodiments, Ring C is an optionally substituted 5-6 membered monocyclic heteroaryl ring having 1-2 heteroatoms independently selected from nitrogen, oxygen, or sulfur. In some embodiments, Ring C is an optionally substituted 5 membered monocyclic heteroaryl ring having 1-4 heteroatoms independently selected from nitrogen, oxygen, or sulfur. In some embodiments, Ring C is an optionally substituted 5 membered monocyclic heteroaryl ring having 1-2 heteroatoms independently selected from nitrogen, oxygen, or sulfur. In some embodiments, Ring C is an optionally substituted 6 membered monocyclic heteroaryl ring having 1-4 heteroatoms independently selected from nitrogen, oxygen, or sulfur. In some embodiments, Ring C is an optionally substituted 6 membered monocyclic heteroaryl ring having 1-2 heteroatoms independently selected from nitrogen, oxygen, or sulfur. In some embodiments, Ring C is optionally substituted pyrrolyl.

In some embodiments, Ring D is an optionally substituted 5-6 membered monocyclic heteroaryl ring having 1-4 heteroatoms independently selected from nitrogen, oxygen, or sulfur. In some embodiments, Ring D is an optionally substituted 5-6 membered monocyclic heteroaryl ring having 1-2 heteroatoms independently selected from nitrogen, oxygen, or sulfur. In some embodiments, Ring D is an optionally substituted 5 membered monocyclic heteroaryl ring having 1-4 heteroatoms independently selected from nitrogen, oxygen, or sulfur. In some embodiments, Ring D is an optionally substituted 5 membered monocyclic heteroaryl ring having 1-2 heteroatoms independently selected from nitrogen, oxygen, or sulfur. In some embodiments, Ring D is an optionally substituted 6 membered monocyclic heteroaryl ring having 1-4 heteroatoms independently selected from nitrogen, oxygen, or sulfur. In some embodiments, Ring D is an optionally substituted 6 membered monocyclic heteroaryl ring having 1-2 heteroatoms independently selected from nitrogen, oxygen, or sulfur. In some embodiments, Ring D is optionally substituted pyrrolyl.

In some embodiments, Ring C is an optionally substituted 3-7 membered saturated heterocyclic ring having 1-3 heteroatoms independently selected from nitrogen, oxygen, or sulfur. In some embodiments, Ring C is an optionally substituted 5-6 membered saturated heterocyclic ring having 1-2 heteroatoms independently selected from nitrogen, oxygen, or sulfur. In some embodiments, Ring C is an optionally substituted 3-7 membered partially unsaturated heterocyclic ring having 1-3 heteroatoms independently selected from nitrogen, oxygen, or sulfur. In some embodiments, Ring C is an optionally substituted 5-6 membered partially unsaturated heterocyclic ring having 1-2 heteroatoms independently selected from nitrogen, oxygen, or sulfur.

In some embodiments, Ring D is an optionally substituted 3-7 membered saturated heterocyclic ring having 1-3 heteroatoms independently selected from nitrogen, oxygen, or sulfur. In some embodiments, Ring D is an optionally substituted 5-6 membered saturated heterocyclic ring having 1-2 heteroatoms independently selected from nitrogen, oxygen, or sulfur. In some embodiments, Ring D is an optionally substituted 3-7 membered partially unsaturated heterocyclic ring having 1-3 heteroatoms independently selected from nitrogen, oxygen, or sulfur. In some embodiments, Ring D is an optionally substituted 5-6 membered partially unsaturated heterocyclic ring having 1-2 heteroatoms independently selected from nitrogen, oxygen, or sulfur.

In some embodiments, Ring C is an optionally substituted 7-10 membered bicyclic saturated heterocyclic ring having 1-5 heteroatoms independently selected from nitrogen, oxygen, or sulfur. In some embodiments, Ring C is an optionally substituted 8-10 membered bicyclic saturated heterocyclic ring having 1-2 heteroatoms independently selected from nitrogen, oxygen, or sulfur. In some embodiments, Ring C is an optionally substituted 7-10 membered bicyclic partially unsaturated heterocyclic ring having 1-5 heteroatoms independently selected from nitrogen, oxygen, or sulfur. In some embodiments, Ring C is an optionally substituted 8-10 membered bicyclic partially unsaturated heterocyclic ring having 1-2 heteroatoms independently selected from nitrogen, oxygen, or sulfur.

In some embodiments, Ring D is an optionally substituted 7-10 membered bicyclic saturated heterocyclic ring having 1-5 heteroatoms independently selected from nitrogen, oxygen, or sulfur. In some embodiments, Ring D is an optionally substituted 8-10 membered bicyclic saturated heterocyclic ring having 1-2 heteroatoms independently selected from nitrogen, oxygen, or sulfur. In some embodiments, Ring D is an optionally substituted 7-10 membered bicyclic partially unsaturated heterocyclic ring having 1-5 heteroatoms independently selected from nitrogen, oxygen, or sulfur. In some embodiments, Ring D is an optionally substituted 8-10 membered bicyclic partially unsaturated heterocyclic ring having 1-2 heteroatoms independently selected from nitrogen, oxygen, or sulfur.

In some embodiments, Ring C is an optionally substituted 8-14 membered bicyclic or tricyclic heteroaryl ring having 1-5 heteroatoms independently selected from nitrogen, oxygen, or sulfur. In some embodiments, Ring C is an optionally substituted 8-10 membered bicyclic heteroaryl ring having 1-5 heteroatoms independently selected from nitrogen, oxygen, or sulfur. In some embodiments, Ring C is an optionally substituted 8 membered bicyclic heteroaryl ring having 1-3 heteroatoms independently selected from nitrogen, oxygen, or sulfur. In some embodiments, Ring C is an optionally substituted 9 membered bicyclic heteroaryl ring having 1-3 heteroatoms independently selected from nitrogen, oxygen, or sulfur. In some embodiments, Ring C is an optionally substituted 10 membered bicyclic heteroaryl ring having 1-3 heteroatoms independently selected from nitrogen, oxygen, or sulfur. In some embodiments, Ring C is an optionally substituted 10-14 membered tricyclic heteroaryl ring having 1-5 heteroatoms independently selected from nitrogen, oxygen, or sulfur.

In some embodiments, Ring D is an optionally substituted 8-14 membered bicyclic or tricyclic heteroaryl ring having 1-5 heteroatoms independently selected from nitrogen, oxygen, or sulfur. In some embodiments, Ring D is an optionally substituted 8-10 membered bicyclic heteroaryl ring having 1-5 heteroatoms independently selected from nitrogen, oxygen, or sulfur. In some embodiments, Ring D is an optionally substituted 8 membered bicyclic heteroaryl ring having 1-3 heteroatoms independently selected from nitrogen, oxygen, or sulfur. In some embodiments, Ring D is an optionally substituted 9 membered bicyclic heteroaryl ring having 1-3 heteroatoms independently selected from nitrogen, oxygen, or sulfur. In some embodiments, Ring D is an optionally substituted 10 membered bicyclic heteroaryl ring having 1-3 heteroatoms independently selected from nitrogen, oxygen, or sulfur. In some embodiments, Ring D is an optionally substituted 10-14 membered tricyclic heteroaryl ring having 1-5 heteroatoms independently selected from nitrogen, oxygen, or sulfur.

Exemplary embodiments for Ring C include but are not limited to those described for R wherein R is an optionally substituted group selected from phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur. Exemplary embodiments for Ring C include but are not limited to those described for R wherein R is an optionally substituted group selected from phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur.

As generally defined above, each $R^7$ is independently halogen, R, —CN, —NO$_2$, —OR, —SR, —S(O)R, —S(O)$_2$R, —OSi(R)$_3$, —N(R)$_2$, —NRC(O)R, —NRC(O)OR, —NRC(O)N(R)$_2$, —NRSO$_2$R, —NRSO$_2$N(R)$_2$, or —NROR.

In some embodiments, $R^7$ is halogen. In some embodiments, $R^7$ is —F. In some embodiments, $R^7$ is —Cl. In some embodiments, $R^7$ is —Br. In some embodiments, $R^7$ is —I.

In some embodiments, $R^7$ is R, —CN, —NO$_2$, —OR, —SR, —S(O)R, —S(O)$_2$R, —OSi(R)$_3$, —N(R)$_2$, —NRC (O)R, —NRC(O)OR, —NRC(O)N(R)$_2$, —NRSO$_2$R, —NRSO$_2$N(R)$_2$, or —NROR.

In certain embodiments, $R^7$ is R, wherein R is as defined above and described herein. In some embodiments, $R^7$ is optionally substituted $C_{1-6}$ aliphatic. In some embodiments, $R^7$ is optionally substituted $C_{1-6}$ alkyl. In some embodiments, $R^7$ is optionally substituted $C_{1-6}$ haloalkyl. In some embodiments, $R^7$ is optionally substituted $C_{1-6}$ haloalkyl, wherein one substituent is —F. In some embodiments, $R^7$ is optionally substituted $C_{1-6}$ haloalkyl, wherein two or more substituents are —F. In certain embodiments, $R^7$ is selected from methyl, ethyl, propyl, or butyl. In certain embodiments, $R^7$ is isopropyl. In certain embodiments, $R^7$ is —CF$_3$.

In some embodiments, $R^7$ is hydrogen. In some embodiments, $R^7$ is an optionally substituted group selected from $C_{1-6}$ aliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur.

In some embodiments, $R^7$ is optionally substituted phenyl. In some embodiments, $R^7$ is substituted phenyl. In some embodiments, $R^7$ is phenyl.

In some embodiments, $R^7$ is —CN. In some embodiments, $R^7$ is —NO$_2$.

In some embodiments, $R^7$ is —OR. In some embodiments, $R^7$ is —OMe.

In some embodiments, $R^7$ is selected from —SR, —S(O)R, —S(O)$_2$R.

In some embodiments, $R^7$ is —OSi(R)$_3$, wherein each R is independently as defined above and described herein.

In some embodiments, $R^7$ is —N(R$^2$), wherein each R is independently as defined above and described herein. In some embodiments, $R^7$ is —N(Me)$_2$.

In some embodiments, $R^7$ is —NRC(O)R, —NRC(O)OR, —NRC(O)N(R)$_2$, —NRSO$_2$R, —NRSO$_2$N(R)$_2$, or —NROR, wherein each R is independently as defined above and described herein.

As generally defined above, each of $R^x$, $R^y$ and $R^z$ is independently an electron-withdrawing group.

Exemplary electron-withdrawing groups are extensive described in the art, including but not limited to halogen, haloalkyl, carbonyl moieties (e.g., aldehyde and ketone groups), —COOH and its derivatives (e.g., ester and amide moieties), protonated amines, quaternary ammonium groups, —CN, —NO$_2$, —S(O)—, and —S(O)$_2$—. In some embodiments, an electron-withdrawing group is selected from halogen, —C(O)R, —C(O)OR, —C(O)N(R)$_2$, —S(O)R, —S(O)$_2$R, —S(O)$_2$OR, —CN, —N$^+$(R)$_3$, or —P(O)(R')$_3$, wherein R' is independently R or —OR, and each R is independently as defined above and described herein.

In some embodiments, an electron-withdrawing group is halogen. In some embodiments, an electron-withdrawing group is —F. In some embodiments, an electron-withdrawing group is —Cl. In some embodiments, an electron-withdrawing group is —Br. In some embodiments, an electron-withdrawing group is —I. In some embodiments, an electron-withdrawing group is —CF$_3$. In some embodiments, an electron-withdrawing group is —C(O)R. In some embodiments, an electron-withdrawing group is —C(O)OR. In some embodiments, an electron-withdrawing group is —C(O)N(R)$_2$. In some embodiments, an electron-withdrawing group is —S(O)R. In some embodiments, an electron-withdrawing group is —S(O)$_2$R. In some embodiments, an electron-withdrawing group is —S(O)$_2$OR. In some embodiments, an electron-withdrawing group is —CN. In some embodiments, an electron-withdrawing group is protonated amine. In some embodiments, an electron-withdrawing group is —N$^+$(R)$_3$. In some embodiments, an electron-withdrawing group is —NO$_2$. In some embodiments, an electron-withdrawing group is —P(O)(R')$_3$, wherein each R' is independently R or —OR.

In some embodiments, at least one of $R^x$, $R^y$ and $R^z$ is —F. In some embodiments, at least two of $R^x$, $R^y$ and $R^z$ are —F. In some embodiments, at least three of $R^x$, $R^y$ and $R^z$ are —F. In some embodiments, at least four of $R^x$, $R^y$ and $R^z$ are —F. In some embodiments, at least five of $R^x$, $R^y$ and $R^z$ are —F. In some embodiments, at least six of $R^x$, $R^y$ and $R^z$ are —F. In some embodiments, at least seven of $R^x$, $R^y$ and $R^z$ are —F. In some embodiments, at least eight of $R^x$, $R^y$ and $R^z$ are —F. In some embodiments, at least nine of $R^x$, $R^y$ and $R^z$ are —F. In some embodiments, at least ten of $R^x$, $R^y$ and $R^z$ are —F.

In some embodiments, at least one of $R^y$ and $R^z$ is —F. In some embodiments, at least two of $R^y$ and $R^z$ are —F. In some embodiments, at least three of $R^y$ and $R^z$ are —F. In some embodiments, at least four of $R^y$ and $R^z$ are —F. In some embodiments, at least five of $R^y$ and $R^z$ are —F. In some embodiments, at least six of $R^y$ and $R^z$ are —F. In some embodiments, at least seven of $R^y$ and $R^z$ are —F. In some embodiments, at least eight of $R^y$ and $R^z$ are —F. In some embodiments, at least nine of $R^y$ and $R^z$ are —F. In some embodiments, all ten of $R^y$ and $R^z$ are —F.

In some embodiments, each of $R^x$, $R^y$ and $R^z$ is —F. In some embodiments, each of $R^y$ and $R^z$ is —F. In some embodiments, p is 5, q is 5, and each of $R^y$ and $R^z$ is —F.

In some embodiments,

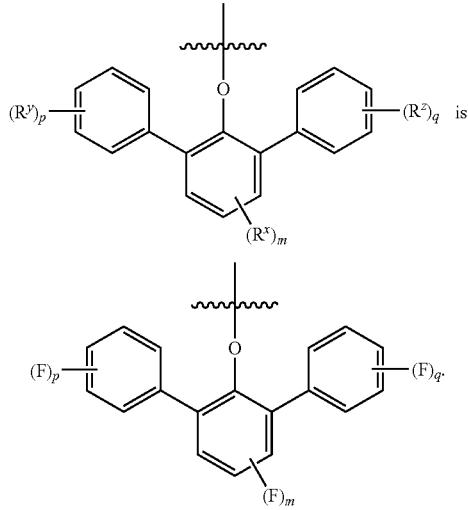

In some embodiments,

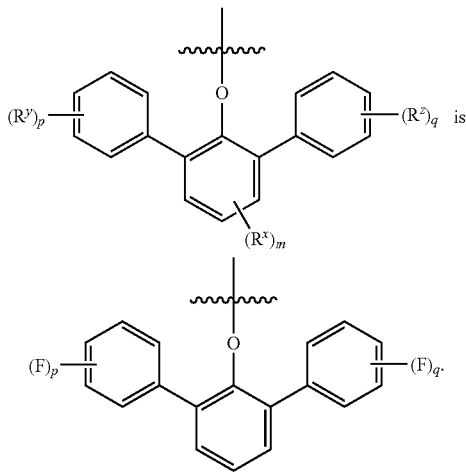

In some embodiments,

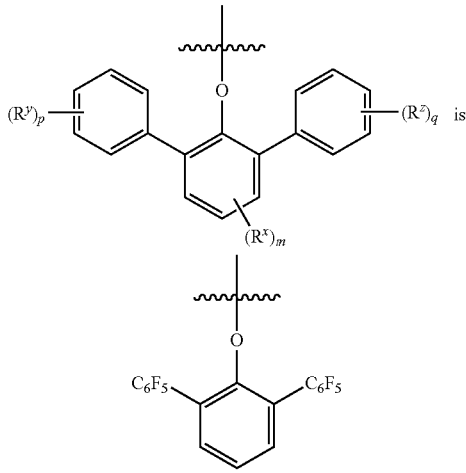

(2,6-$(C_6F_5)_2C_6H_3O-$, decafluoroterphenoxide, DFTO).

As generally defined above, each R is independently hydrogen or an optionally substituted group selected from $C_{1-20}$ aliphatic, $C_{1-20}$ heteroaliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:

two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen, or sulfur.

In some embodiments, R is hydrogen or an optionally substituted group selected from $C_{1-20}$ aliphatic, $C_{1-20}$ heteroaliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur. In some embodiments, two R groups on the same atom are optionally taken together with the atom to which they are attached to form an optionally substituted 3-10 membered, monocyclic or bicyclic, saturated, partially unsaturated, or aryl ring having, in addition to the atom to which they are attached, 0-4 heteroatoms independently selected from nitrogen, oxygen, or sulfur.

In some embodiments, R is optionally substituted $C_{1-20}$ aliphatic. In some embodiments, R is optionally substituted $C_{1-15}$ aliphatic. In some embodiments, R is optionally substituted $C_{1-10}$ aliphatic. In some embodiments, R is optionally substituted $C_{1-6}$ aliphatic. In some embodiments, R is optionally substituted $C_{1-6}$ alkyl. In some embodiments, R is optionally substituted hexyl, pentyl, butyl, propyl, ethyl or methyl. In some embodiments, R is optionally substituted hexyl. In some embodiments, R is optionally substituted pentyl. In some embodiments, R is optionally substituted butyl. In some embodiments, R is optionally substituted propyl. In some embodiments, R is optionally substituted ethyl. In some embodiments, R is optionally substituted methyl. In some embodiments, R is hexyl. In some embodiments, R is pentyl. In some embodiments, R is butyl. In some embodiments, R is propyl. In some embodiments, R is ethyl. In some embodiments, R is methyl. In some embodiments, R is isopropyl. In some embodiments, R is n-propyl. In some embodiments, R is tert-butyl. In some embodiments, R is sec-butyl. In some embodiments, R is n-butyl.

In some embodiments, R is $C_{1-20}$ heteroaliphatic. In some embodiments, R is $C_{1-20}$ heteroaliphatic having 1-6 heteroatoms independently selected from nitrogen, sulfur, phosphorus or selenium. In some embodiments, R is $C_{1-20}$ heteroaliphatic having 1-6 heteroatoms independently selected from nitrogen, sulfur, phosphorus or selenium, optionally including one or more oxidized forms of nitrogen, sulfur, phosphorus or selenium. In some embodiments, R is $C_{1-20}$ heteroaliphatic comprising 1-6 groups independently selected from

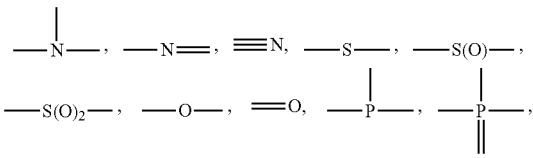

—Se—, and —Se(O)—.

In some embodiments, R is optionally substituted phenyl. In some embodiments, R is optionally substituted phenyl wherein one or more substituents are halogen. In some embodiments, R is optionally substituted phenyl wherein one or more substituents are —F. In some embodiments, R is optionally substituted phenyl wherein one or more substituents are —Cl. In some embodiments, R is optionally substituted phenyl wherein one or more substituents are —Br. In some embodiments, R is optionally substituted phenyl wherein one or more substituents are —I. In some embodiments, R is phenyl.

In some embodiments, R is an optionally substituted 3-7 membered saturated or partially unsaturated carbocyclic ring. In some embodiments, R is an optionally substituted 3-membered saturated or partially unsaturated carbocyclic ring. In some embodiments, R is an optionally substituted 4-membered saturated or partially unsaturated carbocyclic ring. In some embodiments, R is an optionally substituted 5-membered saturated or partially unsaturated carbocyclic ring. In some embodiments, R is an optionally substituted 6-membered saturated or partially unsaturated carbocyclic ring. In some embodiments, R is an optionally substituted 7-membered saturated or partially unsaturated carbocyclic ring. In some embodiments, R is optionally substituted cycloheptyl. In some embodiments, R is cycloheptyl. In some embodiments, R is optionally substituted cyclohexyl. In some embodiments, R is cyclohexyl. In some embodiments, R is optionally substituted cyclopentyl. In some embodiments, R is cyclopentyl. In some embodiments, R is optionally substituted cyclobutyl. In some embodiments, R is cyclobutyl. In some embodiments, R is optionally substituted cyclopropyl. In some embodiments, R is cyclopropyl.

In some embodiments, R is an optionally substituted 8-10 membered bicyclic saturated, partially unsaturated or aryl ring. In some embodiments, R is an optionally substituted 8-10 membered bicyclic saturated ring. In some embodiments, R is an optionally substituted 8-10 membered bicyclic partially unsaturated ring. In some embodiments, R is an optionally substituted 8-10 membered bicyclic aryl ring. In some embodiments, R is optionally substituted naphthyl.

In some embodiments, R is optionally substituted biaryl wherein each aryl group is independently an optionally substituted group selected from phenyl, a 5-6 membered monocyclic heteroaryl ring having 1-4 heteroatoms independently selected from nitrogen, oxygen, or sulfur, an 8-10 membered bicyclic aryl ring, or an 8-10 membered bicyclic heteroaryl ring having 1-5 heteroatoms independently selected from nitrogen, oxygen, or sulfur. In some embodiments, R is optionally substituted biaryl wherein each aryl group is independently an optionally substituted group selected from phenyl, a 5-6 membered monocyclic heteroaryl ring having 1-4 heteroatoms independently selected from nitrogen, oxygen, or sulfur, an 8-10 membered bicyclic aryl ring, or an 8-10 membered bicyclic heteroaryl ring having 1-5 heteroatoms independently selected from nitrogen, oxygen, or sulfur, and wherein at least one aryl group is optionally substituted phenyl. In some embodiments, R is optionally substituted biaryl wherein each aryl group is independently an optionally substituted group selected from phenyl, a 5-6 membered monocyclic heteroaryl ring having 1-4 heteroatoms independently selected from nitrogen, oxygen, or sulfur, an 8-10 membered bicyclic aryl ring, or an 8-10 membered bicyclic heteroaryl ring having 1-5 heteroatoms independently selected from nitrogen, oxygen, or sulfur, and wherein at least one aryl group is an optionally substituted 5-6 membered monocyclic heteroaryl ring having 1-4 heteroatoms independently selected from nitrogen, oxygen, or sulfur. In some embodiments, R is optionally substituted biaryl wherein each aryl group is independently an optionally substituted group selected from phenyl, a 5-6 membered monocyclic heteroaryl ring having 1-4 heteroatoms independently selected from nitrogen, oxygen, or sulfur, an 8-10 membered bicyclic aryl ring, or an 8-10 membered bicyclic heteroaryl ring having 1-5 heteroatoms independently selected from nitrogen, oxygen, or sulfur, and wherein at least one aryl group is an optionally substituted 8-10 membered bicyclic aryl ring. In some embodiments, R is optionally substituted biaryl wherein each aryl group is independently an optionally substituted group selected from phenyl, a 5-6 membered monocyclic heteroaryl ring having 1-4 heteroatoms independently selected from nitrogen, oxygen, or sulfur, an 8-10 membered bicyclic aryl ring, or an 8-10 membered bicyclic heteroaryl ring having 1-5 heteroatoms independently selected from nitrogen, oxygen, or sulfur, and wherein at least one aryl group is optionally substituted naphthyl. In some embodiments, R is optionally substituted biaryl wherein each aryl group is independently an optionally substituted group selected from phenyl, a 5-6 membered monocyclic heteroaryl ring having 1-4 heteroatoms independently selected from nitrogen, oxygen, or sulfur, an 8-10 membered bicyclic aryl ring, or an 8-10 membered bicyclic heteroaryl ring having 1-5 heteroatoms independently selected from nitrogen, oxygen, or sulfur, and wherein at least one aryl group is an optionally substituted 8-10 membered bicyclic heteroaryl ring having 1-5 heteroatoms independently selected from nitrogen, oxygen, or sulfur. In some embodiments, R is optionally substituted biaryl wherein each aryl group is independently optionally substituted phenyl. In some embodiments, R is optionally substituted biaryl wherein each aryl group is independently optionally substituted phenyl, or an optionally substituted 5-6 membered monocyclic heteroaryl ring having 1-4 heteroatoms independently selected from nitrogen, oxygen. In some embodiments, R is optionally substituted biaryl wherein each aryl group is independently an optionally substituted 8-10 membered bicyclic aryl ring. In some embodiments, R is optionally substituted biaryl wherein one aryl group is optionally substituted naphthyl, and the other aryl group is independently an optionally substituted 8-10 membered bicyclic aryl ring. In some embodiments, R is optionally substituted biaryl wherein each aryl group is optionally substituted naphthyl. In some embodiments, R is optionally substituted biaryl wherein one aryl group is optionally substituted naphthyl, and the other aryl group is an optionally substituted 8-10 membered bicyclic heteroaryl ring having 1-5 heteroatoms independently selected from nitrogen, oxygen, or sulfur.

In some embodiments, R is an optionally substituted 5-6 membered monocyclic heteroaryl ring having 1-4 heteroatoms independently selected from nitrogen, oxygen, or sulfur. In some embodiments, R is a substituted 5-6 membered monocyclic heteroaryl ring having 1-4 heteroatoms independently selected from nitrogen, oxygen, or sulfur. In some embodiments, R is an unsubstituted 5-6 membered monocyclic heteroaryl ring having 1-4 heteroatoms independently selected from nitrogen, oxygen, or sulfur.

In some embodiments, R is an optionally substituted 5-membered monocyclic heteroaryl ring having 1-4 heteroatoms independently selected from nitrogen, oxygen or sulfur. In some embodiments, R is an optionally substituted 6-membered monocyclic heteroaryl ring having 1-4 heteroatoms independently selected from nitrogen, oxygen, or sulfur.

In some embodiments, R is an optionally substituted 5-membered monocyclic heteroaryl ring having one heteroatom selected from nitrogen, oxygen, or sulfur. In some embodiments, R is selected from optionally substituted pyrrolyl, furanyl, or thienyl.

In some embodiments, R is an optionally substituted 5-membered heteroaryl ring having two heteroatoms independently selected from nitrogen, oxygen, or sulfur. In certain embodiments, R is an optionally substituted 5-membered heteroaryl ring having one nitrogen atom, and an additional heteroatom selected from sulfur or oxygen. Exemplary R groups include but are not limited to optionally substituted pyrazolyl, imidazolyl, thiazolyl, isothiazolyl, oxazolyl or isoxazolyl.

In some embodiments, R is an optionally substituted 5-membered heteroaryl ring having three heteroatoms independently selected from nitrogen, oxygen, or sulfur. Exemplary R groups include but are not limited to optionally substituted triazolyl, oxadiazolyl or thiadiazolyl.

In some embodiments, R is an optionally substituted 5-membered heteroaryl ring having four heteroatoms independently selected from nitrogen, oxygen, or sulfur. Exemplary R groups include but are not limited to optionally substituted tetrazolyl, oxatriazolyl and thiatriazolyl.

In some embodiments, R is an optionally substituted 6-membered heteroaryl ring having 1-4 nitrogen atoms. In some embodiments, R is an optionally substituted 6-membered heteroaryl ring having 1-3 nitrogen atoms. In other embodiments, R is an optionally substituted 6-membered heteroaryl ring having 1-2 nitrogen atoms. In some embodiments, R is an optionally substituted 6-membered heteroaryl ring having four nitrogen atoms. In some embodiments, R is an optionally substituted 6-membered heteroaryl ring having three nitrogen atoms. In some embodiments, R is an optionally substituted 6-membered heteroaryl ring having two nitrogen atoms. In certain embodiments, R is an optionally substituted 6-membered heteroaryl ring having one nitrogen atom. Exemplary R groups include but are not limited to optionally substituted pyridinyl, pyrimidinyl, pyrazinyl, pyridazinyl, triazinyl, or tetrazinyl.

In some embodiments, R is an optionally substituted 3-7 membered saturated or partially unsaturated heterocyclic ring having 1-3 heteroatoms independently selected from nitrogen, oxygen, or sulfur. In some embodiments, R is a substituted 3-7 membered saturated or partially unsaturated heterocyclic ring having 1-3 heteroatoms independently selected from nitrogen, oxygen, or sulfur. In some embodiments, R is an unsubstituted 3-7 membered saturated or partially unsaturated heterocyclic ring having 1-3 heteroatoms independently selected from nitrogen, oxygen, or sulfur.

In certain embodiments, R is an optionally substituted 5-7 membered partially unsaturated monocyclic ring having 1-3 heteroatoms independently selected from nitrogen, oxygen, or sulfur. In certain embodiments, R is an optionally substituted 5-6 membered partially unsaturated monocyclic ring having 1-3 heteroatoms independently selected from nitrogen, oxygen, or sulfur. In certain embodiments, R is an optionally substituted 5-membered partially unsaturated monocyclic ring having 1-3 heteroatoms independently selected from nitrogen, oxygen, or sulfur. Exemplary R groups include but are not limited to optionally substituted dihydroimidazolyl, dihydrothiazolyl, dihydrooxazolyl, or oxazolinyl. In certain embodiments, R is an optionally substituted 6-membered partially unsaturated monocyclic ring having 1-3 heteroatoms independently selected from nitrogen, oxygen, or sulfur. Exemplary R groups include but are not limited to optionally substituted dihydropyridinyl, tetrahydropyridinyl, dihydropyrimidinyl, tetrahydropyrimidinyl, dihydropyrazinyl, tetrahydropyrazinyl, dihydrotriazinyl, tetrahydrotriazinyl, dihydrodioxinyl, dihydrooxathiinyl, dihydrooxazinyl, dihydrothiine, dihydrothiazine, dioxinyl, oxathiinyl, oxazinyl, dithiinyl, or thiazinyl. In certain embodiments, R is an optionally substituted 7-membered partially unsaturated monocyclic ring having 1-3 heteroatoms independently selected from nitrogen, oxygen, or sulfur. Exemplary R groups include but are not limited to optionally substituted azepinyl, oxepinyl, thiepinyl, diazepinyl, oxazepinyl, thiazepinyl, triazepinyl, oxadiazepinyl, thiadiazepinyl, dihydroazepinyl, dihydrooxepinyl, dihydrothiepinyl, dihydrodiazepinyl, dihydrooxazepinyl, dihydrothiazepinyl, dihydrotriazepinyl, dihydrooxadiazepinyl, dihydrothiadiazepinyl, tetrahydroazepinyl, tetrahydrooxepinyl, tetrahydrothiepinyl, tetrahydrodiazepinyl, tetrahydrooxazepinyl, tetrahydrothiazepinyl, tetrahydrotriazepinyl, tetrahydrooxadiazepinyl, or tetrahydrothiadiazepinyl.

In some embodiments, R is optionally substituted 3-membered heterocyclic ring having one heteroatom selected from nitrogen, oxygen or sulfur. Exemplary R groups include but are not limited to optionally substituted aziridinyl, thiiranyl or oxiranyl. In some embodiments, R is optionally substituted 4-membered heterocyclic ring having 1-3 heteroatoms independently selected from nitrogen, oxygen, or sulfur. Exemplary R groups include but are not limited to optionally substituted azetidinyl, oxetanyl, thietanyl, oxazetidinyl, thiazetidinyl, or diazetidinyl. In some embodiments, R is optionally substituted 5-membered heterocyclic ring having 1-3 heteroatoms independently selected from nitrogen, oxygen, or sulfur. Exemplary R groups include but are not limited to optionally substituted pyrrolidinyl, tetrahydrofuranyl, tetrahydrothienyl, oxazolidinyl, dioxolanyl, oxathiolanyl, thiazolidinyl, dithiolanyl, imidazolidinyl, isothiazolidinyl, pyrazolidinyl, isoxazolidinyl, isothiazolidinyl, triazolidinyl, oxadiazolidinyl, thiadiazolidinyl, oxadiazolidinyl, dioxazolidinyl, oxathiazolidinyl, thiadiazolidinyl or dithiazolidinyl. In some embodiments, R is optionally substituted 6-membered heterocyclic ring having 1-3 heteroatoms independently selected from nitrogen, oxygen, or sulfur. Exemplary R groups include but are not limited to optionally substituted piperidinyl, tetrahydropyranyl, tetrahydrothiopyranyl, piperazinyl, morpholinyl, thiomorpholinyl, dithianyl, dioxanyl, oxathianyl, triazinanyl, oxadiazinanyl, thiadiazinanyl, dithiazinanyl, dioxazinanyl, oxathiazinanyl, oxadithianyl, trioxanyl, dioxathianyl or trithianyl. In some embodiments, R is optionally substituted 7-membered heterocyclic ring having 1-3 heteroatoms independently selected from nitrogen, oxygen, or sulfur. Exemplary R groups include but are not limited to optionally substituted azepanyl, oxepanyl, thiepanyl, diazepanyl, oxazepanyl, thiazepanyl, dioxepanyl, oxathiepanyl, dithiepanyl, triazepanyl, oxadiazepanyl, thiadiazepanyl, dioxazepanyl, oxathiazepanyl, dithiazepanyl, trioxepanyl, dioxathiepanyl, oxadithiepanyl or trithiepanyl.

In certain embodiments, R is optionally substituted oxiranyl, oxetanyl, tetrahydrofuranyl, tetrahydropyranyl, oxepaneyl, aziridineyl, azetidineyl, pyrrolidinyl, piperidinyl, azepanyl, thiiranyl, thietanyl, tetrahydrothienyl, tetrahydrothiopyranyl, thiepanyl, dioxolanyl, oxathiolanyl, oxazolidinyl, imidazolidinyl, thiazolidinyl, dithiolanyl, dioxanyl, morpholinyl, oxathianyl, piperazinyl, thiomorpholinyl, dithianyl, dioxepanyl, oxazepanyl, oxathiepanyl, dithiepanyl, diazepanyl, dihydrofuranonyl, tetrahydropyranonyl, oxepanonyl, pyrolidinonyl, piperidinonyl, azepanonyl, dihydrothiophenonyl, tetrahydrothiopyranonyl, thiepanonyl, oxazolidinonyl, oxazinanonyl, oxazepanonyl, dioxolanonyl, dioxanonyl, dioxepanonyl, oxathiolinonyl, oxathianonyl, oxathiepanonyl, thiazolidinonyl, thiazinanonyl, thiazepanonyl, imidazolidinonyl, tetrahydropyrimidinonyl, diazepanonyl, imidazolidinedionyl, oxazolidinedionyl, thiazolidinedionyl, dioxolanedionyl, oxathiolanedionyl, piperazinedionyl, morpholinedionyl, thiomorpholinedionyl, tetrahydropyranyl, tetrahydrofuranyl, morpholinyl, thiomorpholinyl, piperidinyl, piperazinyl, pyrrolidinyl, tetrahydrothienyl, or tetrahydrothiopyranyl.

In some embodiments, R is an optionally substituted 7-10 membered bicyclic saturated or partially unsaturated heterocyclic ring having 1-5 heteroatoms independently selected from nitrogen, oxygen, or sulfur. In some embodiments, R is optionally substituted indolinyl. In some embodiments, R is optionally substituted isoindolinyl. In some embodiments, R is optionally substituted 1,2,3,4-tetrahydroquinolinyl. In some embodiments, R is optionally substituted 1,2,3,4-tetrahydroisoquinolinyl. In some embodiments, R is an optionally substituted azabicyclo[3.2.1]octanyl.

In some embodiments, R is an optionally substituted 8-10 membered bicyclic heteroaryl ring having 1-5 heteroatoms independently selected from nitrogen, oxygen, or sulfur. In some embodiments, R is an 8-10 membered bicyclic heteroaryl ring having 1-5 heteroatoms independently selected from nitrogen, oxygen, or sulfur.

In some embodiments, R is an optionally substituted 5,6-fused heteroaryl ring having 1-5 heteroatoms independently selected from nitrogen, oxygen, or sulfur. In some embodiments, R is an optionally substituted 5,6-fused heteroaryl ring having 1-4 heteroatoms independently selected from nitrogen, oxygen, or sulfur. In some embodiments, R is an optionally substituted 5,6-fused heteroaryl ring having 1-3 heteroatoms independently selected from nitrogen, oxygen, or sulfur. In some embodiments, R is an optionally substituted 5,6-fused heteroaryl ring having two heteroatoms independently selected from nitrogen, oxygen, or sulfur. In some embodiments, R is optionally substituted 1,4-dihydropyrrolo[3,2-b]pyrrolyl, 4H-furo[3,2-b]pyrrolyl, 4H-thieno[3,2-b]pyrrolyl, furo[3,2-b]furanyl, thieno[3,2-b]furanyl, thieno[3,2-b]thienyl, 1H-pyrrolo[1,2-a]imidazolyl, pyrrolo[2,1-b]oxazolyl or pyrrolo[2,1-b]thiazolyl. In some embodiments, R is an optionally substituted 5,6-fused heteroaryl ring having three heteroatoms independently selected from nitrogen, oxygen, or sulfur. In some embodiments, R is optionally substituted dihydropyrroloimidazolyl, 1H-furoimidazolyl, 1H-thienoimidazolyl, furooxazolyl, furoisoxazolyl, 4H-pyrrolooxazolyl, 4H-pyrroloisoxazolyl, thienooxazolyl, thienoisoxazolyl, 4H-pyrrolothiazolyl, furothiazolyl, thienothiazolyl, 1H-imidazoimidazolyl, imidazooxazolyl or imidazo[5,1-b]thiazolyl. In some embodiments, R is an optionally substituted 5,6-fused heteroaryl ring having four heteroatoms independently selected from nitrogen, oxygen, or sulfur. In some embodiments, R is an optionally substituted 5,6-fused heteroaryl ring having five heteroatoms independently selected from nitrogen, oxygen, or sulfur.

In some embodiments, R is an optionally substituted 5,6-fused heteroaryl ring having 1-5 heteroatoms independently selected from nitrogen, oxygen, or sulfur. In other embodiments, R is an optionally substituted 5,6-fused heteroaryl ring having 1-2 heteroatoms independently selected from nitrogen, oxygen, or sulfur. In certain embodiments, R is an optionally substituted 5,6-fused heteroaryl ring having one heteroatom independently selected from nitrogen, oxygen, or sulfur. In some embodiments, R is optionally substituted indolyl. In some embodiments, R is optionally substituted benzofuranyl. In some embodiments, R is optionally substituted benzo[b]thienyl. In certain embodiments, R is an optionally substituted 5,6-fused heteroaryl ring having two heteroatoms independently selected from nitrogen, oxygen, or sulfur. In some embodiments, R is optionally substituted azaindolyl. In some embodiments, R is optionally substituted benzimidazolyl. In some embodiments, R is optionally substituted benzothiazolyl. In some embodiments, R is optionally substituted benzoxazolyl. In some embodiments, R is an optionally substituted indazolyl. In certain embodiments, R is an optionally substituted 5,6-fused heteroaryl ring having three heteroatoms independently selected from nitrogen, oxygen, or sulfur. In some embodiments, R is optionally substituted oxazolopyridiyl, thiazolopyridinyl or imidazopyridinyl. In certain embodiments, R is an optionally substituted 5,6-fused heteroaryl ring having four heteroatoms independently selected from nitrogen, oxygen, or sulfur. In some embodiments, R is optionally substituted purinyl, oxazolopyrimidinyl, thiazolopyrimidinyl, oxazolopyrazinyl, thiazolopyrazinyl, imidazopyrazinyl, oxazolopyridazinyl, thiazolopyridazinyl or imidazopyridazinyl. In certain embodiments, R is an optionally substituted 5,6-fused heteroaryl ring having five heteroatoms independently selected from nitrogen, oxygen, or sulfur.

In certain embodiments, R is an optionally substituted 6,6-fused heteroaryl ring having 1-5 heteroatoms independently selected from nitrogen, oxygen, or sulfur. In some embodiments, R is an optionally substituted 6,6-fused heteroaryl ring having 1-2 heteroatoms independently selected from nitrogen, oxygen, or sulfur. In other embodiments, R is an optionally substituted 6,6-fused heteroaryl ring having one heteroatom selected from nitrogen, oxygen, or sulfur. In some embodiments, R is optionally substituted quinolinyl. In some embodiments, R is optionally substituted isoquinolinyl. In some embodiments, R is an optionally substituted 6,6-fused heteroaryl ring having two heteroatoms independently selected from nitrogen, oxygen, or sulfur. In some embodiments, R is optionally substituted quinazolinyl, phthalazinyl, quinoxalinyl or naphthyridinyl. In some embodiments, R is an optionally substituted 6,6-fused heteroaryl ring having three heteroatoms independently selected from nitrogen, oxygen, or sulfur. In some embodiments, R is optionally substituted pyridopyrimidinyl, pyridopyridazinyl, pyridopyrazinyl, or benzotriazinyl. In some embodiments, R is an optionally substituted 6,6-fused heteroaryl ring having four heteroatoms independently selected from nitrogen, oxygen, or sulfur. In some embodiments, R is optionally substituted pyridotriazinyl, pteridinyl, pyrazinopyrazinyl, pyrazinopyridazinyl, pyridazinopyridazinyl, pyrimidopyridazinyl or pyrimidopyrimidinyl. In some embodiments, R is an optionally substituted 6,6-fused heteroaryl ring having five heteroatoms independently selected from nitrogen, oxygen, or sulfur.

In some embodiments, R is optionally substituted heterobiaryl wherein each heteroaryl group is independently an optionally substituted group selected from a 5-6 membered monocyclic heteroaryl ring having 1-4 heteroatoms independently selected from nitrogen, oxygen, or sulfur, or an 8-10 membered bicyclic heteroaryl ring having 1-5 heteroatoms independently selected from nitrogen, oxygen, or sulfur. In some embodiments, R is optionally substituted heterobiaryl wherein each aryl group is an optionally substituted 8-10 membered bicyclic heteroaryl ring having 1-5 heteroatoms independently selected from nitrogen, oxygen, or sulfur.

In some embodiments, two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen, or sulfur. In some embodiments, two R groups on the same atom are optionally taken together with the atom to which they are attached to form an optionally substituted 3-10 membered, monocyclic or bicyclic, saturated, partially unsaturated, or aryl ring having 0-4 heteroatoms independently selected from nitrogen, oxygen, or sulfur. In some embodiments, two R groups on the same carbon atom are optionally taken together with the carbon atom to form an optionally substituted 3-10 membered, monocyclic or bicyclic, saturated, partially unsaturated, or aryl ring having 0-4 heteroatoms independently selected from nitrogen, oxygen, or sulfur. In some embodiments, two R groups on the same nitrogen atom are optionally taken together with the nitrogen atom to form an optionally substituted 3-10 membered, monocyclic or bicyclic, saturated, partially unsaturated, or aryl ring having 1-5 heteroatoms independently selected from nitrogen, oxygen, or sulfur. In some embodiments, two R groups on the same sulfur atom are optionally taken together with the sulfur atom to form an optionally substituted 3-10 membered, monocyclic or bicyclic, saturated, partially unsaturated, or aryl ring having 1-5 heteroatoms independently selected from nitrogen, oxygen, or sulfur. In some embodiments, two R groups on the same oxygen atom are optionally taken together with the oxygen atom to form an optionally substituted 3-10 membered, monocyclic or bicyclic, saturated, partially unsaturated, or aryl ring having 1-5 heteroatoms independently selected from nitrogen, oxygen, or sulfur. In some embodiments, two R groups on the same phosphorus atom are optionally taken together with the phosphorus atom to form an optionally substituted 3-10 membered, monocyclic or bicyclic, saturated, partially unsaturated, or aryl ring having, in addition to the phosphorus atom, 0-4 heteroatoms independently selected from nitrogen, oxygen, or sulfur. In some embodiments, two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen, or sulfur, wherein the two R groups are attached to two different atoms.

In some embodiments, two R groups are taken together to form an optionally substituted saturated ring. In some embodiments, two R groups are taken together to form an optionally substituted partially unsaturated ring. In some embodiments, two R groups are taken together to form an optionally substituted aryl ring. In some embodiments, two R groups are taken together to form an optionally substituted heteroaryl ring. In some embodiments, two R groups are taken together to form an optionally substituted phenyl ring. In some embodiments, two R groups are taken together to form a bivalent optionally substituted phenyl ring.

As generally defined above, n is 0-2. In some embodiments, n is 0. In some embodiments, n is not 0. In some embodiments, n is 1 or 2. In some embodiments, n is 1. In some embodiments, n is 2. In some embodiments, n is 2, and the two $R^6$ groups are different. In some embodiments, n is 2, and the two $R^6$ groups are the same. In some embodiments, one of $R^6$ groups is a bidentate or polydentate ligand, and n can be a fraction. In some embodiments, $R^6$ is 1,2-dimethoxyethane (DME or dme), and n is 0.5. In some embodiments, $R^6$ is DME, and n is 1.5.

As generally defined above, each $R^6$ is independently a neutral ligand. In some embodiments, $R^6$ is a monodentate ligand. In some embodiments, $R^6$ is a bidentate ligand. In some embodiments, $R^6$ is a polydentate ligand.

In some embodiments, $R^6$ dissociates easily. In some embodiments, $R^6$ dissociates easily as detected by NMR. In some embodiments, $R^6$ is volatile and can be removed under vacuum.

In some embodiments, $R^6$ is a nitrogen-containing ligand. In some embodiments, $R^6$ is a neutral nitrogen-containing ligand. In some embodiments, $R^6$ is a neutral heteroaryl compound comprising a ring nitrogen atom bonded to M. In some embodiments, $R^6$ is pyridine. In some embodiments, $R^6$ is an oxygen-containing ligand. In some embodiments, $R^6$ is a neutral oxygen-containing ligand. In some embodiments, $R^6$ is an oxygen-containing ligand comprising a carbonyl group, wherein the ligand is bonded to M through the oxygen atom of the carbonyl group. In some embodiments, $R^6$ is $R_2O$. In some embodiments, $R^6$ is THF. In some embodiments, $R^6$ is $Et_2O$. In some embodiments, $R^6$ is a phosphine-containing ligand. In some embodiments, $R^6$ is a neutral phosphine-containing ligand. In some embodiments, a phosphine-containing ligand has the structure of $P(R)_3$, wherein each R is independently as defined above and described herein.

In some embodiments, $R^6$ is a nitrile. In some embodiments, $R^6$ is R—CN. In some embodiments, $R^6$ is $CH_3CN$.

In some embodiments, $R^6$ is a bidentate ligand. Exemplary bidentate ligands include but are not limited to

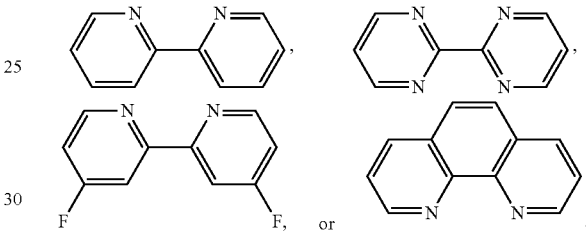

In some embodiments, $R^6$ is a bidentate ligand, wherein the ligand comprises two carbonyl groups, and the ligand is bonded to M through the two oxygen atoms of the two carbonyl groups. In some embodiments, an exemplary ligand is dicarbomethoxynorbornadiene (DCMNBD). In some embodiments, DCMNBD is coordinated to M as illustrated in $Mo(NC_6F_5)(CH_2CH_2)(DCMNBD)(DFTO)_2$. In some embodiments, each $R^6$ is an oxygen-containing ligand. In some embodiments, $R^6$ is a bidentate oxygen-containing ligand. In some embodiments, a bidentate ligand is DME. In some embodiments, a bidentate ligand is $CH_3OCH_2CH_2OCH_3$.

In some embodiments, the present invention provides new ligands or ligands precursors for preparing a provided metal complex. In some embodiments, the present invention provides a compound having the structure of:

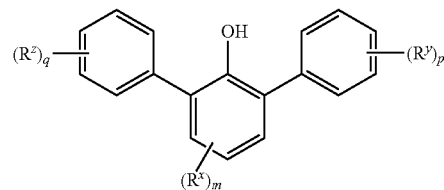

or a salt thereof,
wherein each variable is independently as defined above and described herein. In some embodiments, a compound is DFTOH or a salt thereof. In some embodiments, a compound is DFTOH. In some embodiments, a compound is DFTOLi. In some embodiments, the present invention provides a metal complex comprising one or more DFTO ligand.

In some embodiments, a provided ligand is O-2,6-(CHPh$_2$)$_2$-4-MeC$_6$H$_2$. In some embodiments, a provided ligand precursor is HO-2,6-(CHPh$_2$)$_2$-4-MeC$_6$H$_2$ or a salt thereof. In some embodiments, a provided ligand precursor is LiO-2,6-(CHPh$_2$)$_2$-4-MeC$_6$H$_2$.

The present invention, among other things, recognizes that provided compounds are particularly challenging to prepare. In some embodiments, a person having ordinary skill in the art, when using known methods in the art, cannot obtain a provided compound in satisfactory yields and/or purity. In some embodiments, the present invention provides methods for preparing provided compounds.

In some embodiments, the present invention provides a method for preparing a compound having the structure of formula III:

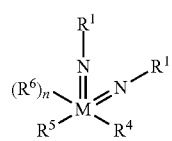

III comprising steps of:
1) providing a compound having the structure of formula IV:

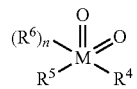

IV each variable is independently as defined above and described herein; and
2) reacting a compound of formula IV with a compound having the structure of R$^1$NSO.

In some embodiments, each R$^1$ in a provided method is optionally substituted

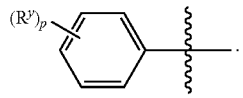

In some embodiments, each R$^1$ in a provided method is

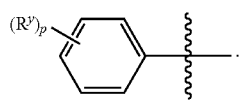

In some embodiments, each R$^1$ in a provided method is C$_6$F$_5$—. In some embodiments, each R$^4$ and R$^5$ in a provided method is halogen. In some embodiments, each R$^4$ and R$^5$ in a provided method is —Cl.

In some embodiments, a provided method optionally comprises identifying a compound of formula IV which has better solubility than others. In some embodiments, a compound of formula IV is MO$_2$Cl$_2$(R$^6$)$_n$. In some embodiments, a compound of formula IV is MO$_2$Cl$_2$(DME). In some embodiments, a compound of formula IV is WO$_2$Cl$_2$(DME).

In some embodiments, a provided method optionally comprises identifying a suitable solvent. In some embodiments, a provided method optionally comprises identify a solvent, in which a compound of formula IV has a suitable solubility. In some embodiments, a solvent is DME. In some embodiments, a provided method optionally comprises identify a solvent, which provides elevated reaction temperature, for example, above about 50, 60, 70, 80, 90 or 100° C. In some embodiments, a solvent is toluene. In some embodiments, a provided solvent is a mixture of two or more solvents, wherein one solvent provides suitable solubility, and another provides higher reaction temperature. In some embodiments, a solvent is the mixture of DME and toluene. In some embodiments, a solvent is DME:Toluene 1:1.

In some embodiments, a provided method further comprises purging an inert gas through the reaction. In some embodiments, an inert gas is nitrogen. In some embodiments, an inert gas is argon.

In some embodiments, a provided compound is particularly challenging for purification or isolation. In some embodiments, such a compound has the structure of formula III, wherein R$^1$ is optionally substituted

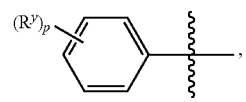

and each R$^4$ and R$^5$ is independently R, wherein R is not hydrogen. In some embodiments, such a compound has the structure of formula III, wherein R$^1$ is

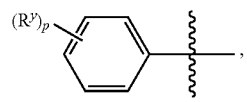

and each R$^4$ and R$^5$ is independently R, wherein R is not hydrogen. In some embodiments, the present invention provides a method for purifying a compound of formula III, comprising steps of:
1) identifying a solvent in which a desired product has a better solubility than the byproducts; and
2) extracting the crude product with said solvent for one or more times; and
3) obtain the desired product from the extracts.

In some embodiments, the desired product is isolated from the extracts through crystallization.

In some embodiments, the present invention provides a method for preparing a compound of formula III, wherein each of R$^4$ and R$^5$ is halogen, comprising providing a compound having the structure of R$^1$N(R)Si(R)$_3$, wherein R$^1$ is optionally substituted

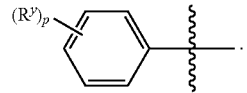

In some embodiments, the present invention provides a method for preparing a compound of formula III, wherein each of R$^4$ and R$^5$ is —Cl, comprising providing a compound having the structure of In some embodiments, a compound having the structure of

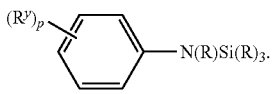

In some embodiments, a compound having the structure of

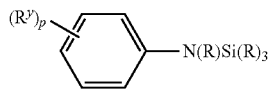

has the structure of

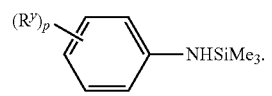

In some embodiments, a method further comprises providing a compound of $MCl_6$. In some embodiments, M in a provided method is W.

In some embodiments, the present invention provides a method for preparing a compound of formula I, wherein each $R^4$ and $R^5$ is —OTf, comprising steps of:
1) providing a compound of formula III:

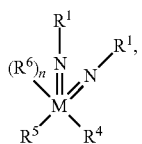

each $R^4$ and $R^5$ is independently R; and
b) reacting the compound of formula III with TfOH.

In some embodiments, the present invention provides a method for preparing a compound of formula I, wherein each $R^4$ and $R^5$ is optionally substituted pyrrolyl, comprising steps of:
1) providing a first compound of formula I, wherein each $R^4$ and $R^5$ is —OTf; and
2) reacting the first compound with $R^4Li$.

In some embodiments, the present invention provides a method for preparing a compound of formula I, wherein $R^4$ is —OR or —OAr$^a$, and $R^5$ is optionally substituted pyrrolyl, comprising steps of:
1) providing a first compound of formula I, wherein each $R^4$ and $R^5$ is optionally substituted pyrrolyl; and
2) reacting the first compound with HOR or HOAr$^a$, or a salt thereof.

In some embodiments, the present invention provides a method for preparing a compound of formula I, wherein each of $R^4$ and $R^5$ is —OR or —OAr$^a$, comprising steps of:
1) providing a first compound of formula I, wherein each $R^4$ and $R^5$ is optionally substituted pyrrolyl; and
2) reacting the first compound with HOR or HOAr$^a$, or a salt thereof.

In some embodiments, the present invention provides a method for preparing a compound of formula I, wherein each of $R^4$ and $R^5$ is —OR or —OAr$^a$, comprising steps of:
1) providing a first compound of formula I, wherein each $R^4$ and $R^5$ is —OTf; and
2) reacting the first compound with HOR or HOAr$^a$, or a salt thereof.

Exemplary compounds having the structure of formula I are listed below: W(NAr$^{Cl3}$)(CHCMe$_3$)(OTf)$_2$(DME), W(NAr$^{Cl3}$)(CHCMe$_3$)(2,5-Me$_2$Pyr)$_2$, W(NAr$^{Br3}$)(CHCMe$_3$)(OTf)$_2$(DME), W(NAr$^{Cl2CF3}$)$_2$(CHCMe$_3$)(OTf)$_2$(DME), W(NAr$^{(CF3)2}$)(CHCMe$_3$)(OTf)$_2$(DME), Mo(NC$_6$F$_5$)(CHCMe$_2$Ph)(OTf)$_2$(DME), Mo(NC$_6$F$_5$)(CHCMe$_2$Ph)(Me$_2$Pyr)$_2$, Mo(NC$_6$F$_5$)(CHCMe$_2$Ph)[OC(CF$_3$)$_3$]$_2$, Mo(NC$_6$F$_5$)(CHCMe$_2$Ph)[OC(C$_6$F$_5$)$_3$]$_2$, Mo(NC$_6$F$_5$)(CHCMe$_2$Ph)(ODFT)$_2$, W(NC$_6$F$_5$)(CH-t-Bu)(DME)(OTf)$_2$, W(NC$_6$F$_5$)(CH-t-Bu)(THF)$_2$(OTf)$_2$, W(NC$_6$F$_5$)(CH-t-Bu)(DME)(THF)(OTf)$_2$, [W(NC$_6$F$_5$)(CH-t-Bu)(μ-DME)(OTf)$_2$]$_x$, W(NC$_6$F$_5$)(CH-t-Bu)(DME)(Pyr)$_2$, W(NC$_6$F$_5$)(CH-t-Bu)(DME)[OC(CF$_3$)$_3$]$_2$, W(NC$_6$F$_5$)(CH-t-Bu)[OC(C$_6$F$_5$)$_3$]$_2$, W(NC$_6$F$_5$)(CH-t-Bu)(ODFT)$_2$, Mo(NC$_6$F$_5$)(CHCMe$_2$Ph)(Me$_2$Pyr)(HMTO), W(NC$_6$F$_5$)(CH-t-Bu)(dme)$_{1.5}$(Pyr)$_2$, W(NC$_6$F$_5$)(CHCMe$_2$Ph)(Me$_2$Pyr)(HMTO), W(NAr$^{Cl3}$)(CH-t-Bu)(Pyr)(DFTO), W(NAr$^{Cl3}$)(CH-t-Bu)(Pyr)(HMTO), W(NAr$^{Cl3}$)(CH-t-Bu)(Pyr)(HIPTO), W(NAr$^{Br3}$)(CH-t-Bu)(Pyr)(DFTO), W(NAr$^{Br3}$)(CH-t-Bu)(Pyr)(HMTO), W(NAr$^{Br3}$)(CH-t-Bu)(Pyr)(HIPTO), W(NAr$^{Cl2CF3}$)(CH-t-Bu)(Pyr)(DFTO), W(NAr$^{Cl2CF3}$)(CH-t-Bu)(Pyr)(HMTO), W(NAr$^{Cl2CF3}$)(CH-t-Bu)(Pyr)(HIPTO), W(NAr$^{(CF3)2}$)(CH-t-Bu)(Pyr)(DFTO), W(NAr$^{(CF3)2}$)(CH-t-Bu)(Pyr)(HMTO), W(NAr$^{(CF3)2}$)(CH-t-Bu)(Pyr)(HIPTO), W(NAr$^{Cl3}$)(CH-t-Bu)(OR$_{F6}$), W(NAr$^{Cl3}$)(CH-t-Bu)(OR$_{F9}$), W(NAr$^{Br3}$)(CH-t-Bu)(OR$_{F6}$), W(NAr$^{Br3}$)(CH-t-Bu)(OR$_{F9}$), W(NAr$^{Cl2CF3}$)(CH-t-Bu)(OR$_{F6}$), W(NAr$^{Cl2CF3}$)(CH-t-Bu)(OR$_{F9}$), W(NAr$^{(CF3)2}$)(CH-t-Bu)(OR$_{F6}$), W(NAr$^{(CF3)2}$)(CH-t-Bu)(OR$_{F9}$), W(NAr$^{Cl3}$)(CHCMe$_3$)(Me$_2$Pyr)(OHMT), W(NAr$^{Cl3}$)(CHCMe$_3$)(Me$_2$pyr)(ODFT), W(NAr$^{Cl3}$)(CHCMe3)(Me$_2$pyr)(OTript), W(NAr$^{Cl3}$)(CHCMe$_3$)(ODBMP)$_2$, W(NAr$^{Br3}$)(CHCMe$_3$)(ODBMP)$_2$, W(NAr$^{Cl2CF3}$)(CHCMe$_3$)(ODBMP)$_2$, W(NAr$^{(CF3)2}$)(CHCMe$_3$)(ODBMP)$_2$, W(NAr$^{(CF3)2}$)(CHCMe$_3$)(ODBMP)$_2$·2DME, W(NAr$^{Cl}$)(CHCMe$_3$)(OTf)$_2$(dme), W(NAr$^{Cl}$)(CHCMe$_3$)(ODBMP)$_2$, W(NAr$^F$)(CHCMe$_3$)(OTf)$_2$(dme), W(NAr$^F$)(CHCMe$_3$)(ODBMP)$_2$, W(NAr')(CHCMe$_3$)(OTf)$_2$(dme), W(NAr')(CHCMe$_3$)(ODBMP)$_2$, W(NAr")(CHCMe$_2$Ph)(OTf)$_2$(dme), W(NAr")(CHCMe$_2$Ph)(ODBMP)$_2$, wherein Ar$^{Cl3}$ is 2,4,6-trichlorophenyl, Ar$^{Br3}$ is 2,4,6-tribromophenyl, Ar$^{Cl2CF3}$ is 2,6-dichloro-4-(trifluoromethyl)phenyl, Ar$^{(CF3)2}$ is 3,5-bis(trifluoromethyl)phenyl, OR$_{F6}$ is hexafluoro-tert-butoxide (—OCMe(CF$_3$)$_2$), OR$_{F9}$ is perfluoro-tert-butoxide (—OC(CF$_3$)$_3$), Ar' is 2,6-Me$_2$C$_6$H$_3$, and Ar" is 3,5-Me$_2$C$_6$H$_3$.

Exemplary compounds of formula II include W(NC$_6$F$_5$)(CH$_2$CH$_2$CH$_2$)[OC(CF$_3$)$_3$]$_2$.

Exemplary compounds of formula III include Mo(NC$_6$F$_5$)$_2$Cl$_2$(DME), W(NC$_6$F$_5$)$_2$Cl$_2$(DME), Mo(NC$_6$F$_5$)$_2$(CH$_2$CMe$_2$Ph)$_2$, Mo(NC$_6$F$_5$)$_2$(CH$_2$CMe$_2$Ph)$_2$(Et$_2$O), W(NC$_6$F$_5$)$_2$(CH$_2$CMe$_3$)$_2$, W(NAr$^{Cl3}$)$_2$Cl$_2$(DME), W(NAr$^{Cl3}$)$_2$(CH$_2$CMe$_3$)$_2$, W(NAr$^{Br3}$)$_2$Cl$_2$(DME), W(NAr$^{Br3}$)$_2$(CH$_2$CMe$_3$)$_2$, W(NAr$^{Cl2CF3}$)$_2$Cl$_2$(DME), W(NAr$^{Cl2CF3}$)$_2$(CHCMe$_3$)$_2$, W(NAr$^{(CF3)2}$)$_2$Cl$_2$(DME), and W(NAr$^{(CF3)2}$)$_2$(CH$_2$CMe$_3$)$_2$, wherein Ar$^{Cl3}$ is 2,4,6-trichlorophenyl, Ar$^{Br3}$ is 2,4,6-tribromophenyl, Ar$^{Cl2CF3}$ is 2,6-dichloro-4-(trifluoromethyl)phenyl, and Ar$^{(CF3)2}$ is 3,5-bis(trifluoromethyl)phenyl.

In some embodiments, a provided compound is other than

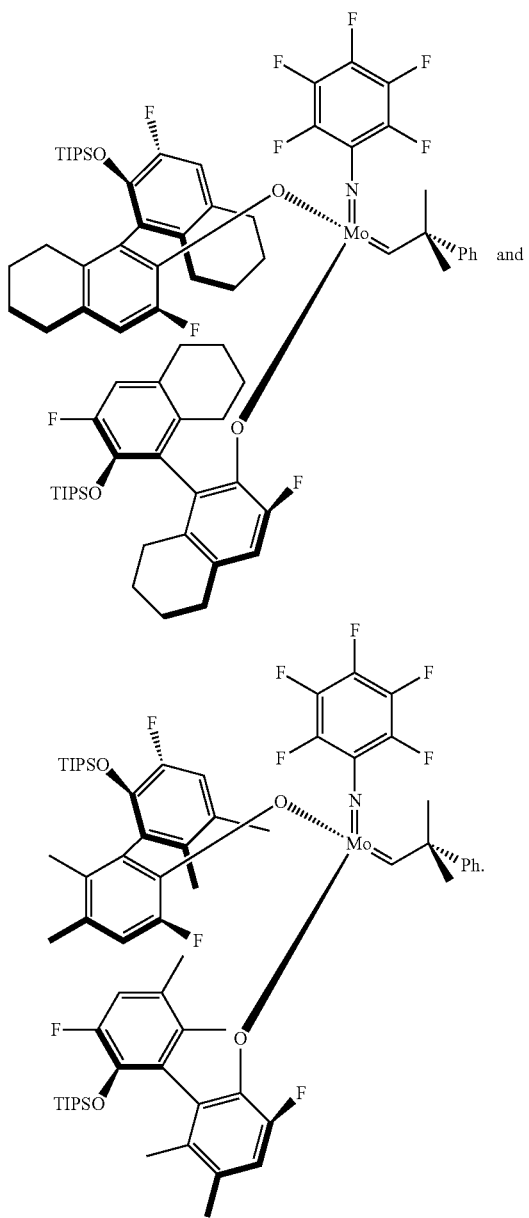

In some embodiments, the present invention provides a method for performing a metathesis reaction, comprising providing a compound of formula I. In some embodiments, a metathesis reaction is cross metathesis, ring-closing metathesis, ring-opening metathesis, acyclic diene metathesis, enyne metathesis, alkane metathesis, alkyne metathesis, or ring-opening metathesis polymerization (ROMP), and the like. In some embodiments, a metathesis reaction is alkane metathesis. In some embodiments, a metathesis reaction is olefin metathesis. In some embodiments, a metathesis reaction is ROMP. In some embodiments, a metathesis reaction is ROMP, and a product is produced with cis, isotactic selectivity.

In some embodiments, a provided compound provides unexpected selectivity in metathesis reaction. In some embodiments, a provided compound promotes ROMP of dicarbomethoxynorbornadiene (DCMNBD) with >% 50 cis, isotactic selectivity. In some embodiments, a provided compound promotes ROMP of dicarbomethoxynorbornadiene (DCMNBD) with >% 60 cis, isotactic selectivity. In some embodiments, a provided compound promotes ROMP of dicarbomethoxynorbornadiene (DCMNBD) with >% 70 cis, isotactic selectivity. In some embodiments, a provided compound promotes ROMP of dicarbomethoxynorbornadiene (DCMNBD) with >% 80 cis, isotactic selectivity.

In some embodiments, the present invention provides a method for ring-opening metathesis polymerization (ROMP), comprising providing a compound having the structure of formula I, wherein the ROMP polymer product has greater than about 50% isotactic structure.

In some embodiments, the present invention provides a method for ring-opening metathesis polymerization (ROMP), comprising providing a compound having the structure of formula II, wherein the ROMP polymer product has greater than about 50% isotactic structure.

In some embodiments, the present invention provides a method for ring-opening metathesis polymerization (ROMP), comprising providing a compound having the structure of formula V, wherein the ROMP polymer product has greater than about 50% isotactic structure.

In some embodiments, an ROMP product is greater than about 50% isotactic. In some embodiments, an ROMP product is greater than about 60% isotactic. In some embodiments, an ROMP product is greater than about 70% isotactic. In some embodiments, an ROMP product is greater than about 80% isotactic. In some embodiments, an ROMP product is greater than about 85% isotactic. In some embodiments, an ROMP product is greater than about 90% isotactic. In some embodiments, an ROMP product is greater than about 91% isotactic. In some embodiments, an ROMP product is greater than about 92% isotactic. In some embodiments, an ROMP product is greater than about 93% isotactic. In some embodiments, an ROMP product is greater than about 94% isotactic. In some embodiments, an ROMP product is greater than about 95% isotactic. In some embodiments, an ROMP product is greater than about 96% isotactic. In some embodiments, an ROMP product is greater than about 97% isotactic. In some embodiments, an ROMP product is greater than about 98% isotactic. In some embodiments, an ROMP product is greater than about 99% isotactic.

In some embodiments, an ROMP product is greater than about 50% cis. In some embodiments, an ROMP product is greater than about 60% cis. In some embodiments, an ROMP product is greater than about 70% cis. In some embodiments, an ROMP product is greater than about 80% cis. In some embodiments, an ROMP product is greater than about 85% cis. In some embodiments, an ROMP product is greater than about 90% cis. In some embodiments, an ROMP product is greater than about 91% cis. In some embodiments, an ROMP product is greater than about 92% cis. In some embodiments, an ROMP product is greater than about 93% cis. In some embodiments, an ROMP product is greater than about 94% cis. In some embodiments, an ROMP product is greater than about 95% cis. In some embodiments, an ROMP product is greater than about 96% cis. In some embodiments, an ROMP product is greater than about 97% cis. In some embodiments, an ROMP product is greater than about 98% cis. In some embodiments, an ROMP product is greater than about 99% cis.

In some embodiments, an ROMP product is greater than about 50% cis and greater than about 50% isotactic. In some embodiments, an ROMP product is greater than about 60% cis and greater than about 50% isotactic. In some embodiments, an ROMP product is greater than about 70% cis and greater than about 50% isotactic. In some embodiments, an ROMP product is greater than about 80% cis and greater than about 50% isotactic. In some embodiments, an ROMP product is greater than about 85% cis and greater than about 50% isotactic. In some embodiments, an ROMP product is greater than about 90% cis and greater than about 50% isotactic. In some embodiments, an ROMP product is greater than about 95% cis and greater than about 50% isotactic. In some embodiments, an ROMP product is greater than about 98% cis and greater than about 50% isotactic. In some embodiments, an ROMP product is greater than about 90% cis and greater than about 60% isotactic. In some embodiments, an ROMP product is greater than about 90% cis and greater than about 70% isotactic. In some embodiments, an ROMP product is greater than about 90% cis and greater than about 80% isotactic. In some embodiments, an ROMP product is greater than about 90% cis and greater than about 90% isotactic. In some embodiments, an ROMP product is greater than about 95% cis and greater than about 90% isotactic. In some embodiments, an ROMP product is greater than about 98% cis and greater than about 90% isotactic. In some embodiments, an ROMP product is greater than about 95% cis and greater than about 95% isotactic.

In some embodiments, the present invention provides a method for optimizing a compound of formula I, wherein $R^1$ is optionally substituted phenyl or

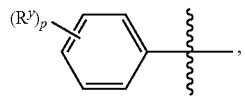

comprising introducing one or more electron-withdrawing groups to the phenyl group of $R^1$. In some embodiments, an electron-withdrawing group is introduced to a position other than the 2- or 6-position. In some embodiments, an electron-withdrawing group is introduced to the 4-position of the phenyl ring. Among other things, an optimized compound may initiate or promote a metathesis reaction, e.g., a ROMP reaction, at an accelerated rate.

Conditions

In some embodiments, a ligand is provided in a molar ratio of about 10:1, 9:1, 8:1, 7:1, 6:1, 5:1, 4:1, 3:1, 2:1, or 1:1 relative to the metal. In some embodiments, a ligand is provided in a molar ratio of about 0.9:1, 0.8:1, 0.7:1, 0.6:1, 0.5:1, 0.4:1, 0.3:1, 0.2:1, or 0.1:1 relative to the metal. In certain embodiments, a ligand is provided in a molar ratio of about 1:1 relative to the metal. One of skill in the art will appreciate that the optimal molar ratio of ligand to metal will depend on, inter alia, whether the ligand is mono- or polydentate. In some embodiments, a ligand or ligand precursor having the structure of formula I is provided in a molar ratio of about 1:1 to M.

Suitable conditions for performing provided methods generally employ one or more solvents. In certain embodiments, one or more organic solvents are used. Examples of such organic solvents include, but are not limited to, hydrocarbons such as benzene, toluene, and pentane, halogenated hydrocarbons such as dichloromethane, or polar aprotic solvents, such as ethereal solvents including ether, DME, tetrahydrofuran (THF), or dioxanes, or protic solvents, such as alcohols, or mixtures thereof. In certain embodiments, one or more solvents are deuterated.

In some embodiments, a single solvent is used. In certain embodiments, a solvent is benzene. In certain embodiments, a solvent is ether. In some embodiments, a solvent is a nitrile. In some embodiments, a solvent is acetonitrile.

In some embodiments, mixtures of two or more solvents are used, and in some cases may be preferred to a single solvent. In certain embodiments, the solvent mixture is a mixture of an ethereal solvent and a hydrocarbon. Exemplary such mixtures include, for instance, an ether/benzene mixture. In some embodiments, an exemplary mixture is a DME/Toluene mixture. In some embodiments, an exemplary mixture is DME/Toluene about 1:1. Solvent mixtures may be comprised of equal volumes of each solvent or may contain one solvent in excess of the other solvent or solvents. In certain embodiments wherein a solvent mixture is comprised of two solvents, the solvents may be present in a ratio of about 20:1, about 10:1, about 9:1, about 8:1, about 7:1, about 6:1, about 5:1, about 4:1, about 3:1, about 2:1, or about 1:1. In certain embodiments wherein a solvent mixture comprises an ethereal solvent and a hydrocarbon, the solvents may be present in a ratio of about 20:1, about 10:1, about 9:1, about 8:1, about 7:1, about 6:1, about 5:1, about 4:1, about 3:1, about 2:1, or about 1:1 ethereal solvent: hydrocarbon. In certain embodiments, the solvent mixture comprises a mixture of ether and benzene in a ratio of about 5:1. One of skill in the art would appreciate that other solvent mixtures and/or ratios are contemplated herein, that the selection of such other solvent mixtures and/or ratios will depend on the solubility of species present in the reaction (e.g., substrates, additives, etc.), and that experimentation required to optimized the solvent mixture and/or ratio would be routine in the art and not undue.

Suitable conditions, in some embodiments, employ ambient temperatures. In some embodiments, a suitable temperature is about 15° C., about 20° C., about 25° C., or about 30° C. In some embodiments, a suitable temperature is from about 15° C. to about 25° C. In certain embodiments, a suitable temperature is about 20° C., 21° C., 22° C., 23° C., 24° C., or 25° C.

In certain embodiments, a provided method is performed at elevated temperature. In some embodiments, a suitable temperature is from about 25° C. to about 110° C. In certain embodiments, a suitable temperature is from about 40° C. to about 100° C., from about 50° C. to about 100° C., from about 60° C. to about 100° C., from about 70° C. to about 100° C., from about 80° C. to about 100° C., or from about 90° C. to about 100° C. In some embodiments, a suitable temperature is about 80° C. In some embodiments, a suitable temperature is about 30° C. In some embodiments, a suitable temperature is about 40° C. In some embodiments, a suitable temperature is about 50° C. In some embodiments, a suitable temperature is about 60° C. In some embodiments, a suitable temperature is about 70° C. In some embodiments, a suitable temperature is about 80° C. In some embodiments, a suitable temperature is about 90° C. In some embodiments, a suitable temperature is about 100° C. In some embodiments, a suitable temperature is about 110° C.

In certain embodiments, a provided method is performed at temperature lower than ambient temperatures. In some embodiments, a suitable temperature is from about −100° C. to about 10° C. In certain embodiments, a suitable temperature is from about −80° C. to about 0° C. In certain embodiments, a suitable temperature is from about −70° C. to about 10° C. In certain embodiments, a suitable temperature is from about −60° C. to about 10° C. In certain embodiments, a suitable temperature is from about −50° C. to about 10° C. In certain embodiments, a suitable temperature is from about −40° C. to about 10° C. In certain embodiments, a suitable temperature is or from about −30°

C. to about 10° C. In some embodiments, a suitable temperature is below 0° C. In some embodiments, a suitable temperature is about −100° C. In some embodiments, a suitable temperature is about −90° C. In some embodiments, a suitable temperature is about −80° C. In some embodiments, a suitable temperature is about −70° C. In some embodiments, a suitable temperature is about −60° C. In some embodiments, a suitable temperature is about −50° C. In some embodiments, a suitable temperature is about −40° C. In some embodiments, a suitable temperature is about −30° C. In some embodiments, a suitable temperature is about −20° C. In some embodiments, a suitable temperature is about −10° C. In some embodiments, a suitable temperature is about 0° C. In some embodiments, a suitable temperature is about 10° C.

In some embodiments, a provided method is performed at different temperatures. In some embodiments, temperature changes in a provided method. In some embodiments, a provided method involves temperature increase from a lower suitable temperature to a higher suitable temperature. In some embodiments, a provided method comprises temperature increase from about −80° C., about −70° C., about −60° C., about −50° C., about −40° C., about −30° C., about −20° C., about −10° C., and about 0° C. to about 0° C., about 10° C., about 20° C., ambient temperature, about 22° C., about 25° C., about 30° C., about 40° C., about 50° C., about 60° C., about 70° C., about 80° C., about 90° C., about 100° C. and about 110° C. In some embodiments, a provided method comprises temperature increase from about −30° C. to 22° C. In some embodiments, a provided method comprises temperature decrease from a higher suitable temperature to a lower suitable temperature. In some embodiments, a provided method comprises temperature increase from about 110° C., about 100° C., about 90° C., about 80° C., about 70° C., about 60° C., about 50° C., about 40° C., about 30° C., about 25° C., about 22° C., ambient temperature, about 20° C., about 10° C., and about 0° C. to about 0° C., about −10° C., about −20° C., about −30° C., about −40° C., about −50° C., about −60° C., about −70° C., about −80° C., about −90° C., and about −100° C.

Suitable conditions typically involve reaction times of about 1 minute to about one or more days. In some embodiments, the reaction time ranges from about 0.5 hour to about 72 hours. In some embodiments, the reaction time ranges from about 0.5 hour to about 48 hours. In some embodiments, the reaction time ranges from about 0.5 hour to about 20 hours. In some embodiments, the reaction time ranges from about 0.5 hour to about 15 hours. In some embodiments, the reaction time ranges from about 1.0 hour to about 12 hours. In some embodiments, the reaction time ranges from about 1 hour to about 10 hours. In some embodiments, the reaction time ranges from about 1 hour to about 8 hours. In some embodiments, the reaction time ranges from about 1 hour to about 6 hours. In some embodiments, the reaction time ranges from about 1 hour to about 4 hours. In some embodiments, the reaction time ranges from about 1 hour to about 2 hours. In some embodiments, the reaction time ranges from about 2 hours to about 8 hours. In some embodiments, the reaction time ranges from about 2 hours to about 4 hours. In some embodiments, the reaction time ranges from about 2 hours to about 3 hours. In certain embodiments, the reaction time is about 1, 2, 3, 4, 5, 6, 7, 8, 9, 10, 11, 12, 24, 36, 48, 60, 72, 96 or 120 hours. In certain embodiments, the reaction time is about 1 hour. In certain embodiments, the reaction time is about 2 hours. In certain embodiments, the reaction time is about 3 hours. In certain embodiments, the reaction time is about 4 hours. In certain embodiments, the reaction time is about 5 hours. In certain embodiments, the reaction time is about 6 hours. In some embodiments, the reaction time is about 12 hours. In some embodiments, the reaction time is about 24 hours. In some embodiments, the reaction time is about 36 hours. In some embodiments, the reaction time is about 48 hours. In some embodiments, the reaction time is about 72 hours. In some embodiments, the reaction time is about 96 hours. In some embodiments, the reaction time is about 120 hours. In certain embodiments, the reaction time is less than about 1 hour. In certain embodiments, the reaction time is about 5, 10, 15, 20, 25, 30, 35, 40, 45, 50, or 55 minutes. In some embodiments, the reaction time is about 5 minutes. In some embodiments, the reaction time is about 10 minutes. In some embodiments, the reaction time is about 15 minutes. In some embodiments, the reaction time is about 20 minutes. In some embodiments, the reaction time is about 25 minutes. In some embodiments, the reaction time is about 30 minutes. In some embodiments, the reaction time is about 35 minutes. In some embodiments, the reaction time is about 40 minutes. In some embodiments, the reaction time is about 100 minutes. In some embodiments, the reaction time is about 110 minutes. In some embodiments, the reaction time is about 200 minutes. In some embodiments, the reaction time is about 300 minutes. In some embodiments, the reaction time is about 400 minutes.

In some embodiments, a provided metal complex compound, e.g. a compound of formula I or an active catalyst formed from a provided compound, is stable under metathesis conditions. In some embodiments, a provided compound, or an active catalyst formed from a provided compound, decomposes under metathesis conditions. In some embodiments, a provided compound, or an active catalyst formed from a provided compound, decomposes under metathesis conditions within about 1 hour. In some embodiments, a provided compound, or an active catalyst formed from a provided compound, decomposes under metathesis conditions within about 2 hours. In some embodiments, a provided compound, or an active catalyst formed from a provided compound, decomposes under metathesis conditions within about 6 hours. In some embodiments, a provided compound, or an active catalyst formed from a provided compound, decomposes under metathesis conditions within about 12 hours. In some embodiments, a provided compound, or an active catalyst formed from a provided compound, decomposes under metathesis conditions within about 24 hours. In some embodiments, a provided compound, or an active catalyst formed from a provided compound, decomposes under metathesis conditions within about 48 hours. In some embodiments, a provided compound, or an active catalyst formed from a provided compound, decomposes under metathesis conditions within about 96 hours.

Some embodiments may provide the ability to selectively synthesize, via a metathesis reaction, products having a Z or E configuration about a double bond. In some embodiments, a method of the present invention provides the ability to synthesize compounds comprising a Z-olefin. In some embodiments, such methods are useful when applied to a wide range of olefin substrates, including those having sterically small or large groups adjacent the olefin. In some embodiments, the substrate olefins are terminal olefins.

In some embodiments, the present invention provides a method for Z-selective metathesis reactions. In some embodiments, a provided method produces a double bond in a Z:E ratio greater than about 1:1, greater than about 2:1, greater than about 3:1, greater than about 4:1, greater than about 5:1, greater than about 6:1, greater than about 7:1, greater than about 8:1, greater than about 9:1, greater than about 95:5, greater than about 96:4, greater than about 97:3, greater than about 98:2, or, in some cases, greater than about 99:1, as determined using methods described herein (e.g., HPLC or NMR). In some cases, about 100% of the double bond produced in the metathesis reaction may have a Z configuration. The Z or cis selectivity may also be expressed as a percentage of product formed. In some cases, the product may be greater than about 50% Z, greater than about 60% Z, greater than about 70% Z, greater than about 80% Z, greater than about 90% Z, greater than about 95% Z, greater than about 96% Z, greater than about 97% Z, greater than about 98% Z, greater than about 99% Z, or, in some cases, greater than about 99.5% Z.

In some embodiments, a metathesis reaction using a compound of the present invention produces a polymer wherein the polymer is >50% cis, >50% syndiotactic. In some embodiments, a metathesis reaction using a compound of the present invention produces a polymer wherein the polymer is >60% cis, >60% syndiotactic. In some embodiments, a metathesis reaction using a compound of the present invention produces a polymer wherein the polymer is >70% cis, >70% syndiotactic. In some embodiments, a metathesis reaction using a compound of the present invention produces a polymer wherein the polymer is 80% cis, >80% syndiotactic. In some embodiments, a metathesis reaction using a compound of the present invention produces a polymer wherein the polymer is >90% cis, 90% syndiotactic. In some embodiments, a metathesis reaction using a compound of the present invention produces a polymer wherein the polymer is >95% cis, 90% syndiotactic. In some embodiments, a metathesis reaction using a compound of the present invention produces a polymer wherein the polymer is >99% cis, 90% syndiotactic. In some embodiments, a metathesis reaction using a compound of the present invention produces a polymer wherein the polymer is >90% cis, >95% syndiotactic. In some embodiments, a metathesis reaction using a compound of the present invention produces a polymer wherein the polymer is >95% cis, >95% syndiotactic. In some embodiments, a metathesis reaction using a compound of the present invention produces a polymer wherein the polymer is >99% cis, >90% syndiotactic. In some embodiments, a metathesis reaction using a compound of the present invention produces a polymer wherein the polymer is >99% cis, >95% syndiotactic. In some embodiments, a metathesis reaction using a compound of the present invention produces a polymer wherein the polymer is >99% cis, >97% syndiotactic. In some embodiments, a metathesis reaction using a compound of the present invention produces a polymer wherein the polymer is >99% cis, >99% syndiotactic.

In some embodiments, an ROMP product is greater than about 50% isotactic. In some embodiments, an ROMP product is greater than about 60% isotactic. In some embodiments, an ROMP product is greater than about 70% isotactic. In some embodiments, an ROMP product is greater than about 80% isotactic. In some embodiments, an ROMP product is greater than about 85% isotactic. In some embodiments, an ROMP product is greater than about 90% isotactic. In some embodiments, an ROMP product is greater than about 91% isotactic. In some embodiments, an ROMP product is greater than about 92% isotactic. In some embodiments, an ROMP product is greater than about 93% isotactic. In some embodiments, an ROMP product is greater than about 94% isotactic. In some embodiments, an ROMP product is greater than about 95% isotactic. In some embodiments, an ROMP product is greater than about 96% isotactic. In some embodiments, an ROMP product is greater than about 97% isotactic. In some embodiments, an ROMP product is greater than about 98% isotactic. In some embodiments, an ROMP product is greater than about 99% isotactic.

In some embodiments, an ROMP product is greater than about 50% cis. In some embodiments, an ROMP product is greater than about 60% cis. In some embodiments, an ROMP product is greater than about 70% cis. In some embodiments, an ROMP product is greater than about 80% cis. In some embodiments, an ROMP product is greater than about 85% cis. In some embodiments, an ROMP product is greater than about 90% cis. In some embodiments, an ROMP product is greater than about 91% cis. In some embodiments, an ROMP product is greater than about 92% cis. In some embodiments, an ROMP product is greater than about 93% cis. In some embodiments, an ROMP product is greater than about 94% cis. In some embodiments, an ROMP product is greater than about 95% cis. In some embodiments, an ROMP product is greater than about 96% cis. In some embodiments, an ROMP product is greater than about 97% cis. In some embodiments, an ROMP product is greater than about 98% cis. In some embodiments, an ROMP product is greater than about 99% cis.

In some embodiments, an ROMP product is greater than about 50% cis and greater than about 50% isotactic. In some embodiments, an ROMP product is greater than about 60% cis and greater than about 50% isotactic. In some embodiments, an ROMP product is greater than about 70% cis and greater than about 50% isotactic. In some embodiments, an ROMP product is greater than about 80% cis and greater than about 50% isotactic. In some embodiments, an ROMP product is greater than about 85% cis and greater than about 50% isotactic. In some embodiments, an ROMP product is greater than about 90% cis and greater than about 50% isotactic. In some embodiments, an ROMP product is greater than about 95% cis and greater than about 50% isotactic. In some embodiments, an ROMP product is greater than about 98% cis and greater than about 50% isotactic. In some embodiments, an ROMP product is greater than about 90% cis and greater than about 60% isotactic. In some embodiments, an ROMP product is greater than about 90% cis and greater than about 70% isotactic. In some embodiments, an ROMP product is greater than about 90% cis and greater than about 80% isotactic. In some embodiments, an ROMP product is greater than about 90% cis and greater than about 90% isotactic. In some embodiments, an ROMP product is greater than about 95% cis and greater than about 90% isotactic. In some embodiments, an ROMP product is greater than about 98% cis and greater than about 90% isotactic. In some embodiments, an ROMP product is greater than about 95% cis and greater than about 95% isotactic.

In some embodiments, a metathesis reaction using a compound of the present invention produces a polymer wherein the polymer is >50% cis, >50% isotactic. In some embodiments, a metathesis reaction using a compound of the present invention produces a polymer wherein the polymer is >60% cis, >60% isotactic. In some embodiments, a metathesis reaction using a compound of the present invention produces a polymer wherein the polymer is >70% cis, >70% isotactic. In some embodiments, a metathesis reaction using a compound of the present invention produces a polymer wherein the polymer is 80% cis, >80% isotactic. In some embodiments, a metathesis reaction using a compound of the present invention produces a polymer wherein the polymer is >90% cis, 90% isotactic. In some embodiments, a metathesis reaction using a compound of the present invention produces a polymer wherein the polymer is >95% cis, 90% isotactic. In some embodiments, a metathesis reaction using a compound of the present invention produces a polymer wherein the polymer is >99% cis, 90% isotactic. In some embodiments, a metathesis reaction using a compound of the present invention produces a polymer wherein the polymer is >90% cis, >95% isotactic. In some embodiments, a metathesis reaction using a compound of the present invention produces a polymer wherein the polymer is >95% cis, >95% isotactic. In some embodiments, a metathesis reaction using a compound of the present invention produces a polymer wherein the polymer is >99% cis, >90% isotactic. In some embodiments, a metathesis reaction using a compound of the present invention produces a polymer wherein the polymer is >99% cis, >95% isotactic. In some embodiments, a metathesis reaction using a compound of the present invention produces a polymer wherein the polymer is >99% cis, >97% isotactic. In some embodiments, a metathesis reaction using a compound of the present invention produces a polymer wherein the polymer is >99% cis, >99% isotactic.

In some embodiments, a provided method requires an amount of a provided compound (e.g., a metal complex having the structure of formula I) such that the loading is from about 0.01 mol % to about 20 mol % of the provided compound relative to substrate (e.g., a first or second double bond). In certain embodiments, a provided compound is used in an amount of between about 0.01 mol % to about 10 mol %. In certain embodiments, a provided compound is used in an amount of between about 0.01 mol % to about 6 mol %. In certain embodiments, a provided compound is used in an amount of between about 0.01 mol % to about 5 mol %. In certain embodiments, a provided compound is used in an amount of between about 0.01 mol % to about 4 mol %. In certain embodiments, a provided compound is used in an amount of between about 0.01 mol % to about 3 mol %. In certain embodiments, a provided compound is used in an amount of between about 0.01 mol % to about 1 mol %. In certain embodiments, a provided compound is used in an amount of between about 0.01 mol % to about 0.5 mol %. In certain embodiments, a provided compound is used in an amount of between about 0.01 mol % to about 0.2 mol %. In certain embodiments, a provided compound is used in an amount of about 0.05%, 0.1%, 0.2%, 0.5%, 1%, 2%, 3 mol %, 4 mol %, 5 mol %, 6 mol %, 7 mol %, 8 mol %, 9 mol %, or 10 mol %.

In some embodiments, a method of the present invention requires an amount of solvent such that the concentration of the reaction is between about 0.01 M and about 1 M. In some embodiments, the concentration of the reaction is between about 0.01 M and about 0.5 M. In some embodiments, the concentration of the reaction is between about 0.01 M and about 0.1 M. In some embodiments, the concentration of the reaction is between about 0.01 M and about 0.05 M. In some embodiments, the concentration of the reaction is about 0.01 M. In some embodiments, the concentration of the reaction is about 0.02 M. In some embodiments, the concentration of the reaction is about 0.03 M. In some embodiments, the concentration of the reaction is about 0.04 M. In some embodiments, the concentration of the reaction is about 0.05 M. In some embodiments, the concentration of the reaction is about 0.1 M. In some embodiments, the concentration of the reaction is about 0.3 M.

In some embodiments, a method of the present invention is performed at ambient pressure. In some embodiments, a method of the present invention is performed at reduced pressure. In some embodiments, a method of the present invention is performed at a pressure of less than about 20 torr. In some embodiments, a method of the present invention is performed at a pressure of less than about 15 torr. In some embodiments, a method of the present invention is performed at a pressure of less than about 10 torr. In some embodiments, a method of the present invention is performed at a pressure of about 9, 8, 7, 6, 5, 4, 3, 2, or 1 torr. In certain embodiments, a method of the present invention is performed at a pressure of about 7 torr. In certain embodiments, a method of the present invention is performed at a pressure of about 1 torr.

In some embodiments, a method of the present invention is performed at increased pressure. In some embodiments, a method of the present invention is performed at greater than about 1 atm. In some embodiments, a method of the present invention is performed at greater than about 2 atm. In some embodiments, a method of the present invention is performed at greater than about 3 atm. In some embodiments, a method of the present invention is performed at greater than about 5 atm. In some embodiments, a method of the present invention is performed at greater than about 10 atm. In some embodiments, a method of the present invention is performed at about 2 atm. In some embodiments, a method of the present invention is performed at about 3 atm. In some embodiments, a method of the present invention is performed at about 5 atm. In some embodiments, a method of the present invention is performed at about 10 atm.

As mentioned above, provided compounds are useful for metathesis reactions. Exemplary such methods and reactions are described below.

It will be appreciated that, in certain embodiments, each variable recited is as defined above and described in embodiments, herein, both singly and in combination.

EXEMPLIFICATION

The present invention recognizes, among other things, that there is a continuing demand for compounds and methods for highly efficient and stereoselective metathesis reactions. In some embodiments, the present invention provides novel compounds for metathesis reactions, their preparation methods and use thereof. In some embodiments, the prevent invention provides novel methods for metathesis. Exemplary examples are depicted herein.

Exemplary Compounds Comprising Electron-Withdrawing Imido Groups

Among other things, the present invention recognizes that compounds of formula I wherein $R^1$ comprises electron-withdrawing groups are particularly difficult to synthesize; in some embodiments, the present invention provides methods for preparing such compounds. Exemplary compounds and methods are described below.

$Mo(NC_6F_5)_2Cl_2(DME)$ (1a) was prepared by heating a mixture of $(NH_4)_2Mo_2O_7$, $NEt_3$, $Me_3SiCl$, and $C_6F_5NH_2$ in the ratio of 1:8:17:4 in DME (Fox, H. H.; Yap, K. B.; Robbins, J.; Cai, S.; Schrock, R. R. *Inorg. Chem.* 1992, 31, 2287), but prior to the methods described herein, no dialkyl (for example, neopentyl or neophyl) complexes, which are precursors to the imido alkylidene complexes, could be prepared in a purity good enough for the next step. Treatment of 1a with two equivalent of $ClMg(CH_2CMe_2Ph)$ in diethyl ether gave a dark oil product, which could not be purified by conventional methods such as crystallization. We surprisingly found that extraction of the dark oil with pentane, followed by recrystallization, for 5 times provided a reddish oil 2a whose NMR spectra showed >90% purity (according to $^1$H NMR integration of aromatic peaks). While not wishing to be limited by theory, according to $^1$H and $^{19}$F NMR the product 2a was determined to be the bisalkyl complex $Mo(NC_6F_5)_2(CH_2CMe_2Ph)_2$ with about one equivalent of $Et_2O$ in the mixture, which could hinder crystallization. Without the intention to be limited by theory, it was reasoned that reaction of $ClMg(CH_2CMe_2Ph)$ with 2a to form trialkyl and tetraalkyl products, and reaction of $ClMg(CH_2CMe_2Ph)$ with C—F bond, could also contribute to the difficulty of obtaining 2a with satisfactory purity and/or yield. To our surprise, treatment of 2a with three equivalents of triflic acid generated the yellow solid product $Mo(NC_6F_5)(CHCMe_2Ph)(DME)(OTf)_2$ 3a. After optimization, the two steps yield from 1a to 3a was improved to 64%.

In contrast to 1a, an analogous synthesis of $W(NC_6F_5)_2Cl_2(DME)$ (1b) from $WO_2Cl_2$ did not provide the desired product as a consequence of a failure to convert both oxo ligands into imido ligands. Instead, the known methods only produced $WO(NC_6F_5)(DME)Cl_2$. Without the intention to be limited by theory, we reason that the electron-withdrawing $C_6F_5$ made $NH_2C_6F_5$ a weak nucleophile. After extensive optimization, it was surprisingly found that reacting $C_6F_5NSO$ with $WO_2Cl_2(DME)$ (Dreisch, K.; Andersson, C.; Stalhandske, C. *Polyhedron* 1991, 10, 2417) provided the desired 1b. The reaction condition was critical: 1) $WO_2Cl_2$ is not very soluble in organic solvent but $WO_2Cl_2$(DME) is more soluble in DME. Without the intention to be limited by theory, we reasoned that the mixture solvent worked because, in some embodiments, DME provided enhanced solubility and toluene provided high temperature; 2) $N_2$ purge is very important. Without it, only 5 was formed as the product. Without the intention to be limited by theory, we reasoned that $N_2$ purge removed $SO_2$, which was generated in situ and could bind to W and prevent the second $C_6F_5NSO$ to react. In some embodiments, 1b has been prepared by heating $WO_2Cl_2$ with $C_6F_5NSO$ under a flow of argon to give $W(NC_6F_5)_2Cl_2$ and subsequently dissolving $W(NC_6F_5)_2Cl_2$ in 1,2-dimethoxyethane (Rufanov, K. A.; Kipke, J.; Sundermeyer, J. *Dalton Trans.* 2011, 40, 1990).

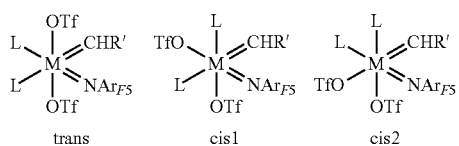

(1)

Proton and $^{19}$F NMR studies of a solution of 3a in $C_6D_6$ showed it initially to be an isomer that contains trans triflates (alkylidene δ $H_α$ 13.74 ppm, δ $C_α$ 326.6 ppm) and the required cis imido and alkylidene ligands. This isomer slowly is transformed into a mixture that contains ~12% of a cis isomer (δ $H_α$ 14.98 ppm, δ $C_α$ 336.1 ppm). Monomeric six-coordinate trans and cis bistriflate complexes of the type $M(NR)(CHR^3)(OTf)_2L_2$ have been observed in other circumstances ((a) Schrock, R. R. *Chem. Rev.* 2002, 102, 145. (b) Schrock, R. R. *Chem. Rev.* 2009, 109, 3211). The four possible monomeric $M(NR)(CHR^3)(OTf)_2L_2$ structures are drawn below, where that L is a monodentate donor.

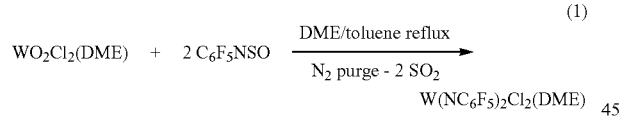

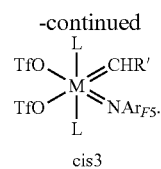

Dialkylation of $W(NC_6F_5)_2Cl_2(DME)$ with neopentyl magnesium chloride led to isolable $W(NC_6F_5)_2(CH_2CMe_3)_2$ (2b) in 89% yield on a 10 g scale. Treatment of 2b with two equivalents of triflic acid in a 5:1 mixture of diethyl ether and DME produced an 81% yield of an insoluble ivory-colored solid on a 8 g scale that analyzes as $W(NC_6F_5)(CH-t-Bu)(DME)(OTf)_2$ (3b). The solid dissolves immediately in THF to give one equivalent of free dme and $W(NC_6F_5)(CH-t-Bu)(THF)_2(OTf)_2$ as a mixture of trans and cis isomers, according to NMR spectra. Recrystallization of 3b from a mixture of THF and pentane gave yellow crystals whose proton NMR spectrum and elemental analysis are consistent with the formula $W(NC_6F_5)(CH-t-Bu)(DME)_{0.5}(THF)(OTf)_2$. Without the intention to be limited by theory, we propose that the insoluble solid is the cis3, and necessarily polymeric, form of $W(NC_6F_5)(CH-t-Bu)(OTf)_2(DME)$, i.e., $\{W(NC_6F_5)(CH-t-Bu)(μ-DME)(OTf)_2\}_x$ (3b). While not wishing to be limited by theory, we ascribe this unusual circumstance to the relatively high electrophilicity of the metal in 3b and, of course, precipitation of 3b, which greatly aids its rapid isolation in high purity in a matter of minutes.

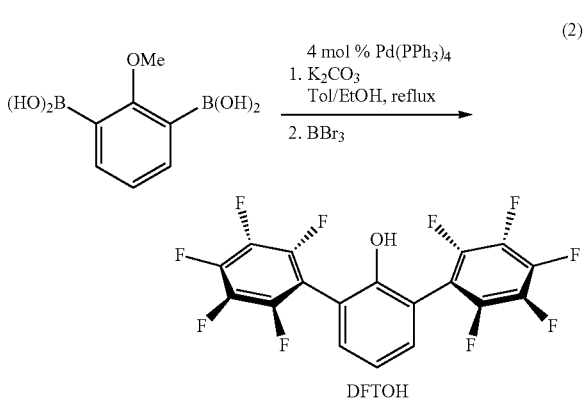

(2)

$HOC(C_6F_5)_3$ was prepared in 92% yield from perfluorobenzophenone and $LiC_6F_5$ in diethyl ether. It has been synthesized previously (Vorozhtsov, N. N.; Barkhash, V. A.; Gerasimova, T. N.; Lokshina, E. G.; Ivanova, N. G. Z. *Obsh. Khim.* 1967, 37, 1225), although to our knowledge it has never been employed as a ligand in a transition metal complex. Contrary to HMTO and HIPTO, synthesis of the novel HDFTO was extraordinarily challenging. Following the methods for HMTO and HIPTO, the first step, generation of $C_6F_5MgBr$, did not produce the desired product as $C_6F_5Br$ decomposed in the reaction condition. Various coupling reactions using $2,6-Br_2C_6H_3OMe$ as starting material, including Suzuki, Nigishi, Kumada and $C_6F_5H$ coupling (e.g., using CuI, $Ag_2O$ and CsF) reactions did not work under various conditions (e.g., $Pd(PPh_3)_4$, $Pd_2(dba)_3$ with X-Phos, S-Phos, Ru-Phos and other phosphines). Surprisingly, we found $2,6-(C_6F_5)_2C_6H_3OH$ (DFTOH) could be prepared as shown in equation 2. The DFTO anion is a relatively electron-withdrawing variation of $2,6-Mesityl_2C_6H_3O$ (HMTO) and $2,6-(2,4,6-i-Pr_3C_6H_2)_2C_6H_3O$ (HIPTO).

TABLE 1

Compounds and yields.

| Compound | Label | Yield |
|---|---|---|
| Mo(NC$_6$F$_5$)(CHCMe$_2$Ph)(OTf)$_2$(DME) | 3a | 64% |
| Mo(NC$_6$F$_5$)(CHCMe$_2$Ph)(Me$_2$Pyr)$_2$ | 4a | 89% |
| Mo(NC$_6$F$_5$)(CHCMe$_2$Ph)[OC(CF$_3$)$_3$]$_2$ | 5a | 69% |
| Mo(NC$_6$F$_5$)(CHCMe$_2$Ph)[OC(C$_6$F$_5$)$_3$]$_2$ | 6a | 92% |
| Mo(NC$_6$F$_5$)(CHCMe$_2$Ph)(ODFT)$_2$ | 7a | 84% |
| W(NC$_6$F$_5$)$_2$Cl$_2$(DME) | 1b | 96% |
| W(NC$_6$F$_5$)$_2$(CH$_2$-t-Bu)$_2$ | 2b | 89% |
| [W(NC$_6$F$_5$)(CH-t-Bu)(—DME)(OTf)$_2$]$_x$ | 3b | 81% |
| W(NC$_6$F$_5$)(CH-t-Bu)(DME)(Pyr)$_2$ | 4b | 71% |
| W(NC$_6$F$_5$)(CH-t-Bu)(DME)[OC(CF$_3$)$_3$]$_2$ | 5b | 57% |
| W(NC$_6$F$_5$)(CH-t-Bu)[OC(C$_6$F$_5$)$_3$]$_2$ | 6b | 78% |
| W(NC$_6$F$_5$)(CH-t-Bu)(ODFT)$_2$ | 7b | 66% |
| W(NC$_6$F$_5$)(CH$_2$CH$_2$CH$_2$)[OC(CF$_3$)$_3$]$_2$ | 8b | 92% |

Treatment of 3a with two equivalents LiMe$_2$Pyr at −30° C. in toluene gave the bisdimethylpyrrolide complex Mo(NC$_6$F$_5$)(CHCMe$_2$Ph)(Me$_2$Pyr)$_2$ (4a) as essentially the only product in 89% yield (equation 3; only one bistriflate isomer is shown). Analytically pure dark red-orange 4a could be obtained in 53% isolated yield from pentane. NMR spectra of 4a are temperature dependent with broad pyrrolide resonances at room temperature as a consequence of interconversion of η$^1$- and η$^5$-pyrrolides on the NMR time scale (Marinescu, S. C.; Singh, R.; Hock, A. S.; Wampler, K. M.; Schrock, R. R.; Müller, P. *Organometallics* 2008, 27, 6570). A similar reaction between 3b and two equivalents of LiPyr yields 4b (eq 3) in 71% yield; NMR data for 4b are consistent with its structure being analogous to that of W(NAr)(CHCMe$_2$Ph)(Pyr)$_2$(DME) (Kreickmann, T.; Arndt, S.; Schrock, R. R.; Müller, P. *Organometallics* 2007, 26, 5702).

Bisalkoxides were prepared from the bistriflates in a manner analogous to that shown in equation 3. These include Mo(NC$_6$F$_5$)(CHCMe$_2$Ph)[OC(CF$_3$)$_3$]$_2$ (5a), W(NC$_6$F$_5$)(CH-t-Bu)(DME)[OC(CF$_3$)$_3$]$_2$ (5b), Mo(NC$_6$F$_5$)(CHCMe$_2$Ph)[OC(C$_6$F$_5$)$_3$]$_2$ (6a), W(NC$_6$F$_5$)(CH-t-Bu)[OC(C$_6$F$_5$)$_3$]$_2$ (6b), Mo(NC$_6$F$_5$)(CHCMe$_2$Ph)(ODFT)$_2$ (7a), and W(NC$_6$F$_5$)(CH-t-Bu)(ODFT)$_2$ (7b).

Figure 1:
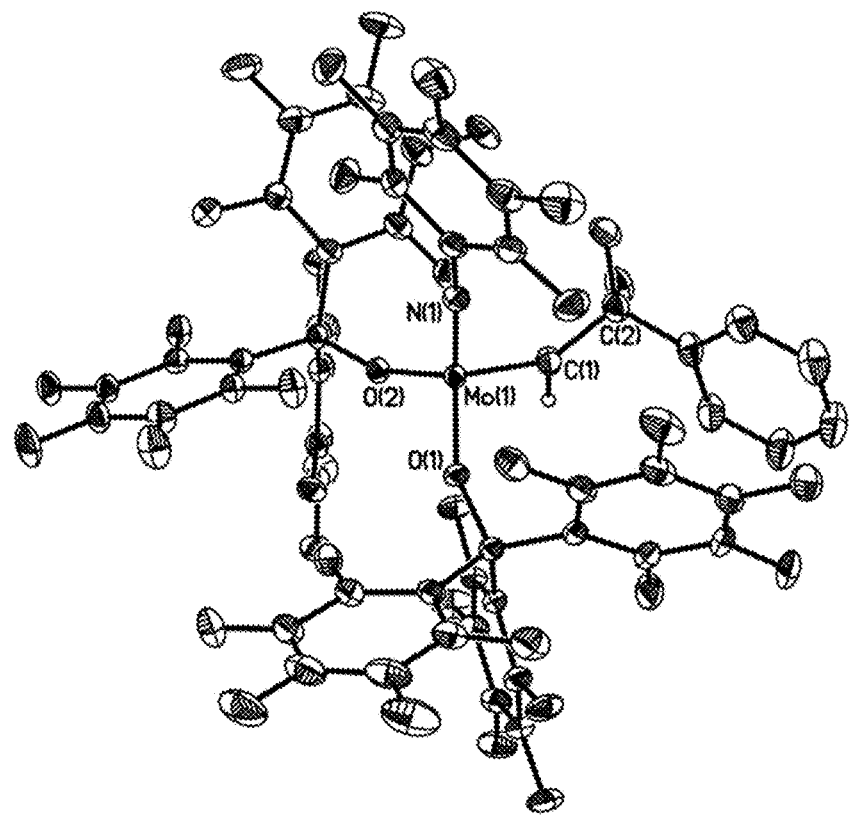
FIG. 1. Thermal ellipsoid drawing (50%) of 6a. Atoms for the minor component of the disorders have been omitted for clarity. Selected bond lengths [Å] and angles [°]: Mo(1)-N(1) 1.7172(16), Mo(1)-O(1) 1.9022(13), Mo(1)-O(2) 1.9212(11), Mo(1)-C(1) 1.896(2), Mo(1)-O(2)-C(41) 152.85(12), Mo(1)-O(1)-C(21) 153.24(12), Mo(1)-N(1)-C(11) 168.31(15), Mo(1)-C(1)-C(2) 142.98(15).

A drawing of the structure of 6a, as determined in an X-ray study, is shown in FIG. 1. The neophylidene is in the syn conformation, as expected. Bond distances and angles are not unusual.

Figure 2:
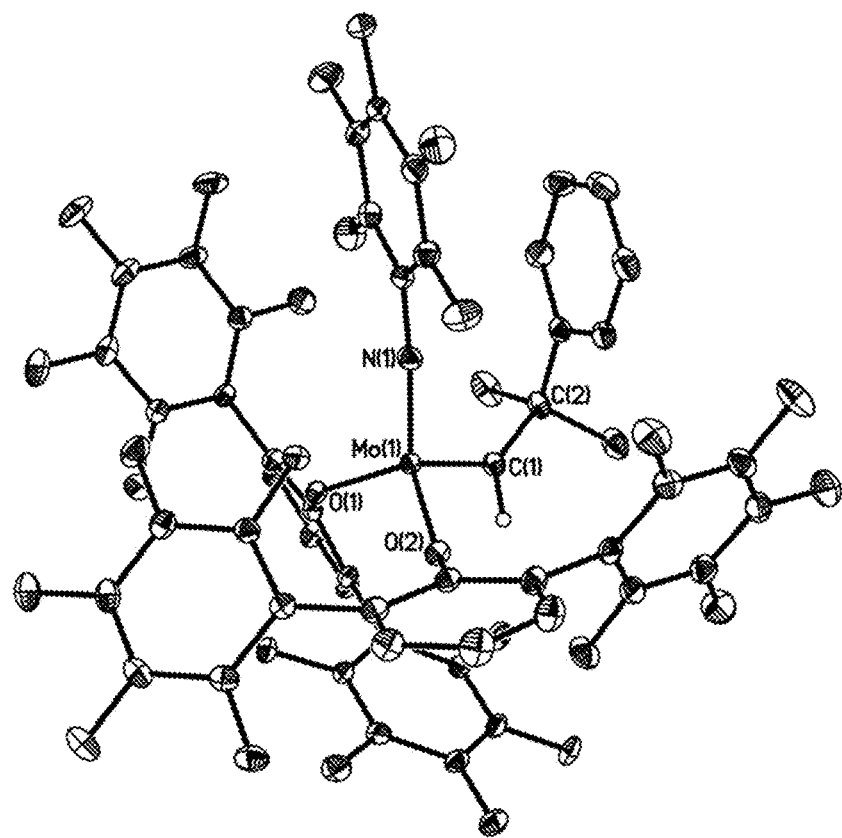
FIG. 2. Thermal ellipsoid drawing (50%) of 7a. Selected bond lengths [Å] and angles [°]: Mo(1)-N(1) 1.7316(10), Mo(1)-O(1) 1.9403(8), Mo(1)-O(2) 1.9250(8), Mo(1)-C(1) 1.8840(11), Mo(1)-O(2)-C(41) 146.97(7), Mo(1)-O(1)-C(21) 130.32(6), Mo(1)-N(1)-C(11) 169.18(9), Mo(1)-C(1)-C(2) 138.20(9).

The structure of 7a is illustrated in FIG. 2. While not wishing to be bound by theory, a relatively small Mo(1)-O(1)-C(21) angle of 130.32(6)° and a N(1)-Mo(1)-C(1)-C(2) dihedral angle of 13.5° (with C(2) tipped back in the view in FIG. 2 seem to result from steric interactions that can be traced to the two pentafluorophenyl rings in the DIFTO ligand that contains O(2); examination of the fluorine NMR spectrum of 7a at −80° C. suggests that in the DFTO ligands the ortho fluorines (8), the meta fluorines (8), and the para fluorines (4) are all inequivalent on the NMR time scale, consistent with the structure shown in FIG. 2. At room temperature and up to 100° C. one para, two meta, and two ortho fluorine resonances are found, consistent with equilibration of the two DFTO ligands, slow rotation on the NMR time scale of the pentafluorophenyl rings about the C—C bond to the central phenyl ring, as one might expect, and free rotation about the Mo—O bonds.

Figure 3:
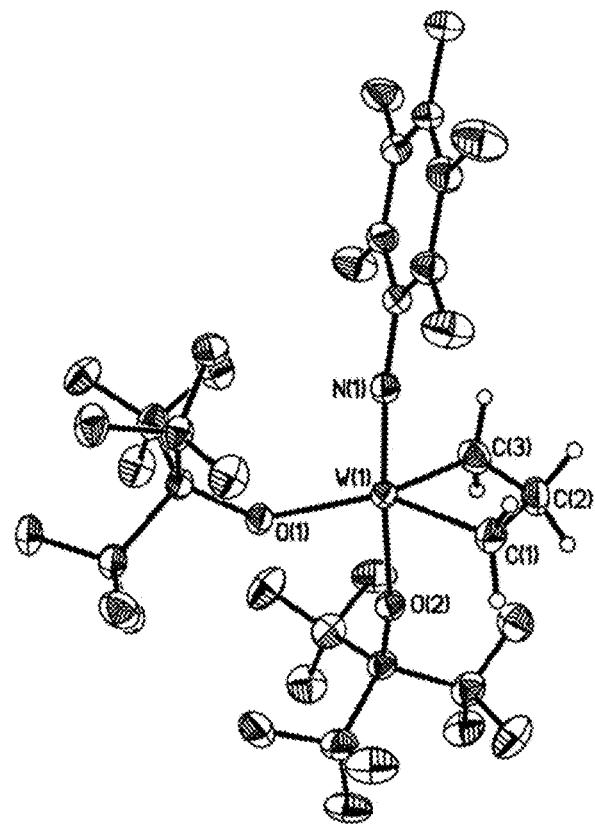
FIG. 3. Thermal ellipsoid drawing (50%) of 8b. Atoms for the minor component of the disorders have been omitted for clarity. Selected bond lengths [Å] and angles [°]: W(1)-N(1) 1.7502(18), W(1)-O(1) 1.9514(14), W(1)-O(2) 1.9785(15), W(1)-C(1) 2.041(2), W(1)-C(2) 2.349(2), W(1)-C(3) 2.065

Treatment of a sample of 5b in pentane with ethylene (1 atm) led to white 8b (92%) after one day. A $^{13}$C-labelled version was also prepared. All NMR data are consistent with 8b being a TBP metallacyclobutane complex that contains an equatorial metallacyclobutane ring. An X-ray study (FIG. 3) showed 8b to have a structure analogous to other TBP bisalkoxide imido complexes of tungsten (Feldman J.; Schrock, R. R. *Prog. Inorg. Chem.* 1991, 39, 1) with a relatively short W(1)-C(2) distance (2.349(2) Å) and characteristic angles within the ring (C(1)-W(1)-C(3)=84.09(10), C(1)-C(2)-C(3)=118.10(18), W(1)-C(1)-C(2)=79.25(13), W(1)-C(3)-C(2)=78.55(13)). An intermediate TBP metallacycle that contains a t-butyl group in the a position could be observed in NMR spectra, but could not be isolated in pure form. Compound 8b is unstable in the absence of ethylene at 100° C., but is relatively stable at room temperature.

Several of the new Mo and W imido alkylidene complexes were screened for alkane metathesis activity ((a) Goldman, A. S.; Roy, A. H.; Huang, Z.; Ahuja, R.; Schinski, W.; Brookhart, M. *Science* 2006, 312, 257. (b) Bailey, B. C.; Schrock, R. R.; Kundu, S.; Goldman, A. S.; Huang, Z.; Brookhart, M. *Organometallics* 2009, 27, 355. (c) Huang, Z.; Rolfe, E.; Carson, E. C.; Brookhart, M.; Goldman, A. S.; El-Khalafy, S. H.; MacArthur, A. H. R., *Adv. Synth. Catal.*, 2010, 352, 125). Table 2 showed the results.

TABLE 2

Total product concentration (mM) in metathesis of octane.[a]

| Compound | mM |
|---|---|
| Mo(NC$_6$F$_5$)(CHCMe$_2$Ph)[OC(CF$_3$)$_3$]$_2$ (5a) | 120 |
| W(NC$_6$F$_5$)(CH-t-Bu)[OC(C$_6$F$_5$)$_3$]$_2$ (6b) | 0 |
| Mo(NC$_6$F$_5$)(CHCMe$_2$Ph)(DFTO)$_2$ (7a) | 0 |
| W(NC$_6$F$_5$)(CH-t-Bu)(DFTO)$_2$ (7b) | 40 |
| W(NC$_6$F$_5$)(CH$_2$CH$_2$CH$_2$)[OC(CF$_3$)$_3$]$_2$ (8b) | 60 |
| W(NAr)(CHCMe$_2$Ph)[OC(CF$_3$)$_3$]$_2$[b] | 2260 |
| W(NAr)(CHCMe$_2$Ph)(OSiPh$_3$)$_2$[b] | 2770 |

[a]Conditions: 125° C., 4 days in J. Young tubes; 16 mM metathesis catalyst, 10 mM (POCOP)Ir(C$_2$H$_4$), and 28.8 mM mesitylene (internal standard). See SI for details.
[b]Ar = 2,6-diisopropylphenyl.

We found unusual olefin metathesis activity with provided compounds at room temperature. 100 equivalents of 2,3-dicarbomethoxynorbornadiene (DCMNBD) are polymerized by 7a or 7b to give poly(DCMNBD) with a structure that is >99% cis,isotactic, behavior that has been matched by biphenolate and binaphtholate imido alkylidene initiators, but not bisalkoxide complexes that contain achiral alkoxides ((a) Buchmeiser, M. R. *Chem. Rev.* 2000, 100, 1565. (b) Bielawski, C. W.; Grubbs, R. H. *Prog. Poly. Sci.*, 2007, 32, 1. (c) Smith, D.; Pentzer, E. B.; Nguyen, S. T. *Polym. Rev.*, 2007, 47, 419. (d) Schrock, R. R. *Dalton Trans.* 2011, 40, 7484). DCMNBD is polymerized by 6a to give 90% cis polymer which is not highly tactic while DCMNBD did not react with 8b in experiments conducted so far.

General Comments.

All manipulations were conducted under a nitrogen atmosphere in a Vacuum Atmospheres drybox or using Schlenk techniques. All glassware was oven-dried prior to use. Ether, pentane, toluene, dichloromethane, toluene, and benzene were degassed with dinitrogen and passed through activated alumina columns under nitrogen. All dried and deoxygenated solvents were stored over molecular sieves in a nitrogen or argon-filled glovebox. NMR spectra were recorded on a Varian 500 MHz spectrometer at room temperature. Chemical shifts for $^1$H spectra were referenced to the residual 1H resonances of the deuterated solvent (C$_6$D$_6$ δ 7.16 ppm; CDCl$_3$ δ 7.26 ppm) and are reported as parts per million relative to tetramethylsilane. The following abbreviations refer to the multiplicity: s=singlet, d=doublet, t=triplet, m=multiplet, br=broad. Mo(NC$_6$F$_5$)$_2$Cl$_2$(DME) (Fox, H. H.; Yap, K. B.; Robbins, J.; Cai, S.; Schrock, R. R. *Inorg. Chem.* 1992, 31, 2287), 1-MeO-2,6-[B(OH)$_2$]$_2$C$_6$H$_3$ (Dabrowski, M.; Lulinski, S.; Serwatowski, J. *Acta Cryst.* 2008, E64, o414-o415) and HOC(C$_6$F$_5$)$_3$ (Vorozhtsov, N. N.; Barkhash, V. A.; Gerasimova, T. N.; Lokshina, E. G.; Ivanova, N. G. *Zhurnal Obshchei Khimii*, 1967, vol. 37, p. 1225-1227) were prepared as described.

1-MeO-2,6-$(C_6F_5)_2$—$C_6H_3$.

1-MeO-2,6-$[B(OH)_2]_2$—$C_6H_3$ (700 mg, 3.58 mmol), Pd(PPh$_3$)$_4$ (165 mg, 0.143 mmol) and K$_2$CO$_3$ (2.47 g, 17.9 mmol) were suspended in a mixture of toluene (12 mL) and ethanol (8 mL). C$_6$F$_5$Br (1.33 mL, 10.73 mmol) was added at room temperature. After refluxing for 1 day, the mixture was cooled to room temperature and filtered through silica plug and washed with CH$_2$Cl$_2$. Removal of the solvent gave a light yellow oil that was dissolved in a mixture of CH$_2$Cl$_2$ and hexane; colorless crystals formed at −35° C.; yield 1.021 g (65%): $^1$H NMR (300 MHz, acetone-d$_6$, 20° C.) δ 7.63 (d, $^3J_{HH}$=5 Hz, 2H), 7.48 (t, $^3J_{HH}$=5 Hz, 1H), 3.38 (s, 3H, Me); $^{19}$F NMR (282 MHz, acetone-d$_6$, 20° C.) δ −141.9 (m, 4F, o-F), −157.6 (t, $^3J_{FF}$=21 Hz, 2F, p-F), −165.0 (m, 4F, m-F); $^{13}$C{$^1$H}NMR (125 MHz, acetone-d$_6$, 20° C.) δ 158.3 (s, 1C), 145.8 (d, $^1J_{CF}$=298 Hz, 4C), 142.1 (d, $^1J_{CF}$=252 Hz, 2C), 138.8 (d, $^1J_{CF}$=250 Hz, 4C), 128.6 (s, 2C), 125.4 (s, 1C), 121.6 (s, 2C), 113.5 (t, $^2J_{CF}$=19 Hz, 2C). HRMS (ESI/[M+Na]$^+$) Calcd for C$_{19}$H$_6$F$_{10}$NaO: 643.0151. Found: 643.0149.

HO-2,6-$(C_6F_5)_2$—$C_6H_3$.

1-MeO-2,6-$(C_6F_5)_2C_6H_3$ (552 mg, 1.25 mmol) was dissolved in CH$_2$Cl$_2$ (20 mL). BBr$_3$ (0.238 mL, 2.51 mmol) was added at 0° C. The mixture was warmed up to room temperature. After 16 hours, water (10 mL) was added to quench the reaction. The organic layer was separated from the aqueous layer and the aqueous layer was extracted with diethyl ether. The organic parts were combined and dried with MgSO$_4$. Removal of the solvent in vacuo gave a white solid that was recrystallized from hexanes to give colorless crystals; yield 482 mg (90%): $^1$H NMR (300 MHz, CDCl$_3$, 20° C.) δ 7.42 (d, $^3J_{HH}$=8 Hz, 2H), 7.28 (t, $^3J_{HH}$=7 Hz, 1H), 4.92 (br, 1H, OH); $^{19}$F NMR (282 MHz, CDCl$_3$, 20° C.) δ −139.9 (m, 4F, o-F), −154.3 (t, $^3J_{FF}$=21 Hz, 2F, p-F), −165.0 (m, 4F, m-F); $^{13}$C{$^1$H}NMR (125 MHz, CDCl$_3$, 20° C.) δ 151.3 (s, 1C), 145.0 (d, $^1J_{CF}$=250 Hz, 4C), 141.4 (d, $^1J_{CF}$=242 Hz, 2C), 138.2 (d, $^1J_{CF}$=253 Hz, 4C), 133.6 (s, 2C), 121.7 (s, 1C), 115.0 (s, 2C), 111.2 (t, $^2J_{CF}$=19 Hz, 2C). Anal. Calcd for C$_{14}$H$_4$F$_{10}$O: C, 50.72; H, 0.95. Found: C, 50.96; H, 1.06.

W(NC$_6$F$_5$)$_2$Cl$_2$(DME) (1b).

WO$_2$Cl$_2$(DME) (10.00 g, 26.53 mmol) was dissolved in DME (50 mL). C$_6$F$_5$NSO (14.60 g, 61.03 mmol) and toluene (50 mL) were added. The mixture was refluxed as nitrogen was passed through the solution. After two days, the dark yellow mixture was cooled to room temperature and the solvent was removed in vacuo to give a dark yellow oil. Pentane (10 mL) was added and the mixture was stirred at room temperature for 30 min to give a yellow precipitate. The mixture was filtered and the solid was washed with pentane; yield 18.05 g (96%): $^1$H NMR (300 MHz, C$_6$D$_6$, 20° C.) δ 3.59 (s, 6H, CH$_3$), 3.03 (s, 4H, CH$_2$); $^{19}$F NMR (282 MHz, C$_6$D$_6$, 20° C.) δ −149.5 (dm, $^3J_{FF}$=22 Hz, 2F, o-F), −158.1 (t, $^3J_{FF}$=22 Hz, 1F, p-F), −164.4 (t, $^3J_{FF}$=22 Hz, 2F, m-F); $^{13}$C{$^1$H}NMR (125 MHz, C$_6$D$_6$, 20° C.) δ 144.5 (d, $^2J_{CF}$=244 Hz, 2C), 140.2 (d, $^2J_{CF}$=244 Hz, 1C), 137.0 (d, $^2J_{CF}$=250 Hz, 2C), 71.5 (s, 2C), 65.0 (s, 2C). Anal. Calcd for C$_{16}$H$_{10}$Cl$_2$F$_{10}$N$_2$O$_2$W: C, 27.18; H, 1.43; N, 3.96. Found: C, 27.15; H, 1.44; N, 3.80.

W(NC$_6$F$_5$)$_2$(CH$_2$-t-Bu)$_2$ (2b).

W(NC$_6$F$_5$)$_2$Cl$_2$(DME) (10.00 g, 14.14 mmol) was suspended in Et$_2$O (200 mL) and the mixture was cooled to −30° C. ClMg(CH$_2$-t-Bu) (12.3 mL, 28.28 mmol, 2.32M) was added at −30° C. The mixture was warmed up to room temperature at which point much precipitate formed. After one hour, the mixture was filtered through Celite and the solid was washed with toluene. The solvent was removed from the filtrate in vacuo to give dark yellow oil. Pentane (50 mL) was added to the oily product. The solution was stirred for 1 hour and the mixture was cooled in fridge overnight. The solvent was removed in vacuo and the yellow solid was dried under vacuum; yield 8.66 g (89%): $^1$H NMR (300 MHz, C$_6$D$_6$, 20° C.) δ 1.90 (s, 4H, CH$_2$), 1.09 (s, 18H, $^t$Bu); $^{19}$F NMR (282 MHz, C$_6$D$_6$, 20° C.) δ −150.7 (dm, $^3J_{FF}$=24 Hz, 2F, o-F), −160.6 (t, $^3J_{FF}$=24 Hz, 1F, p-F), −164.3 (t, $^3J_{FF}$=24 Hz, 2F, m-F); $^{13}$C{$^1$H}NMR (125 MHz, C$_6$D$_6$, 20° C.) δ 142.5 (d, $^1J_{CF}$=244 Hz, 2C), 138.6 (d, $^1J_{CF}$=252 Hz, 1C), 137.6 (d, $^1J_{CF}$=250 Hz, 2C), 96.2 (s, 2C, CH$_2$), 36.6 (s, 2C, CMe$_3$), 33.8 (s, 6C, Me). Yellow crystals were obtained upon recrystallization in a mixture of DME and pentane to give W(NC$_6$F$_5$)$_2$(CH$_2$-t-Bu)$_2$ that contained 0.5 equivalent of DME according to NMR spectra. Anal. Calcd for C$_{24}$H$_{27}$F$_{10}$N$_2$OW: C, 39.31; H, 3.71; N, 3.82. Found: C, 39.29; H, 3.54; N, 3.72.

Mo(NC$_6$F$_5$)(CHCMe$_2$Ph)(DME)(OTf)$_2$ (3a).

Mo(NC$_6$F$_5$)$_2$(DME)Cl$_2$ (6.50 g, 10.50 mmol) was suspended in Et$_2$O (100 mL). ClMgCHCMe$_2$Ph (0.5 M, 42.0 mL, 21.0 mmol) was added at −30° C. After stirring at room temperature for 2 hours, the mixture was filtered and the solvent was evaporated to give a dark oil. Pentane (80 mL) was added and the mixture was stirred overnight. The yellow solid was filtered off and the solvent was removed to give Mo(NC$_6$F$_5$)$_2$(CH$_2$CMe$_2$Ph)$_2$ as a dark reddish oil (2a): $^1$H NMR (500 Hz, C$_6$D$_6$, 20° C.) δ 7.23 (d, 4H, $^3$J=8 Hz, o-Ar), 7.05 (t, 4H, $^3$J=8 Hz, m-Ar), 6.90 (t, 2H, $^3$J=8 Hz, p-Ar), 3.24 (q, 4H, CH$_2$ of Et$_2$O), 1.93 (s, 4H, WCH$_2$), 1.36 (s, 12H, Me), 1.12 (t, 6H, CH$_3$ of Et$_2$O); $^{19}$F NMR (282 Hz, C$_6$D$_6$, 20° C.) δ −149.7 (m, 4F, o-Ar), −160.0 (m, 2F, p-Ar), −164.5 (m, 4F, m-Ar). The dark reddish oil was dissolved in Et$_2$O (100 mL) and HOTf (2.79 mL, 31.5 mmol) was added at −30° C. The mixture was warmed up to room temperature and stirred for 16 hours. The solvent was removed in vacuo and the residue was extracted with CH$_2$Cl$_2$ (3×30 mL). Evaporation of solvent gave a dark brown oil. Pentane (50 mL) was added and the mixture was stirred for 1 hour to give a yellow precipitate that was filtered off, washed with Et$_2$O (3×20 mL), and dried in vacuo to give a light yellow solid; yield 5.39 g (64%). Anal. Calcd for C$_{22}$H$_{22}$F$_{10}$MoNO$_8$S$_2$: C, 33.13; H, 2.78; N, 1.76. Found: C, 32.99; H, 2.86; N, 1.72.

Trans isomer (major) $^1$H NMR (500 Hz, C$_6$D$_6$, 20° C.) δ 13.73 (s, 1H, Mo=CH), 7.54 (d, 2H, $^3$J=7.3 Hz, o-Ar), 6.97 (t, 2H, $^3$J=7.5 Hz, m-Ar), 6.60 (t, 1H, $^3$J=7.4 Hz, p-Ar), 3.34 (s, 4H, OCH$_2$), 3.03 (s, 6H, OMe), 1.61 (s, 6H, CMe$_2$); $^{19}$F NMR (282 Hz, C$_6$D$_6$, 20° C.) δ −77.2 (s, 6F, CF$_3$), −141.1 (d, $^3J_{FF}$=19 Hz, 2F, o-Ar), −149.9 (t, $^3J_{FF}$=21 Hz, 1F, p-Ar), −162.1 (t, $^3J_{FF}$=21 Hz, 2F, m-Ar); $^{13}$C{$^1$H}NMR (125 Hz, C$_6$D$_6$, 20° C.) δ 326.6 (s, Mo=C), 146.0 (dd, $^1J_{CF}$=261 Hz, $^2J_{CF}$=13 Hz, o-Ar$_F$), 142.1 (dt, $^1J_{CF}$=261 Hz, $^2J_{CF}$=13 Hz, p-Ar$_F$), 137.0 (dt, 1J$_{CF}$=261 Hz, $^2J_{CF}$=13 Hz, m-Ar$_F$), 128.4, 128.3, 127.9, 126.6, 120.0 (q, 1J$_{CF}$=319 Hz), 73.9 (OCH$_2$), 69.7 (OMe), 58.9 (CMe$_2$), 29.6 (CMe$_2$).

Cis isomer (minor) $^1$H NMR (500 Hz, C$_6$D$_6$, 20° C.) δ 14.98 (s, 1H, Mo=CH), 7.40 (d, 2H, $^3$J=8 Hz, o-Ar), 6.91 (t, 2H, $^3$J=7.7 Hz, m-Ar), 6.60 (t, 1H, $^3$J=7.4 Hz, p-Ar), 3.31 (s, 4H, OCH$_2$), 2.91 (s, 6H, OMe), 1.71 (s, 6H, CMe$_2$); $^{19}$F NMR (282 Hz, C$_6$D$_6$, 20° C.) δ −77.1 (s, 3F, CF$_3$), −77.98 (s, 3F, CF$_3$), −143.8 (d, $^3J_{FF}$=20 Hz, 2F, o-Ar), −151.6 (t, $^3J_{FF}$=21 Hz, 1F, p-Ar), −161.9 (t, $^3J_{FF}$=21 Hz, 2F, m-Ar); $^{13}$C{$^1$H}NMR (125 Hz, C$_6$D$_6$, 20° C.) δ 336.1 (s, Mo=C), 145.5 (d, $^1J_{CF}$=261 Hz, o-Ar$_F$), 141.6 (d, $^1J_{CF}$=261 Hz, p-Ar$_F$), 137.1 (d, $^1J_{CF}$=261 Hz, m-Ar$_F$), 128.5, 128.3, 127.4, 120.4 (q, $^1J_{CF}$=319 Hz), 73.6 (OCH$_2$), 69.4 (OMe), 59.0 (CMe$_2$), 29.2 (CMe$_2$).

[W(NC$_6$F$_5$)(CH-t-Bu)(p-DME)(OTf)$_2$]$_x$ (3b).

W(NC$_6$F$_5$)$_2$(CH$_2$-t-Bu)$_2$ (8.50 g, 12.35 mmol) was dissolved in a mixture of Et$_2$O (10 mL), and DME (2 mL), and the mixture was cooled to −30° C. HOTf (3.80 g, 24.70 mmol) was added at −30° C. After 5 min, an ivory colored solid precipitated. The mixture was warmed up to room temperature and after 1 hour was filtered. The solid was washed with pentane (10 mL) and Et$_2$O (4 mL) and dried in vacuo to give an ivory color solid (8.26 g, 81% yield). The product is slightly soluble in Et$_2$O, pentane, CH$_2$Cl$_2$, DME, benzene, and very soluble in THF. Anal. Calcd for C$_{17}$H$_{20}$F$_{11}$NO$_8$S$_2$W: C, 24.80; H, 2.45; N, 1.70. Found: C, 24.84; H, 2.41; N, 1.69.

The ivory-colored solid was dissolved in THF and solvent was removed in vacuo to give the THF adduct W(NC$_6$F$_5$)(CH-t-Bu)(THF)$_2$(OTf)$_2$ as a mixture of trans and cis isomers in a ratio of 10:1. A proton NMR spectrum in THF-d$_8$ showed that one equivalent per W of free dme is formed. Major (trans OTfs): $^1$H NMR (300 MHz, C$_6$D$_6$, 20° C.) δ 10.64 (s, 1H, W=CH), 3.65 (br, 8H, THF), 1.62 (s, 9H, $^t$Bu), 1.26 (br, 8H, THF); $^{19}$F NMR (282 MHz, C$_6$D$_6$, 20° C.) δ −77.0 (t, J$_{FF}$=4 Hz, 6F, OTf), −144.1 (dm, $^3J_{FF}$=22 Hz, 2F, o-F), −153.5 (t, $^3J_{FF}$=22 Hz, 1F, p-F), −162.4 (tm, $^3J_{FF}$=22 Hz, 2F, m-F); $^{13}$C{$^1$H}NMR (125 Hz, C$_6$D$_6$, 20° C.) δ 305.5 (br, Mo=C), 120.6 (q, $^2J_{CF}$=318 Hz, OTf). Other resonances are broad at room temperature and were not assigned. Minor product of W(NC$_6$F$_5$)(CH-t-Bu)(THF)$_2$(OTf)$_2$ (cis OTfs): $^1$H NMR (300 MHz, C$_6$D$_6$, 20° C.) δ 11.72 (s, 1H, W=CH); the other peaks overlaped with the major product; $^{19}$F NMR (282 MHz, C$_6$D$_6$, 20° C.) δ −76.8 (s, 3F, OTf), −77.9 (s, 3F, OTf), −147.2 (dm, $^3J_{FF}$=22 Hz, 2F, o-F), −154.5 (t, $^3J_{FF}$=22 Hz, 1F, p-F), −161.9 (tm, $^3J_{FF}$=22 Hz, 2F, m-F). Recrystallization of 3b from a mixture of THF and pentane gave yellow crystals whose proton NMR spectrum is consistent with the formula W(NC$_6$F$_5$)(CH-t-Bu)(DME)$_{0.5}$(THF)(OTf)$_2$. Anal. Calcd for C$_{64}$H$_{87}$N$_3$OW: C, 26.78; H, 2.72; N, 1.65. Found: C, 26.82; H, 2.76; N, 1.62.

Mo(NC$_6$F$_5$)(CHCMe$_2$Ph)(Me$_2$Pyr)$_2$ (4a).

Mo(NC$_6$F$_5$)(CHCMe$_2$Ph)(DME) (OTf)$_2$ (1.50 g, 1.88 mmol) was suspended in toluene (50 mL). LiMe$_2$Pyr (418 mg, 4.14 mmol) was added at −30° C. The mixture was warmed up to room temperature and the color turned dark red. After 30 min, the solvent was removed in vacuo and the residue was extracted with CH$_2$Cl$_2$. Removal of the solvent in vacuo left the product as a dark foam. Recrystallization from CH$_2$Cl$_2$/pentane gave a reddish-orange solid (612 mg, 53%); the solvent was evaporated from the filtrate to recover the remaining product as a foam (418 mg, 36%): $^1$H NMR (500 Hz, C$_6$D$_6$, 20° C.) δ 13.01 (s, 1H, Mo=CH), 7.12 (d, 2H, $^3$J=7.2 Hz, o-Ar), 6.82 (t, 2H, $^3$J=7.4 Hz, m-Ar), 6.74 (t, 1H, $^3$J=7.1 Hz, p-Ar), 5.94 (br, 4H, Pyr), 2.11 (br, 12H, Me$_2$Pyr), 1.41 (s, 6H, CMe$_2$Ph); $^{19}$F NMR (282 Hz, C$_6$D$_6$, 20° C.) δ −146.1 (d, $^3J_{FF}$=28 Hz, 2F, o-Ar), −157.6 (t, $^3J_{FF}$=21 Hz, 1F, p-Ar), −163.9 (t, $^3J_{FF}$=21 Hz, 2F, m-Ar). Anal. Calcd for C$_{28}$H$_{28}$F$_5$MoN$_3$: C, 56.29; H, 4.72; N, 7.03. Found: C, 56.04; H, 4.83; N, 7.02.

W(NC$_6$F$_5$)(CH-t-Bu)(Pyr)$_2$(dme) (4b).

W(NC$_6$F$_5$)(CH-t-Bu)(DME)(OTf)$_2$ (915 mg, 1.11 mmol) was added to a 20 mL scintillation vial. Toluene (5 mL) and DME (5 mL) were added and the suspension was cooled to −25° C. A DME (2 mL) solution of lithium pyrrolide (162 mg, 2.22 mmol) that had been cooled to −25° C. was added dropwise and the mixture was allowed to warm to room temperature. The yellow-orange suspension became a homogeneous red solution. The mixture was stirred for 30 min and the volatiles were removed in vacuo. The residue was taken up in benzene and the mixture was filtered through Celite. The volatiles were removed from the filtrate in vacuo and the resulting residue was triturated with Et$_2$O to afford an orange solid; yield 516 mg (71%): $^1$H NMR (600 MHz, C$_6$D$_6$, 20° C.) δ 10.25 (br s, 1H, W=CH), 6.97 (br s, 4H, pyr), 6.57 (br s, 4H, pyr), 3.01 (s, 6H, MeO), 2.39 (s, 4H, CH$_2$O), 1.35 (s, 9H, $^t$Bu); $^{19}$F NMR (282 MHz, C$_6$D$_6$) δ −146.23 (d, $^3J_{FF}$=18.2 Hz, 2F, o-F), −158.34 (t, $^3J_{FF}$=22.1 Hz, 1F, p-F), −163.10 (t, $^3J_{FF}$=20.0 Hz, 2F, m-F); $^{13}$C{$^1$H}NMR (125 MHz, C$_6$D$_6$) δ 283.76 ($^1J_{WC}$=181.4 Hz, WCH), 144.64 (d, $^1J_{CF}$=254.8 Hz, Ar—F), 140.33 (m, Ar—F), 138.43 (m, Ar—F), 136.45 (m, Ar—F), 134.30, 131.21 (m, Ar—F), 109.23, 71.59, 60.89, 46.47, 33.40. Recrystallization of 4b from a mixture of DME and pentane gave yellow crystals whose proton NMR spectrum is consistent with the formula W(NC$_6$F$_5$)(CH-t-Bu)(dme)$_{1.5}$(Pyr)$_2$. Anal. Calcd for C$_{25}$H$_{33}$F$_5$N$_3$O$_3$W: C, 42.75; H, 4.74; N, 5.98. Found: C, 42.49; H, 4.82; N, 6.01.

Mo(NC$_6$F$_5$)(CHCMe$_2$Ph)[OC(CF$_3$)$_3$]$_2$(DME)$_{0.5}$ (5a).

Mo(NC$_6$F$_5$)(CHCMe$_2$Ph) (DME)(OTf)$_2$ (100 mg, 0.125 mmol) was dissolved in Et$_2$O (4 mL) and the solution was cooled to −30° C. LiOC(CF$_3$)$_3$ (76 mg, 0.313 mmol) was added at −30° C. The mixture was warmed up to room temperature. After 1 hour, the solvent was removed in vacuo and the residue was extracted with pentane. The solution was concentrated to 0.5 mL and cooled to −30° C. overnight to give orange solid; yield 71 mg (64%): $^1$H NMR (500 MHz, C$_6$D$_6$) δ 10.92 (br s, 1H, Mo=CH), 7.30-7.40 (m, 5H, Ar), 3.67 (br s, 2H, CH$_2$O), 3.30 (br s, 3H, OCH$_3$), 1.29 (s, 6H, CMe$_2$Ph); $^{19}$F NMR (282 MHz, C$_6$D$_6$) δ −74.12 (br s, 18F, —OC(CF$_3$)$_3$, −155.25 (br s, 2F), −163.40 (br s, 2F). The resonance for the para-fluoride on the NC$_6$F$_5$ ring cannot be observed at room temperature. Anal. Calcd for C$_{28}$H$_{21}$F$_{23}$MoNO: C, 36.54; H, 2.30; N, 1.52. Found: C, 36.34; H, 2.49; N, 1.42.

W(NC$_6$F$_5$)(CH-t-Bu)[OC(CF$_3$)$_3$]$_2$(DME) (5b).

W(NC$_6$F$_5$)(CH-t-Bu)(DME) (OTf)$_2$ (477 mg, 0.579 mmol), DME (3 mL) and Et$_2$O (3 mL) were added to a 20 mL scintillation vial and cooled to −25° C. A −25° C. solution of LiOC(CF$_3$)$_3$ (287 mg, 1.18 mmol) in Et$_2$O (4 mL) was added dropwise to the stirred suspension and the mixture was allowed to warm to room temperature. After 6 hours the volatiles were removed in vacuo. Pentane (300 mL) was added to the remaining residue and the mixture was stirred 1 hour. The suspension was filtered through Celite and the filtrate was reduced in vacuo to provide a bright yellow solid. The crude material was washed with pentane (−25° C.) to provide the pure product as a yellow-orange solid; yield 497 mg (86%): $^1$H NMR (600 MHz, C$_6$D$_6$) δ 10.63 (br s, 1H, W=CH), 3.23 (s, 6H, MeO), 2.63 (s, 4H, CH$_2$O), 1.26 (s, 9H, $^t$Bu); $^{19}$F NMR (282 MHz, C$_6$D$_6$) δ −72.10 (s, 18F, —OC(CF$_3$)$_3$), −147.24 (m, 2F, o-F), −157.52 (m, 1F, p-F), −162.84 (m, 2F, m-F); $^{13}$C{$^1$H}NMR (126 MHz, CD$_2$Cl$_2$) δ 145.68 (d, $^1J_{CF}$=252.6 Hz, Ar—F), 141.07, 139.05, 136.99, 130.86, 121.84 (q, $^1J_{CF}$=292.5 Hz, CCF$_3$), 72.99, 46.19, 34.01. The alkylidene carbon resonance was not observed, presumably due to fluxionality arising from the lability of DME in solution. Anal. Calcd. for C$_{23}$H$_{20}$F$_{23}$NO$_4$W: C, 27.76; H, 2.03; N, 1.41. Found: C, 27.51; H, 1.95; N, 1.41.

Mo(NC$_6$F$_5$)(CHCMe$_2$Ph)[OC(C$_6$F$_5$)$_3$]$_2$ (6a).

Mo(NC$_6$F$_5$)(CHCMe$_2$Ph)(DME) (OTf)$_2$ (100 mg, 0.125 mmol) was suspended in toluene (50 mL) and the solution was chilled at −30° C. LiOC(C$_6$F$_5$)$_3$ (148 mg, 0.276 mmol) was added to the stirred mixture, which was allowed to warm to room temperature over a period of 2 hours. The solvent was removed from the red-brown solution after two hours and the residue was extracted with pentane. Removal of the pentane from the extract in vacuo gave 175 mg (92%, 0.119 mmol) of a red-orange foam: $^1$H NMR (500 MHz, $C_6D_6$, 20° C.) δ 11.54 (s, 1H, Mo=CH), 7.38-7.00 (m, 5H, Ar), 1.31 (s, 6H, CMe$_2$Ph); $^{19}$F NMR (282 Hz, $C_6D_6$, 20° C.) δ −139.2 (d, $^3J$=16 Hz, 12F, o-Ar), −140.5 (d, $^3J_{FF}$=20 Hz, 2F, o-NAr), −151.9 (t, $^3J_{FF}$=25 Hz, 6F, p-Ar), −160.8 (t, $^3J_{FF}$=20 Hz, 1F, p-NAr), −161.3 (t, $^3J_{FF}$=21 Hz, 12F, m-Ar), −162.4 (t, $^3J_{FF}$=16 Hz, 2F, m-NAr); $^{13}$C{$^1$H}NMR (125 Hz, $C_6D_6$, 20° C.) δ 287.33 (Mo—CH), 147.40, 145.68 ($^1J_{CF}$=251 Hz, Ar), 145.32 ($^1J_{CF}$=251 Hz, NAr), 141.79 ($^1J_{CF}$=254 Hz, Ar), 141.00 ($^1J_{CF}$=257 Hz, NAr), 138.27 ($^1J_{CF}$=251 Hz, Ar), 137.51 ($^1J_{CF}$=254 Hz, NAr), 136.65, 131.56, 126.68, 125.88, 117.27, 84.07, 74.06, 30.19. Anal. Calcd for $C_{54}H_{12}F_{35}MoNO_2$: C, 45.18; H, 0.84; N, 0.98. Found: C, 45.31; H, 1.04; N, 0.71.

W(NC$_6$F$_5$)(CH-t-Bu)[OC(C$_6$F$_5$)$_3$]$_2$ (6b).

W(NC$_6$F$_5$)(CH-t-Bu)(DME)(OTf)$_2$ (245 mg, 0.355 mmol), Et$_2$O (1 mL) and pentane (4 mL) were added to a 20 mL scintillation vial and cooled to −30° C. A −30° C. solution of LiOC(C$_6$F$_5$)$_3$ (400 mg, 0.764 mmol) in Et$_2$O (4 mL) was added dropwise to the stirring suspension and the mixture was allowed to warm to room temperature. After 2 hours, the solvent was removed from the orange solution and the residue was extracted with pentane. Removal of the pentane in vacuo gave a yellow product; yield 412 mg (78%). Two isomers were observed in a ratio of 1.7:1. Major: $^1$H NMR (300 MHz, $C_6D_6$, 20° C.) δ 10.60 (s, 1H, W=CH), 1.46 (s, 9H, $^t$Bu); $^{19}$F NMR δ (282 MHz, $C_6D_6$, 20° C.) δ −140.9 (m, 2F, o-F), −151.4 (m, 1F, p-F), −161.3 (m, 2F, m-F). Minor: $^1$H NMR (300 MHz, $C_6D_6$, 20° C.) δ 11.72 (s, 1H, W=CH), 1.24 (s, 9H, $^t$Bu); $^{19}$F NMR 6 (282 MHz, $C_6D_6$, 20° C.) δ −144.8 (m, 2F, o-F), −152.7 (m, 1F, p-F), −161.9 (m, 2F, m-F). Anal. Calcd. for $C_{49}H_{10}F_{35}NO_2W$: C, 39.41; H, 0.67; N, 0.94. Found: C, 39.35; H, 0.73; N, 1.11.

Mo(NC$_6$F$_5$)(CHCMe$_2$Ph)(DFTO)$_2$ (7a).

Mo(NC$_6$F$_5$)(CHCMe$_2$Ph)(Me$_2$Pyr)$_2$ (150 mg, 0.245 mmol) was dissolved in Et$_2$O (6 mL). DFTOH (220 mg, 0.516 mmol) was added at room temperature. After 2 hours, the solvent was removed from the orange solution to give an orange oil. Pentane (2 mL) was added and the mixture was stirred for 30 min to give a yellow solid. The crude material was washed with pentane; yield 259 mg (84%): $^1$H NMR (300 MHz, $C_6D_6$, 20° C.) δ 11.20 (s, 1H, Mo=CH), 6.96 (d, 8 Hz, 4H), 6.76 (t, 8 Hz, 2H), 6.68 (d, 4 Hz, 4H), 6.32 (m, 1H), 0.80 (s, 6H, Me); $^{19}$F NMR (282 MHz, $C_6D_6$, 20° C.) δ −140.2 (d, $^3J_{FF}$=20 Hz, 4F, o-F), −140.7 (d, $^3J_{FF}$=21 Hz, 4F, o-F), −148.3 (d, $^3J_{FF}$=21 Hz, 2F, o-F of NC$_6$F$_5$), −154.3 (t, $^3J_{FF}$=21 Hz, 4F, p-F), −154.4 (t, $^3J_{FF}$=21 Hz, 1F, p-F of NC$_6$F$_5$), −161.78 (t, $^3J_{FF}$=20 Hz, 4F, m-F), −162.34 (br, 4F, m-F), −164.3 (m, 2F, m-F, of NC$_6$F$_5$). $^{19}$F NMR (282 MHz, toluene-ds, −80° C.) δ −109.3 (s, 1F, o-F), −110.2 (s, 1F, o-F), −110.7 (s, 1F, o-F), −112.0 (s, 1F, o-F), −114.4 (s, 2F, o-F), −115.1 (s, 1F, o-F), −115.3 (s, 1F, o-F), −120.2 (s, 2F, o-F of NC$_6$F$_5$), −123.9 (s, 2F, p-F), −125.2 (s, 1F, p-F of NC$_6$F$_5$), −125.7 (s, 1F, p-F), −126.8 (s, 1F, p-F), −131.1 (s, 1F, m-F), −132.1 (s, 1F, m-F), −132.7 (s, 1F, m-F), −133.1 (s, 1F, m-F), −133.3 (s, 3F, m-F), −134.1 (s, 1F, m-F), −135.2 (s, 1F, m-F of NC$_6$F$_5$); $^{13}$C{$^1$H}NMR (125 MHz, $C_6D_6$, 20° C.) δ 288.0 (d, 124 Hz, Mo=C), 163.3 (t, 7 Hz), 146.5 (dm, 250 Hz), 144.5 (dm, 244 Hz), 143.3 (dm, 251 Hz), 141.1 (dm, 255 Hz), 140.1 (dm, 256 Hz), 138.0 (dm, 259 Hz), 137.2 (dm, 254 Hz), 133.7 (dd, 261 Hz, 18 Hz), 130.6 (m), 122.6 (d, 164 Hz), 117.6 (d, 8 Hz), 112.0 (d, 19 Hz), 29.3 (q, 128 Hz). Anal. Calcd for $C_{52}H_{18}F_{25}MoNO_2$: C, 49.58; H, 1.44; N, 1.11. Found: C, 49.43; H, 1.56; N, 1.07.

W(NC$_6$F$_5$)(CH-t-Bu)(DFTO)$_2$ (7b).

W(NC$_6$F$_5$)(CH-t-Bu)(OTf)$_2$(DME) (200 mg, 0.29 mmol) was dissolved in Et$_2$O (5 mL). DFTOLi (264 mg, 0.61 mmol) was added at −30° C. The mixture was warmed up to room temperature. After 2 hours, the solvent was removed from the orange solution and the residue was extracted with pentane. Removal of the pentane in vacuo gave a yellow foam. The solid was recrystallized from a mixture of ether and pentane to give a yellow solid; yield 267 mg (71%): $^1$H NMR (300 MHz, $C_6D_6$, 20° C.) δ 8.04 (s, 1H, W=CH), 6.94 (d, $J_{HH}$=7 Hz, 4H, Ar), 6.74 (t, $J_{HH}$=7 Hz, 2H, Ar), 0.724 (s, 9H, $^t$Bu). $^1$H NMR (300 MHz, toluene-ds, 20° C.) δ 8.00 (s, 1H, W=CH), 6.94 (d, $J_{HH}$=7 Hz, 4H, Ar), 6.74 (t, $J_{HH}$=7 Hz, 2H, Ar), 0.70 (s, 9H, $^t$Bu); $^{19}$F NMR (282 MHz, toluene-ds, 20° C.) δ −140.2 (d, $^3J_{FF}$=23 Hz, 4F, o-F), −140.8 (d, $^3J_{FF}$=21 Hz, 4F, o-F), −151.3 (d, $^3J_{FF}$=21 Hz, 2F, o-F of NC$_6$F$_5$), −154.1 (t, $^3J_{FF}$=20 Hz, 4F, p-F), −156.4 (t, $^3J_{FF}$=21 Hz, 1F, p-F of NC$_6$F$_5$), −161.7 (t, $^3J_{FF}$=20 Hz, 4F, m-F), −162.3 (br, 4F, m-F), −163.5 (m, 2F, m-F, of NC$_6$F$_5$). Anal. Calcd. for $C_{47}H_{16}F_{25}NO_2W$: C, 43.92; H, 1.25; N, 1.09. Found: C, 43.96; H, 1.36; N, 1.09.

W(NC$_6$F$_5$)(CH$_2$CH$_2$CH$_2$)[OC(CF$_3$)$_3$]$_2$ (8b).

A suspension of W(NC$_6$F$_5$)(CH-t-Bu)[OC(CF$_3$)$_3$]$_2$(DME) (150.3 mg, 0.1510 mmol) in pentane (2 mL) was subjected to three freeze-pump-thaw cycles and treated with ethylene (1 atm). After one day the precipitated white solid was decanted off. The supernatant was cooled to −25° C. to precipitate a second crop of white crystals. The combined solids were briefly dried in vacuo to afford pure material; yield 121.8 mg (92%): $^1$H NMR (600 MHz, $C_6D_6$, 20° C.) δ 4.60 (m, 2H, α-CH$_2$), 4.23 (m, $^1J_{CH}$=157.1 Hz, 2H, α-CH$_2$), −1.04 (m, $^1J_{CH}$=159.9 Hz, 1H, (β-CH$_2$), −1.66 (m, $^1J_{CH}$=159.7 Hz, 1H, β-CH$_2$). $^1J_{CH}$ values were obtained from an analogous experiment using $^{13}$C labeled ethylene. $^{19}$F NMR (282 MHz, $C_6D_6$, 20° C.) δ −73.01 (s, 9F, —OC(CF$_3$)$_3$), −73.82 (s, 9F, —OC(CF$_3$)$_3$), −148.41 (m, 2F, o-F), −152.19 (m, 1F, p-F), −161.00 (m, 2F, m-F); $^{13}$C{$^1$H}NMR (126 MHz, $C_6D_6$, 20° C.) δ 145.98 (d, $^1J_{CF}$=242.5 Hz, Ar—F), 141.29 (d, $^1J_{CF}$=258.3 Hz, Ar—F), 136.89 (d, $^1J_{CF}$=257.3 Hz, Ar—F), 121.36 (q, $^1J_{CF}$=291 Hz, CCF$_3$), 103.37 ($^1J_{CW}$=64.0 Hz, α-CH$_2$), −6.56 (β-CH$_2$). Anal. Calcd. for $C_{17}H_6F_{23}NO_2W$: C, 23.28; H, 0.69; N, 1.60. Found: C, 23.08; H, 0.82; N, 1.45.

W(NC$_6$F$_5$)(CH-t-Bu)(CH$_2$CH$_2$)[OC(CF$_3$)$_3$]$_2$.

A $C_6D_6$ solution of W(NC$_6$F$_5$)(CH-t-Bu)[OC(CF$_3$)$_3$]$_2$ (dme) in a J. Young NMR tube was subjected to 3 freeze-pump-thaw cycles and treated with ethylene. After 1 hour, the resonances of the alpha-substituted metallacycle could be observed. No attempt was made to isolate this intermediate species. $^1$H NMR (600 MHz, $C_6D_6$, 20° C.) δ 5.73 (m, 2H, α-CH), 4.79 (m, $^1J_{CH}$=162.2 Hz, 1H, α-CH$_2$), 4.23 (m, $^1J_{CH}$=157.5 Hz, 1H, α-CH$_2$), 0.82 (s, 9H, α-C-t-Bu), −0.64 (m, $^1J_{CH}$=160.0 Hz, 1H, β-CH$_2$), −1.34 (m, $^1J_{CH}$=156.1 Hz, 1H, β-CH$_2$). $^1J_{CH}$ values were obtained from an analogous experiment using $^{13}$C labeled ethylene.

Mo(NC$_6$F$_5$)(CHCMe$_2$Ph)(Me$_2$Pyr)(HMTO):

Mo(NC$_6$F$_5$)(CHCMe$_2$Ph) (Me$_2$Pyr)$_2$ (300 mg, 0.502 mmol) was dissolved in bezene (5 mL). HMTOH (183 mg, 0.557 mmol) was added and the mixture was heated to 70° C. After 16 h, the solvent was removed in vacuo to give dark oily product. The residue was recrystallized from a mixture of pentane and diethyl ether to give an orange solid; yield 259 mg (60%): $^1$H NMR (500 MHz, $C_6D_6$, 20° C.) δ 11.08 (s, 1H, Mo=CH), 7.24 (d, $^3J$=8 Hz, 2H), 6.94 (m, 3H), 6.88 (m, 2H), 6.79 (s, 2H), 6.73 (s, 2H), 6.69 (m, 1H), 6.07 (s, 2H), 2.05 (d, J=10.5 Hz, 12H), 1.98 (br, 12H), 1.36 (d, J=11.3 Hz, 6H); $^{19}$F NMR (282 Hz, $C_6D_6$, 20° C.) δ −145.7 (d, 2F, $^3$J=23 Hz, o-Ar), −159.4 (t, 1F, $^3$J=24 Hz, p-Ar), −165.0 (t, 2F, $^3$J=23 Hz, m-Ar); $^{13}$C{$^1$H}NMR (125 MHz, $C_6D_6$, 20° C.) δ 295.3 (s, 1C, Mo=C), 157.9, 148.4, 143.0 (d, $^1J_{CF}$=245 Hz), 139.4 (d, $^1J_{CF}$=260 Hz), 136.9, 136.8, 136.4, 135.5 (d, $^1J_{CF}$=235 Hz), 135.2, 134.7, 131.9, 129.8, 129.1, 127.3, 126.0, 123.4, 109.7, 155.5, 34.4, 32.5, 28.6, 22.7, 21.1, 19.9, 16.8, 14.4. Anal. Calcd for $C_{46}H_{45}F_5MoN_2O_2$: C, 66.34; H, 5.45; N, 3.36. Found: C, 66.27; H, 5.49; N, 3.33.

Procedure for Alkane Metathesis Catalytic Runs.

The catalytic runs were performed using a modification of our previous procedure (Bailey, B. C.; Schrock, R. R.; Kundu, S.; Goldman, A. S.; Huang, Z.; Brookhart, M. *Organometallics* 2009, 28, 355-360). A stock solution of (POCOP)Ir($C_2H_4$) (10 mM, Goldman, A. S.; Roy, A. H.; Huang, Z.; Ahuja, R.; Schinski, W.; Brookhart, M. *Science* 2006, 312, 257-261), n-octane, and mesitylene (28.8 mM; internal standard) was prepared under an argon atmosphere. A J. Young NMR tube was charged with the respective Mo or W olefin metathesis catalyst (8 µmol) and 500 µL of the Ir stock solution was added. The sealed tube was frozen in a dry ice/acetone bath and the headspace was evacuated. Samples were heated in an oil bath for 4 days at 125° C. The reaction mixture was passed through basic alumina and the resulting solution was subjected to GC analysis. The peaks were integrated with respect to the mesitylene internal standard. GC response factors were calculated with C7-C15 standards. Integrations were totaled for all alkanes and normalized to 6154 mM (corresponding to 500 µL of n-octane).

Procedure for ROMP of DCMNBD.

The catalyst (5 mg) was dissolved in toluene (0.1 mL). DCMNBD (100 eq) was added as a solution of toluene (0.5 mL). A white precipitate formed immediately for 7a and 7b but no precipitate was observed when DCMNBD was added to 6a. After 2 hours, benzaldehyde (0.1 mL) was added to the mixture. The reaction mixture became deep green within 5 minutes, and was stirred for 1 h. The entire mixture was added dropwise to 100 mL of vigorously stirring methanol. A fine white solid immediately formed, and the mixture was stirred for 12 h. The white or off-white polymers were isolated on a medium or fine porosity frit by filtration, rinsed with MeOH, and dried in vacuo.

For 7a and 7b, poly (DCMNBD) was shown by $^{13}$C NMR to have a structure that is >99% cis, >99% isotactic; the yields are 99% and 93%, respectively. Cis-isotactic poly-DCMNBD: $^1$H NMR (500 MHz, CDCl$_3$, 20° C.) δ=5.40 (m, 2H, $C_5H$, $C_6H$), 3.95 (m, 2H, $C_1H$, $C_4H$), 3.74 (s, 6H, $CO_2Me$), 2.52 (m, 1H, $C_7H$), 1.44 (m, 1H, $C_7H$); $^{13}$C{$^1$H}NMR: (125 MHz, CDCl$_3$, 20° C.): δ=165.3 ($CO_2CH_3$), 142.3 ($C_3$), 131.5 ($C_5$), 52.1 ($CO_2CH_3$), 44.3 ($C_4$), 38.8 ($C_7$).

For 6a, poly (DCMNBD) was formed in 83% yield. The polymer was shown to be 90% cis by $^{13}$C NMR spectroscopy with little or no specific tacticity.

Crystallographic Details.

Low-temperature diffraction data were collected on a Bruker-AXS X8 Kappa Duo diffractometer coupled to a Smart Apex2 CCD detector with Mo K$_\alpha$ radiation (λ=0.71073 Å) from an IµS micro-source, performing φ- and ω-scans. The structures were solved by direct methods using SHELXS (Sheldrick, G. M., *Acta Cryst.* 1990, A46, 467-473) and refined against $F^2$ on all data by full-matrix least squares with SHELXL-97 (Sheldrick, G. M., Acta Cryst. 2008, A64, 112-122) following established refinement strategies (Müller, P. *Crystallography Reviews* 2009, 15, 57-83).

All non-hydrogen atoms were refined anisotropically. Except for hydrogen atoms on carbon atoms in direct contact with the metal (for details see below), all hydrogen atoms were included into the model at geometrically calculated positions and refined using a riding model. The isotropic displacement parameters of all hydrogen atoms were fixed to 1.2 times the U value of the atoms they are linked to (1.5 times for methyl groups).

Crystals of 6a suitable for X-ray analysis were grown from a concentrated $C_6D_6$ solution upon standing it at room temperature. Compound 6a crystallizes in the triclinic space group P$\bar{1}$ with one molecule of 6a and half a benzene molecule per asymmetric unit. The second half of the benzene is generated by the crystallographic inversion center. There is higher than average molecular motion in one of the "OF15" ligands, the one corresponding to O1. This was addressed with similarity restraints on displacement parameters as well as rigid bond restraints for anisotropic displacement parameters for the atoms in question. Coordinates for the hydrogen atom on C1, that is the carbon directly binding to the metal, were taken from the difference Fourier synthesis and this hydrogen atom was subsequently refined semi-freely with the help of distance restraints (target C—H-distance 0.95(2) Å).

Crystals of 7a suitable for X-ray analysis were grown from diffusion of pentane to a $CH_2Cl_2$ solution of 7a at room temperature. Compound 7a crystallizes in the monoclinic space group P2$_1$/c with one molecule per asymmetric unit. Coordinates for the hydrogen atom on C1, that is the carbon directly binding to the metal, were taken from the difference Fourier synthesis and this hydrogen atom was subsequently refined semi-freely with the help of distance restraints (target C—H-distance 0.95(2) Å).

Crystals of 8b suitable for X-ray analysis were grown from a saturated pentane solution cooled to −25° C. Compound 8b crystallizes in the monoclinic space group P2$_1$/c with one molecule per asymmetric unit. Three of the six CF$_3$ groups were refined as disordered over two positions, corresponding to a rotation about the C—CF$_3$ bond. Those disorders were refined with the help of similarity restraints on 1-2 and 1-3 distances and displacement parameters as well as rigid bond restraints for anisotropic displacement parameters. The ratios between the two components of all disorders were refined freely and converged at 0.543(12), 0.515(17), and 0.533(13), respectively. Coordinates for all hydrogen atoms were taken from the difference Fourier synthesis. The hydrogen atoms were subsequently refined semi-freely with the help of distance restraints (target C—H-distance 0.99(2) Å).

Additional Exemplary Embodiments

As described above, in some embodiments, provided compounds are particularly difficult to prepare. For example, past attempts to make complexes in which the imido group is NAr$^{Cl3}$ or NAr$^{Br3}$ (NAr$^{X3}$=N-2,4,6-$X_3C_6H_2$ where X=Cl or Br) failed to provide suitable yields and/or purity due to, in some embodiments, decomposition of bisimido dialkyl intermediates, even in the solid state, to give the anilines and unidentifiable metal-containing products. In some embodiments, the present invention provides methods for preparing provided compounds, e.g., complexes that contain N-2,4,6-$X_3C_6H_2$ (NAr$^{X3}$, X=Cl, Br), N-2,6-$Cl_2$-4-$CF_3C_6H_2$ (NAr$^{Cl2CF3}$), or N-3,5-$(CF_3)_2C_6H_3$ (NAr$^{(CF3)2}$) ligands as described herein:

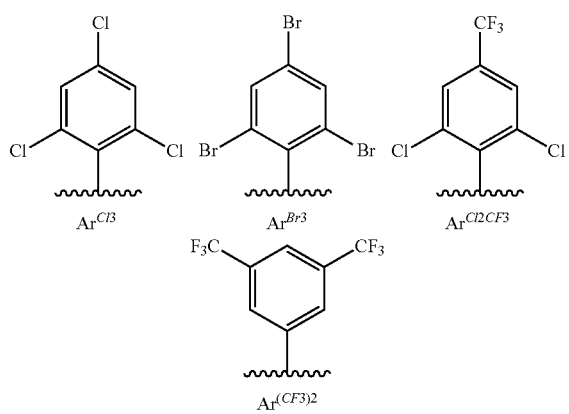

A typical procedure for synthesizing W-based imido alkylidene complexes begins with a reaction between $WO_2Cl_2$ (dme), two equivalents of aniline, excess base (e.g., triethylamine), and TMSCl to afford complexes of the type $W(NR)_2Cl_2(dme)$. This approach was unsuccessful for $W(NR)_2Cl_2(dme)$ species in which $NR^1$ is $NAr^{X3}$, $NAr^{Cl2CF3}$, or $NAr^{(CF3)2}$. Without the intention to be limited by theory, Applicant notes that the electron-withdrawing nature of the anilines can reduce their nucleophilicity to a degree that is insufficient to replace both oxo ligands on the metal. The N-sulfinylamine method reported by Sundermeyer and co-workers (Rufanov, K. A., Kipke, J., Sundermeyer, J. *Dalton Trans.* 2011, 40, 1990; Rufanov, K. A., Zarubin, D. N., Ustynyuk, N. A., Gourevitch, D. N., Sundermeyer, J., Churakov, A. V., Howard, J. A. K. *Polyhedron* 2001, 20, 379) was also found to be unsatisfactory for preparing $NAr^{X3}$, $NAr^{Cl2CF3}$, or $NAr^{(CF3)2}$ complexes. It was surprisingly found that methods as illustrated below provided desired products in suitable yields and purity.

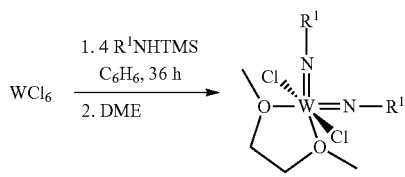

$R^1 = 2,4,6-Cl_3C_6H_2$ (9a), 82%; $R^1 = 2,4,6-Br_3C_6H_2$ (9b), 74%; $R^1 = 2,6-Cl_2-4-(CF_3)C_6H_2$ (9c), 47%; $R^1 = 3,5-(CF_3)_2C_6H_3$ (9d), 65%

The required ArNH(TMS) (Ar=$Ar^{X3}$, $Ar^{Cl2CF3}$, or $Ar^{(CF3)2}$) reagents were prepared on large scale and in high purity through deprotonation of the parent aniline followed by addition of TMSCl. (See experimental section.) The TMS-substituted aniline was then added to a benzene suspension of $WCl_6$ and the mixture was stirred for 1.5 days. The solvent was removed in vacuo and replaced by a mixture of DME and pentane, from which the $W(NR)_2Cl_2(dme)$ complexes 9a-9d were all isolated on a relatively large scale in good yields and high purity.

Compounds 9a-9d were alkylated with neopentylmagnesium chloride to give the dineopentyl complexes, $W(NR^1)_2(CH_2CMe_3)_2$ (10a-10d, below). Addition of acetonitrile to the crude products (or pentane in the case of 10d) followed by filtration yielded bright yellow, analytically pure 10a-10d in good yields (65-78%). Dineophyl complexes, $W(NR^1)_2(CH_2CMe_2Ph)_2$, were also prepared. Applicant notes that the dineophyl complexes, in some embodiments, decomposed under the reaction conditions of the next step (addition of triflic acid).

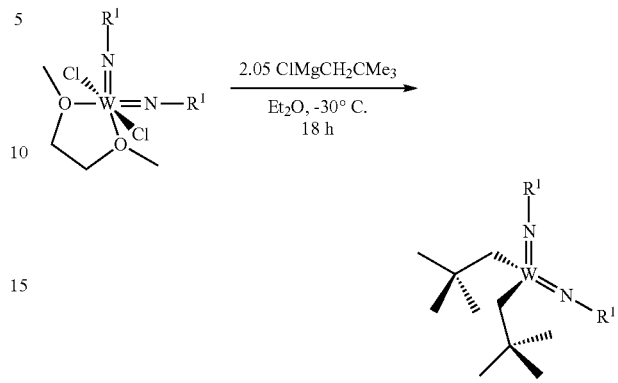

$R^1 = 2,4,6-Cl_3C_6H_2$ (10a), 75%; $R^1 = 2,4,6-Br_3C_6H_2$ (10b), 65%; $R^1 = 2,6-Cl_2-4-(CF_3)C_6H_2$ (10c), 78%; $R^1 = 3,5-(CF_3)_2C_6H_3$ (10d), 72%

Complexes 10a-10c exhibited typical NMR spectra with well-defined $^2J_{WH}$ couplings for the $WCH_2$ unit. Complex 10d displayed broad resonances in $C_6D_6$ at room temperature. Cooling a $CD_2Cl_2$ solution of this complex to $-20°$ C. resulted in the further broadening of the $CH_2$ resonance, as well as broadening of the resonances for the protons at the 2- and 6-positions on the aryl ring. Heating a $C_7D_8$ solution of this same sample above $50°$ C. resulted in sharpening of the $CH_2$ resonance and sharpening of the aryl resonances. An X-ray study of crystals grown from a diethyl ether solution at $-30°$ C. revealed that this complex is an imido-bridged dimer, as shown in FIG. 4. Without the intention to be limited by theory, Applicant suggests that a monomer/dimer interconversion may be the cause of this NMR behavior. Treatment of the isolated dimer with either $CD_3CN$ or $C_5D_5N$ results in the appearance of multiple species in solution.

Addition of three equivalents of triflic acid to 10a-10d complexes resulted in formation of the desired $W(NR^1)(CHCMe_3)(OTf)_2(dme)$ complexes 11a-11d in good yields. Mixtures of cis and trans triflate isomers are observed in $^1H$ NMR spectra in $C_6D_6$ for 11a, 11b, and 11c. Only one isomer of 11d is observed in $C_6D_6$. Preparation of neophylidene analogs of 11a-11d as well as $W(NC_6F_5)_2(CH_2CMe_2Ph)_2$ is being optimized for better yield.

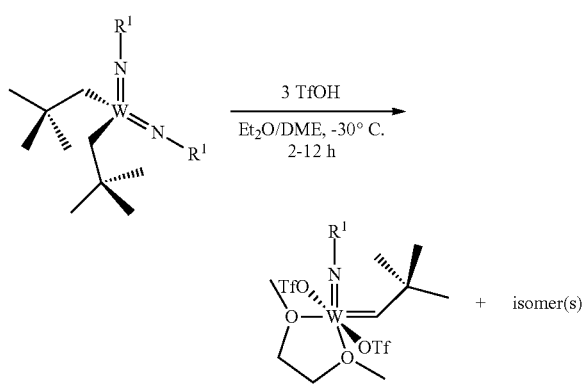

$R^1 = 2,4,6-Cl_3C_6H_2$ (11a), 88%; $R^1 = 2,4,6-Br_3C_6H_2$ (11b), 69%; $R^1 = 2,6-Cl_2-4-(CF_3)C_6H_2$ (11c), 49%; $R^1 = 3,5-(CF_3)_2C_6H_3$ (11d), 84%

A series of bis-ODBMP species were synthesized from the requisite bistriflate complexes. In some embodiments, the O-2,6-(CHPh$_2$)$_2$-4-MeC$_6$H$_2$ (ODBMP) ligand facilitated easy isolation and purification. All complexes were isolated cleanly in moderate to good yield as syn alkylidene isomers. Crystalline 12d contains two equivalents of DME that can be removed by dissolving 12d in toluene and removing all solvent in vacuo. Without the intention to be limited by theory, Applicant notes that the fact that compounds of type 12 can be prepared readily at room temperature suggests that the ODBMP ligand may not be as conformationally rigid or as sterically demanding as a bisterphenoxide such as O-2,6-Mesityl$_2$C$_6$H$_3$ (OHMT), bisterphenoxide imido examples of which are relatively rare so far.

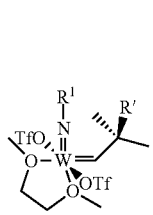

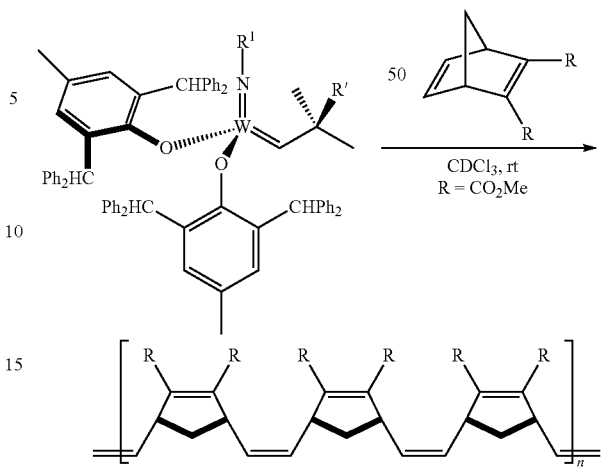

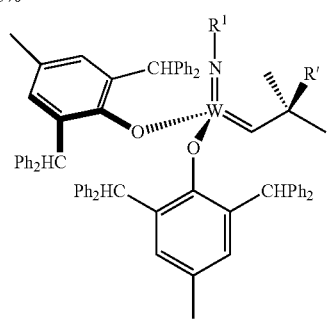

R$^1$ = 2,4,6-Cl$_3$C$_6$H$_2$ (12a), 57%;
R$^1$ = 2,4,6-Br$_3$C$_6$H$_2$ (12b), 69%;
R$^1$ = 2,6-Cl$_2$-4-(CF$_3$)C$_6$H$_2$ (12c), 61%;
R$^1$ = 3,5-(CF$_3$)$_2$C$_6$H$_3$ (12d), 65%

R$^1$ = 2,6-Cl$_2$C$_6$H$_3$ (12e), 63%;
R$^1$ = C$_6$F$_5$ (12f), 59%;
R$^1$ = 2,6-Me$_2$C$_6$H$_3$ (12g), 75%;
R$^1$ = 3,5-Me$_2$C$_6$H$_3$ (12h), 79%

R' = Me, 12a-g; Ph, 12 h

X-ray quality crystals of 12a were obtained from a saturated methylene chloride solution at −30° C. The solid-state structure is shown in FIG. 5. Bond distances and angles do not significantly deviate from those of known bisaryloxide species. The benzhydryl groups are canted away from the metal and the ODBMP ligands do not seem to present any dramatic steric influence, at least compared to a terphenoxide ligand in bisOHMT or bisODFT complexes.

ROMP results of the polymerization of 50 equivalents of DCMNBD with various initiators in CDCl$_3$ are summarized in Table 3. The resulting poly(DCMNBD) polymers have a relatively high cis content and a bias toward an isotactic microstructure.

Table 3. Polymerization of DCMNBD with initiators 12a-12h in CDCl$_3$. Monomer and initiator concentration was held constant at 0.002M and 0.1M, respectively, across three trials for each initiator.

TABLE 3

Polymerization of DCMNBD with initiators 12a-12h in CDCl$_3$. Monomer and initiator concentration was held constant at 0.002M and 0.1M, respectively, across three trials for each initiator.

| Imido substituent | Avg. k$_{obs}$ (M$^{-1}$ s$^{-1}$) | Polymer Structure |
|---|---|---|
| 2,4,6-Cl$_3$C$_6$H$_2$ (12a) | 0.59 | 84% cis, iso |
| 2,4,6-Br$_3$C$_6$H$_2$ (12b) | 0.075 | 71% cis, iso |
| 2,6-Cl$_2$-4-(CF$_3$)C$_6$H$_2$ (12c) | 1.1 | 85% cis, iso |
| 3,5-(CF$_3$)$_2$C$_6$H$_3$ (12d) | >4.1 (est)$^a$ | 53% cis, iso |
| 2,6-Cl$_2$C$_6$H$_3$ (12e) | 0.51 | 88% cis, iso |
| C$_6$F$_5$ (12f) | >4.1 (est)$^a$ | 85% cis, iso |
| 2,6-Me$_2$C$_6$H$_3$ (12g) | 0.005 | 75% cis, iso (10% trans) |
| 3,5-Me$_2$C$_6$H$_3$ (12h) | >4.1 (est)$^a$ | 55% cis, iso |

$^a$Reactions were >95% complete within 5 min.
$^b$Unless otherwise noted, <5% trans polymer sequences is observed.

The fastest rates of polymerization rates were observed employing 12d, 12f, and 12h. The estimated value (95% conversion in 5 minutes) for k$_{obs}$ is >4.1 in those cases. The rates decreased from there in the order 12c>12a, 12e>12b>12g. The slowest reaction (employing 12g) is approximately two orders of magnitude slower than other initiators with substituents in the 2 and 6 positions (12a, 12b, 12c, 12e). Without the intention to be limited by theory, Applicant notes that in some embodiments, there can be a significant electronic effect.

General Procedures.

All manipulations of air- and moisture-sensitive materials were preformed either in a Vacuum Atmospheres glove box (N$_2$-atmosphere) or on an air-free dual-manifold Schlenk line. All solvents were sparged with nitrogen, passed through activated alumina, and stored over activated 4 Å molecular sieves. Reagents were prepared as reported or were used as received unless otherwise noted. Methylene chloride-d$_2$, chloroform-d, and benzene-d$_6$ were stored over 4 Å molecular sieves. NMR measurements of air- and moisture-sensitive materials were carried out in Teflon-valve-sealed J. Young-type NMR tubes. NMR spectra were recorded using spectrometers at 500 or 300 ($^1$H), 125 ($^{13}$C), and 282 ($^{19}$F) MHz, reported in δ (parts per million) relative to tetramethylsilane ($^1$H, $^{13}$C) or fluorobenzene ($^{19}$F) and referenced to residual $^1$H/$^{13}$C signals of the deuterated solvent ($^1$H (δ): benzene 7.160, methylene chloride 5.320, chloroform 7.260; $^{13}$C (δ): benzene 128.06, methylene chloride 53.84, chloroform 77.16).

N-(trimethylsilyl)-2,4,6-trichloroaniline

Et$_2$O (50 mL) was added to a Schlenk flask under argon containing 2,4,6-trichloroaniline that had been recrystallized from hot hexane. The solution was chilled to −78° C. and n-butyllithium (2.0M in cyclohexane, 4.03 mL, 8.06 mmol) was added via syringe under an argon flow and the resulting white slurry was allowed to stir for 2 h; the slurry acquired a reddish tint over time. Trimethylsilylchloride (1.86 mL, 14.6 mmol) was added by syringe and the solution was allowed to warm to room temperature. Solvent was removed and the orange residue was charged with CH$_2$Cl$_2$. The mixture was filtered over Celite, the Celite washed with CH$_2$Cl$_2$ and the filtrate concentrated under reduced pressure to give an analytically pure orange oil in 90% yield (1.776 g, 6.61 mmol): $^1$H NMR (C$_6$D$_6$, 20° C.) δ 6.95 (s, 2H, Ar), 3.76 (s, 1H, NH), 0.16 (s, 9H, SiMe$_3$); $^{13}$C NMR (C$_6$D$_6$, 20° C.) δ s179.50, 141.26, 124.83, 123.64, 1.783. Anal. Calcd for C$_9$H$_{12}$Cl$_3$NSi: % C, 40.24; % H, 4.50; N, 5.21. Found: C, 40.01; H, 4.39; N, 5.22.

N-(trimethylsilyl)-2,6-dichloro-4-trifluoromethylaniline

Et$_2$O (200 mL) was added to a Schlenk flask under nitrogen containing 2,6-dichloro-4-trifluoromethylaniline (14.39 g, 62.6 mmol) and was cooled to −78° C. n-butyllithium (2.5M in hexane, 26.3 mL, 65.7 mmol) was added over 15 min to the stirred solution. The solution was stirred at −78° C. for 2 h and was then taken out of the cold bath, during which time a dark red/brown color evolved. Trimethylsilyl chloride (15.9 mL, 125 mmol) was then added dropwise to afford a light yellow slurry. This mixture was allowed to warm to room temperature and was filtered through Celite. The yellow filtrate was concentrated under reduced pressure to give an analytically pure orange oil; yield 18.90 g, (98%): $^1$H NMR (C$_6$D$_6$, 20° C.) δ 7.24 (s, 2H, Ar), 4.21 (bs, 1H, NH), 0.16 (s, 9H, TMS); $^{13}$C NMR (C$_6$D$_6$, 20° C.) δ 145.68, 125.4 (m), 123.90 (q, $^1$J$_{CF}$=271 Hz), 123.44, 121.29 (q, $^2$J$_{CF}$=33.8 Hz), 2.23 (m); $^{19}$F NMR (C$_6$D$_6$, 20° C.) δ −61.77. Anal. Calcd for C$_{10}$H$_{12}$Cl$_2$F$_3$NSi: C, 39.75; H, 4.00; N, 4.64. Found: C, 40.06; H, 3.84; N, 4.42.

W(NAr$^{Cl3}$)$_2$Cl$_2$(DME) (9a).

WCl$_6$ (0.568 g, 0.143 mmol) was added to toluene (25 mL) in a round bottom flask. A solution of N-trimethylsilyl-2,4,6-trichloroaniline (1.539 g, 0.572 mmol) in toluene was added to the stirred WCl$_6$ solution. The red/orange mixture was stirred for two days, after which the solvent was removed in vacuo. Pentane (20 mL) and 2 mL DME were added to the viscous residue and the mixture was stirred. The precipitated orange solid was isolated by filtration; 82% yield (757 mg, 0.118 mmol): $^1$H NMR (C$_6$D$_6$, 20° C.) δ 6.93 (s, 4H), 3.61 (s, 6H), 3.16 (s, 4H); $^{13}$C NMR (C$_6$D$_6$, 20° C.) δ 149.00, 132.87, 130.43, 127.82, 71.47, 64.94. Anal. Calcd for C$_{16}$H$_{14}$Cl$_8$N$_2$O$_2$W: C, 26.19; H, 1.92; N, 3.82. Found: C, 26.26; H, 1.96; N, 3.75.

W(NAr$^{Cl3}$)$_2$(CH$_2$CMe$_3$)$_2$ (10a).

W(NAr$^{Cl3}$)$_2$(dme)Cl$_2$ (10 g, 13.6 mmol) was charged to a round bottom flask with 200 mL Et$_2$O and chilled at −30 C for 1 h. Neopentylmagnesium chloride (1.68M, 16.6 mL, 27.9 mmol) was added dropwise by syringe. The resulting mixture was allowed to stir overnight. The suspension was filtered over Celite and the Celite cake was washed thoroughly with Et$_2$O. The volatiles were removed from the filtrate under vacuum to afford a red oil. Acetonitrile and minimal diethyl ether were added to the viscous residue and the mixture was stirred. The precipitated yellow solid was filtered off and rinsed once with acetonitrile; yield 75% (7.322 g): $^1$H NMR (C$_6$D$_6$, 20° C.) δ 9.94 (s, 4H, Ar), 2.19 (s, 4H, CH$_2$), 1.16 (s, 18H, CMe$_3$); $^{13}$C NMR (C$_6$D$_6$, 20° C.) δ 149.71, 131.42, 129.54, 127.93, 95.59, 35.35, 34.12. Anal. Calcd for C$_{22}$H$_{26}$Cl$_6$N$_2$W: C, 36.96; H, 3.67; N, 3.92. Found: C, 37.11; H, 3.78; N, 4.02.

W(NAr$^{Cl3}$)(CHCMe$_3$)(OTf)$_2$(dme) (11a).

W(NAr$^{Cl3}$)(CH$_2$CMe$_3$)$_2$ (7.15 g, 10.0 mmol) was charged to a flask with 50 mL Et$_2$O and 25 mL DME and chilled at −30° C. for 2 h. A solution of triflic acid (4.50 g, 30.0 mmol) in 5 mL chilled Et$_2$O was added dropwise to the stirred mixture. The resulting mixture was stirred for 1.5 h and allowed to warm to room temperature. The solvents were removed in vacuo from the resulting mixture and CH$_2$Cl$_2$ was added. The salts were removed by filtration through Celite and the filtrate taken to dryness in vacuo to give the desired product; yield 7.37 g (88%): $^1$H NMR (CD$_2$Cl$_2$, 20° C.) (major isomer) δ 11.51 (s, 1H, W=CH), 7.47 (s, 2H, Ar), 4.58 (s, 3H, DME), 4.39 (m, 1H, DME), 4.31 (m, 1H, DME), 4.11 (m, 1H, DME) 3.72 (s, 3H, DME), 3.72 (m, 1H, DME), 1.22 (s, 9H, CMe$_3$); $^{13}$C NMR (C$_6$D$_6$, 20° C.) δ (2 isomers) 302.60 ($^1$J$_{WC}$=169 Hz), 294.71 ($^1$J$_{WC}$=169 Hz), 147.60, 147.43, 135.22, 133.53, 132.93, 128.42, 128.34, 120.57 (q, $^1$J$_{CF}$=315 Hz), 119.78 (q, $^1$J$_{CF}$=315 Hz), 119.72 (q, $^1$J$_{CF}$=315 Hz), 81.30, 78.36, 74.40, 70.64, 70.18, 67.20, 62.97, 61.31, 48.38, 48.24, 33.30, 33.08; $^{19}$F NMR (CD$_2$Cl$_2$, 20° C.) (major isomer) δ −77.42, −78.23. Anal. Calcd for C$_{17}$H$_{22}$Cl$_3$F$_6$NO$_8$S$_2$W: C, 24.40; H, 2.65; N, 1.67. Found: C, 24.25; H, 2.32; N, 1.59.

W(NAr$^{Cl3}$)(CHCMe$_3$)(ODBMP)$_2$ (12a).

Compound 11a (95 mg, 0.114 mmol) was charged with LiODBMP.Et$_2$O (101 mg, 0.227 mmol) in 10 mL Et$_2$O at room temperature. The mixture was stirred for 2 h to yield an orange solution with precipitate. The solvent was removed in vacuo and CH$_2$Cl$_2$ was added to the residue. The mixture was filtered through a Celite plug, and solvents were removed from the filtrate in vacuo. Pentane was added to the orange residue and the mixture was stirred for 1 h to give a yellow solid, which was isolated by filtration. Analytically pure product was obtained by recrystallization from toluene; yield 86 mg (57%): $^1$H NMR (CD$_2$Cl$_2$, 20° C.) δ 9.29 (s, 1H, W=CH), 7.12 (m, 14H, Ar), 6.89-6.78 (m, 28H, Ar), 6.56 (s, 4H, Ar), 5.84 (s, 4H, CHPh$_2$), 2.11 (s, 6H, Me), 1.13 (s, 9H, CMe$_3$); $^{13}$C NMR (CD$_2$Cl$_2$, 20° C.) δ 255.00, 159.49, 149.75, 144.41, 143.49, 133.32, 133.26, 131.54, 130.42, 130.08, 130.05, 129.92, 128.49, 128.36, 127.61, 126.52, 126.43, 50.07, 45.91, 34.54, 21.27. Anal. Calcd for C$_{77}$H$_{66}$Cl$_3$NO$_2$W: C, 69.66; H, 5.01; N, 1.06. Found: C, 68.52; H, 4.81; N, 1.04.

W(NAr$^{Cl3}$)(CHCMe$_3$)(2,5-Me$_2$Pyr)$_2$.

W(NAr$^{Cl3}$)(CHCMe$_3$)(OTf)$_2$(DME) (1.0 g, 1.20 mmol) was charged to a flask with 40 mL toluene and ~1 mL DME. The resulting solution was chilled at −30° C. for 2 h. LiMe$_2$Pyr (254 mg, 2.51 mmol) was then added to the stirred solution and the resulting mixture was allowed to stir for 1.5 h. Solvent was removed under vacuum and the residue was charged with CH$_2$Cl$_2$. The mixture was filtered through Celite and washed with CH$_2$Cl$_2$. The filtrate was dried under vacuum to give an orange solid (641 mg, 84%). $^1$H NMR (C$_6$D$_6$, 500 MHz) δ 11.02 (bs, 1H, W=CH), 6.81 (s, 2H, Ar), 6.03 (bs, 4H, pyr), 2.26 (bs, 12H, pyr), 1.21 (s, 9H, Me$_3$); $^{13}$C NMR (125 MHz): 288.14 (W=C), 148.89, 132.52, 130.21, 128.48, 128.34, 107.62, 48.42, 33.83, 18.62. Anal. Calc'd for $C_{23}H_{28}Cl_3N_3W$ % C, 43.39; % H, 4.43; % N, 6.60. Found % C, 43.11; % H, 4.31; % N, 6.41.

W(NAr$^{Cl3}$)(CHCMe$_3$)(Me$_2$Pyr)(OHMT).

W(NAr$^{Cl3}$)(CHCMe$_3$)(2,5-Me$_2$Pyr)$_2$ (250 mg, 0.393 mmol) was charged to a flask with 40 mL Et$_2$O, and the resulting solution was chilled for 1 h. HMTOH (130 mg, 0.393 mmol) was added and the solution was allowed to stir and warm to room temperature overnight. The solution was dried under vacuum and the resulting residue was charged with minimal pentane to give a yellow solid (119 mg, 35%). The filtrate was again concentrated and put in the freezer to isolate a pure second crop of product. $^1$H NMR (C$_6$D$_6$, 500 MHz) 8.40 (s, 1H, W=CH, $^1J_{WC}$=115 Hz (syn), $^2J_{WH}$=16.5 Hz), 6.93 (m, 3H, OHMT), 6.81 (s, 4H, OHMT), 6.80 (s, 2H, Ar), 6.06 (s, 2H, pyr), 2.14 (s, 12H, OHMT), 2.11 (s, 6H, pyr), 2.03 (s, 6H, OHMT), 1.13 (s, 9H, CMe$_3$); $^{13}$C NMR (125 MHz): 269.28 (W=CH), 157.98, 149.47, 137.18, 136.84, 136.51, 135.04, 132.27, 130.41, 129.71, 129.49, 128.65, 127.70, 123.80, 110.29, 46.22, 33.10, 21.33, 21.21, 20.49.

W(NAr$^{Cl3}$)(CHCMe$_3$)(Me$_2$Pyr)(ODFT).

W(NAr$^{Cl3}$)(CHCMe$_3$)(2,5-Me$_2$Pyr)$_2$ (304 mg, 0.477 mmol) was charged to a flask with 20 mL Et$_2$O and chilled for 45 min. DFTOH (203 mg, 0.477 mmol) was added to the stirred mixture in 2 mL Et$_2$O dropwise. After 1 h, the volatiles were removed and pentane was charged to the resulting residue to give 239 mg; further recrystallization from Et2O gave an extra 101 mg (340 mg, 74%). $^1$H NMR (C$_6$D$_6$, 500 MHz) 8.87 (s, 1H, W=CH, $^1J_{WC}$=110 Hz, $^2J_{WH}$=15.5 Hz), 7.09 (d, 2H, ODFT), 6.85 (t, 1H, ODFT), 6.61 (s, 2H, Ar), 5.87 (bs, 2H, Me$_2$Pyr), 2.11 (bs, 6H, Me$_2$Pyr), 0.93 (s, 9H, CMe$_3$); $^{13}$C NMR (125 MHz): 270.46 (W=CH, $^1J_{WC}$=190 Hz), 163.07, 148.86, 145.67 (m), 143.71 (m), 142.26 (m), 140.44 (m), 139.25 (m), 137.26 (m), 133.73, 132.15, 131.21, 127.95, 123.09, 118.02, 111.67 (td), 110.98, 65.95, 46.77, 32.44; $^{19}$F NMR (282 MHz): −140.01 (d, 2F, ortho), −140.54 (d, 2F, ortho), −153.09 (t, 1F, para), −161.38 (m, 2F, meta); Anal Calc'd for $C_{35}H_{23}Cl_3F_{10}N_2OW$ % C, 43.44; % H, 2.40; % N, 0.89. Found % C, 43.50; % H, 2.33; % N, 2.73.

W(NAr$^{Cl3}$)(CHCMe$_3$)(OC(CF$_3$)$_3$)$_2$.

W(NAr$^{Cl3}$)(CHCMe$_3$)(Me$_2$pyr)$_2$ (164 mg, 0.258 mmol) in 15 mL Et$_2$O was charged with HOC(CF$_3$)$_3$ (72 µL, 0.515 mmol) and the resulting mixture was stirred for 3 h. The solution was dried in vacuo, charged with pentane, and dried in vacuo again for 4-5 cycles. The residue was then charged with minimal Et$_2$O and was chilled at −30° C. for one week to afford 55 mg of yellow crystals. $^1$H NMR (C$_6$D$_6$, 500 MHz, 20° C.): δ 9.46 (s, 1H, W=CH), 6.78 (s, 2H, Ar), 1.06 (s, 9H, CMe$_3$); $^{13}$C NMR (C$_6$D$_6$, 125 MHz, 20° C.): 266.37 (W=CH, $^1J_{WC}$=189 Hz), 149.09, 133.94, 133.28, 122.35, 120.03, 106.72, 47.09, 33.07; $^{19}$F NMR (C$_6$D$_6$, 282 MHz, 20° C.): −73.48.

W(NAr$^{Cl3}$)(CHCMe3)(Me$_2$Pyr)(OTript).

OTript=9-oxytriptycene. W(NAr$^{Cl3}$)(CHCMe$_3$)(Me$_2$pyr)$_2$ (74 mg, 0.116 mmol) in ~8 mL Et$_2$O was charged with 9-hydroxytriptycene (31 mg, 0.116 mmol) and was stirred for 1 h. The volatiles were removed in vacuo and the residue was charged with pentane to afford a yellow powder (86 mg, 91%). $^1$H NMR (C$_6$D$_6$, 500 MHz, 20° C.): δ 9.81 (s, 1H, W=CH), 7.73 (d, 3H, Tript), 7.15 (d, 3H, Tript), 6.93 (t, 3H, Tript), 6.85 (s, 2H, Ar), 6.82 (t, 3H, Tript), 6.25 (s, 2H, Me$_2$pyr), 5.14 (s, 1H, Tript), 2.60 (s, 6H, Me$_2$pyr), 1.28 (s, 9H, CMe$_3$).

W(NAr$^{Br3}$)$_2$Cl$_2$(DME) (9b).

WCl$_6$ (3.51 g, 8.87 mmol) was added to benzene (150 mL) in a round bottom flask. N-trimethylsilyl-2,4,6-tribromoaniline (19.26 g, 35.5 mmol) was added and the dark red mixture was stirred for 36 h, after which the solvent was removed in vacuo. Minimal DME was added to the red viscous solid and the resulting yellow solid was isolated by filtration and washed twice with minimal DME (6.53 g, 74%). $^1$H NMR (C$_6$D$_6$, 20° C.) δ 7.37 (s, 4H, Ar), 3.60 (s, 6H, OCH$_3$), 3.07 (s, 4H, CH$_2$); $^{13}$C NMR (C$_6$D$_6$, 20° C.) δ 151.82, 134.23, 122.12, 118.46, 71.38, 64.99. Anal. Calcd for $C_{16}H_{14}Br_6Cl_2N_2O_2W$: C, 19.21; H, 1.41; N, 2.80. Found: C, 19.65; H, 1.26; N, 2.86.

W(NAr$^{Br3}$)$_2$(CH$_2$CMe$_3$)$_2$ (10b).

A solution of W(NAr$^{Br3}$)$_2$Cl$_2$(dme) (6.0 g, 6.0 mmol) in diethyl ether was chilled for 1 h, after which neopentylmagnesium chloride (1.555 M in Et$_2$O, 7.91 mL, 12.3 mmol) was added. After 2 h, 2 mL of dioxane was added. The mixture was stirred for 20 min and filtered through Celite. The Celite pad was washed thoroughly with dichloromethane and the solvents were removed from the filtrate in vacuo. Acetonitrile was added to the residue and the resulting yellow solid was isolated by filtration; yield 3.81 g (65%): $^1$H NMR (C$_6$D$_6$, 20° C.) δ 7.36 (s, 4H, Ar), 2.27 (s, 4H, CH$_2$), 1.21 (s, 18H, Me$_3$); $^{13}$C NMR (CD$_2$Cl$_2$, 125 MHz) δ 152.55, 134.08, 121.58, 116.89, 97.31, 34.87, 34.12. Anal. Calcd for $C_{22}H_{26}Br_6N_2W$: C, 26.92; H, 2.67; N, 2.85. Found: C, 27.27; H, 2.50; N, 2.96.

W(NAr$^{Br3}$)(CHCMe$_3$)(OTf)$_2$(dme) (11b).

W(NAr$^{Br3}$)$_2$(CH$_2$CMe$_3$)$_2$ (3.67 g, 3.74 mmol) was added to a mixture of 30 mL Et$_2$O and 20 mL DME and the solution was cooled at −30° C. for 1 h. A solution of trifluoromethanesulfonic acid (1.68 g, 11.2 mmol) in ~4 mL of Et$_2$O was added dropwise to yield a deep red/orange solution. The solution was stirred for one hour, after which the volatiles were removed in vacuo. The residue was dissolved in CH$_2$Cl$_2$ and the solution was filtered through Celite. The solvents were removed from the filtrate in vacuo. The residue was triturated with pentane and the resulting yellow solid was isolated by filtration; yield 2.50 g (69%). (Repeated isolations may be necessary in order to remove all anilinium triflate salts.): $^1$H NMR (CD$_2$Cl$_2$, 20° C.) δ (major isomer) 11.47 (s, 1H, W=CH), 7.48 (s, 2H, Ar), 4.59 (s, 3H, dme), 4.44 (m, 1H, dme), 4.31 (m, 1H, dme), 4.06 (m, 1H, dme), 3.75 (s, 3H, dme), 3.73 (m, 1H, dme), 1.24 (s, 9H, CMe$_3$); $^{13}$C NMR (CD$_2$Cl$_2$, 20° C.) δ (major isomer) 303.22 (W=C), 150.442, 135.18, 123.96, 121.45, 119.99 (q, $J_{CF}$=316 Hz), 119.99 (q, $J_{CF}$=316 Hz), 119.02 (q, $J_{CF}$=316 Hz), 82.00, 79.21, 71.83, 62.33, 48.46, 32.93; $^{19}$F NMR (CD$_2$Cl$_2$, 20° C.) δ −77.25 (major), −77.42 (minor), −77.13 (major). Anal. Calcd for $C_{17}H_{22}Br_3F_6NO_8S_2W$: C, 21.05; H, 2.29; N, 1.44. Found: C, 21.00; H, 2.15; N, 1.23.

W(NAr$^{Br3}$)(CHCMe$_3$)(ODBMP)$_2$ (12b).

Solid LiODBMP.Et$_2$O (144 mg, 0.276 mmol) and 11b (134 mg, 0.138 mmol) were added to 10 mL of Et$_2$O at room temperature. Workup and isolation of the product followed the same procedure as 12a. Analytically pure product was obtained by recrystallization from toluene/pentane; yield 139 mg (69%): $^1$H NMR (CD$_2$Cl$_2$, 20° C.) δ 9.82 (s, 1H, W=CH), 7.50 (s, 2H, Ar), 7.13 (m, 12H, Ar), 6.94 (m, 12H, Ar), 6.86 (m, 8H, Ar), 6.80 (m, 8H, Ar), 6.62 (s, 4H, Ar), 6.01 (s, 4H, CHPh$_2$), 2.14, (s, 6H, Me), 1.13 (s, 9H, CMe$_3$); $^{13}$C NMR (CD$_2$Cl$_2$, 20° C.) δ 260.61, 159.77, 144.36, 143.61, 134.22, 133.62, 133.35, 131.50, 130.18, 130.07, 130.02, 128.50, 128.41, 126.47, 126.43, 123.57, 50.16, 46.01, 34.34, 21.29. Anal. Calcd for $C_{77}H_{66}Br_3NO_2W$: C, 63.31; H, 4.55; N, 0.96. Found: C, 63.63; H, 4.56; N, 0.89.

W(NAr$^{Cl2CF3}$)$_2$Cl$_2$(dme) (9c).

N-trimethylsilyl-2,6-dichloro-4-(trifluoromethyl)-aniline (44.65 g, 148 mmol) was added to a solution of WCl$_6$ (14.6 g, 36.9 mmol) in 400 mL benzene. The mixture was stirred for 48 h and all solvents were removed in vacuo. Minimal DME was added to the residue, followed by pentane. The precipitate was isolated on a glass frit and washed with pentane; yield 24.98 g (85%): $^1$H NMR (C$_6$D$_6$, 20° C.) δ 7.21 (s, 4H, Ar), 3.54 (s, 6H, OCH$_3$), 3.05 (s, 4H, CH$_2$); $^{13}$C NMR (C$_6$D$_6$, 20° C.) δ 132.71, 127.02, 125.05 (q), 124.63, 121.01, 71.35, 64.90. Anal. Calcd for C$_{18}$H$_{14}$N$_2$F$_6$Cl$_4$O$_2$W: C, 26.99; H, 1.76; N, 3.50. Found: C, 26.92; H, 1.72; N, 3.23.

W(NAr$^{Cl2CF3}$)$_2$(CHCMe$_3$)$_2$ (10c).

A solution of 9c (4.21 g, 5.25 mmol) in 150 mL of Et$_2$O was chilled for 1 h. Neopentylmagnesium chloride (1.555 M in Et$_2$O, 6.93 mL, 10.8 mmol) was added dropwise to the mixture. After 2 h, the suspension was filtered through Celite and the Celite pad was washed with Et$_2$O until the filtrate ran colorless. The solvents were removed from the filtrate in vacuo. A small quantity of acetonitrile was added to the residue and the resulting yellow solid was isolated by filtration; yield 3.21 g (78%): $^1$H NMR (C$_6$D$_6$, 20° C.) δ 7.27 (s, 4H, Ar), 2.25 (s, 4H, CH$_2$), 1.15 (s, 18H, Me$_3$); $^{13}$C NMR (CD$_2$Cl$_2$, 20° C.) δ 153.21, 131.69, 126.50, 125.29, 123.36, 97.39, 35.62, 34.05; $^{19}$F NMR (C$_6$D$_6$, 20° C.) δ −62.46. Anal. Calcd for C$_{24}$H$_{26}$Cl$_4$F$_6$N$_2$W: C, 36.86; H, 3.35; N, 3.58. Found: C, 37.26; H, 3.28; N, 3.53.

W(NAr$^{Cl2CF3}$)$_2$(CHCMe$_3$)(OTf)$_2$(dme) (11c).

A solution of W(NAr$^{Cl2CF3}$)$_2$(CH$_2$CMe$_3$)$_2$ (2.23 g, 2.85 mmol) in a mixture of 30 mL Et$_2$O and 15 mL DME was chilled at −30° C. overnight. HOTf (1.28 g, 8.55 mmol) in 5 mL of cold Et$_2$O was added dropwise to the red solution. After 1.5 h, the volatiles were removed in vacuo and minimal dichloromethane was added to the residue. The mixture was filtered through Celite and the solvents were removed from the filtrate in vacuo. Pentane was added to the residue and the insoluble product was isolated by filtration; yield 1.22 g (49%): $^1$H NMR (CD$_2$Cl$_2$, 20° C.) δ 11.52 (s, 1H, W=CH), 7.72 (s, 2H, Ar), 4.61 (s, 3H, DME), 4.38 (m, 2H, DME), 4.16 (m, 1H, DME), 3.73 (s, 3H, DME), 3.73 (m, 1H, DME), 1.23 (s, 9H, CMe$_3$); $^{13}$C NMR (CD$_2$Cl$_2$, 20° C.) δ 303.75 (W=C, $^1J_{WC}$=170 Hz), 150.87, 135.69, 129.81 (q, J$_{CF}$=34.4 Hz), 126.24, 119.98 (q, J$_{CF}$=315 Hz), 119.21 (J$_{CF}$=315 Hz), 119.08 (J$_{CF}$=315 Hz), 82.38, 79.57, 71.72, 62.23, 48.46, 33.03; $^{19}$F NMR (CD$_2$Cl$_2$, 20° C.) δ −77.40, 78.23. Anal. Calcd for C$_{18}$H$_{22}$Cl$_2$F$_9$NO$_8$S$_2$W: C, 24.84; H, 2.55; N, 1.61. Found: C, 24.78; H, 2.38; N, 1.47.

W(NAr$^{Cl2CF3}$)(CHCMe$_3$)(ODBMP)$_2$ (12c).

A mixture of compound 11c (112 mg, 0.129 mmol) and LiODBMP.Et$_2$O (134 mg, 0.257 mmol) in 10 mL Et$_2$O was stirred overnight. Workup and isolation followed that of 12a. Analytically pure product was obtained by recrystallization from a mixture of toluene and pentane; yield 106 mg (61%): $^1$H NMR (CD$_2$Cl$_2$, 20° C.) δ 9.31 (s, 1H, W=CH), 7.38 (s, 2H, Ar), 7.15-7.09 (m, 12H, Ar), 6.93-6.86 (m, 12H, Ar), 6.84-6.74 (m, 16H, Ar), 6.57 (s, 4H, Ar), 5.85 (s, 4H, CHPh$_2$), 2.11 (s, 6H, Me), 1.11 (s, 9H, CMe$_3$); $^{13}$C NMR (CD$_2$Cl$_2$, 20° C.) δ 256.38, 144.30, 143.45, 133.27, 133.25, 131.76, 130.03, 129.91, 129.73, 128.89, 128.57, 128.49, 128.37, 126.52, 126.46, 124.86 ($^2J_{CF}$=3.75 Hz), 123.27 ($^1J_{CF}$=270 Hz), 50.12, 45.85, 34.48, 21.27; 19F NMR (C$_6$D$_6$, 20° C.) δ −62.49. Anal. Calcd for C$_{78}$H$_{66}$Cl$_2$F$_3$NO$_2$W: C, 68.83; H, 4.89; N, 1.03. Found: C, 69.08; H, 4.82; N, 1.00.

W(NAr$^{(CF3)2}$)$_2$Cl$_2$(dme) (9d).

N-trimethylsilyl-3,5-bis(trifluoromethyl)aniline (65 g, 215 mmol) was added over 10 minutes to a solution of WCl$_6$ (21.33 g, 53.8 mmol) in 400 mL of benzene in a round bottom flask. The red-orange mixture was stirred for 36 h and the mixture was filtered through a glass frit. The solid was washed with minimal DME and pentane to give a yellow-orange solid; three crops totaled 30.2 g (70%): $^1$H NMR (C$_6$D$_6$, 20° C.) δ 7.52 (s, 2H, Ar), 7.29 (s, 1H, Ar), 3.29 (s, 6H, DME), 2.93 (s, 4H, DME); $^{13}$C NMR (C$_6$D$_6$, 20° C.) δ 156.16, 132.44 (q, J$_{CF}$=33.8 Hz), 123.81, 123.61 (q, J$_{CF}$=271 Hz), 119.02, 71.52, 64.61; $^{19}$F NMR (C$_6$D$_6$, 20° C.) δ −63.59. Anal. Calcd for C$_{20}$H$_{16}$Cl$_2$F$_{12}$N$_2$O$_2$W: C, 30.06; H, 2.02; N, 3.51. Found: C, 29.98; H, 2.09; N, 3.38.

W(NAr$^{(CF3)2}$)$_2$(CH$_2$CMe$_3$)$_2$ (10d).

A solution of W(NAr$^{(CF3)2}$)Cl$_2$(dme) (1.00 g, 1.25 mmol) in Et$_2$O was chilled for 1 h. Neopentylmagnesium chloride (1.06 mL, 2.57 mmol, 2.42M in Et$_2$O) was added dropwise and the mixture was stirred overnight. The solvents were removed from the mixture. Diethyl ether was added to the residue and the mixture was filtered through Celite. Toluene was added to the filtrate and all volatiles were removed in vacuo. Pentane was added to the resulting yellow solid and the solid was filtered off to give the product. Analytically pure product was obtained by recrystallization from CH$_2$Cl$_2$/pentane; yield 699 mg (72%): $^1$H NMR (C$_6$D$_6$, 20° C.) δ [ppm] 7.49 (s, 4H, Ar), 7.45 (s, 2H, Ar), 1.75 (s, 4H, CH$_2$), 0.99 (s, 18H, Me); $^{13}$C NMR (CD$_2$Cl$_2$, 20° C.) δ 157.52, 132.40 (q, J$_{CF}$=33.8 Hz), 124.70, 123.50 (q, J$_{CF}$=271 Hz), 118.48, 97.20, 37.33, 34.26; $^{19}$F NMR (C$_6$D$_6$, 20° C.) δ −63.51. Anal. Calcd for C$_{26}$H$_{28}$F$_{12}$N$_2$W: C, 40.02; H, 3.62; N, 3.59. Found: C, 39.93; H, 3.57; N, 3.43.

W(NAr$^{(CF3)2}$)(CHCMe$_3$)(OTf)$_2$(dme) (11d).

A solution of 10d (289 mg, 0.370 mmol) in a mixture of 7 mL DME and 7 mL Et$_2$O was chilled at −30° C. for 2 h. A chilled solution of HOTf (166 mg, 1.11 mg) in 4 mL of Et$_2$O was added dropwise. After stirring the reaction mixture overnight, the solvent was removed in vacuo. Toluene was added to the residue and the mixture was filtered through Celite. The solvents were removed from the filtrate in vacuo and pentane was added to the residue. The yellow product was isolated on a glass frit; yield 321 mg (84%): $^1$H NMR (C$_6$D$_6$, 20° C.) δ 10.45 (s, 1H, W=CH), 8.40 (s, 2H, Ar), 7.53 (s, 1H, Ar), 3.07 (s, 3H, dme), 2.96 (t, 2H, dme), 2.80 (s, 3H, dme), 2.43 (t, 2H, dme), 1.35 (s, 9H, Me$_3$); $^{13}$C NMR (C$_6$D$_6$, 20° C.) δ 291.20 (W=C), 154.93, 133.02 (q, J$_{CF}$=33.8 Hz), 128.51 (m), 123.31 (q, J$_{CF}$=272 Hz), 121.50 (m), 119.79 (q, J$_{CF}$=376 Hz), 74.46, 69.77, 64.54, 62.30, 48.79, 33.65; $^{19}$F NMR (C$_6$D$_6$, 20° C.) δ −63.52, −77.16. Anal. Calcd for C$_{19}$H$_{23}$F$_{12}$NO$_8$S$_2$W: C, 26.25; H, 2.67; N, 1.61. Found: C, 25.86; H, 2.45; N, 1.50.

W(NAr$^{(CF3)2}$)(CHCMe$_3$)(ODBMP)$_2$.2DME (12d).

Compound 11d (75 mg, 0.086 mmol) and LiODBMP.Et$_2$O (90 mg, 0.173 mmol) were added to 10 mL of Et$_2$O at room temperature and the mixture was stirred overnight. Solvents were removed from the mixture in vacuo. The residue was dissolved in toluene and the mixture was filtered through Celite. The solvents were removed from the filtrate in vacuo and ~1 mL of DME was added and the mixture was cooled at −30° C. overnight to give a yellow-orange crystalline product. The mother liquor was drawn off, the solid washed once with cold DME, and the solid was dried in vacuo; yield 86 mg, (65%): $^1$H NMR (CD$_2$Cl$_2$, 20° C.) δ 7.13-7.03 (m, 25H, Ar+W=CH), 6.98-6.88 (m, 17H, Ar), 6.75 (s, 2H, Ar), 6.59 (s, 4H, Ar), 5.94 (s, 4H, CHPh$_2$), 3.47 (s, 8H, DME), 3.32 (s, 12H, DME), 2.12 (s, 6H, Me), 0.83 (s, 9H, CMe$_3$); $^{13}$C NMR (CD$_2$Cl$_2$, 20° C.) δ 248.04, 158.33, 156.53, 144.13, 143.37, 132.58, 131.44, 131.26 (q, $J_{CF}$=33.75 Hz), 129.97, 129.92, 129.66, 128.68, 128.65, 126.78, 126.69, 126.21 (m), 123.60 (q, $J_{CF}$=271 Hz), 117.98 (m), 72.17, 59.05, 50.45, 45.17, 33.53, 21.29; $^{19}$F (CD$_2$Cl$_2$, 20° C.) δ −65.39. Anal. Calcd for C$_{87}$H$_{87}$F$_6$NO$_6$W: C, 67.83; H, 5.69; N, 0.91. Found: C, 68.04; H, 5.37; N, 1.06.

W(NAr$^{Cl}$)(CHCMe$_3$)(ODBMP)$_2$ (12e).

A mixture of W(NAr$^{Cl}$)(CHCMe$_3$)(OTf)$_2$(dme) (97 mg, 0.121 mmol) and LiODBMP.Et$_2$O (126 mg, 0.242 mmol) in 10 mL Et$_2$O at room temperature was stirred overnight. Workup and isolation followed the procedure employed for 12a. Analytically pure product was obtained by recrystallization from a mixture of toluene and pentane; yield 99 mg (63%): $^1$H NMR (CD$_2$Cl$_2$, 20° C.) δ 9.32 (s, 1H, W=CH), 7.16-7.08 (m, 14H, Ar), 9.94 (t, 1H, Ar), 6.90-6.76 (m, 28H, Ar), 6.54 (s, 4H, Ar), 5.84 (s, 4H, CHPh$_2$), 2.10 (s, 6H, Me), 1.13 (s, 9H, CMe$_3$); $^{13}$C NMR (CD$_2$Cl$_2$, 20° C.) δ 254.64, 159.54, 150.87, 144.49, 143.56, 133.38, 132.96, 131.32, 130.11, 129.99, 129.90, 128.42, 128.31, 127.73, 126.45, 126.37, 126.13, 50.04, 45.89, 34.45, 21.26. Anal. Calcd for C$_{77}$H$_{67}$Cl$_2$NO$_2$W: C, 71.52; H, 5.22; N, 1.08. Found: C, 71.38; H, 5.15; N, 0.86.

W(NAr$^F$)(CHCMe$_3$)(ODBMP)$_2$ (12f).

A mixture of W(NAr$^F$)(CHCMe$_3$)(OTf)$_2$(dme) (126 mg, 0.153 mmol) and LiODBMP.Et$_2$O (159 mg, 0.306 mmol) in 10 mL Et$_2$O was stirred for 2 h. Workup and isolation followed the procedure employed for 12a; yield 118 mg (59%): $^1$H NMR (C$_6$D$_6$, 20° C.) δ 7.20 (m, 14H, Ar), 7.05-6.85 (30H, Ar), 6.32 (s, 4H, CHPh$_2$), 1.83 (s, 6H, Me), 1.14 (s, 9H, CMe$_3$); $^{13}$C NMR (CD$_2$Cl$_2$, 20° C.) δ 251.69, 144.62, 144.13, 143.99, 143.28, 142.65, 138.37, 136.53, 132.84, 130.00, 129.98, 129.74, 128.90, 128.57, 128.55, 126.65, 126.54, 50.07, 45.28, 33.69, 21.29; $^{19}$F NMR (C$_6$D$_6$, 20° C.) δ −147.07 (t, 2F), −160.31 (d, 2F), −164.58 (s, 1F). Anal. Calcd for C$_{77}$H$_{64}$F$_5$NO$_2$W: C, 70.37; H, 4.91; N, 1.07. Found: C, 70.13; H, 4.83; N, 0.98.

W(NAr)(CHCMe$_3$)(ODBMP)$_2$ (12g).

A mixture of W(NAr)(CHCMe$_3$)(OTf)$_2$(dme) (133 mg, 0.175 mmol) and LiODBMP.Et$_2$O (182 mg, 0.349 mmol) in 10 mL Et$_2$O was stirred for 2 h. Workup and isolation followed the procedure employed for 12a; yield 164 mg (75%): $^1$H NMR (CD$_2$Cl$_2$, 20° C.) δ 9.12 (s, 1H, W=CH), 7.15-7.08 (m, 12H, Ar), 6.90-6.74 (m, 31H, Ar), 6.56 (s, 4H, Ar), 5.82 (s, 4H, CHPh$_2$), 2.10 (s, 6H, Me), 1.86 (s, 6H, Me), 1.07 (s, 9H, CMe$_3$); $^{13}$C NMR (CD$_2$Cl$_2$, 20° C.) δ 249.68, 159.25, 155.27, 144.52, 143.55, 135.19, 133.33, 131.05, 130.10, 130.05, 129.72, 128.41, 128.34, 127.44, 126.49, 126.40, 125.89, 50.03, 46.06, 34.58, 21.21, 19.82. Anal. Calcd for C$_{79}$H$_{73}$NO$_2$W: C, 75.77; H, 5.88; N, 1.12. Found: C, 76.16; H, 6.00; N, 0.93.

W(NAr")(CHCMe$_2$Ph)(ODBMP)$_2$ (12h).

A mixture of W(NAr")(CHCMe$_2$Ph)(OTf)$_2$(dme) (93 mg, 0.123 mmol) and LiODBMP.Et$_2$O (127 mg, 0.244 mmol) in 10 mL Et$_2$O was stirred 2 h. Workup and isolation followed the procedure employed for 12a; yield 118 mg (79%): $^1$H NMR (CD$_2$Cl$_2$, 20° C.) δ 7.11-6.81 (m, 39H, W=CH/Ar), 6.74 (d, 2H, Ar), 6.68 (s, 1H, Ar), 6.60 (s, 4H, Ar), 6.12 (s, 2H, Ar), 5.90 (s, 4H, CHPh$_2$), 2.16 (s, 6H, Me), 2.01 (s, 6H, Me), 1.33 (s, 6H, CMe$_2$Ph); $^{13}$C NMR (CD$_2$Cl$_2$, 20° C.) δ 242.82, 158.72, 155.98, 152.08, 144.35, 143.68, 137.74, 133.02, 130.96, 130.07, 130.00, 129.54, 128.62, 128.45, 127.97, 127.90, 126.64, 126.60, 126.45, 125.64, 124.64, 51.72, 50.31, 34.21, 21.29, 21.11. Anal. Calcd for C$_{84}$H$_{75}$NO$_2$W: C, 76.76; H, 5.75; N, 1.07. Found: C, 77.13; H, 5.90; N, 0.76.

Procedure for Polymerization Using W(R$^1$)(CHMe$_2$R') (ODBMP)$_2$ as the Initiator.

From a 0.2 M stock solution in CDCl$_3$, 1 mL (50 equiv) of dicarbomethoxynorbornadiene (DCMNBD) was charged with 1 mL of a 0.004M stock solution of catalyst in CDCl$_3$. Aliquots were taken out of the reaction vial approximately every 6-9 minutes for three to four cycles, brought outside the glove box in a capped vial, and quenched with wet CDCl$_3$. Integrations of polymer were measured with respect to the monomer peak at 6.92 ppm in CDCl$_3$. The rate constants were determined by plotting ln[([M]+[P])/[M] v. time, where [M] and [P] represent integration of monomer peak and all polymer peaks (approx. 5.50 ppm-5.20 ppm), respectively, and where time is measured in seconds. The slope of this curve was divided by the concentration of catalyst to give polymerization rate constant. Diagnostic C$_7$ carbon shift for cis, isotactic poly(DCMNBD) at 38.8 ppm.

X-Ray Crystal Structure Determination Details.

Low-temperature diffraction data (φ- and ω-scans) were collected on a Bruker-AXS X8 Kappa Duo diffractometer coupled to a Smart APEX2 CCD detector with Mo Kα radiation (λ=0.71073 Å) from an IµS micro-source for the structures of compounds 11a and 12a, and on a Siemens Platform three-circle diffractometer coupled to a Bruker-AXS Smart Apex CCD detector with graphite-monochromated Mo Kα radiation (λ=0.71073 Å) for the structure of compound 10d. Absorption and other corrections were applied using SADABS. All structures were solved by direct methods using SHELXS and refined against F$^2$ on all data by full-matrix least squares with SHELXL-97 (structure of 11a) or SHELXL-2013 (structures of 12a and 10d) using established refinement approaches. Coordinates for hydrogen atoms bound to carbon directly attached to the central metal atoms were taken from the difference Fourier synthesis and those hydrogen atoms were subsequently refined semi-freely with the help of distance restraints. All other hydrogen atoms were included into the model at geometrically calculated positions and refined using a riding model. The isotropic displacement parameters of all hydrogen atoms were fixed to 1.2 times the U$_{eq}$ value of the atoms they are linked to (1.5 times for methyl groups).

Compound 11a crystallizes in the monoclinic centrosymmetric space group P2$_1$/n with one molecule of 11a and one molecule of dichloromethane per asymmetric unit. There is no disorder and except for the C1-H1 distance restraint, no restraints were applied.

Compound 12a crystallizes in the triclinic centrosymmetric space group P-1 with one molecule of 12a and one half Et$_2$O molecule per asymmetric unit. The half Et$_2$O molecule is located near a crystallographic inversion center and was refined as over two independent sites, resulting in a four-fold disorder of the full Et$_2$O molecule in the unit cell with two of the four disorder components pairwise related to the other two by the crystallographic inversion center. In addition, the alkylidene ligand was found to be disordered over two positions, approximately corresponding to a slight rotation about the W1-C1 and a stronger rotation about the C1-C2 bond. Those disorders were refined with the help of similarity restraints on 1-2 and 1-3 distances and displacement parameters as well as rigid bond restraints for anisotropic displacement parameters. The circumstance that the structure contains only half a molecule of diethyl ether for every full molecule of 12a results in a non-integer number for the element oxygen in the empirical Formula.

Compound 10d crystallizes in the monoclinic centrosymmetric space group P2$_1$/n with one half molecule of 10d per asymmetric unit. The other half of the molecule is generated by a crystallographic inversion center. Two of the four crystallographically independent CF3 groups were refined as disordered over two positions, corresponding to a rotation about the respective C—C bonds. All C—F bonds and all F—C—F angles in the structure were refined to be equivalent. For one of the two disordered CF₃ groups the disorder was found to correspond to a rotation of approximately 60° about the C—C bond and fluorine atoms located on opposite sides of the disorder axis were pairwise constrained to have identical anisotropic displacement parameters. In addition, similarity and rigid bond restraints were applied to the anisotropic displacement parameters of all atoms involved in the disorders.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The invention claimed is:
1. A compound of formula I, or II:

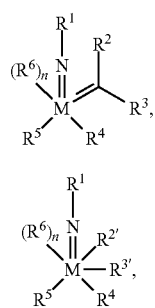

wherein:
M is molybdenum or tungsten;
$R^1$ is substituted phenyl, wherein one to five of the substituents are independently $R^y$;
each of $R^2$ and $R^3$ is independently R, —OR, —SR, —N(R)₂, —OC(O)R, —SOR, —SO₂R, —SO₂N(R)₂, —C(O)N(R)₂, —NRC(O)R, or —NRSO₂R;
$R^{2'}$ and $R^{3'}$ are taken together with M to form a substituted 3-8 membered saturated or partially unsaturated ring having, in addition to M, 0-4 heteroatoms independently selected from nitrogen, oxygen, or sulfur;
each of $R^4$ and $R^5$ is independently triflate, —O-2,6-(CHPh₂)₂-4-MeC₆H₂, DFTO, —OC(CF₃)₃ or —OC(C₆F₅)₃;
$R^y$ is independently an electron-withdrawing group;
each R is independently hydrogen or an optionally substituted group selected from $C_{1-20}$ aliphatic, $C_{1-20}$ heteroaliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:
two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen, or sulfur;
n is 0-2; and
each $R^6$ is independently a neutral ligand.

2. The compound of claim 1, wherein the compound is a compound of formula I, and one of $R^2$ and $R^3$ is hydrogen and the other is optionally substituted $C_{1-20}$ aliphatic.

3. The compound of claim 1, wherein the compound is a compound of formula II, and $R^{2'}$ and $R^{3'}$ are taken together with M to form a 3-membered saturated ring unsubstituted at the ring carbon atoms.

4. The compound of claim 1, wherein each of $R^4$ and $R^5$ is DFTO, or —OC(C₆F₅)₃.

5. The compound of claim 1, wherein M is tungsten.

6. A compound of formula I, or II:

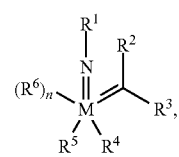

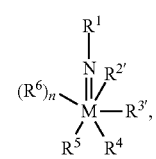

wherein:

M is tungsten;

$R^1$ is

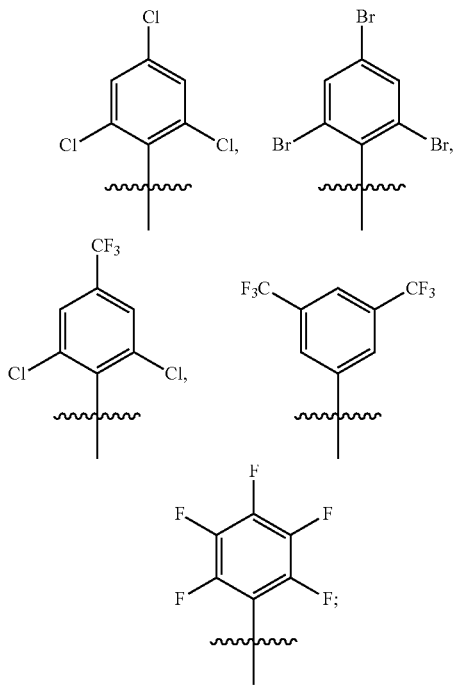

each of $R^2$ and $R^3$ is independently R, —OR, —SR, —N(R)$_2$, —OC(O)R, —SOR, —SO$_2$R, —SO$_2$N(R)$_2$, —C(O)N(R)$_2$, —NRC(O)R, or —NRSO$_2$R;

$R^{2'}$ and $R^{3'}$ are taken together with M to form a substituted 3-8 membered saturated or partially unsaturated ring having, in addition to M, 0-4 heteroatoms independently selected from nitrogen, oxygen, or sulfur;

each of $R^4$ and $R^5$ is independently —OR, —OSi(R)$_3$, or —OAr$^a$;

Ar$^a$ is

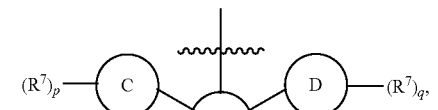

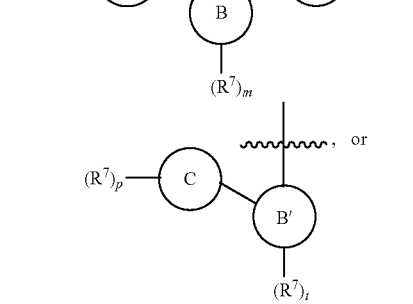

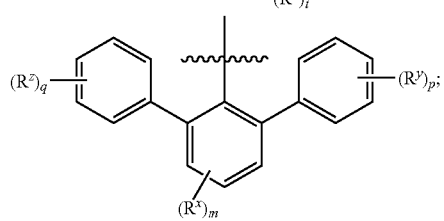

m is 0-3;

Ring B is a substituted group selected from phenyl or a 5-6 membered monocyclic heteroaryl ring having 1-4 heteroatoms independently selected from nitrogen, oxygen, or sulfur;

p is 1-5;

q is 0-5;

t is 0-4;

each of Ring B', Ring C and Ring D is independently a substituted group selected from phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-14 membered bicyclic or tricyclic heteroaryl ring having 1-5 heteroatoms independently selected from nitrogen, oxygen, or sulfur;

each $R^7$ is independently halogen, R, —CN, —NO$_2$, —OR, —SR, —S(O)R, —S(O)$_2$R, —OSi(R)$_3$, —N(R)$_2$, —NRC(O)R, —NRC(O)OR, —NRC(O)N(R)$_2$, —NRSO$_2$R, —NRSO$_2$N(R)$_2$, or —NROR;

each of $R^x$, $R^y$ and $R^z$ is independently an electron-withdrawing group;

each R is independently hydrogen or an optionally substituted group selected from $C_{1-20}$ aliphatic, $C_{1-20}$ heteroaliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:

two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen, or sulfur;

n is 0-2; and each $R^6$ is independently a neutral ligand.

7. The compound of claim 6, wherein $R^1$ is

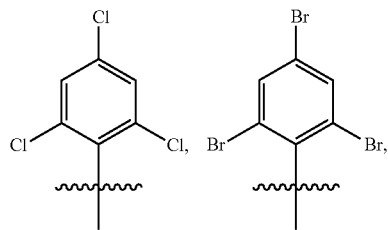

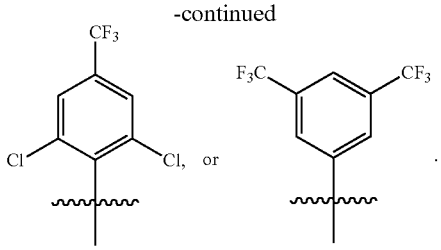

8. The compound of claim 6, wherein each of $R^4$ and $R^5$ is independent —$OAr^a$, wherein $Ar^a$ is

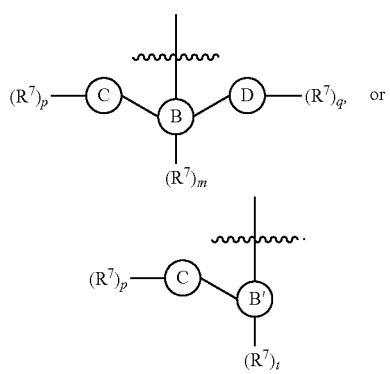

9. The compound of claim 1, wherein n is 1.

10. A compound of formula I, or II, or III:

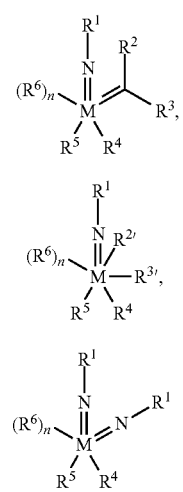

wherein:

M is molybdenum or tungsten;

$R^1$ is substituted phenyl, wherein one to five of the substituents are independently $R^y$;

each of $R^2$ and $R^3$ is independently R, —OR, —SR, —N(R)$_2$, —OC(O)R, —SOR, —SO$_2$R, —SO$_2$N(R)$_2$, —C(O)N(R)$_2$, —NRC(O)R, or —NRSO$_2$R;

$R^{2'}$ and $R^{3'}$ are taken together with M to form a substituted 3-8 membered saturated or partially unsaturated ring having, in addition to M, 0-4 heteroatoms independently selected from nitrogen, oxygen, or sulfur;

each of $R^4$ and $R^5$ is independently halogen, R, —N(R)$_2$, —NRC(O)R, —NRC(O)OR, —NRC(O)N(R)$_2$, —NRSO$_2$R, —NRSO$_2$N(R)$_2$, —NROR, —OR, —OSi(R)$_3$, —$OAr^a$, or an optionally substituted group selected from a 5-6 membered monocyclic heteroaryl ring having at least one nitrogen and 0-3 additional heteroatoms independently selected from nitrogen, oxygen, or sulfur, a 3-7 membered saturated or partially unsaturated heterocyclic ring having at least one nitrogen and 0-2 additional heteroatoms independently selected from nitrogen, oxygen, or sulfur, a 7-10 membered bicyclic saturated or partially unsaturated heterocyclic ring having at least one nitrogen and 0-4 additional heteroatoms independently selected from nitrogen, oxygen, or sulfur, or an 8-10 membered bicyclic heteroaryl ring having at least one nitrogen and 0-4 additional heteroatoms independently selected from nitrogen, oxygen, or sulfur;

$Ar^a$ is

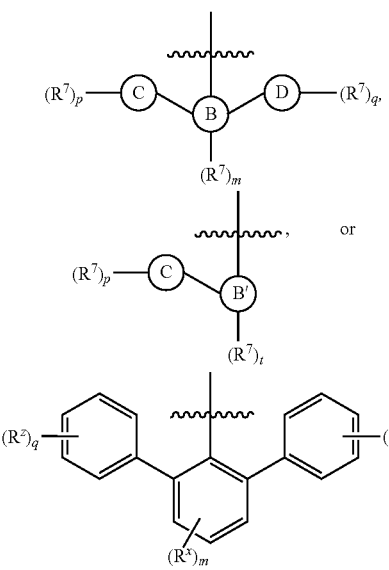

m is 0-3;

Ring B is a substituted group selected from phenyl or a 5-6 membered monocyclic heteroaryl ring having 1-4 heteroatoms independently selected from nitrogen, oxygen, or sulfur;

p is 1-5;

q is 0-5;

t is 0-4;

each of Ring B', Ring C and Ring D is independently a substituted group selected from phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-14 membered bicyclic or tricyclic heteroaryl ring having 1-5 heteroatoms independently selected from nitrogen, oxygen, or sulfur;

each $R^7$ is independently halogen, R, —CN, —NO$_2$, —OR, —SR, —S(O)R, —S(O)$_2$R, —OSi(R)$_3$, —N(R)$_2$, —NRC(O)R, —NRC(O)OR, —NRC(O)N(R)$_2$, —NRSO$_2$R, —NRSO$_2$N(R)$_2$, or —NROR;

each of $R^x$, $R^y$ and $R^z$ is independently an electron-withdrawing group;

each R is independently hydrogen or an optionally substituted group selected from C$_{1-20}$ aliphatic, C$_{1-20}$ heteroaliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:

two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen, or sulfur;

n is 1; and $R^6$ is a bidentate ligand, and $R^6$ is 1,2-dimethoxyethane (DME).

11. The compound of claim 1, wherein n is 0.

12. A compound selected from: W(NAr$^{cl3}$)(CHCMe$_3$)(OTf)$_2$(DME), W(NAr$^{cl3}$)(CHCMe$_3$)(2,5-Me$_2$Pyr)$_2$, W(NAr$^{Br3}$)(CHCMe$_3$)(OTf)$_2$(DME), W(NAr$^{Cl2CF3}$)$_2$(CHCMe$_3$)(OTf)$_2$(DME), W(NAr$^{(CF3)2}$)(CHCMe$_3$)(OTf)$_2$(DME), Mo(NC$_6$F$_5$)(CHCMe$_2$Ph)(OTf)$_2$(DME), Mo(NC$_6$F$_5$)(CHCMe$_2$Ph)(Me$_2$Pyr)$_2$, Mo(NC$_6$F$_5$)(CHCMe$_2$Ph)[OC(CF$_3$)$_3$]$_2$, Mo(NC$_6$F$_5$)(CHCMe$_2$Ph)[OC(C$_6$F$_5$)$_3$]$_2$, Mo(NC$_6$F$_5$)(CHCMe$_2$Ph)(ODFT)$_2$, W(NC$_6$F$_5$)(CH-t-Bu)(DME)(OTf)$_2$, W(NC$_6$F$_5$)(CH-t-Bu)(THF)$_2$(OTf)$_2$, W(NC$_6$F$_5$)(CH-t-Bu)(DME)(THF)(OTf)$_2$, [W(NC$_6$F$_5$)(CH-t-Bu)(t-DME)(OTf)$_2$]$_x$, W(NC$_6$F$_5$)(CH-t-Bu)(DME)(Pyr)$_2$, W(NC$_6$F$_5$)(CH-t-Bu)(DME)[OC(CF$_3$)$_3$]$_2$, W(NC$_6$F$_5$)(CH-t-Bu)[OC(C$_6$F$_5$)$_3$]$_2$, W(NC$_6$F$_5$)(CH-t-Bu)(ODFT)$_2$, Mo(NC$_6$F$_5$)(CHCMe$_2$Ph)(Me$_2$Pyr)(HMTO), W(NC$_6$F$_5$)(CH-t-Bu)(dme)$_{1.5}$(Pyr)$_2$, W(NC$_6$F$_5$)(CHCMe$_2$Ph)(Me$_2$Pyr)(HMTO), W(NAr$^{cl3}$)(CH-t-Bu)(Pyr)(DFTO), W(NAr$^{cl3}$)(CH-t-Bu)(Pyr)(HMTO), W(NAr$^{cl3}$)(CH-t-Bu)(Pyr)(HIPTO), W(NAr$^{Br3}$)(CH-t-Bu)(Pyr)(DFTO), W(NAr$^{Br3}$)(CH-t-Bu)(Pyr)(HMTO), W(NAr$^{Br3}$)(CH-t-Bu)(Pyr)(HIPTO), W(NAr$^{Cl2CF3}$)(CH-t-Bu)(Pyr)(DFTO), W(NAr$^{Cl2CF3}$)(CH-t-Bu)(Pyr)(HMTO), W(NAr$^{Cl2CF3}$)(CH-t-Bu)(Pyr)(HIPTO), W(NAr$^{(CF3)2}$)(CH-t-Bu)(Pyr)(DFTO), W(NAr$^{(CF3)2}$)(CH-t-Bu)(Pyr)(HMTO), W(NAr$^{(CF3)2}$)(CH-t-Bu)(Pyr)(HIPTO), W(NAr$^{cl3}$)(CH-t-Bu)(OR$_{F6}$), W(NAr$^{cl3}$)(CH-t-Bu)(OR$_{F9}$), W(NAr$^{Br3}$)(CH-t-Bu)(OR$_{F6}$), W(NAr$^{Br3}$)(CH-t-Bu)(OR$_{F9}$), W(NAr$^{Cl2CF3}$)(CH-t-Bu)(OR$_{F6}$), W(NAr$^{Cl2CF3}$)(CH-t-Bu)(OR$_{F9}$), W(NAr$^{(CF3)2}$)(CH-t-Bu)(OR$_{F6}$), W(NAr$^{(CF3)2}$)(CH-t-Bu)(OR$_{F9}$), W(NAr$^{cl3}$)(CHCMe$_3$)(Me$_2$Pyr)(OHMT), W(NAr$^{cl3}$)(CHCMe$_3$)(Me$_2$pyr)(ODFT), W(NAr$^{cl3}$)(CHCMe3)(Me$_2$pyr)(OTript), W(NAr$^{cl3}$)(CHCMe$_3$)(ODBMP)$_2$, W(NAr$^{Br3}$)(CHCMe$_3$)(ODBMP)$_2$, W(NAr$^{Cl2CF3}$)(CHCMe$_3$)(ODBMP)$_2$, W(NAr$^{(CF3)2}$)(CHCMe$_3$)(ODBMP)$_2$, W(NAr$^{(CF3)2}$)(CHCMe$_3$)(ODBMP)$_2$·2DME, W(NAr$^{cl}$)(CHCMe$_3$)(OTf)$_2$(dme), W(NAr$^{cl}$)(CHCMe$_3$)(ODBMP)$_2$, W(NAr$^F$)(CHCMe$_3$)(OTf)$_2$(dme), W(NAr$^F$)(CHCMe$_3$)(ODBMP)$_2$, W(NAr')(CHCMe$_3$)(OTf)$_2$(dme), W(NAr')(CHCMe$_3$)(ODBMP)$_2$, W(NAr")(CHCMe$_2$Ph)(OTf)$_2$(dme), W(NAr")(CHCMe$_2$Ph)(ODBMP)$_2$, W(NC$_6$F$_5$)(CH$_2$CH$_2$CH$_2$)[OC(CF$_3$)$_3$]$_2$, Mo(NC$_6$F$_5$)$_2$Cl$_2$(DME), W(NC$_6$F$_5$)$_2$Cl$_2$(DME), Mo(NC$_6$F$_5$)$_2$(CH$_2$CMe$_2$Ph)$_2$, Mo(NC$_6$F$_5$)$_2$(CH$_2$CMe$_2$Ph)$_2$(Et$_2$O), W(NC$_6$F$_5$)$_2$(CH$_2$CMe$_3$)$_2$, W(NAr$^{cl3}$)$_2$Cl$_2$(DME), W(NAr$^{cl3}$)$_2$(CH$_2$CMe$_3$)$_2$, W(NAr$^{Br3}$)$_2$Cl$_2$(DME), W(NAr$^{Br3}$)$_2$(CH$_2$CMe$_3$)$_2$, W(NAr$^{Cl2CF3}$)$_2$Cl$_2$(DME), W(NAr$^{Cl2CF3}$)$_2$(CH$_2$CMe$_3$)$_2$, W(NAr$^{(CF3)2}$)$_2$Cl$_2$(DME), and W(NAr$^{(CF3)2}$)$_2$(CHCMe$_3$)$_2$, wherein Ar$^{cl3}$ is 2,4,6-trichlorophenyl, Ar$^{Br3}$ is 2,4,6-tribromophenyl, Ar$^{Cl2CF3}$ is 2,6-dichloro-4-(trifluoromethyl)phenyl, Ar$^{(CF3)2}$ is 3,5-bis(trifluoromethyl)phenyl, OR$_{F6}$ is hexafluoro-tert-butoxide (—OCMe(CF$_3$)$_2$), OR$_{F9}$ is perfluoro-tert-butoxide (—OC(CF$_3$)$_3$), Ar' is 2,6-Me$_2$C$_6$H$_3$, and Ar" is 3,5-Me$_2$C$_6$H$_3$, or HO-2,6-(CHPh$_2$)$_2$-4-MeC$_6$H$_2$ or a salt thereof.

13. The compound of claim 12, wherein the compound is HO-2,6-(CHPh$_2$)$_2$-4-MeC$_6$H$_2$ or a salt thereof.

14. A compound of formula I, or II, or III:

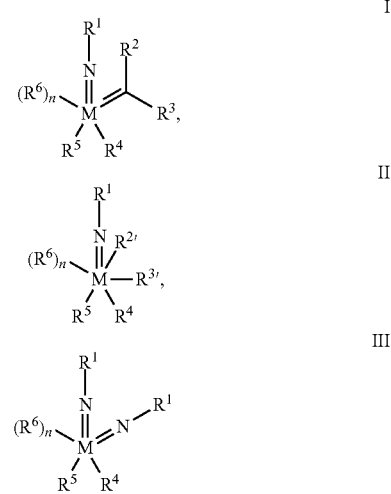

wherein:

M is tungsten;

$R^1$ is

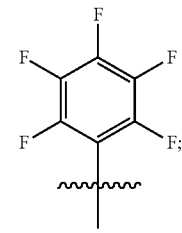 [SMILES: *c1c(F)c(F)c(F)c(F)c1F]

each of $R^2$ and $R^3$ is independently R, —OR, —SR, —N(R)$_2$, —OC(O)R, —SOR, —SO$_2$R, SO$_2$N(R)$_2$, —C(O)N(R)$_2$, —NRC(O)R or —NRSO$_2$R;

$R^{2'}$ and $R^{3'}$ are taken together with M to form a substituted 3-8 membered saturated or partially unsaturated ring having, in addition to M, 0-4 heteroatoms independently selected from nitrogen, oxygen, or sulfur;

each of $R^4$ and $R^5$ is independently halogen, R, —N(R)$_2$, —NRC(O)R, —NRC(O)OR, —NRC(O)N(R)$_2$, —NRSO₂R, —NRSO₂N(R)₂, —NROR, —OR, —OSi(R)₃, —OArᵃ, or an optionally substituted group selected from a 5-6 membered monocyclic heteroaryl ring having at least one nitrogen and 0-3 additional heteroatoms independently selected from nitrogen, oxygen, or sulfur, a 3-7 membered saturated or partially unsaturated heterocyclic ring having at least one nitrogen and 0-2 additional heteroatoms independently selected from nitrogen, oxygen, or sulfur, a 7-10 membered bicyclic saturated or partially unsaturated heterocyclic ring having at least one nitrogen and 0-4 additional heteroatoms independently selected from nitrogen, oxygen, or sulfur, or an 8-10 membered bicyclic heteroaryl ring having at least one nitrogen and 0-4 additional heteroatoms independently selected from nitrogen, oxygen, or sulfur;

Arᵃ is

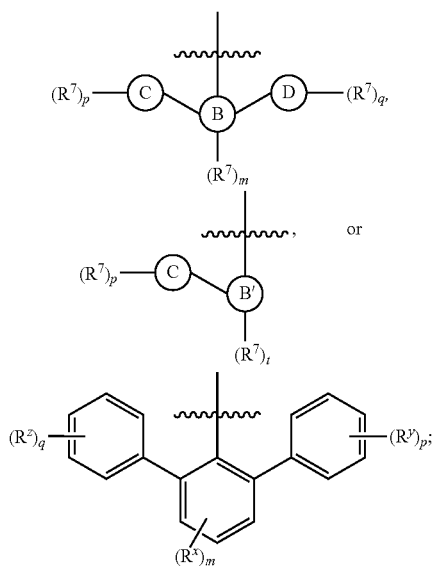

m is 0-3;

Ring B is a substituted group selected from phenyl or a 5-6 membered monocyclic heteroaryl ring having 1-4 heteroatoms independently selected from nitrogen, oxygen, or sulfur;

p is 1-5;

q is 0-5;

t is 0-4;

each of Ring B', Ring C and Ring D is independently a substituted group selected from phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-14 membered bicyclic or tricyclic heteroaryl ring having 1-5 heteroatoms independently selected from nitrogen, oxygen, or sulfur;

each $R^7$ is independently halogen, R, —CN, —NO₂, —OR, —SR, —S(O)R, —S(O)₂R, —OSi(R)₃, —N(R)₂, —NRC(O)R, —NRC(O)OR, —NRC(O)N(R)₂, —NRSO₂R, —NRSO₂N(R)₂, or —NROR;

each of $R^x$, $R^y$ and $R^z$ is independently an electron-withdrawing group;

each R is independently hydrogen or an optionally substituted group selected from $C_{1-20}$ aliphatic, $C_{1-20}$ heteroaliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:

two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen, or sulfur;

n is 0-2; and each $R^6$ is independently a neutral ligand.

15. The compound of claim 14, wherein the compound is a compound of formula II.

16. The compound of claim 14, wherein the compound is a compound of formula III.

17. The compound of claim 14, wherein the compound is a compound of formula II, and $R^{2'}$ and $R^{3'}$ are taken together with M to form a metallacyclobutane ring optionally substituted at the ring carbon atoms.

18. The compound of claim 17, wherein $R^{2'}$ and $R^{3'}$ are taken together with M to form a metallacyclobutane ring unsubstituted at the ring carbon atoms.

19. The compound of claim 14, wherein the compound is a compound of formula II, and $R^{2'}$ and $R^{3'}$ are taken together with M to form a metallacyclopropane ring optionally substituted at the ring carbon atoms.

20. The compound of claim 14, wherein the compound is a compound of formula I.

21. The compound of claim 20, wherein each of $R^4$ and $R^5$ is independently —N(R)₂, or an optionally substituted group selected from a 5-6 membered monocyclic heteroaryl ring having at least one nitrogen and 0-3 additional heteroatoms independently selected from nitrogen, oxygen, or sulfur, a 3-7 membered saturated or partially unsaturated heterocyclic ring having at least one nitrogen and 0-2 additional heteroatoms independently selected from nitrogen, oxygen, or sulfur, a 7-10 membered bicyclic saturated or partially unsaturated heterocyclic ring having at least one nitrogen and 0-4 additional heteroatoms independently selected from nitrogen, oxygen, or sulfur, and an 8-10 membered bicyclic heteroaryl ring having at least one nitrogen and 0-4 additional heteroatoms independently selected from nitrogen, oxygen, or sulfur; wherein each of $R^4$ and $R^5$ is bonded to M through the nitrogen atom.

22. The compound of claim 21, wherein each of $R^4$ and $R^5$ is independent optionally substituted pyrrolyl.

23. The compound of claim 14, wherein the compound is a compound of formula I or II, wherein:

$R^4$ is —$N(R)_2$, or an optionally substituted group selected from a 5-6 membered monocyclic heteroaryl ring having at least one nitrogen and 0-3 additional heteroatoms independently selected from nitrogen, oxygen, or sulfur, a 3-7 membered saturated or partially unsaturated heterocyclic ring having at least one nitrogen and 0-2 additional heteroatoms independently selected from nitrogen, oxygen, or sulfur, a 7-10 membered bicyclic saturated or partially unsaturated heterocyclic ring having at least one nitrogen and 0-4 additional heteroatoms independently selected from nitrogen, oxygen, or sulfur, and an 8-10 membered bicyclic heteroaryl ring having at least one nitrogen and 0-4 additional heteroatoms independently selected from nitrogen, oxygen, or sulfur; wherein $R^4$ is bonded to M through the nitrogen atom; and $R^5$ is —OR, —$OSi(R)_3$, or —$OAr^a$.

24. The compound of claim 23, wherein $R^4$ is optionally substituted pyrrolyl.

25. The compound of claim 23, wherein $R^5$ is —$OAr^a$, wherein $Ar^a$ is

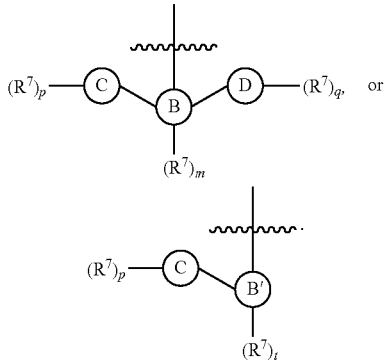

26. The compound of claim 14, wherein the compound is a compound of formula I or II, and each of $R^4$ and $R^5$ is independently —OR, —$OSi(R)_3$, or —$OAr^a$.

27. The compound of claim 26, wherein each of $R^4$ and $R^5$ is independently —$OAr^a$, wherein $Ar^a$ is

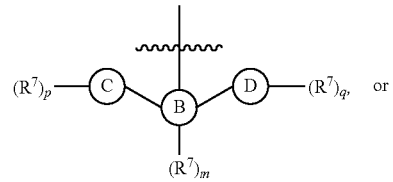

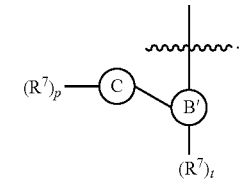

28. The compound of claim 14, wherein the compound is a compound of formula III, wherein each of $R^4$ and $R^5$ is independently optionally substituted $C_{1-20}$ aliphatic.

29. The compound of claim 10, wherein:
$R^1$ is substituted phenyl, wherein three to five of the substituents are independently $R^y$; and each of $R^x$, $R^y$ and $R^z$ is independently halogen or —$CF_3$.

* * * * *

UNITED STATES PATENT AND TRADEMARK OFFICE
CERTIFICATE OF CORRECTION

| | |
|---|---|
| PATENT NO. | : 9,441,059 B2 |
| APPLICATION NO. | : 14/311111 |
| DATED | : September 13, 2016 |
| INVENTOR(S) | : Richard Royce Schrock et al. |

It is certified that error appears in the above-identified patent and that said Letters Patent is hereby corrected as shown below:

In the Specification

Column 9, Line 5 needs to have --III-- inserted into the right margin of the graph Column 11, Line 57 reads, ". . . cyclooctenyl, norbomyl, adamantyl, . . ." which should read ". . . cyclooctenyl, norbornyl, adamantyl, . . ."

Column 12, Line 56 reads, ". . . 14 it electrons shared . . ." which should read ". . . 14 π electrons shared . . ."

Column 14, Line 40 reads, ". . . –N(R°)S(O)$_2$R. . ." which should read ". . . –N(R°)S(O)$_2$R° . . ."

Column 14, Line 41 reads, ". . . –P(O)$_2$R. . ." which should read ". . . –P(O)$_2$R° . . ."

Column 15, Line 12 reads, ". . . hydrogen, C$_{1-6}$ aliphatic . . ." which should read ". . . hydrogen, C$_{1-6}$ aliphatic . . ."

Column 18, Lines 56-57 read, ". . . 3,4-dimethoxybenzyl, 0-nitrobenzyl, . . ." which should read ". . . 3,4-dimethoxybenzyl, O-nitrobenzyl, . . ."

Column 77, Line 36 reads, ". . . each variable is . . ." which should read ". . . wherein each variable is . . ."

Column 79, Line 39 reads, ". . . each R$^4$ and R$^5$ is . . ." which should read ". . . wherein each R$^4$ and R$^5$ is . . ."

Column 94, Line 7 reads, ". . . group in the a position could be . . ." which should read ". . . group in the α position could be . . ."

Signed and Sealed this
Third Day of July, 2018

Andrei Iancu
*Director of the United States Patent and Trademark Office*

CERTIFICATE OF CORRECTION (continued)
U.S. Pat. No. 9,441,059 B2

Column 96, Line 56 reads, ". . . (dt, 1$J_{CF}$=261 Hz, . . ." which should read ". . . (dt, $^1J_{CF}$=261 Hz, . . ."

Column 96, Line 57 reads, ". . . (q, 1$J_{CF}$=319 Hz), . . ." which should read ". . . (q, $^1J_{CF}$=319 Hz), . . ."

Column 97, Line 4 reads, ". . . (p-DME) . . ." which should read ". . . (μ-DME) . . ."

Column 99, Line 55 reads, ". . . toluene-ds, . . ." which should read ". . . toluene-$d_8$, . . ."

Column 100, Line 14 reads, ". . . toluene-ds, . . ." which should read ". . . toluene-$d_8$, . . ."

Column 100, Line 17 reads, ". . . toluene-ds, . . ." which should read ". . . toluene-$d_8$, . . ."

Column 103, Line 23 reads, ". . . W(NR)$_2$Cl$_2$(dme)." which should read ". . . W(NR$^1$)$_2$Cl$_2$(dme)."

Column 103, Line 24 reads, ". . . W(NR)$_2$Cl$_2$(dme)." which should read ". . . W(NR$^1$)$_2$Cl$_2$(dme)."

Column 111, Line 49 reads, "78.23. Anal. . . ." which should read "-78.23. Anal. . . ."

In the Claims

Column 121, Line 33 reads, ". . . W(NAr$^{cl3}$) . . ." which should read ". . . W(NAr$^{Cl3}$) . . ."

Column 121, Line 34 reads, ". . . W(NAr$^{cl3}$) . . ." which should read ". . . W(NAr$^{Cl3}$) . . ."

Column 121, Line 43 reads, ". . . (t-DME) . . ." which should read ". . . μ-DME) . . ."

Column 121, Line 48 reads, ". . . W(Nar$^{cl3}$) . . ." which should read ". . . W(Nar$^{Cl3}$) . . ."

Column 121, Line 49 reads, ". . . W(Nar$^{cl3}$) . . ." which should read ". . . W(Nar$^{Cl3}$) . . ." (two instances)

Column 121, Line 56 reads, ". . . W(Nar$^{cl3}$) . . ." which should read ". . . W(Nar$^{Cl3}$) . . ."

Column 121, Line 57 reads, ". . . W(Nar$^{cl3}$) . . ." which should read ". . . W(Nar$^{Cl3}$) . . ."

Column 121, Line 62 reads, ". . . W(Nar$^{cl3}$) . . ." which should read ". . . W(Nar$^{Cl3}$) . . ." (two instances)

Column 121, Line 63 reads, ". . . W(Nar$^{cl3}$) . . ." which should read ". . . W(Nar$^{Cl3}$) . . ."

Column 121, Line 67 reads, ". . . W(NAr$^{cl}$) . . ." which should read ". . . W(NAr$^{Cl}$) . . ." (two instances)

Column 122, Line 8 reads, ". . . W(Nar$^{cl3}$) . . ." which should read ". . . W(Nar$^{Cl3}$) . . ." (two instances)

Column 122, Line 12 reads, ". . . wherein Ar$^{cl3}$ is . . ." which should read ". . . wherein Ar$^{Cl3}$ is . . ."